US012586268B2

(12) United States Patent
Kimhi et al.

(10) Patent No.: US 12,586,268 B2
(45) Date of Patent: Mar. 24, 2026

(54) DIGITAL PROCESSING SYSTEMS AND METHODS FOR ENHANCED DATA REPRESENTATION

(71) Applicant: MONDAY.COM LTD., Tel Aviv (IL)

(72) Inventors: Ron Kimhi, Tel Aviv (IL); Itamar Ben Shushan, Tel Aviv (IL); Hili Neeman Magid, Tel Aviv (IL); Eylon Goren, Tel Aviv (IL); Ronit Cyjon, Tel Aviv (IL); Adi Livne, Tel Aviv (IL); Inbal Gery, Tel Aviv (IL); Dror Ogen, Tel Aviv (IL); Dana Porat, Tel Aviv (IL)

(73) Assignee: MONDAY.COM LTD., Tel-Aviv (IL)

( * ) Notice: Subject to any disclaimer, the term of this patent is extended or adjusted under 35 U.S.C. 154(b) by 0 days.

(21) Appl. No.: 19/006,587

(22) Filed: Dec. 31, 2024

(65) Prior Publication Data

US 2025/0138693 A1     May 1, 2025

Related U.S. Application Data

(63) Continuation of application No. PCT/IB2024/055803, filed on Jun. 13, 2024.

(Continued)

(51) Int. Cl.
*G06T 11/20* (2006.01)
*G06F 3/0481* (2022.01)
(Continued)

(52) U.S. Cl.
CPC .......... *G06T 11/206* (2013.01); *G06F 3/0481* (2013.01); *G06F 3/04817* (2013.01);
(Continued)

(58) Field of Classification Search
CPC .. G06T 11/206; G06F 3/0481; G06F 3/04817; G06F 3/04845; G06F 3/0485;
(Continued)

(56) References Cited

U.S. PATENT DOCUMENTS

| | | | |
|---|---|---|---|
| 4,972,314 A | 11/1990 | Getzinger et al. | |
| 5,220,657 A | 6/1993 | Bly et al. | |

(Continued)

FOREIGN PATENT DOCUMENTS

| | | |
|---|---|---|
| CA | 2828011 A1 | 9/2012 |
| CN | 103064833 A | 4/2013 |

(Continued)

OTHER PUBLICATIONS

Abor Jr. C., "Low-Code and No-Code AI: New AI Development—What is code anymore?!?!" Linkedin, Published Jul. 15, 2023, Retrieved from <https://www.linkedin.com/pulse/ low-code-no-code-ai-new-development-what-code-anymore-c-l-abor-jr>, 15 pages.

(Continued)

*Primary Examiner* — Cao H Nguyen
(74) *Attorney, Agent, or Firm* — FINNEGAN, HENDERSON, FARABOW, GARRETT & DUNNER LLP

(57) ABSTRACT

Enhanced data representations involving accessing a data structure including items associated with a common objective, each including first and second alphanumeric values, receiving a trigger requesting that items be graphically grouped for visualizing progress toward the common objective, analyzing alphanumeric values to segment the items in partitioning groups, based on a first partitioning, identifying first visual characteristics for non-alphanumerically expressing the first alphanumeric values, based on a second partitioning, identifying second visual characteristics different from the first, for non-alphanumerically expressing the second alphanumeric values, generating tiles associated with the items, each of the tiles adopting a first and second visual characteristics, arranging the plurality of tiles in groupings based on at least one of the first visual characteristics or the (Continued)

second visual characteristics, and causing the groupings to be presented on a common display.

20 Claims, 54 Drawing Sheets

Related U.S. Application Data

(60) Provisional application No. 63/507,985, filed on Jun. 13, 2023.

(51) Int. Cl.

| | |
|---|---|
| *G06F 3/04817* | (2022.01) |
| *G06F 3/04842* | (2022.01) |
| *G06F 3/04845* | (2022.01) |
| *G06F 3/0485* | (2022.01) |
| *G06Q 10/0633* | (2023.01) |

(52) U.S. Cl.

CPC ........ *G06F 3/04845* (2013.01); *G06F 3/0485* (2013.01); *G06Q 10/0633* (2013.01); *G06F 3/04842* (2013.01)

(58) Field of Classification Search

CPC .. G06F 3/04842; G06F 40/103; G06F 40/177; G06Q 10/0633; G06Q 10/06; G06Q 10/067; G06Q 10/103; G06Q 10/101

See application file for complete search history.

(56) References Cited

U.S. PATENT DOCUMENTS

| | | | |
|---|---|---|---|
| 5,479,602 | A | 12/1995 | Baecker et al. |
| 5,517,663 | A | 5/1996 | Kahn |
| 5,632,009 | A | 5/1997 | Rao et al. |
| 5,657,437 | A | 8/1997 | Bishop et al. |
| 5,682,469 | A | 10/1997 | Linnett et al. |
| 5,696,702 | A | 12/1997 | Skinner et al. |
| 5,726,701 | A | 3/1998 | Needham |
| 5,734,837 | A | 3/1998 | Flores et al. |
| 5,787,411 | A | 7/1998 | Groff et al. |
| 5,880,742 | A | 3/1999 | Rao et al. |
| 5,933,145 | A | 8/1999 | Meek |
| 5,987,469 | A | 11/1999 | Lewis et al. |
| 5,999,911 | A | 12/1999 | Berg et al. |
| 6,016,438 | A | 1/2000 | Wakayama |
| 6,016,553 | A | 1/2000 | Schneider et al. |
| 6,023,695 | A | 2/2000 | Osborn et al. |
| 6,034,681 | A | 3/2000 | Miller et al. |
| 6,049,622 | A | 4/2000 | Robb et al. |
| 6,088,707 | A | 7/2000 | Bates et al. |
| 6,108,573 | A | 8/2000 | Debbins et al. |
| 6,111,573 | A | 8/2000 | Mccomb et al. |
| 6,157,381 | A | 12/2000 | Bates et al. |
| 6,167,405 | A | 12/2000 | Rosensteel et al. |
| 6,169,534 | B1 | 1/2001 | Raffel et al. |
| 6,182,127 | B1 | 1/2001 | Cronin, III et al. |
| 6,185,582 | B1 | 2/2001 | Zellweger et al. |
| 6,195,794 | B1 | 2/2001 | Buxton |
| 6,222,541 | B1 | 4/2001 | Bates et al. |
| 6,252,594 | B1 | 6/2001 | Xia et al. |
| 6,266,067 | B1 | 7/2001 | Owen et al. |
| 6,275,809 | B1 | 8/2001 | Tamaki et al. |
| 6,330,022 | B1 | 12/2001 | Seligmann |
| 6,377,965 | B1 | 4/2002 | Fries et al. |
| 6,385,617 | B1 | 5/2002 | Malik |
| 6,460,043 | B1 | 10/2002 | Tabbara et al. |
| 6,496,832 | B2 | 12/2002 | Chi et al. |
| 6,509,912 | B1 | 1/2003 | Moran et al. |
| 6,510,459 | B2 | 1/2003 | Cronin et al. |
| 6,522,347 | B1 | 2/2003 | Tsuji et al. |
| 6,527,556 | B1 | 3/2003 | Koskinen |
| 6,567,830 | B1 | 5/2003 | Madduri |
| 6,606,740 | B1 | 8/2003 | Lynn et al. |
| 6,626,959 | B1 | 9/2003 | Moise et al. |
| 6,636,242 | B2 | 10/2003 | Bowman-Amuah |
| 6,647,370 | B1 | 11/2003 | Fu et al. |
| 6,661,431 | B1 | 12/2003 | Stuart et al. |
| 6,874,010 | B1 | 3/2005 | Sargent |
| 6,988,248 | B1 | 1/2006 | Tang et al. |
| 7,027,052 | B1 | 4/2006 | Thorn et al. |
| 7,027,997 | B1 | 4/2006 | Robinson et al. |
| 7,034,860 | B2 | 4/2006 | Lia et al. |
| 7,043,529 | B1 | 5/2006 | Simonoff |
| 7,054,891 | B2 | 5/2006 | Cole |
| 7,228,492 | B1 | 6/2007 | Graham |
| 7,237,188 | B1 | 6/2007 | Leung |
| 7,249,042 | B1 | 7/2007 | Doerr et al. |
| 7,272,637 | B1 | 9/2007 | Himmelstein |
| 7,274,375 | B1 | 9/2007 | David |
| 7,379,934 | B1 | 5/2008 | Forman et al. |
| 7,380,202 | B1 | 5/2008 | Lindhorst et al. |
| 7,383,320 | B1 | 6/2008 | Silberstein et al. |
| 7,389,473 | B1 | 6/2008 | Sawicki et al. |
| 7,415,664 | B2 | 8/2008 | Aureglia et al. |
| 7,417,644 | B2 | 8/2008 | Cooper et al. |
| 7,461,077 | B1 | 12/2008 | Greenwood |
| 7,464,366 | B2 | 12/2008 | Shukla et al. |
| 7,489,976 | B2 | 2/2009 | Adra |
| 7,565,270 | B2 | 7/2009 | Bramwell et al. |
| 7,617,443 | B2 | 11/2009 | Mills et al. |
| 7,685,152 | B2 | 3/2010 | Chivukula et al. |
| 7,707,514 | B2 | 4/2010 | Forstall et al. |
| 7,710,290 | B2 | 5/2010 | Johnson |
| 7,747,782 | B2 | 6/2010 | Hunt et al. |
| 7,770,100 | B2 | 8/2010 | Chamberlain et al. |
| 7,827,476 | B1 | 11/2010 | Roberts et al. |
| 7,827,615 | B1 | 11/2010 | Allababidi et al. |
| 7,836,408 | B1 | 11/2010 | Ollmann et al. |
| 7,916,157 | B1 | 3/2011 | Kelley et al. |
| 7,921,360 | B1 | 4/2011 | Sundermeyer et al. |
| 7,933,952 | B2 | 4/2011 | Parker et al. |
| 7,945,622 | B1 | 5/2011 | Pegg |
| 7,954,043 | B2 | 5/2011 | Bera |
| 7,954,064 | B2 | 5/2011 | Forstall et al. |
| 8,046,703 | B2 | 10/2011 | Busch et al. |
| 8,060,518 | B2 | 11/2011 | Timmons |
| 8,078,955 | B1 | 12/2011 | Gupta |
| 8,082,274 | B2 | 12/2011 | Steinglass et al. |
| 8,108,241 | B2 | 1/2012 | Shukoor |
| 8,136,031 | B2 | 3/2012 | Massand |
| 8,151,213 | B2 | 4/2012 | Weitzman et al. |
| 8,223,172 | B1 | 7/2012 | Miller et al. |
| 8,286,072 | B2 | 10/2012 | Chamberlain et al. |
| 8,365,095 | B2 | 1/2013 | Bansal et al. |
| 8,375,327 | B2 | 2/2013 | Lorch et al. |
| 8,386,960 | B1 | 2/2013 | Eismann et al. |
| 8,407,217 | B1 | 3/2013 | Zhang |
| 8,413,261 | B2 | 4/2013 | Nemoy et al. |
| 8,423,909 | B2 | 4/2013 | Zabielski |
| 8,543,566 | B2 | 9/2013 | Weissman et al. |
| 8,548,997 | B1 | 10/2013 | Wu |
| 8,560,942 | B2 | 10/2013 | Fortes et al. |
| 8,566,732 | B2 | 10/2013 | Louch et al. |
| 8,572,173 | B2 | 10/2013 | Briere et al. |
| 8,578,399 | B2 | 11/2013 | Khen et al. |
| 8,601,383 | B2 | 12/2013 | Folting et al. |
| 8,620,703 | B1 | 12/2013 | Kapoor et al. |
| 8,621,652 | B2 | 12/2013 | Slater |
| 8,635,520 | B2 | 1/2014 | Christiansen et al. |
| 8,660,881 | B2 | 2/2014 | Wood et al. |
| 8,677,448 | B1 | 3/2014 | Kauffman et al. |
| 8,694,981 | B2 | 4/2014 | Federighi et al. |
| 8,719,071 | B2 | 5/2014 | MacIntyre et al. |
| 8,738,414 | B1 | 5/2014 | Nagar et al. |
| 8,812,471 | B2 | 8/2014 | Akita |
| 8,819,042 | B2 | 8/2014 | Samudrala et al. |
| 8,825,758 | B2 | 9/2014 | Bailor et al. |
| 8,838,533 | B2 | 9/2014 | Kwiatkowski et al. |
| 8,862,979 | B2 | 10/2014 | Hawking |
| 8,863,022 | B2 | 10/2014 | Rhodes et al. |
| 8,869,027 | B2 | 10/2014 | Louch et al. |
| 8,937,627 | B1 | 1/2015 | Otero et al. |

(56) References Cited

U.S. PATENT DOCUMENTS

| | | | |
|---|---|---|---|
| 8,938,465 | B2 | 1/2015 | Messer |
| 8,954,871 | B2 | 2/2015 | Louch et al. |
| 9,007,405 | B1 | 4/2015 | Eldar et al. |
| 9,015,716 | B2 | 4/2015 | Fletcher et al. |
| 9,021,118 | B2 | 4/2015 | John et al. |
| 9,026,897 | B2 | 5/2015 | Zarras |
| 9,043,362 | B2 | 5/2015 | Weissman et al. |
| 9,063,958 | B2 | 6/2015 | Müller et al. |
| 9,129,234 | B2 | 9/2015 | Campbell et al. |
| 9,159,246 | B2 | 10/2015 | Rodriguez et al. |
| 9,172,738 | B1 | 10/2015 | Dacosta |
| 9,177,238 | B2 | 11/2015 | Windmueller et al. |
| 9,183,303 | B1 | 11/2015 | Goel et al. |
| 9,223,770 | B1 | 12/2015 | Ledet |
| 9,239,719 | B1 | 1/2016 | Feinstein et al. |
| 9,244,917 | B1 | 1/2016 | Sharma et al. |
| 9,253,130 | B2 | 2/2016 | Zaveri |
| 9,268,604 | B1 | 2/2016 | Herzberg et al. |
| 9,286,246 | B2 | 3/2016 | Saito et al. |
| 9,286,475 | B2 | 3/2016 | Li et al. |
| 9,292,587 | B2 | 3/2016 | Kann et al. |
| 9,336,502 | B2 | 5/2016 | Mohammad et al. |
| 9,342,579 | B2 | 5/2016 | Cao et al. |
| 9,361,287 | B1 | 6/2016 | Simon et al. |
| 9,372,592 | B1 * | 6/2016 | Goodspeed ........... G06F 3/0481 |
| 9,390,059 | B1 | 7/2016 | Gur et al. |
| 9,395,959 | B2 | 7/2016 | Hatfield et al. |
| 9,424,287 | B2 | 8/2016 | Schroth |
| 9,424,333 | B1 | 8/2016 | Bisignani et al. |
| 9,424,545 | B1 | 8/2016 | Lee |
| 9,430,458 | B2 | 8/2016 | Rhee et al. |
| 9,449,031 | B2 | 9/2016 | Barrus et al. |
| 9,495,386 | B2 | 11/2016 | Tapley et al. |
| 9,519,699 | B1 | 12/2016 | Kulkarni et al. |
| 9,558,172 | B2 | 1/2017 | Rampson et al. |
| 9,569,511 | B2 | 2/2017 | Morin |
| 9,613,086 | B1 | 4/2017 | Sherman |
| 9,635,091 | B1 | 4/2017 | Laukkanen et al. |
| 9,659,284 | B1 | 5/2017 | Wilson et al. |
| 9,679,456 | B2 | 6/2017 | East |
| 9,686,086 | B1 | 6/2017 | Nguyen et al. |
| 9,720,602 | B1 | 8/2017 | Chen et al. |
| 9,727,376 | B1 | 8/2017 | Bills et al. |
| 9,760,271 | B2 | 9/2017 | Persaud |
| 9,779,150 | B1 | 10/2017 | Sherman et al. |
| 9,794,256 | B2 | 10/2017 | Kiang et al. |
| 9,798,829 | B1 | 10/2017 | Baisley |
| 9,811,676 | B1 | 11/2017 | Gauvin |
| 9,866,561 | B2 | 1/2018 | Psenka et al. |
| 9,870,136 | B2 | 1/2018 | Pourshahid |
| 9,911,092 | B2 | 3/2018 | Goja |
| 10,001,908 | B2 | 6/2018 | Grieve et al. |
| 10,043,296 | B2 | 8/2018 | Li |
| 10,057,246 | B1 | 8/2018 | Drozd et al. |
| 10,067,928 | B1 | 9/2018 | Krappe |
| 10,078,668 | B1 | 9/2018 | Woodrow et al. |
| 10,169,306 | B2 | 1/2019 | O'Shaughnessy et al. |
| 10,176,154 | B2 | 1/2019 | Ben-Aharon et al. |
| 10,235,441 | B1 | 3/2019 | Makhlin et al. |
| 10,255,609 | B2 | 4/2019 | Kinkead et al. |
| 10,282,405 | B1 | 5/2019 | Silk et al. |
| 10,282,406 | B2 | 5/2019 | Bissantz |
| 10,311,080 | B2 | 6/2019 | Folting et al. |
| 10,318,624 | B1 | 6/2019 | Rosner et al. |
| 10,327,712 | B2 | 6/2019 | Beymer et al. |
| 10,347,017 | B2 | 7/2019 | Ruble et al. |
| 10,372,706 | B2 | 8/2019 | Chavan et al. |
| 10,380,140 | B2 | 8/2019 | Sherman |
| 10,419,469 | B1 | 9/2019 | Singh et al. |
| 10,423,758 | B2 | 9/2019 | Kido et al. |
| 10,445,702 | B1 | 10/2019 | Hunt |
| 10,452,360 | B1 | 10/2019 | Burman et al. |
| 10,453,118 | B2 | 10/2019 | Smith et al. |
| 10,474,317 | B2 | 11/2019 | Ramanathan et al. |
| 10,489,391 | B1 | 11/2019 | Tomlin |
| 10,489,462 | B1 | 11/2019 | Rogynskyy et al. |
| 10,496,737 | B1 | 12/2019 | Sayre et al. |
| 10,505,825 | B1 | 12/2019 | Bettaiah et al. |
| 10,528,599 | B1 | 1/2020 | Pandis et al. |
| 10,534,507 | B1 | 1/2020 | Laukkanen et al. |
| 10,540,152 | B1 | 1/2020 | Krishnaswamy et al. |
| 10,540,434 | B2 | 1/2020 | Migeon et al. |
| 10,546,001 | B1 | 1/2020 | Nguyen et al. |
| 10,564,622 | B1 | 2/2020 | Dean et al. |
| 10,573,407 | B2 | 2/2020 | Ginsburg |
| 10,579,724 | B2 | 3/2020 | Campbell et al. |
| 10,581,675 | B1 | 3/2020 | Iyer et al. |
| 10,587,714 | B1 | 3/2020 | Kulkarni et al. |
| 10,628,002 | B1 | 4/2020 | Kang et al. |
| 10,698,594 | B2 | 6/2020 | Sanches et al. |
| 10,706,061 | B2 | 7/2020 | Sherman et al. |
| 10,719,220 | B2 | 7/2020 | Ouellet et al. |
| 10,719,311 | B2 | 7/2020 | Foskett et al. |
| 10,733,256 | B2 | 8/2020 | Fickenscher et al. |
| 10,740,117 | B2 | 8/2020 | Ording et al. |
| 10,747,764 | B1 | 8/2020 | Plenderleith |
| 10,747,950 | B2 | 8/2020 | Dang et al. |
| 10,748,312 | B2 | 8/2020 | Ruble et al. |
| 10,754,688 | B2 | 8/2020 | Powell |
| 10,761,691 | B2 | 9/2020 | Anzures et al. |
| 10,762,471 | B1 | 9/2020 | Wang et al. |
| 10,795,555 | B2 | 10/2020 | Burke et al. |
| 10,809,696 | B1 | 10/2020 | Principato |
| 10,817,660 | B2 | 10/2020 | Rampson et al. |
| D910,077 | S | 2/2021 | Naroshevitch et al. |
| 10,955,992 | B2 | 3/2021 | Hooton et al. |
| 10,963,578 | B2 | 3/2021 | More et al. |
| 11,010,371 | B1 | 5/2021 | Slomka et al. |
| 11,030,259 | B2 | 6/2021 | Mullins et al. |
| 11,042,363 | B1 | 6/2021 | Krishnaswamy et al. |
| 11,042,699 | B1 | 6/2021 | Sayre et al. |
| 11,044,257 | B1 | 6/2021 | Heuts et al. |
| 11,048,499 | B2 | 6/2021 | Foskett et al. |
| 11,048,714 | B2 | 6/2021 | Sherman et al. |
| 11,080,636 | B1 | 8/2021 | Son |
| 11,086,894 | B1 | 8/2021 | Srivastava et al. |
| 11,128,464 | B1 | 9/2021 | Loladia |
| 11,144,854 | B1 | 10/2021 | Mouawad |
| 11,182,218 | B2 | 11/2021 | Sanchez et al. |
| 11,190,516 | B1 | 11/2021 | Loladia |
| 11,222,167 | B2 | 1/2022 | Gehrmann et al. |
| 11,231,862 | B1 | 1/2022 | Vig et al. |
| 11,240,278 | B1 | 2/2022 | Wang et al. |
| 11,243,688 | B1 | 2/2022 | Remy et al. |
| 11,301,623 | B2 | 4/2022 | Helft et al. |
| 11,341,705 | B1 | 5/2022 | Isaacs et al. |
| 11,356,485 | B2 | 6/2022 | Hegde et al. |
| 11,360,765 | B2 | 6/2022 | Miller et al. |
| 11,405,504 | B1 | 8/2022 | Tripathy et al. |
| 11,429,384 | B1 | 8/2022 | Navert et al. |
| 11,443,390 | B1 | 9/2022 | Caligaris et al. |
| 11,494,171 | B1 | 11/2022 | Acharya et al. |
| 11,513,772 | B1 | 11/2022 | Gross |
| 11,570,182 | B1 | 1/2023 | Tran et al. |
| 11,593,096 | B1 | 2/2023 | Chaptini et al. |
| 11,593,477 | B1 | 2/2023 | Thimmegowda et al. |
| 11,620,615 | B2 | 4/2023 | Jiang et al. |
| 11,681,445 | B2 | 6/2023 | Vohra et al. |
| 11,682,091 | B2 | 6/2023 | Sukman et al. |
| 11,720,410 | B2 | 8/2023 | Culp et al. |
| 11,750,475 | B1 | 9/2023 | Gonzalez et al. |
| 11,799,951 | B1 | 10/2023 | Maloo et al. |
| 11,823,269 | B2 | 11/2023 | Aisen et al. |
| 11,882,117 | B1 | 1/2024 | Kumar |
| 11,922,222 | B1 | 3/2024 | Chawla et al. |
| 11,977,858 | B2 | 5/2024 | Kulkarni et al. |
| 12,034,613 | B2 | 7/2024 | Gupta et al. |
| 12,105,939 | B1 | 10/2024 | Rank et al. |
| 2001/0008998 | A1 | 7/2001 | Tamaki et al. |
| 2001/0032248 | A1 | 10/2001 | Krafchin |
| 2001/0039551 | A1 | 11/2001 | Saito et al. |
| 2002/0002459 | A1 | 1/2002 | Lewis et al. |
| 2002/0019827 | A1 | 2/2002 | Shiman et al. |
| 2002/0065848 | A1 | 5/2002 | Walker et al. |

(56) References Cited

U.S. PATENT DOCUMENTS

| | | |
|---|---|---|
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0099777 A1 | 7/2002 | Gupta et al. |
| 2002/0138528 A1 | 9/2002 | Gong et al. |
| 2003/0004771 A1 | 1/2003 | Yaung |
| 2003/0033196 A1 | 2/2003 | Tomlin |
| 2003/0041113 A1 | 2/2003 | Larsen |
| 2003/0051377 A1 | 3/2003 | Chirafesi |
| 2003/0052912 A1 | 3/2003 | Bowman et al. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | Mcinnes et al. |
| 2003/0135558 A1 | 7/2003 | Bellotti et al. |
| 2003/0137536 A1 | 7/2003 | Hugh |
| 2003/0187864 A1 | 10/2003 | Mcgoveran |
| 2003/0200215 A1 | 10/2003 | Chen et al. |
| 2003/0204490 A1 | 10/2003 | Kasriel |
| 2003/0233224 A1 | 12/2003 | Marchisio et al. |
| 2004/0010514 A1 | 1/2004 | Agarwal et al. |
| 2004/0032432 A1 | 2/2004 | Baynger |
| 2004/0078105 A1 | 4/2004 | Moon et al. |
| 2004/0078373 A1 | 4/2004 | Ghoneimy et al. |
| 2004/0098284 A1 | 5/2004 | Petito et al. |
| 2004/0119713 A1 | 6/2004 | Meyringer |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0168115 A1 | 8/2004 | Bauernschmidt et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0010454 A1 | 1/2005 | Falk et al. |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0149908 A1 | 7/2005 | Klianev |
| 2005/0165600 A1 | 7/2005 | Kasravi et al. |
| 2005/0171881 A1 | 8/2005 | Ghassemieh et al. |
| 2005/0210371 A1 | 9/2005 | Pollock et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1 | 2/2006 | Keyser et al. |
| 2006/0036568 A1 | 2/2006 | Moore et al. |
| 2006/0044307 A1 | 3/2006 | Song |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0074735 A1 | 4/2006 | Shukla et al. |
| 2006/0074736 A1 | 4/2006 | Shukla et al. |
| 2006/0080594 A1 | 4/2006 | Chavoustie et al. |
| 2006/0085744 A1 | 4/2006 | Hays et al. |
| 2006/0090169 A1 | 4/2006 | Daniels et al. |
| 2006/0095276 A1 | 5/2006 | Axelrod et al. |
| 2006/0101324 A1 | 5/2006 | Goldberg et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0112123 A1 | 5/2006 | Clark et al. |
| 2006/0129415 A1 | 6/2006 | Thukral et al. |
| 2006/0129913 A1 | 6/2006 | Vigesaa et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0271859 A1 | 11/2006 | Gorzela |
| 2006/0282348 A1 | 12/2006 | Greenfield et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0032993 A1 | 2/2007 | Yamaguchi et al. |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0067373 A1 | 3/2007 | Higgins et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0143736 A1 | 6/2007 | Moriarty et al. |
| 2007/0150389 A1 | 6/2007 | Aamodt et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0192729 A1 | 8/2007 | Downs |
| 2007/0220119 A1 | 9/2007 | Himmelstein |
| 2007/0233647 A1 | 10/2007 | Rawat et al. |
| 2007/0239746 A1 | 10/2007 | Masselle et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0010615 A1 | 1/2008 | Curtis et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0040181 A1 | 2/2008 | Freire et al. |
| 2008/0046816 A1 | 2/2008 | Cao et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0088628 A1 | 4/2008 | Lu et al. |
| 2008/0097748 A1 | 4/2008 | Haley et al. |
| 2008/0104091 A1 | 5/2008 | Chin |

(56) References Cited

U.S. PATENT DOCUMENTS

| | | |
|---|---|---|
| 2008/0126389 A1 | 5/2008 | Mush et al. |
| 2008/0127205 A1 | 5/2008 | Barros |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0221946 A1 | 9/2008 | Balon |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons et al. |
| 2009/0006171 A1 | 1/2009 | Blatchley et al. |
| 2009/0006283 A1 | 1/2009 | Labrie et al. |
| 2009/0007157 A1 | 1/2009 | Ward et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0043814 A1 | 2/2009 | Faris et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0075694 A1 | 3/2009 | Kim et al. |
| 2009/0077164 A1 | 3/2009 | Phillips et al. |
| 2009/0077217 A1 | 3/2009 | Mcfarland et al. |
| 2009/0083140 A1 | 3/2009 | Phan |
| 2009/0088875 A1 | 4/2009 | Baier et al. |
| 2009/0094514 A1 | 4/2009 | Dargahi et al. |
| 2009/0113310 A1 | 4/2009 | Appleyard et al. |
| 2009/0129596 A1 | 5/2009 | Chavez et al. |
| 2009/0132331 A1 | 5/2009 | Cartledge et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | Mccormack et al. |
| 2009/0256972 A1 | 10/2009 | Ramaswamy et al. |
| 2009/0262690 A1 | 10/2009 | Breuer et al. |
| 2009/0271696 A1 | 10/2009 | Bailor et al. |
| 2009/0276692 A1 | 11/2009 | Rosner |
| 2009/0292690 A1 | 11/2009 | Culbert |
| 2009/0313201 A1 | 12/2009 | Huelsman et al. |
| 2009/0313537 A1 | 12/2009 | Fu et al. |
| 2009/0313570 A1 | 12/2009 | Po |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0077260 A1 | 3/2010 | Pillai et al. |
| 2010/0082705 A1 | 4/2010 | Ramesh et al. |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | Mckeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0169853 A1 | 7/2010 | Jain et al. |
| 2010/0174678 A1 | 7/2010 | Massand |
| 2010/0205521 A1 | 8/2010 | Folting |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241968 A1 | 9/2010 | Tarara et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0268705 A1 | 10/2010 | Douglas et al. |
| 2010/0268773 A1 | 10/2010 | Hunt et al. |
| 2010/0281462 A1 | 11/2010 | Festa |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0154192 A1 | 6/2011 | Yang et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225525 A1 | 9/2011 | Chasman et al. |
| 2011/0231273 A1 | 9/2011 | Buchheit |
| 2011/0238716 A1 | 9/2011 | Amir et al. |
| 2011/0258040 A1 | 10/2011 | Gnanasambandam |
| 2011/0269424 A1 | 11/2011 | Multer |
| 2011/0288900 A1 | 11/2011 | Mcqueen et al. |
| 2011/0289397 A1 | 11/2011 | Eastmond et al. |
| 2011/0289439 A1 | 11/2011 | Jugel |
| 2011/0292046 A1 | 12/2011 | Gotz |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036423 A1 | 2/2012 | Haynes et al. |
| 2012/0036462 A1 | 2/2012 | Schwartz et al. |
| 2012/0050802 A1 | 3/2012 | Masuda |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0120086 A1 | 5/2012 | Dang et al. |
| 2012/0124749 A1 | 5/2012 | Lewman |
| 2012/0130907 A1 | 5/2012 | Thompson et al. |
| 2012/0131445 A1 | 5/2012 | Oyarzabal et al. |
| 2012/0137238 A1 | 5/2012 | Abeln |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz et al. |

(56)                References Cited

U.S. PATENT DOCUMENTS

| | | |
|---|---|---|
| 2012/0229867 A1 | 9/2012 | Takagi |
| 2012/0233150 A1 | 9/2012 | Naim et al. |
| 2012/0233533 A1 | 9/2012 | Yucel et al. |
| 2012/0234907 A1 | 9/2012 | Clark et al. |
| 2012/0236368 A1 | 9/2012 | Uchida et al. |
| 2012/0239454 A1 | 9/2012 | Taix et al. |
| 2012/0244891 A1 | 9/2012 | Appleton |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Sitrick et al. |
| 2012/0284643 A1 | 11/2012 | Sitrick et al. |
| 2012/0297307 A1 | 11/2012 | Rider et al. |
| 2012/0300931 A1 | 11/2012 | Ollikainen et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2012/0324348 A1 | 12/2012 | Rounthwaite |
| 2013/0015954 A1 | 1/2013 | Thorne et al. |
| 2013/0018952 A1 | 1/2013 | Mcconnell et al. |
| 2013/0018953 A1 | 1/2013 | Mcconnell et al. |
| 2013/0018960 A1 | 1/2013 | Knysz et al. |
| 2013/0024418 A1 | 1/2013 | Sitrick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0059598 A1 | 3/2013 | Miyagi et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0215475 A1 | 8/2013 | Noguchi |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter et al. |
| 2013/0268331 A1 | 10/2013 | Bitz et al. |
| 2013/0297468 A1 | 11/2013 | Hirsch et al. |
| 2013/0307997 A1 | 11/2013 | O'Keefe et al. |
| 2013/0318424 A1 | 11/2013 | Boyd |
| 2013/0339051 A1 | 12/2013 | Dobrean |
| 2014/0002863 A1 | 1/2014 | Hasegawa et al. |
| 2014/0006326 A1 | 1/2014 | Bazanov |
| 2014/0012616 A1 | 1/2014 | Moshenek |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0059017 A1 | 2/2014 | Chaney et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0078557 A1 | 3/2014 | Hasegawa et al. |
| 2014/0082525 A1 | 3/2014 | Kass et al. |
| 2014/0095237 A1 | 4/2014 | Ehrler et al. |
| 2014/0100884 A1 | 4/2014 | Hamilton et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Jarvenpaa et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao Dv |
| 2014/0214404 A1 | 7/2014 | Kalia et al. |
| 2014/0215303 A1 | 7/2014 | Grigorovitch et al. |
| 2014/0229816 A1 | 8/2014 | Yakub |
| 2014/0240735 A1 | 8/2014 | Salgado |
| 2014/0249877 A1 | 9/2014 | Hull et al. |
| 2014/0257568 A1 | 9/2014 | Czaja et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0297828 A1 | 10/2014 | Voltmer et al. |
| 2014/0304174 A1 | 10/2014 | Scott et al. |
| 2014/0306837 A1 | 10/2014 | Hauck |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0325552 A1 | 10/2014 | Evans et al. |
| 2014/0359580 A1 | 12/2014 | Boissy et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0039387 A1 | 2/2015 | Akahoshi et al. |
| 2015/0046209 A1 | 2/2015 | Choe |
| 2015/0046900 A1 | 2/2015 | Eldridge et al. |
| 2015/0058619 A1 | 2/2015 | Sweet et al. |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0100336 A1 | 4/2015 | Ford et al. |
| 2015/0106736 A1 | 4/2015 | Torman et al. |
| 2015/0125834 A1 | 5/2015 | Mendoza Tascon |
| 2015/0142676 A1 | 5/2015 | Mcginnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0178657 A1 | 6/2015 | Kleehammer et al. |
| 2015/0188964 A1 | 7/2015 | Sharma et al. |
| 2015/0205830 A1 | 7/2015 | Bastide et al. |
| 2015/0212717 A1 | 7/2015 | Nair et al. |
| 2015/0213397 A1 | 7/2015 | Arena |
| 2015/0220491 A1 | 8/2015 | Cochrane et al. |
| 2015/0234887 A1 | 8/2015 | Greene et al. |
| 2015/0242091 A1 | 8/2015 | Lu et al. |
| 2015/0248214 A1 | 9/2015 | Gilger et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Kim et al. |
| 2015/0295877 A1 | 10/2015 | Roman et al. |
| 2015/0310126 A1 | 10/2015 | Steiner et al. |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |

(56)     References Cited

U.S. PATENT DOCUMENTS

| | | |
|---|---|---|
| 2015/0370540 A1 | 12/2015 | Coslovi et al. |
| 2015/0370776 A1 | 12/2015 | New |
| 2015/0370904 A1 | 12/2015 | Joshi et al. |
| 2015/0378542 A1 | 12/2015 | Saito et al. |
| 2015/0378556 A1 | 12/2015 | Ramanathan et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0035546 A1 | 2/2016 | Platt et al. |
| 2016/0041736 A1 | 2/2016 | Schulz |
| 2016/0055134 A1 | 2/2016 | Sathish et al. |
| 2016/0055374 A1 | 2/2016 | Zhang et al. |
| 2016/0057163 A1 | 2/2016 | Boffa et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0098574 A1 | 4/2016 | Bargagni |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0196310 A1 | 7/2016 | Dutta |
| 2016/0210572 A1 | 7/2016 | Shaaban et al. |
| 2016/0216948 A1 | 7/2016 | Mcpherson et al. |
| 2016/0224532 A1 | 8/2016 | Miller et al. |
| 2016/0224676 A1 | 8/2016 | Miller et al. |
| 2016/0224939 A1 | 8/2016 | Chen et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur Bache et al. |
| 2016/0275150 A1 | 9/2016 | Bourbonnais et al. |
| 2016/0292206 A1 | 10/2016 | Ruiz Velazquez et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Wright et al. |
| 2016/0335303 A1 | 11/2016 | Madhalam et al. |
| 2016/0335604 A1 | 11/2016 | Reminick et al. |
| 2016/0335731 A1 | 11/2016 | Hall |
| 2016/0335903 A1 | 11/2016 | Mendoza Tascon |
| 2016/0344828 A1 | 11/2016 | Hausler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0038919 A1 | 2/2017 | Moss et al. |
| 2017/0041296 A1 | 2/2017 | Ford et al. |
| 2017/0052937 A1 | 2/2017 | Sirven et al. |
| 2017/0061342 A1 | 3/2017 | Lore et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0139992 A1 | 5/2017 | Morin |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177556 A1 | 6/2017 | Fay et al. |
| 2017/0177888 A1 | 6/2017 | Arora et al. |
| 2017/0185575 A1 | 6/2017 | Sood et al. |
| 2017/0185592 A1 | 6/2017 | Frei et al. |
| 2017/0185668 A1 | 6/2017 | Convertino et al. |
| 2017/0200122 A1 | 7/2017 | Edson et al. |
| 2017/0206366 A1 | 7/2017 | Fay et al. |
| 2017/0212924 A1 | 7/2017 | Semlani et al. |
| 2017/0220813 A1 | 8/2017 | Mullins et al. |
| 2017/0221072 A1 | 8/2017 | Athulurutlrumala et al. |
| 2017/0221238 A1 | 8/2017 | Limberger |
| 2017/0228421 A1 | 8/2017 | Sharma et al. |
| 2017/0228445 A1 | 8/2017 | Chiu et al. |
| 2017/0228460 A1 | 8/2017 | Amel et al. |
| 2017/0229152 A1 | 8/2017 | Loganathan et al. |
| 2017/0236081 A1 | 8/2017 | Grady Smith et al. |
| 2017/0242921 A1 | 8/2017 | Rota |
| 2017/0257517 A1 | 9/2017 | Panda |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277620 A1 | 9/2017 | Kadioglu |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0289619 A1 | 10/2017 | Xu et al. |
| 2017/0301039 A1 | 10/2017 | Dyer et al. |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0316355 A1 | 11/2017 | Shrestha et al. |
| 2017/0322963 A1 | 11/2017 | Ramamurthi et al. |
| 2017/0324692 A1 | 11/2017 | Zhou |
| 2017/0329479 A1 | 11/2017 | Rauschenbach et al. |
| 2017/0351252 A1 | 12/2017 | Kleifges et al. |
| 2017/0351974 A1 | 12/2017 | Rose et al. |
| 2017/0372442 A1 | 12/2017 | Mejias |
| 2017/0374205 A1 | 12/2017 | Panda |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0039651 A1 | 2/2018 | Tobin et al. |
| 2018/0055434 A1 | 3/2018 | Cheung et al. |
| 2018/0068470 A1 | 3/2018 | Croft |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081505 A1 | 3/2018 | Ron et al. |
| 2018/0081863 A1 | 3/2018 | Bathla |
| 2018/0081868 A1 | 3/2018 | Willcock et al. |
| 2018/0082072 A1 | 3/2018 | Hosie et al. |
| 2018/0088753 A1 | 3/2018 | Viegas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121028 A1 | 5/2018 | Kuscher et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |

(56) References Cited

U.S. PATENT DOCUMENTS

| | | |
|---|---|---|
| 2018/0174104 A1 | 6/2018 | Schikora et al. |
| 2018/0181650 A1 | 6/2018 | Komatsuda et al. |
| 2018/0181716 A1 | 6/2018 | Mander et al. |
| 2018/0189734 A1 | 7/2018 | Newhouse et al. |
| 2018/0210936 A1 | 7/2018 | Reynolds et al. |
| 2018/0225270 A1 | 8/2018 | Bhide et al. |
| 2018/0232422 A1 | 8/2018 | Park et al. |
| 2018/0260371 A1 | 9/2018 | Theodore et al. |
| 2018/0260435 A1 | 9/2018 | Xu |
| 2018/0262705 A1 | 9/2018 | Park et al. |
| 2018/0276417 A1 | 9/2018 | Cerezo Sanchez |
| 2018/0285918 A1 | 10/2018 | Staggs |
| 2018/0293217 A1 | 10/2018 | Callaghan |
| 2018/0293587 A1 | 10/2018 | Oda |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357047 A1 | 12/2018 | Brown et al. |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0011310 A1 | 1/2019 | Turnbull et al. |
| 2019/0012306 A1 | 1/2019 | Dvorak |
| 2019/0012342 A1 | 1/2019 | Cohn |
| 2019/0028360 A1 | 1/2019 | Douglas et al. |
| 2019/0034395 A1 | 1/2019 | Curry et al. |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050466 A1 | 2/2019 | Kim et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0079751 A1 | 3/2019 | Foskett et al. |
| 2019/0095413 A1 | 3/2019 | Davis et al. |
| 2019/0097909 A1 | 3/2019 | Puri et al. |
| 2019/0102425 A1 | 4/2019 | Obeidat |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0114589 A1 | 4/2019 | Voss et al. |
| 2019/0123924 A1 | 4/2019 | Embiricos et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0147030 A1 | 5/2019 | Stein et al. |
| 2019/0155821 A1 | 5/2019 | Dirisala |
| 2019/0166110 A1 | 5/2019 | Miu |
| 2019/0179501 A1 | 6/2019 | Seeley et al. |
| 2019/0199823 A1 | 6/2019 | Underwood et al. |
| 2019/0208058 A1 | 7/2019 | Dvorkin et al. |
| 2019/0213557 A1 | 7/2019 | Dotan-Cohen et al. |
| 2019/0220161 A1 | 7/2019 | Loftus et al. |
| 2019/0236188 A1 | 8/2019 | Mckenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0312899 A1 | 10/2019 | Shulman et al. |
| 2019/0324840 A1 | 10/2019 | Malamut et al. |
| 2019/0325012 A1 | 10/2019 | Delaney et al. |
| 2019/0327294 A1 | 10/2019 | Subramani Nadar et al. |
| 2019/0340550 A1 | 11/2019 | Denger et al. |
| 2019/0347077 A1 | 11/2019 | Huebra |
| 2019/0349447 A1 | 11/2019 | Adams et al. |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0377791 A1 | 12/2019 | Abou Mahmoud et al. |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua Garcia |
| 2020/0026352 A1 | 1/2020 | Wang et al. |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez Salgado et al. |
| 2020/0117908 A1 | 4/2020 | Pavetic et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0176089 A1 | 6/2020 | Jones et al. |
| 2020/0192646 A1 | 6/2020 | Yerramreddy et al. |
| 2020/0192785 A1 | 6/2020 | Chen |
| 2020/0193388 A1 | 6/2020 | Tran-Kiem et al. |
| 2020/0236110 A1 | 7/2020 | Metzler et al. |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293337 A1 | 9/2020 | Rangasamy et al. |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0310835 A1 | 10/2020 | Momchilov |
| 2020/0310888 A1 | 10/2020 | Gopalan et al. |
| 2020/0326824 A1 | 10/2020 | Magahern et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0372055 A1 | 11/2020 | Joko et al. |
| 2020/0374146 A1 | 11/2020 | Chhabra et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2020/0409949 A1 | 12/2020 | Saxena et al. |
| 2020/0410395 A1 | 12/2020 | Ray et al. |
| 2021/0014136 A1 | 1/2021 | Rath |
| 2021/0019287 A1 | 1/2021 | Prasad et al. |
| 2021/0021603 A1 | 1/2021 | Gibbons |
| 2021/0026598 A1 | 1/2021 | Zinsmeyer et al. |
| 2021/0034058 A1 | 2/2021 | Subramanian et al. |
| 2021/0034443 A1 | 2/2021 | Lowin et al. |
| 2021/0035069 A1 | 2/2021 | Parikh |
| 2021/0042796 A1 | 2/2021 | Khoury et al. |
| 2021/0049524 A1 | 2/2021 | Nachum et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0065203 A1 | 3/2021 | Billigmeier et al. |
| 2021/0072883 A1 | 3/2021 | Migunova et al. |
| 2021/0073526 A1 | 3/2021 | Zeng et al. |
| 2021/0075870 A1 | 3/2021 | Kempf et al. |
| 2021/0081404 A1 | 3/2021 | Kempf et al. |
| 2021/0084120 A1 | 3/2021 | Fisher et al. |
| 2021/0096852 A1 | 4/2021 | Stump et al. |
| 2021/0117864 A1 | 4/2021 | Weast et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0141923 A1 | 5/2021 | Wu et al. |
| 2021/0149553 A1 | 5/2021 | Lereya et al. |
| 2021/0149688 A1 | 5/2021 | Newell et al. |
| 2021/0149925 A1 | 5/2021 | Mann et al. |
| 2021/0150489 A1 | 5/2021 | Haramati et al. |
| 2021/0157978 A1 | 5/2021 | Haramati et al. |

(56) References Cited

U.S. PATENT DOCUMENTS

| | | | |
|---|---|---|---|
| 2021/0158214 A1 | 5/2021 | Witt et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0203549 A1 | 7/2021 | Snehashis et al. |
| 2021/0232484 A1 | 7/2021 | Keneally et al. |
| 2021/0248311 A1 | 8/2021 | Helft et al. |
| 2021/0257065 A1 | 8/2021 | Mander et al. |
| 2021/0264220 A1 | 8/2021 | Wei et al. |
| 2021/0271726 A1 | 9/2021 | Trainor |
| 2021/0273957 A1 | 9/2021 | Boyer et al. |
| 2021/0281428 A1 | 9/2021 | Kempf et al. |
| 2021/0304020 A1 | 9/2021 | Kaplan |
| 2021/0326519 A1 | 10/2021 | Lin et al. |
| 2021/0328888 A1 | 10/2021 | Rath |
| 2021/0342145 A1 | 11/2021 | Miller et al. |
| 2021/0342785 A1 | 11/2021 | Mann et al. |
| 2021/0357579 A1 | 11/2021 | Lereya et al. |
| 2021/0365446 A1 | 11/2021 | Srivastava et al. |
| 2021/0374197 A1 | 12/2021 | Chauhan |
| 2021/0382611 A1 | 12/2021 | Gan |
| 2021/0397585 A1 | 12/2021 | Seward |
| 2022/0066847 A1 | 3/2022 | Liu et al. |
| 2022/0099454 A1 | 3/2022 | Decrop et al. |
| 2022/0103589 A1 | 3/2022 | Shen et al. |
| 2022/0121325 A1 | 4/2022 | Roberts et al. |
| 2022/0121478 A1 | 4/2022 | Chivukula et al. |
| 2022/0129283 A1 | 4/2022 | Sharma et al. |
| 2022/0138004 A1 | 5/2022 | Nandakumar et al. |
| 2022/0147934 A1 | 5/2022 | Chandrashekar et al. |
| 2022/0191251 A1 | 6/2022 | Gavish et al. |
| 2022/0206864 A1 | 6/2022 | Nadathur et al. |
| 2022/0221591 A1 | 7/2022 | Smith et al. |
| 2022/0222427 A1 | 7/2022 | Mann et al. |
| 2022/0229928 A1 | 7/2022 | Shachar et al. |
| 2022/0237550 A1 | 7/2022 | Jennings et al. |
| 2022/0261288 A1 | 8/2022 | Viswanathan et al. |
| 2022/0291666 A1 | 9/2022 | Cella et al. |
| 2022/0292180 A1 | 9/2022 | Chauhan |
| 2022/0308918 A1 | 9/2022 | Pandey et al. |
| 2022/0335362 A1 | 10/2022 | Nikain et al. |
| 2022/0343258 A1 | 10/2022 | Wilde et al. |
| 2022/0351564 A1 | 11/2022 | Sahani et al. |
| 2022/0357905 A1 | 11/2022 | Dohmae |
| 2022/0358190 A1 | 11/2022 | Baghani et al. |
| 2022/0375145 A1 | 11/2022 | Herath et al. |
| 2022/0382522 A1 | 12/2022 | Heynemann Nascentes Da Silva et al. |
| 2022/0413846 A1 | 12/2022 | Clarke et al. |
| 2023/0004832 A1 | 1/2023 | Sahasi et al. |
| 2023/0014233 A1 | 1/2023 | Xiang et al. |
| 2023/0016946 A1 | 1/2023 | Wouhaybi et al. |
| 2023/0035600 A1 | 2/2023 | Holzman et al. |
| 2023/0075183 A1 | 3/2023 | Copty et al. |
| 2023/0081880 A1 | 3/2023 | Mathur et al. |
| 2023/0083891 A1 | 3/2023 | Achin et al. |
| 2023/0093470 A1 | 3/2023 | Dvornik et al. |
| 2023/0108808 A1 | 4/2023 | Lerman |
| 2023/0113369 A1 | 4/2023 | Wang et al. |
| 2023/0142774 A1 | 5/2023 | Hashemi et al. |
| 2023/0153651 A1 | 5/2023 | Bi et al. |
| 2023/0153724 A1 | 5/2023 | Thampy et al. |
| 2023/0171241 A1 | 6/2023 | Amichay et al. |
| 2023/0188516 A1 | 6/2023 | Danilov et al. |
| 2023/0230006 A1 | 7/2023 | Bosch et al. |
| 2023/0259390 A1 | 8/2023 | Howley et al. |
| 2023/0259839 A1 | 8/2023 | Manalo et al. |
| 2023/0281040 A1 | 9/2023 | Cao |
| 2023/0316382 A1 | 10/2023 | Faricy et al. |
| 2023/0385085 A1 | 11/2023 | Singh |
| 2023/0393832 A1 | 12/2023 | Touati et al. |
| 2023/0396641 A1 | 12/2023 | Hebbagodi et al. |
| 2023/0419161 A1 | 12/2023 | Dines |
| 2024/0046142 A1 | 2/2024 | Marks et al. |
| 2024/0053727 A1 | 2/2024 | Timisescu et al. |
| 2024/0054526 A1 | 2/2024 | Horwitz et al. |
| 2024/0078724 A1* | 3/2024 | Brehmer ............... G06F 3/0482 |
| 2024/0169519 A1 | 5/2024 | Tjon |
| 2024/0250977 A1 | 7/2024 | Shulman et al. |
| 2024/0283759 A1 | 8/2024 | Adams |
| 2024/0345807 A1 | 10/2024 | Duggal et al. |
| 2024/0361995 A1 | 10/2024 | Somasundaram et al. |
| 2025/0130705 A1 | 4/2025 | Kimhi et al. |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 108717428 A | 10/2018 |
| CN | 112929172 A | 6/2021 |
| EP | 3443466 B1 | 12/2021 |
| KR | 20150100760 A | 9/2015 |
| KR | 20220016276 A | 2/2022 |
| WO | 2004100015 A2 | 11/2004 |
| WO | 2006116580 A2 | 11/2006 |
| WO | 2008109541 A1 | 9/2008 |
| WO | 2014088393 A1 | 6/2014 |
| WO | 2017202159 A1 | 11/2017 |
| WO | 2018023798 A1 | 2/2018 |
| WO | 2018042424 A1 | 3/2018 |
| WO | 2020139865 A1 | 7/2020 |
| WO | 2020187408 A1 | 9/2020 |
| WO | 2020215123 A1 | 10/2020 |
| WO | 2021096944 A1 | 5/2021 |
| WO | 2021144656 A1 | 7/2021 |
| WO | 2021161104 A1 | 8/2021 |
| WO | 2021220058 A1 | 11/2021 |
| WO | 2022153122 A1 | 7/2022 |
| WO | 2023186048 A1 | 10/2023 |

OTHER PUBLICATIONS

Anupam et al., "Personalizing the Web Using Site Descriptions," In: Proceedings of the Tenth International Workshop on Database and Expert Systems Applications, Sep. 1999, 7 pages.

Aylward, Grant, "Drag-and-Drop AI Enables Digital Workforce Deployment at Scale Share," Blue Prism, Mar. 19, 2020, Retrieved from <https://www.blueprism.com/resources/ blog/drag-and-drop-ai-enables-digital-workforce-deployment-at-scale/>, 10 pages.

Baarslag et al., "Negotiation as an Interaction Mechanism for Deciding App Permissions," In: Proceedings of the 2016 CHI Conference Extended Abstracts on Human Factors in Computing Systems, 2016, pp. 2012-2019.

Bahrebar et al., "A Novel Type-2 Fuzzy Logic for Improved Risk Analysis of Proton Exchange Membrane Fuel Cells in Marine Power Systems Application," Energies, Mar. 22, 2018, vol. 11, No. 721, pp. 1-16.

Barai et al., "Image Annotation System Using Visual and Textual Features," In: Proceedings of the 16th International Conference on Distributed Multi-media Systems, 2010, 8 pages.

Basic Walkthrough, Aug. 9, 2019, Retrieved from <https://www. youtube.com/watch?v=VpbgWyPf74g>, 16 pages.

Breitgand et al., "Serverless Data Analytics Platform: D3.1 Intital specs of the Serverless Compute and Execution Engine," CloudButton, Jul. 22, 2019, Retrieved from <https://cloudbutton.eu/docs/ deliverables/CloudButton_D3.1_Public.pdf>, 56 pages.

Chen et al., "Artificial Intelligence in Education: A Review," IEEEAccess, Apr. 2020, vol. 8, pp. 75264-75278.

Demonstracion en espanol de Monday.com, Published Feb. 20, 2019, Retrieved from <https://www.youtube.com/watch?v= zOqydTgof1A>, 53 pages.

Desmedt et al., "Function-Based Access Control (FBAC) From Access Control Matrix to Access Control Tensor," In: Proceedings of the 8th ACM CCS International Workshop on Managing Insider Security Threats, 2016, 12 pages.

(56) References Cited

OTHER PUBLICATIONS

Donath, Judith, "Interfaces Make Meaning," Chapter 3 from The Social Machine: Designs for Living Online, 2014, pp. 41-76.

Dorn et al., "Efficient Full-Field Vibration Measurements and Operational Modal Analysis Using Neuromorphic Event-Based Imaging," Journal of Engineering Mechanics, Jul. 1, 2018, vol. 144, No. 7, 25 pages.

Features, daPulse, Nov. 2021, Retrieved from <web.archive.org/web/2014091818421/https://dapulse.com/features>, 22 pages.

Freund, Karl, "SiMa.ai Creates Drag-And-Drop Platform For Building AI Workflows," Forbes, Sep. 12, 2023, Retrieved from <https://www.forbes.com/sites/karlfreund/2023/09/12/simaai-creates-drag-and-drop-platform-for-building-ai-workflows/?sh=789de8466046>, 6 pages.

Gutwin et al., "Supporting Informal Collaboration in Shared-Workspace Groupware," Journal of Universal Computer Science, 2008, vol. 14, No. 9, pp. 1411-1434.

High Level Overview, daPulse, 2016, Retrieved from <https://web.archive.org/web/20161104170936/https://dapulse.com>, 12 pages.

Hupfer et al., "Introducing collaboration into an application development environment," In: Proceedings of the 2004 ACM Conference on Computer Supported Cooperative Work, Nov. 2004, vol. 6, No. 3, pp. 21-24.

International Search Report and Written Opinion in PCT/IB2020/000024, mailed Jun. 9, 2020, 10 pages.

International Search Report and Written Opinion in PCT/IB2020/000658, mailed Nov. 11, 2020, 8 pages.

International Search Report and Written Opinion in PCT/IB2020/000974, mailed May 3, 2021, 15 pages.

International Search Report and Written Opinion in PCT/IB2021/000090, mailed Jul. 27, 2021, 12 pages.

International Search Report and Written Opinion in PCT/IB2021/000297, mailed Oct. 12, 2021, 17 pages.

International Search Report and Written Opinion in PCT/IB2023/061991, mailed Feb. 26, 2024, 6 pages.

International Search Report and Written Opinion in PCT/IB2023/061992, mailed Mar. 19, 2024, 7 pages.

International Search Report and Written Opinion in PCT/IB2023/061994, mailed Apr. 25, 2024, 11 pages.

Ionescu et al., "A chat-centric collaborative environment for web-based real-time collaboration," 2015 IEEE 10th Jubilee International Symposium on Applied Computational Intelligence and Informatics, May 21-23, 2015, pp. 105-110.

Kantorovitz, Isaiah, "Lexical Analysis Tool," May 2004, Retrieved from <https://dl.acm.org/doi/pdf/10.1145/997140.997147>, vol. 39, No. 5, pp. 66-74.

Kollmann, Franz, "Realizing Fine-Granular Read and Write Rights on Tree Structured Documents," in: The Second International Conference on Availability, Reliability and Security, 2007, 7 pages.

Larson, Stephen, "Introducing Data Mining Concepts Using Microsoft Excel's Table Analysis Tools," Oct. 2015, Retrieved from <https://dl.acm.org/doi/pdf/10.5555/2831373.2831394>, pp. 127-129.

Lins et al., "Artificial Intelligence as a Service," Business & Information Systems Engineering, vol. 63, 2021, pp. 441-456.

List et al., "An Evaluation of Conceptual Business Process Modelling Languages," In: Proceedings of the 2006 ACM symposium on Applied Computing, Apr. 2006, pp. 1532-1539.

Monday.com Walkthrough 2018/All Features, Platforms & Thoughts, Transcription Provided, Mar. 1, 2018, pp. 1-55.

Ni et al., "Asynchronous Event-Based Visual Shape Tracking for Stable Haptic Feedback in Microrobotics," IEEE Transactions on Robotics, vol. 28, No. 5, Oct. 1, 2012, pp. 1081-1089.

Pedersen et al., "Tivoli: an electronic whiteboard for informal workgroup meetings," Conference on Human Factors in Computing Systems: Proceedings of the INTERACT '93 and CHI '93 conference on Human factors in computing systems, Apr. 24-29, 1993, pp. 391-398.

Peltier, J., "Clustered and Stacked Column and Bar Charts," Peltier Technical Services, Inc., Aug. 2011, 128 pages.

Pivot table, Wikipedia, Jul. 2021, Retrieved from <https://en.wikipedia.org/w/index.php?title=Pivottable&oldid=857163289>, 5 pages.

Rodrigo, A., "Project Management with Monday.com: A 101 Introduction," Envato Tuts+, Jul. 22, 2019, Retrieved from <https://business.tutsplus.com/tutorials/project-management-with-mondaycom--cms-33586>, 11 pages.

Singh et al., "A Theoretical Framework of a BIM-based Multi-Disciplinary Collaboration Platform," Automation in Construction, Nov. 2011, vol. 20, pp. 134-144.

Sreenath et al., "Agent-based service selection," Journal of Web Semantics 1.3, Oct. 2003, 29 pages.

Stancu et al., "SecCollab-Improving Confidentiality for Existing Cloud-Based Collaborative Editors," In: 2017 21st International Conferences on Control Systems and Computer Science, 2017, pp. 324-331.

Stohr, E., "Workflow Automation: Overview and Research Issues," Information Systems Frontiers, 2001, pp. 281-296.

Sun et al., "Geoweaver: Advanced Cyberinfrastructure for Managing Hybrid Geoscientific AI Workflows," International Journal of Geo-Information, Feb. 2020, vol. 9, 20 pages.

Switch Presenter While Using ShowMyPC, ShowMyPC, Aug. 2016, Retrieved from <The Wayback Machine>, 1 page.

Using Filters in Overview, Published Mar. 7, 2017, Retrieved from <https://www.youtube.com/watch?v=hycANhz7gww> 1 page.

Wilson et al., "Beyond Social Graphs: User Interactions in Online Social Networks and their Implications," ACM Transactions on the Web, Nov. 2012, vol. 6, No. 4, 31 pages.

Yamada et al., "A Software Tag Generation System to Realize Software Traceability," 2010 Asia Pacific Software Engineering Conference, pp. 423-432.

Zhang et al., "Integrating semantic NLP and logic reasoning into a unified system for fully-automated code checking," Automation in Construction, 2017, vol. 73, 2017, pp. 45-57.

International Search Report and Written Opinion in PCT/IB2024/055803, mailed Sep. 30, 2024, 13 pages.

* cited by examiner

DATA STRUCTURE 200

204

| Client Name | Type | Deal size ($) | Level of risk | Phase | Due Date | Salesperson(s) | Completion Rate | Comments |
|---|---|---|---|---|---|---|---|---|
| Name A | X | 94K | High | Negotiation | 06.09 | Pers. A | 40% | - |
| Name B | Y | 52K | Moderate | Proposal | 06.06 | Pers. B | 15% | - |
| Name C | X | 11K | Low | Proposal | 06.04 | Pers. A, Pers. C | 25% | - |
| Name D | Y | 156K | Low | Won | 06.24 | Pers. D, Pers. B | 90% | Contract Sent |
| Name E | Y | 23K | High | Evaluation | 08.08 | Pers. E | 60% | Check Mail |
| Name F | Z | 68K | Moderate | Evaluation | 14.07 | Pers. C | 55% | - |
| Name G | X | 15K | High | Negotiation | 08.30 | Pers. B, Pers. E | 70% | New Client |
| Name H | Y | 240K | Low | Won | 10.15 | Pers. D | 95% | - |
| ... | ... | ... | ... | ... | ... | ... | ... | ... |
| Name AJ | Z | 136K | Moderate | Evaluation | 05.30 | Pers. D, Pers. E | 70% | - |

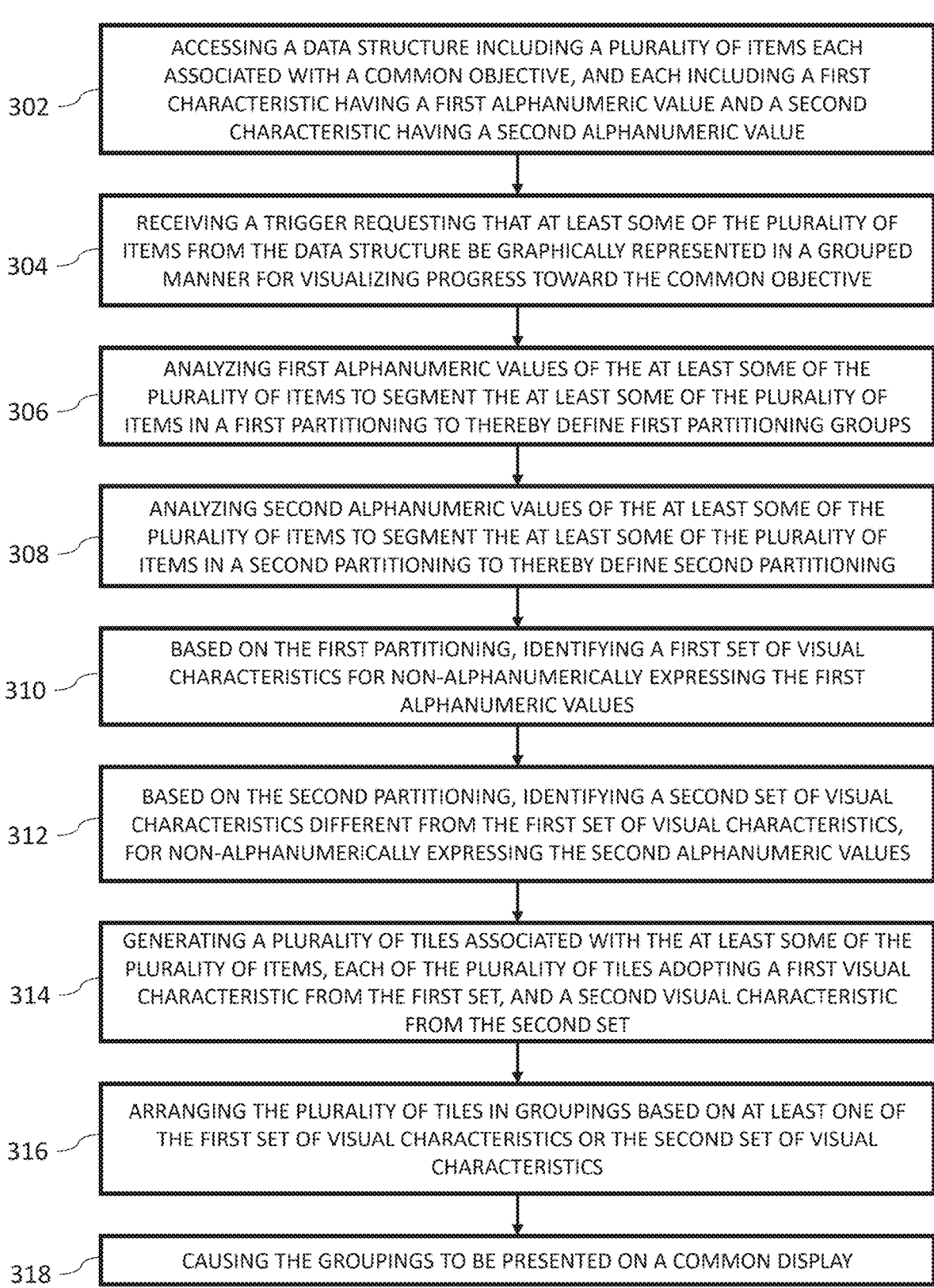

302 — ACCESSING A DATA STRUCTURE INCLUDING A PLURALITY OF ITEMS EACH ASSOCIATED WITH A COMMON OBJECTIVE, AND EACH INCLUDING A FIRST CHARACTERISTIC HAVING A FIRST ALPHANUMERIC VALUE AND A SECOND CHARACTERISTIC HAVING A SECOND ALPHANUMERIC VALUE

304 — RECEIVING A TRIGGER REQUESTING THAT AT LEAST SOME OF THE PLURALITY OF ITEMS FROM THE DATA STRUCTURE BE GRAPHICALLY REPRESENTED IN A GROUPED MANNER FOR VISUALIZING PROGRESS TOWARD THE COMMON OBJECTIVE

306 — ANALYZING FIRST ALPHANUMERIC VALUES OF THE AT LEAST SOME OF THE PLURALITY OF ITEMS TO SEGMENT THE AT LEAST SOME OF THE PLURALITY OF ITEMS IN A FIRST PARTITIONING TO THEREBY DEFINE FIRST PARTITIONING GROUPS

308 — ANALYZING SECOND ALPHANUMERIC VALUES OF THE AT LEAST SOME OF THE PLURALITY OF ITEMS TO SEGMENT THE AT LEAST SOME OF THE PLURALITY OF ITEMS IN A SECOND PARTITIONING TO THEREBY DEFINE SECOND PARTITIONING

310 — BASED ON THE FIRST PARTITIONING, IDENTIFYING A FIRST SET OF VISUAL CHARACTERISTICS FOR NON-ALPHANUMERICALLY EXPRESSING THE FIRST ALPHANUMERIC VALUES

312 — BASED ON THE SECOND PARTITIONING, IDENTIFYING A SECOND SET OF VISUAL CHARACTERISTICS DIFFERENT FROM THE FIRST SET OF VISUAL CHARACTERISTICS, FOR NON-ALPHANUMERICALLY EXPRESSING THE SECOND ALPHANUMERIC VALUES

314 — GENERATING A PLURALITY OF TILES ASSOCIATED WITH THE AT LEAST SOME OF THE PLURALITY OF ITEMS, EACH OF THE PLURALITY OF TILES ADOPTING A FIRST VISUAL CHARACTERISTIC FROM THE FIRST SET, AND A SECOND VISUAL CHARACTERISTIC FROM THE SECOND SET

316 — ARRANGING THE PLURALITY OF TILES IN GROUPINGS BASED ON AT LEAST ONE OF THE FIRST SET OF VISUAL CHARACTERISTICS OR THE SECOND SET OF VISUAL CHARACTERISTICS

318 — CAUSING THE GROUPINGS TO BE PRESENTED ON A COMMON DISPLAY

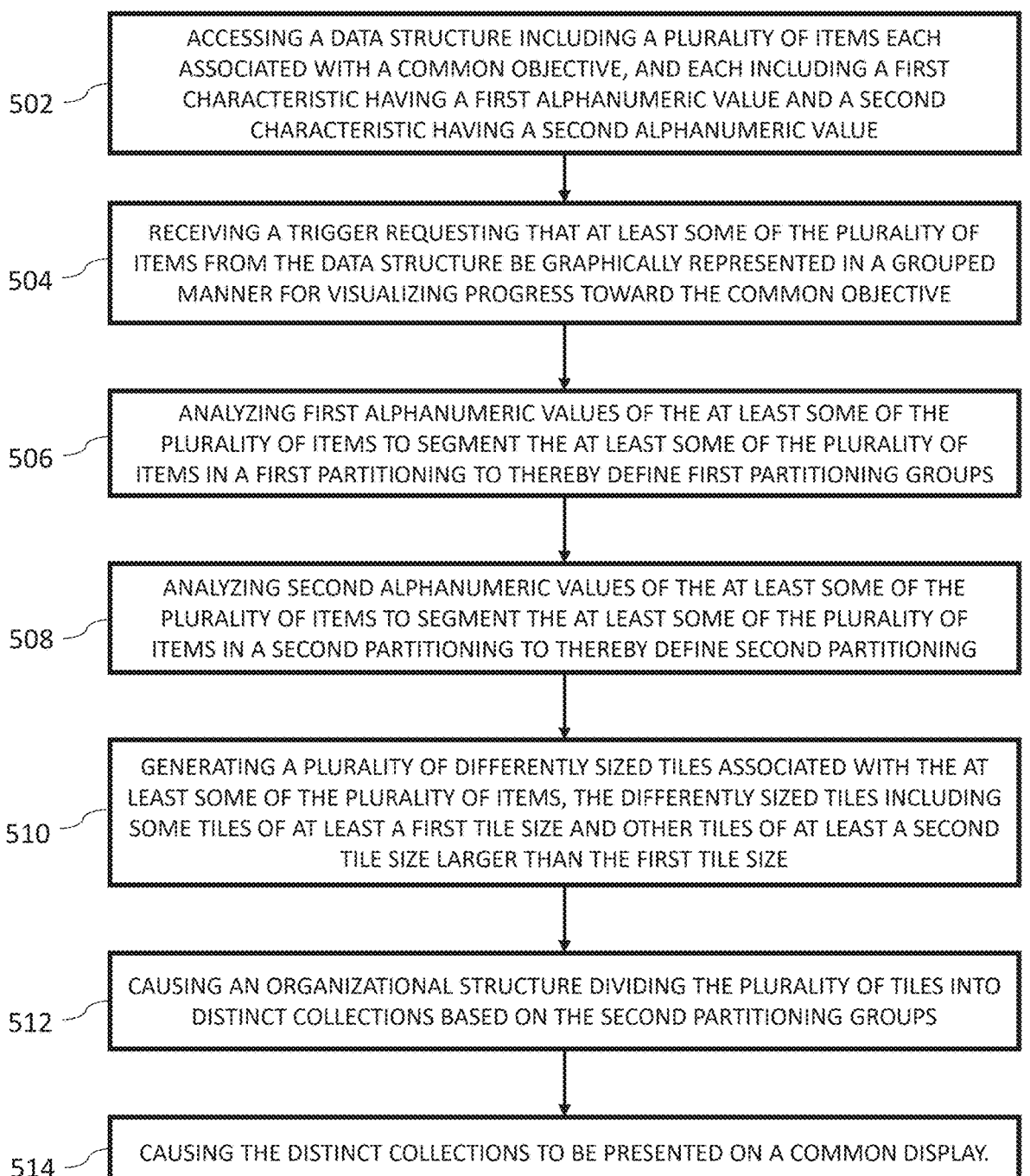

502 — ACCESSING A DATA STRUCTURE INCLUDING A PLURALITY OF ITEMS EACH ASSOCIATED WITH A COMMON OBJECTIVE, AND EACH INCLUDING A FIRST CHARACTERISTIC HAVING A FIRST ALPHANUMERIC VALUE AND A SECOND CHARACTERISTIC HAVING A SECOND ALPHANUMERIC VALUE

504 — RECEIVING A TRIGGER REQUESTING THAT AT LEAST SOME OF THE PLURALITY OF ITEMS FROM THE DATA STRUCTURE BE GRAPHICALLY REPRESENTED IN A GROUPED MANNER FOR VISUALIZING PROGRESS TOWARD THE COMMON OBJECTIVE

506 — ANALYZING FIRST ALPHANUMERIC VALUES OF THE AT LEAST SOME OF THE PLURALITY OF ITEMS TO SEGMENT THE AT LEAST SOME OF THE PLURALITY OF ITEMS IN A FIRST PARTITIONING TO THEREBY DEFINE FIRST PARTITIONING GROUPS

508 — ANALYZING SECOND ALPHANUMERIC VALUES OF THE AT LEAST SOME OF THE PLURALITY OF ITEMS TO SEGMENT THE AT LEAST SOME OF THE PLURALITY OF ITEMS IN A SECOND PARTITIONING TO THEREBY DEFINE SECOND PARTITIONING

510 — GENERATING A PLURALITY OF DIFFERENTLY SIZED TILES ASSOCIATED WITH THE AT LEAST SOME OF THE PLURALITY OF ITEMS, THE DIFFERENTLY SIZED TILES INCLUDING SOME TILES OF AT LEAST A FIRST TILE SIZE AND OTHER TILES OF AT LEAST A SECOND TILE SIZE LARGER THAN THE FIRST TILE SIZE

512 — CAUSING AN ORGANIZATIONAL STRUCTURE DIVIDING THE PLURALITY OF TILES INTO DISTINCT COLLECTIONS BASED ON THE SECOND PARTITIONING GROUPS

514 — CAUSING THE DISTINCT COLLECTIONS TO BE PRESENTED ON A COMMON DISPLAY.

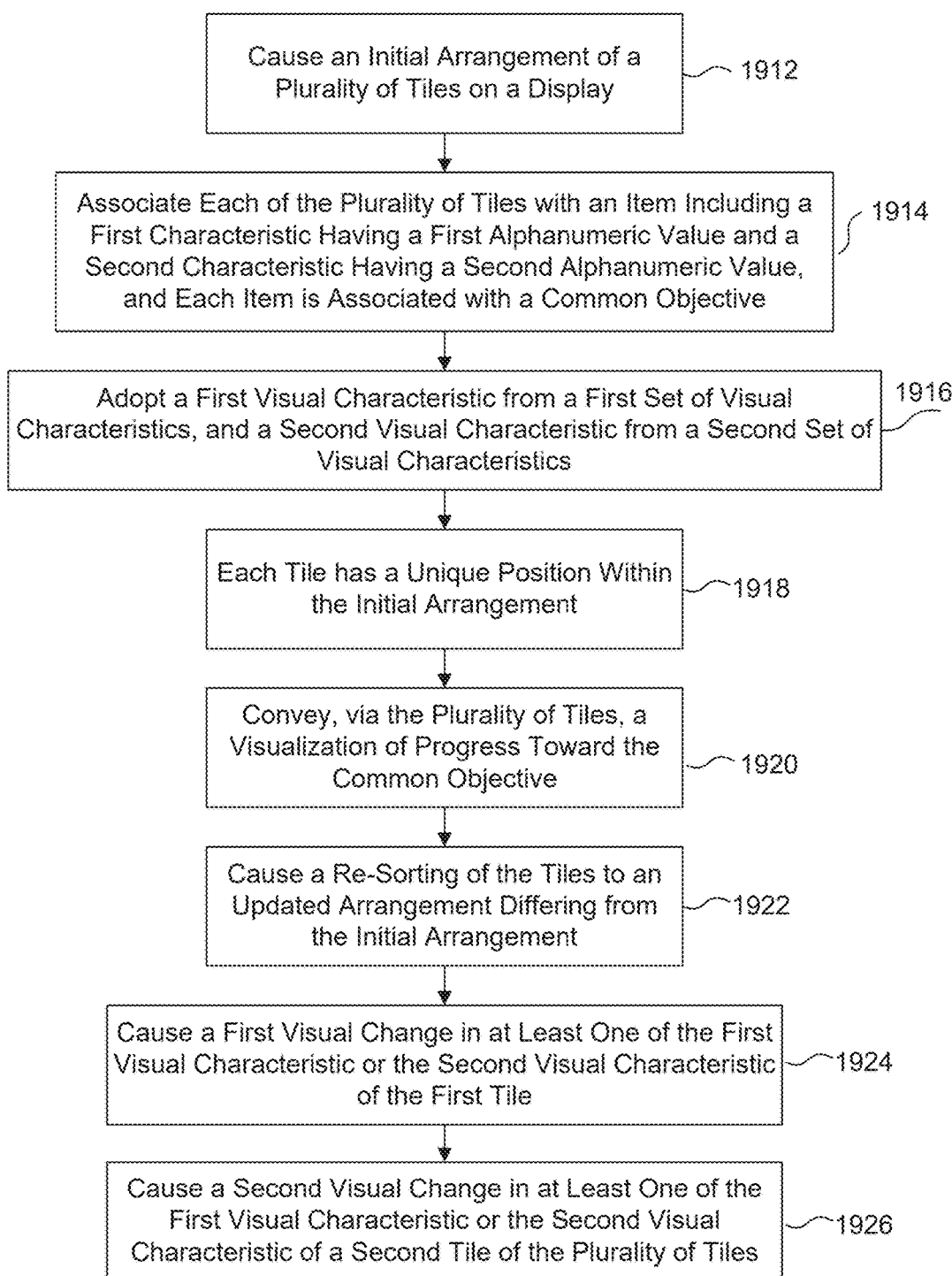

Cause an Initial Arrangement of a Plurality of Tiles on a Display — 1912

Associate Each of the Plurality of Tiles with an Item Including a First Characteristic Having a First Alphanumeric Value and a Second Characteristic Having a Second Alphanumeric Value, and Each Item is Associated with a Common Objective — 1914

Adopt a First Visual Characteristic from a First Set of Visual Characteristics, and a Second Visual Characteristic from a Second Set of Visual Characteristics — 1916

Each Tile has a Unique Position Within the Initial Arrangement — 1918

Convey, via the Plurality of Tiles, a Visualization of Progress Toward the Common Objective — 1920

Cause a Re-Sorting of the Tiles to an Updated Arrangement Differing from the Initial Arrangement — 1922

Cause a First Visual Change in at Least One of the First Visual Characteristic or the Second Visual Characteristic of the First Tile — 1924

Cause a Second Visual Change in at Least One of the First Visual Characteristic or the Second Visual Characteristic of a Second Tile of the Plurality of Tiles — 1926

FIG. 19

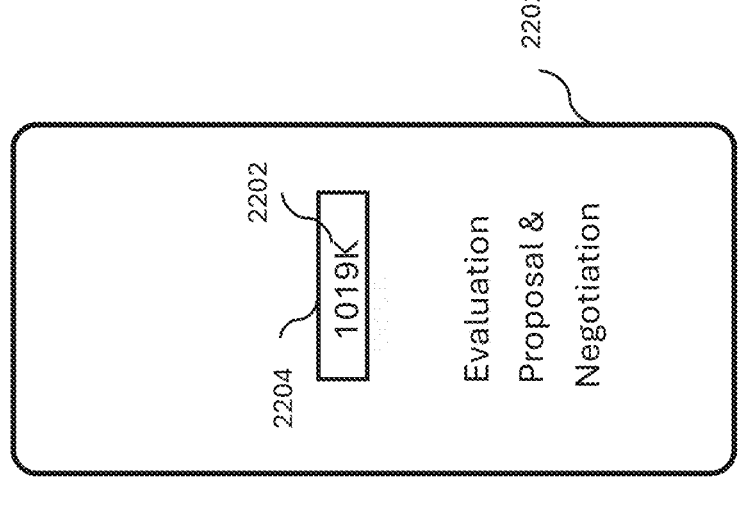
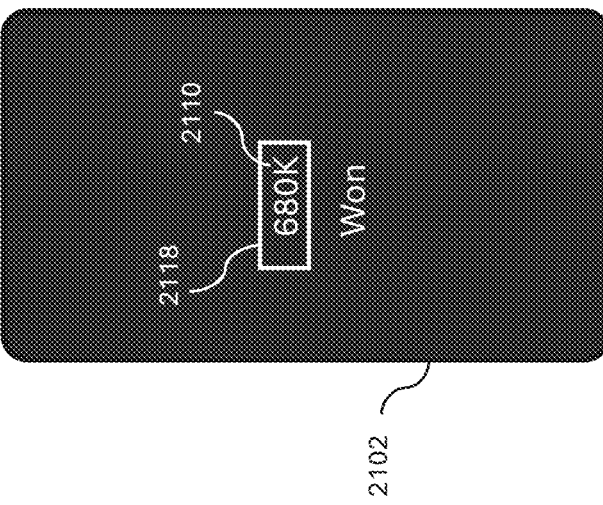
FIG. 22

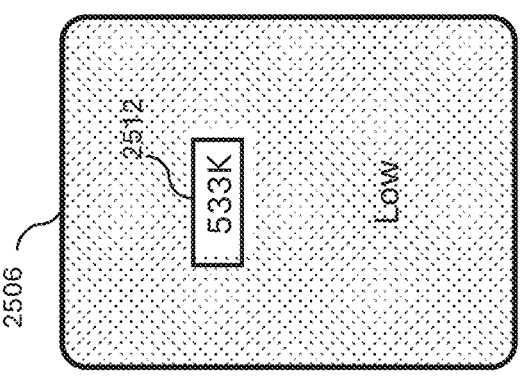
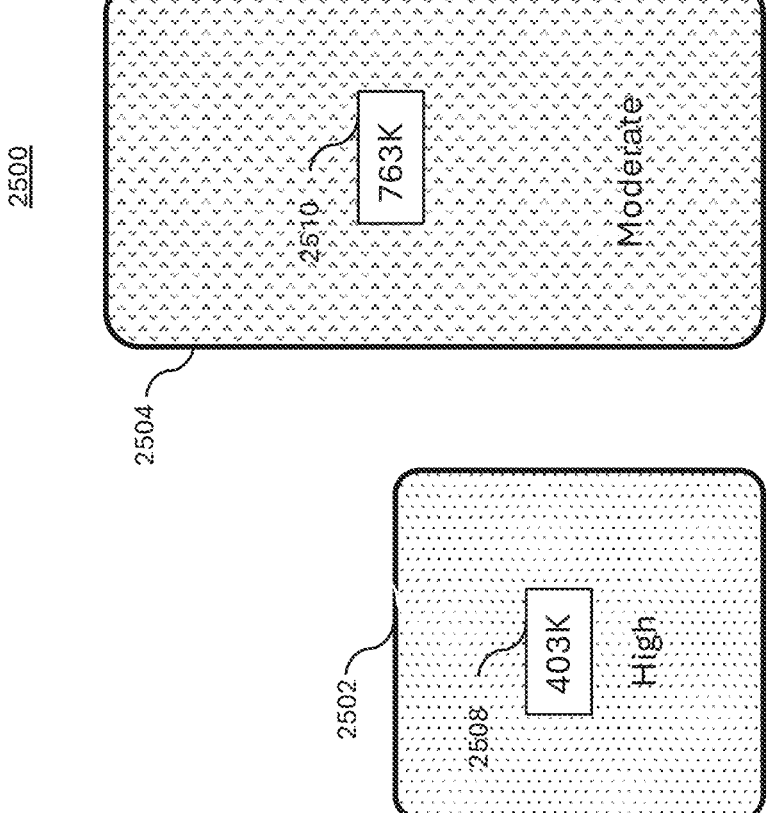
FIG. 25

2600

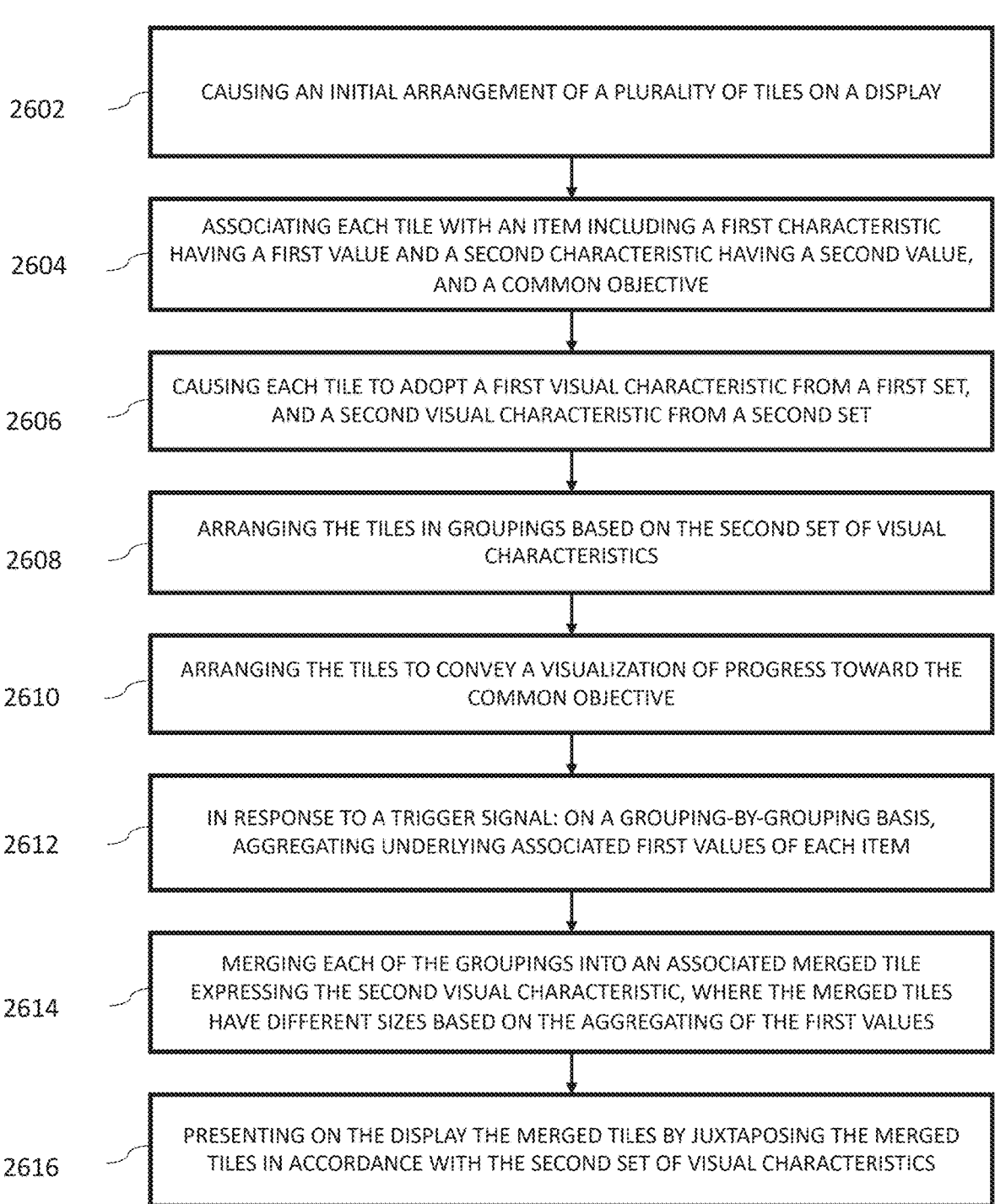

2602 — CAUSING AN INITIAL ARRANGEMENT OF A PLURALITY OF TILES ON A DISPLAY

2604 — ASSOCIATING EACH TILE WITH AN ITEM INCLUDING A FIRST CHARACTERISTIC HAVING A FIRST VALUE AND A SECOND CHARACTERISTIC HAVING A SECOND VALUE, AND A COMMON OBJECTIVE

2606 — CAUSING EACH TILE TO ADOPT A FIRST VISUAL CHARACTERISTIC FROM A FIRST SET, AND A SECOND VISUAL CHARACTERISTIC FROM A SECOND SET

2608 — ARRANGING THE TILES IN GROUPINGS BASED ON THE SECOND SET OF VISUAL CHARACTERISTICS

2610 — ARRANGING THE TILES TO CONVEY A VISUALIZATION OF PROGRESS TOWARD THE COMMON OBJECTIVE

2612 — IN RESPONSE TO A TRIGGER SIGNAL: ON A GROUPING-BY-GROUPING BASIS, AGGREGATING UNDERLYING ASSOCIATED FIRST VALUES OF EACH ITEM

2614 — MERGING EACH OF THE GROUPINGS INTO AN ASSOCIATED MERGED TILE EXPRESSING THE SECOND VISUAL CHARACTERISTIC, WHERE THE MERGED TILES HAVE DIFFERENT SIZES BASED ON THE AGGREGATING OF THE FIRST VALUES

2616 — PRESENTING ON THE DISPLAY THE MERGED TILES BY JUXTAPOSING THE MERGED TILES IN ACCORDANCE WITH THE SECOND SET OF VISUAL CHARACTERISTICS

FIG. 26

DIGITAL PROCESSING SYSTEMS AND METHODS FOR ENHANCED DATA REPRESENTATION

PRIORITY CLAIM

This application is a continuation of Patent Cooperation Treaty Application No. PCT/IB2024/055803, filed Jun. 13, 2024, which claims the priority benefit of U.S. Provisional Application No. 63/507,985, filed Jun. 13, 2023, both of which are incorporated herein in their entirety.

TECHNICAL FIELD

The present disclosure relates generally to CRM solutions systems, methods and computer readable media. More specifically, the disclosed embodiments enable user enhanced data representation. Various disclosed embodiments employ structures and non-transitory computer-readable storage media that store program instructions executable by at least one processing device to perform any of the steps and/or methods described herein.

BACKGROUND

Operation of modern enterprises can be complicated and time-consuming. In many cases, managing the operation of a single project often requires integration of several employees, departments, and other resources of the entity. To manage challenging operations, project management software applications or platform (e.g., SaaS platform) may be used. Such software applications allow a user to organize, plan, and manage resources in collaboration with other user by providing a collaborative platform in which users share project-related information in order to optimize the time and resources spent on each project.

Leveraging Customer Relationship Management (CRM) solutions is helpful in project management software applications to enable users to effectively complete tasks or achieve objectives. By integrating pipeline management tools, CRM solutions ensure smooth and organized operations, thereby enabling users to achieve specific outcomes or goals. Often referred to as Sales CRM platforms, these digital solutions are purpose-built to streamline sales processes, enhance customer interactions, and drive revenue generation.

Despite the utility of pipeline management tools, they often fall short in providing sales professionals with comprehensive insights into future opportunities and current anomalies. Moreover, pipeline management tools frequently necessitate integration with multiple existing systems, including databases and applications. However, ensuring seamless data flow, compatibility, and interoperability between these disparate systems can pose significant technical challenges and consume valuable time. The present disclosure describes solutions to address or overcome one or more of the above-stated challenges, among other drawbacks in existing workflow managing systems.

SUMMARY

Some embodiments consistent with the present disclosure provide digital systems, methods, and computer readable media for implementing CRM solutions enabling user-enhanced data representation. Some such embodiments may be implemented using a combination of conventional hardware and software as well as specialized hardware and software such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

In one embodiment, systems, methods, and computer readable media for converting stored alphanumeric data into discrete graphical elements having a plurality of graphical characteristics that convey representations of the alphanumeric data in a non-alphanumeric manner are disclosed. Systems, methods, devices, and non-transitory computer readable media may involve at least one processor configured to: access a data structure including a plurality of items each associated with a common objective, and each including a first characteristic having a first alphanumeric value and a second characteristic having a second alphanumeric value; receive a trigger requesting that at least some of the plurality of items from the data structure be graphically represented in a grouped manner for visualizing progress toward the common objective; analyze first alphanumeric values of the at least some of the plurality of items to segment the at least some of the plurality of items in a first partitioning to thereby define first partitioning groups; analyze second alphanumeric values of the at least some of the plurality of items to segment the at least some of the plurality of items in a second partitioning to thereby define second partitioning groups; based on the first partitioning, identify a first set of visual characteristics for non-alphanumerically expressing the first alphanumeric values; based on the second partitioning, identify a second set of visual characteristics different from the first set of visual characteristics, for non-alphanumerically expressing the second alphanumeric values; generate a plurality of tiles associated with the at least some of the plurality of items, each of the plurality of tiles adopting a first visual characteristic from the first set, and a second visual characteristic from the second set; arrange the plurality of tiles in groupings based on at least one of the first set of visual characteristics or the second set of visual characteristics; and cause the groupings to be presented on a common display.

In another embodiment, methods, and computer-readable media for causing discrete graphical elements to be organized in a segmented manner and exhibiting alphanumeric data as graphical distinctions are disclosed. Systems, methods, devices, and non-transitory computer readable media may involve at least one processor configured to: access a data structure including a plurality of items each associated with a common objective, and each including a first characteristic having a first alphanumeric value and a second characteristic having a second alphanumeric value; receive a trigger requesting that at least some of the plurality of items from the data structure be graphically represented in a grouped manner for visualizing progress toward the common objective; analyze first alphanumeric values of the at least some of the plurality of items to segment the at least some of the plurality of items in a first partitioning to thereby define first partitioning groups; analyze second alphanumeric values of the at least some of the plurality of items to segment the at least some of the plurality of items in a second partitioning to thereby define second partitioning groups; generate a plurality of tiles associated with the at least some of the plurality of items, the differently sized tiles including some tiles of at least a first tile size and other tiles of at least a second tile size larger than the first tile size, and wherein the first tile size is configured to convey a first magnitude of the first alphanumeric value of the first characteristic, and the second tile size is configured to convey a second magnitude of the first alphanumeric value of the first characteristic, the second magnitude being greater than the first magnitude; wherein the second partitioning groups are configured to cause an organizational structure dividing the plurality of tiles into distinct collections based on the second partitioning groups, and wherein within the distinct collections, the tiles of the distinct collections visually differ based on the different sizes; and cause the distinct collections to be presented on a common display.

In yet another embodiment, methods, and computer-readable media for arranging discrete graphical elements having a plurality of graphical characteristics conveying representations of alphanumeric data in a non-alphanumeric manner are disclosed. Systems, methods, devices, and non-transitory computer readable media may involve at least one processor configured to: cause an initial arrangement of a plurality of tiles on a display, wherein in the initial arrangement: each of the plurality of tiles is associated with an item including a first characteristic having a first alphanumeric value and a second characteristic having a second alphanumeric value, and each item is associated with a common objective; each tile adopts a first visual characteristic from a first set of visual characteristics, and a second visual characteristic from a second set of visual characteristics; each tile has a unique position within the initial arrangement; and the plurality of tiles conveys a visualization of progress toward the common objective. In response to a value change in at least one of the first alphanumeric value or the second alphanumeric value of a first item associated with a first tile of the plurality of tiles, the at least one processor may be configured to cause a re-sorting of the tiles to an updated arrangement differing from the initial arrangement; cause a first visual change in at least one of the first visual characteristic or the second visual characteristic of the first tile; and cause a second visual change in at least one of the first visual characteristic or the second visual characteristic of a second tile of the plurality of tiles.

In yet another embodiment, methods, and computer-readable media for toggling between different arrangements of discrete graphical elements having a plurality of graphical characteristics conveying representations of alphanumeric data in a non-alphanumeric manner are disclosed. Systems, methods, devices, and non-transitory computer-readable media may involve at least one processor configured to: cause an initial arrangement of a plurality of tiles on a display, wherein in the initial arrangement: each of the plurality of tiles is associated with an item including a first characteristic having a first alphanumeric value and a second characteristic having a second alphanumeric value, and each item is associated with a common objective; each of the plurality of tiles adopts a first visual characteristic from a first set of visual characteristics, and a second visual characteristic from a second set of visual characteristics; the plurality of tiles is arranged in groupings based on the second set of visual characteristics; and the plurality of tiles is arranged to convey a visualization of progress toward the common objective. The at least one processor is further configured to, in response to a trigger signal: on a grouping-by-grouping basis, aggregate underlying associated first alphanumeric values of each item; cause each of the groupings to merge into an associated merged tile expressing the second visual characteristic, and wherein the merged tiles have different sizes based on the aggregating of the underlying associated first alphanumeric values; and present on the display the merged tiles by juxtaposing the merged tiles in accordance with the second set of visual characteristics.

BRIEF DESCRIPTION OF THE DRAWINGS

The accompanying drawings, which are incorporated in and constitute a part of this disclosure, illustrate various disclosed embodiments. In the drawings:

FIG. 2 illustrates a representation of an exemplary data structure, consistent with some disclosed embodiments;

FIG. 3 is a flowchart of an exemplary process for performing operations for converting stored alphanumeric data into discrete graphical elements having a plurality of graphical characteristics that convey representations of the alphanumeric data in a non-alphanumeric manner, consistent with some disclosed embodiments;

FIG. 5 is a flowchart of an exemplary process for causing discrete graphical elements to be organized in a segmented manner and exhibiting alphanumeric data as graphical distinctions, consistent with some disclosed embodiments;

FIG. 19 is a flowchart illustrating an exemplary method for arranging discrete graphical elements having a plurality of graphical characteristics that convey representations of alphanumeric data in a non-alphanumeric manner, consistent with some disclosed embodiments.

FIG. 22 illustrates a presentation of combined tiles based on second alphanumeric values, consistent with some disclosed embodiments.

FIG. 25 illustrates a presentation of alternative merged tiles juxtaposed in accordance with a third set of visual characteristics, consistent with some disclosed embodiments.

FIG. 26 is a flowchart of an exemplary process for toggling between different arrangements of discrete graphical elements having a plurality of graphical characteristics conveying representations of alphanumeric data in a non-alphanumeric manner, consistent with some disclosed embodiments.

DETAILED DESCRIPTION

Figure 1:
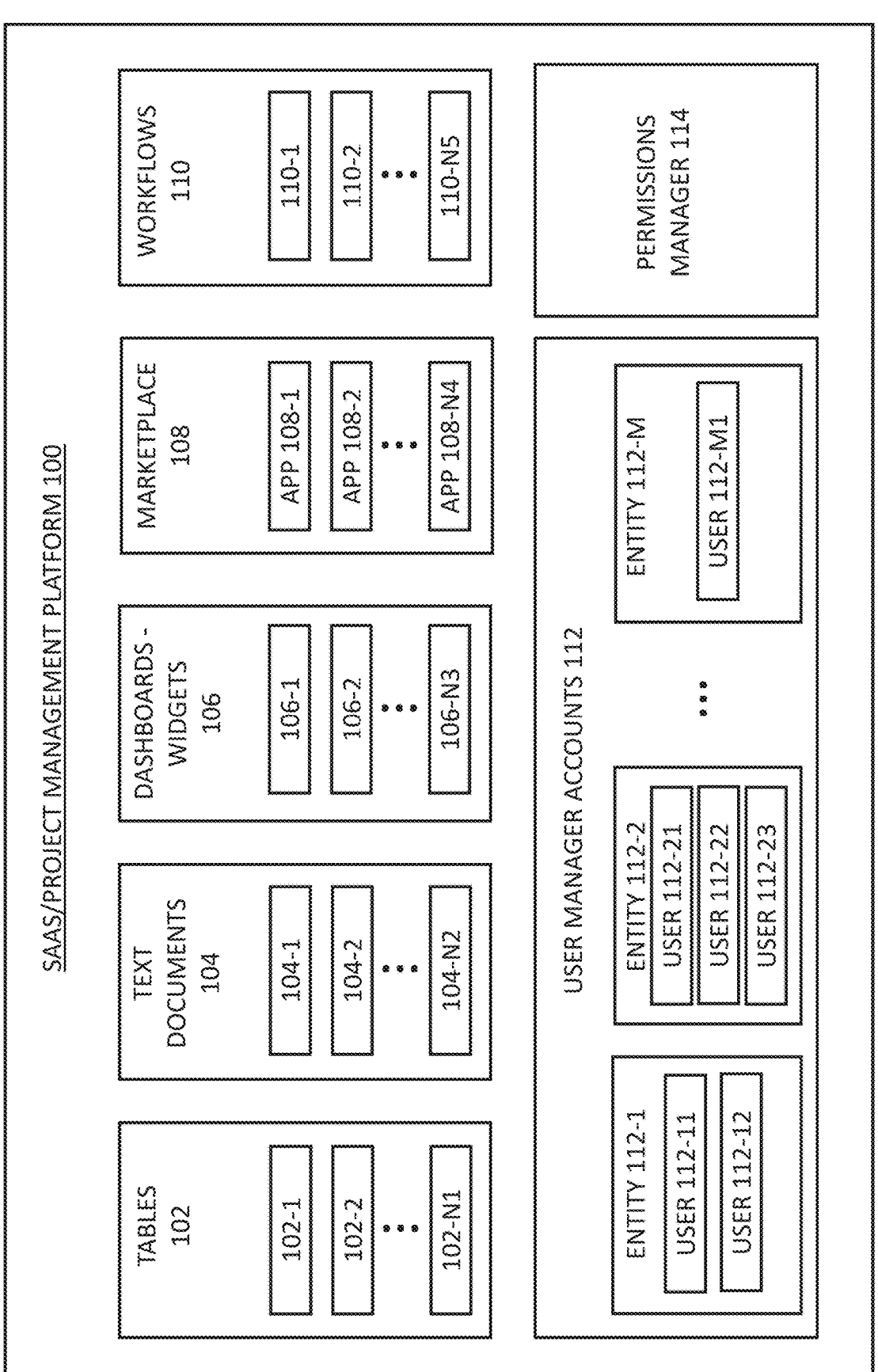
FIG. 1 is a block diagram of an exemplary SaaS/project management platform, consistent with some disclosed embodiments.

Disclosed embodiments provide new and improved techniques for implementing CRM solutions enabling user enhanced data representation.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audits logs, version history, cross-referencing with different boards, external linking with data sources, permissions of access or a combination thereof. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, tablature may include any type of information, depending on intended use. As an example, when used in conjunction with a project/task management application, the tablature may include any information associated with one or more tasks, such as one or more status values, projects, time-frames/ deadlines, countries, persons, teams, progress statuses, a combination thereof, or any other information related to a task. In some cases, a hierarchy may be established between different items/cells in a same row. For example, a unique identifier (UID) may be assigned to an item and the other cell of the same row may then be associated with the item or the assigned UID.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics (which may also be referred to more generically as "widgets"). In some instances, dashboards may also include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular level such as rows, columns, and even individual cells, allowing for fine-grained control over who may access, view, edit, or interact with the data included in the board, particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word-processing document may be provided in order to control access, facilitate collaboration, and ensure that different users have appropriate levels of involvement and authority over different parts of the content. An electronic collaborative word-processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically, or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different levels of granularity (e.g., a specific board, a plurality of boards . . . ) or across an entirety of an account or entity (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures, and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison.

In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Project management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, these platforms may correspond to a Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:

Accessibility: Users may conveniently and securely access software and data from any device with an internet connection.

Scalability: SaaS platforms may easily scale up or down to accommodate changing business requirements, providing flexibility and cost-effectiveness.

Cost-effectiveness: By eliminating upfront investments in hardware and software, SaaS may reduce initial costs. Customers may pay subscription fees based on their usage.

Maintenance and Updates: Service providers handle software maintenance, updates, and security patches, relieving customers of these responsibilities.

Collaboration: SaaS platforms often offer collaboration features, enabling multiple users to work together, share data, and communicate within the platform.

Customization: SaaS platforms can offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include Monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS platforms may include a plurality of SaaS platform elements which may correspond to components or building blocks of the platform that work together to deliver software applications and services over the Internet. Examples of such elements may include application software, infrastructure, or user interface. For example, a platform may offer project management capabilities to its users via dashboards, tables, text documents, a workflow manager, diverse applications offered on a marketplace, all of which constitute building blocks and therefore elements of the platform. Application offered on the marketplace may be provided by developers external to the SaaS platform, accordingly, they may utilize a user interface different from a generic user interface provided by the SaaS platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-element may include a widget associated with a dashboard, a column or a cell associated with a table, a workflow block associated with a workflow manager, or pipeline management tools.

FIG. 1 is a block diagram of an exemplary SaaS platform 100. As illustrated, SaaS platform 100 includes a plurality of SaaS platform elements, namely Tables 102, Text documents 104, Dashboards 106, Marketplace 108, and Workflows 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 20 through APP 108-N4 for Marketplace 108 and 110-1 through 101-N5 for Workflows 110, wherein N1, N2, N3, N4 and N5 represent natural numbers.

It is to be appreciated that these SaaS platform elements may collaborate seamlessly. For instance, a text document (e.g., 104-1) might incorporate data from a table (e.g., 102-1), and a dashboard/widget (e.g., 106-1) might display data originating from a table (e.g., 102-1). This integration may ensure a cohesive and flexible user experience, allowing different components of the platform to work together effectively and dynamically share data. Additionally, it is to be appreciated that the utilizations of data originating from a first SaaS platform element (e.g., a table), by a second SaaS platform (e.g., a widget included a plurality of graphical representations) may not necessarily lead to additional memory allocation on a SaaS platform server. This efficiency maybe achieved because the data is not duplicated for each view (a table view or a dashboard/widget view). Instead, the data may be dynamically imported from the first SaaS platform element, often using pointers to their specific locations in memory. This approach ensures that the original data remains intact and avoids the overhead associated with creating multiple copies, thereby optimizing memory usage and improving the overall performance of the server. For example, when a user of the SaaS platform requests a graphical representation (widget view) of data from a table, the platform may retrieve the necessary data by referencing the memory locations where the data is stored, rather than creating new instances of the data. These references, or pointers, serve as links to the original data, enabling the server to efficiently handle multiple requests without incurring significant memory costs. By leveraging this method, the SaaS platform may support numerous simultaneous views and graphical representations without a proportional increase in memory usage. Furthermore, this approach allows for real-time data updates to be reflected instantly across all views. Since all views point to the same data source, any changes to the data are immediately visible, ensuring consistency and accuracy. This method may be advantageous in environments where data is frequently updated, such as in financial systems, real-time analytics, and monitoring applications.

Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications or CRM/pipeline management tools (not shown in FIG. 1) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning or implementing that app. These applications may not be publicly available (i.e., not on the market/ publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

In some cases, a Sales Customer Relationship Management (CRM) solution may be incorporated into a broader project management platform or may be offered as an offline software or as a Software-as-a-Service (SaaS). Sales CRM solutions represent software solutions designed to streamline and optimize sales processes and customer interactions. These solutions may consolidate multiple functionalities to efficiently oversee leads, contacts, deals, and sales activities. By leveraging comprehensive analytics and reporting tools, sales teams can glean actionable insights and foster seamless communication and teamwork. At their core, Sales CRM solution may encompass a diverse array of pipeline management utilities. These utilities may include dynamic data tables and interactive boards that empower sales professionals to monitor and orchestrate every aspect of their sales pipeline. From initial lead acquisition to deal closure, these solutions may offer a versatile toolkit designed to optimize performance, streamline processes, and foster meaningful customer interactions.

Still referring to FIG. 1, SaaS platform 100 may include one or more CRM solutions/pipeline management tools that may involve a combination of one or more SaaS platform element or sub-element. For example, a CRM solution may leverage data stored in one or more tables and offer comprehensive data visualization through prebuilt dashboards and widgets, furnishing users with deep and meaningful insights into their operations. In some embodiments, these tools may enable visualization of alphanumeric data in a non-alphanumeric manner. For instance, instead of conventional tables or charts, these tools may employ immersive graphical interfaces or interactive simulations to depict complex datasets. These visualizations may encompass versatile views such as Kanban boards, timeline representations, Gantt charts, or other representations, offering users diverse perspectives and facilitating informed decision-making. This approach enables users to interact with the data in a more intuitive and engaging manner, facilitating deeper understanding and analysis. Each of these pipeline management tools may be coupled to a one or more user accounts 112 and may operate synergistically within SaaS platform 100, empowering users to streamline and optimize their sales processes, from lead generation to deal closure. These tools leverage the analytical capabilities of the SaaS platform to provide users with actionable insights and facilitate efficient management of their sales pipelines.

In order to provide meaningful data visualizations, pipeline management tools may access one or more data structures. A data structure refers to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include a data pool (whether a structured or an unstructured pool), an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. Additionally or alternatively, some or all of the data structure may be organized using the Ruby on Rails web application framework. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A data structure may include a plurality of data items and may define the relationship between the items and the operations that may be performed on them. Each item may include one or more characteristics associated with a value (e.g., an alphanumeric value). Within the context of CRM, a data structure may include a plurality of items. Examples of items may include but are not limited to a deal, a transaction, a client account, a prospect, or an order. A characteristic of an item may include any distinctive feature or quality that helps to identify or define an item. The characteristics of items may include, for example, a deal size, an associated level of risk, one or more associated salespersons, a client name, a phase in the sales funnel, a client type, one or more due dates, a rate of completion, comments, or any additional feature or quality relevant to an item included in a data structure. The characteristics of an item may present relationships and patterns that offer valuable insights into customer behavior, sales trends, and operational efficiencies. For instance, analyzing the relationship between deal size and associated risk levels can help identify high-risk, high-reward opportunities or tracking the performance of salespersons in relation to deal phases and completion rates can highlight strengths and areas for improvement within the sales team.

The plurality of items of a data structure may be associated with a common objective. A common objective refers to a shared goal or aim. Examples of common objectives in a business context include increasing revenues, sales, profitability, customer retention, or number of customers; or decreasing waste, expense, or loss of customers. In general, a common objective can refer to increasing a positive measure and/or decreasing a negative measure. In this context, a common objective may guide the arrangement and interaction of the individual elements towards a shared purpose or goal. This objective could span a broad spectrum, ranging from high-level aspirations, such as maximizing profitability or efficiency, to more specific aims, such as streamlining processes or achieving targeted outcomes. Whether the objective is overarching or focused, the association between the items and the common objective underscores the cohesion and purposefulness of the data structure, driving meaningful insights and outcomes. A comprehensive visualization of the data structure may provide valuable insights into the common objective. By presenting the relationships and patterns inherent within the data structure, such a visualization may enable a deeper understanding of how individual items contribute to the overarching goal. This comprehensive view may facilitate the identification of key trends, dependencies, and potential optimizations that can propel progress towards achieving the common objective. Moreover, by offering a holistic perspective, the visualization may empower user (e.g., salesperson, salesperson manager etc.) to make informed decisions and strategic adjustments, leveraging the collective knowledge embedded within the data structure to drive towards the desired common objective.

FIG. 2 is an illustration of a representation of an exemplary data structure 200. Consistent with the disclosed embodiments, data structure 200 may be accessed by one or more pipeline management tools. Data structure 200 include a plurality of items 202, each included in a row of data structure 200. Each item 202 includes a plurality of characteristics 204, represented in columns of data structure 200, where each column is associated with a single characteristic (First column=Client Name, Second column=Deal Type etc.). Although data structure 200 is represented here as a table, it is to be appreciated that data structure 200 may adopt any suitable format. Examples of formats include but are not limited to lists, linked list, hash table, or board. Additionally, data structure 200 may be stored in a database in different digital format. For example, data structure may be stored as a text file, a CSV file, a XML, file a JSON file, a YAML file, or a INI file. In some embodiments, data structure 200 may be directly stored in a database/server accessible to and handle by a CRM solution or SaaS platform 100. Alternatively, data structure 200 may be stored in a database external to SaaS platform 100, which could be managed by another external cloud provider. In such case proper credentials/authentication flow may be required to grant access to the external database. Data structure can also include unstructured databases such as a folder of documents or a bunch of emails, in which the value may appear directly or generated ad hoc by AI.

Some disclosed embodiments may involve converting stored alphanumeric data into discrete graphical elements having a plurality of graphical characteristics that convey representations of the alphanumeric data in a non-alphanumeric manner. Within the context of this disclosure, alphanumeric data refers to data composed of either or both letters (alphabetic) and numbers. This type of data may include any combination of the 26 letters of the English alphabet (A-Z, a-z) and the 10 numeric digits (0-9). Additionally, alphanumeric data may also encompass ideograms, such as those used in Chinese or Japanese characters, or characters from any other alphabet, such as Cyrillic, Hebrew, Greek, or Arabic. A graphical element is a visual component that conveys information. By way of non-limiting examples, graphical elements can include shapes, lines, colors, textures, images, icons, and symbols. Discrete graphical elements refer to individual visual components that are distinct from one another, enabling visual comparison between them. Each element may adopt a plurality of graphical characteristics such as shape, color, size/dimensions, borderline, texture or position with respect to a screen and/or other presented elements, that may be used to visually encode information. In this disclosure, unless specified otherwise, a graphical element may equally refer to the visual representation/entity as presented on a display and/or to the underlying data model of the visual representation that can be readily understood and manipulated by a processing device and that includes properties defining the graphical characteristics of the visual representation.

By converting alphanumeric values of an item into graphical characteristics of a graphical element which serves as a discrete graphic representation of that item, alphanumeric data may be conveyed in a graphical, non-alphanumeric manner. In other words, this approach enables alphanumeric data to be interpreted visually rather than through traditional text-based methods, which can be useful for creating visually enhanced data presentations, enabling easier pattern recognition, or providing an alternative way to encode and decode information. Converting stored alphanumeric data into various graphical characteristics of discrete graphical elements may be highly beneficial drawing conclusions from a large data structure. This method allows for multiple alphanumeric value comparisons simultaneously, facilitating the deduction of insights.

In the context of a CRM solution, and particularly with respect to sales pipelines, transforming complex alphanumeric data into visual elements with different varying visual characteristics, may enable users (e.g., salesperson, manager etc.) to quickly perform comparisons of different characteristics and gain immediate insights. For example, different stages of a sales process may be represented by distinct shapes or colors, making it easy to compare differently colored/shaped items to identify bottlenecks or opportunities, or gain the overall picture at a glance. Visual representations may enable users to identify patterns and trends that might be missed in alphanumeric data. For instance, if certain types of deals (represented by specific graphical elements) consistently take longer to close, this can be easily spotted on a graphical pipeline through the use of visual cues (e.g., deals that take longer to close could be highlighted in a specific color). Additionally, graphical elements may provide quick insights without the need for extensive data analysis. Sales managers may immediately see which deals are in which stage, their relative size, and their probability of closing, facilitating faster decision-making. Lastly, visual data tends to be more universally understood than alphanumeric data, especially in diverse teams with varying levels of familiarity with the CRM system. Graphical elements may bridge gaps in understanding and ensure that every team member is on the same page.

FIG. 3 is a flowchart of an exemplary process (300) for converting stored alphanumeric data into discrete graphical elements having a plurality of graphical characteristics that convey representations of the alphanumeric data in a non-alphanumeric manner. Process 300 is discussed herein for explanatory purposes and is not intended to be limiting. In some embodiments, steps of process 300 may be changed, modified, substituted, or rearranged, consistent with the present disclosure. Process 300 may be implemented using one or more components of a computing device 3000 (discussed in FIG. 30) or user device 3120 of computing architecture 3100 (discussed in FIG. 31). Some disclosed embodiments may include at least one processor that may be configured to execute stored instructions to perform operations for converting stored alphanumeric data into discrete graphical elements having a plurality of graphical characteristics that convey representations of the alphanumeric data in a non-alphanumeric manner. As shown in FIG. 3, process 300 may include steps 302, 304, 306, 308, 310, 312, 314, 316, and 318, discussed in further detail below.

Some disclosed embodiments may involve accessing a data structure including a plurality of items. Each item may be associated with a common objective, and each item may include a first characteristic having a first alphanumeric value and a second characteristic having a second alphanumeric value. Accessing a data structure (as defined earlier) from the point of view of a software component or a processing unit relates to performing operations to retrieve, modify, or manage data contained within that structure. For example, a processing unit by accessing a data structure may extract data from the structure. This may involve reading specific elements, searching for particular values, or querying the data based on certain criteria. In another example, accessing a data structure may involve updating or changing the data within the structure such as inserting new elements, updating existing values, or deleting elements. Additionally, accessing a data structure may include performing tasks that ensure the data structure is maintained and operates efficiently. This may involve tasks like sorting, reorganizing, or balancing the data structure to optimize performance. An example of accessing a data structure is illustrated as step 302 of FIG. 3, and an exemplary data structure 200 is shown in FIG. 2.

The data structure may include a plurality of items, each including a first and a second characteristic. For example, referring to FIG. 2 representing in the context of a CRM solution a data structure 200 corresponding to a plurality of deals of a sales team, each item 202 includes a first characteristic, e.g., deal size, and a second characteristic e.g., phase or level of risk. The first and second characteristics may be associated with a first and a second alphanumeric value. For example, the first deal included in the first row of data structure 200, includes a deal size (first characteristic) associated with the alphanumeric value "94 k" or "94,000" (first alphanumeric value), and a phase in the sales funnel (second characteristic) corresponding to the alphanumeric value "Negotiation" (second alphanumeric value). Additionally, each item may be associated with a common objective. This objective could span a broad spectrum, ranging from high-level aspirations, such as maximizing profitability or efficiency, to more specific aims, such as streamlining processes or achieving targeted outcomes. For example, within the data structure 200, each item 202 may be associated with a collective goal, such as meeting quarterly sales targets, generating revenue, finalizing all deals, or mitigating risks associated with each deal.

In some embodiments, at least one of the first alphanumeric values or the second alphanumeric values may be relative alphanumeric values. In the present context, values may be relative if they indicate a common parameter, are part of a common group, may be compared with each other, or are in any way related to each other. For example, a relative alphanumeric value includes alphanumeric data that may vary/take on a value within a continuous range. For example, a deal size may be associated with an alphanumeric value ranging from 0 to infinity, and the deal size of a first item/deal may directly be compared with the deal size of a second item/deal. Comparing deal sizes between different deals allows salespeople to gain insights into achieving a common objective such as maximizing profit or meeting quarterly goals. Likewise, the phase within a sales funnel may be associated with an alphanumeric value that spans a continuous set of phases, ranging from initial evaluation to final closure (e.g., "Evaluation"-"Proposal"-"Negotiation"-"Won"). By assigning alphanumeric values to these phases, comparisons can be made between different deals to determine their progression within the sales funnel. This comparison may enable the identification of deals that are more advanced in the sales funnel and those that may require additional attention to align with the common objective. In contrast to the previous example, certain characteristics, such as client names, are associated with alphanumeric values that do not fall within a continuous set. Client names are diverse and distinct identifiers without inherent significance other than labeling a deal. Comparing client names may not yield valuable information due to their inherent uniqueness and would not provide actionable insights or contribute to achieving common objectives. However, some distinct variables, such as country, may still yield significant insights related to the objective. For example, grouping deals by country may reveal regional trends and opportunities, aiding in strategic decision-making. By considering both relative alphanumeric values and distinct variables, the CRM solution may provide a comprehensive analysis that leverages a variety of data types to support diverse business objectives.

Some disclosed embodiments may involve receiving a trigger requesting that at least some of the plurality of items from the data structure be graphically represented in a grouped manner for visualizing progress toward the common objective. A trigger refers to a signal or event that initiates a specific action or process within a system, software component, or application. Triggers may stem from a user-initiated action. For example, in some embodiments, receiving a trigger may include at least one of receiving a scroll signal resulting from a motion of a user on a display (e.g., a display wherein the data structure would be graphically represented), loading a certain URL, or receiving a trigger via a Graphical User Interface (GUI) component (e.g., a button, a check box etc.) present on the display. Alternatively, in some embodiments, receiving a trigger may be an automated event such as reaching a certain number of items in the data structure or time threshold. An example of receiving a trigger is illustrated as step 304 of FIG. 3. Once the trigger is received, preparation of the graphical representation of at least some of the plurality of items may be initiated. The presentation may occur by grouping the items based on relevant criteria related to the common objective. This grouped visualization may enable users to gain insights into the overall progress towards the common objective, identifying trends, patterns, or areas requiring attention more effectively than when examining raw data. It may support decision-making by providing a clear overview of where efforts should be focused to maximize progress towards the objective. It is to be appreciated that not all items from the plurality of items may be graphically represented. For example, items missing either the first or second alphanumeric value may be excluded from graphical representation. In some embodiments, the selection of items to be represented may be based on the common objective. For instance, if the common objective corresponds to meet quarterly sales targets, deals with due dates later than the end of the quarter may not be displayed. In other embodiments, a Null value can be introduced into the missing first or second alphanumeric values in order to prevent exclusion of partially filled items from the graphical representation.

Some disclosed embodiments may involve analyzing first alphanumeric values of the at least some of the plurality of items to segment the at least some of the plurality of items in a first partitioning to thereby define first partitioning groups. In this context, "analyzing" refers to evaluation of the first alphanumeric values associated with the at least some of the plurality of items to be graphically represented. This process may involve scrutinizing these values to identify patterns, relationships, or criteria that can be used to categorize or segment the items into distinct partitioning groups. This analysis of the first alphanumeric values may represent a first method of sorting the at least some of the plurality of items (i.e., a first partitioning). An example of analyzing first alphanumeric values to thereby define first partitioning groups is illustrated as step 306 of FIG. 3. In some embodiments, each of the first partitioning groups may include at least one item, with each item being uniquely attributed to a single first partitioning group. In other words, in this context, items cannot simultaneously be associated with two distinct first partitioning groups.

In some embodiments, analyzing the first alphanumeric values may involve creating a group for each distinct first alphanumeric value, effectively sorting items based on these values. For example, if the alphanumeric values correspond to client names, the items may be sorted by client name and a first partitioning group would be provided for each distinct value. In other embodiments, analyzing the first alphanumeric values may involve creating groups for a plurality of distinct first alphanumeric values. For instance, in the context of relative alphanumeric values, the first partitioning groups may correspond to different non-overlapping ranges. This analysis process might involve comparing each alphanumeric value to thresholds or boundary values associated with these groupings. For example, if the alphanumeric values correspond to deal sizes, the first partitioning groups could be defined by distinct deal size ranges, such as a group for items with deal sizes strictly below 10 k, a group for items with deal sizes between 10 k and 100 k, and a group for items with deal sizes strictly above 100 k. In some embodiments, the threshold or boundary values for the partitioning groups may be determined during the analysis. After evaluating the span of all alphanumeric values and their statistical distribution, different boundary values may be established to create groups that efficiently represent this distribution. Alternatively, the boundary or threshold values may be specified by a user through a GUI component as part of a customization process. For example, a user interested in greater granularity for items with large deal sizes may adjust the partitioning groups (e.g., default predetermined portioning groups) to emphasize differences among items with large deal sizes by creating multiple groups for detailed visualization, while creating a single, larger group for all items with moderate to low deal sizes.

Some disclosed embodiments may involve analyzing second alphanumeric values of the at least some of the plurality of items to segment the at least some of the plurality of items in a second partitioning to thereby define second partitioning groups. Akin to the analysis of the first alphanumeric values, the analysis of the second alphanumeric values may represent a second method of sorting the at least some of the plurality of items (i.e., a second partitioning). An example of analyzing second alphanumeric values to thereby define second partitioning groups is illustrated as step 308 of FIG. 3. In line with the above, in some embodiments, analyzing the second alphanumeric values may involve creating a group for each distinct second alphanumeric value or creating groups for a plurality of distinct second alphanumeric values. In some embodiments, each of the second partitioning groups may include at least one item, with each item being uniquely attributed to a single second partitioning group. In other words, in this context, items cannot simultaneously be associated with two distinct second partitioning groups. Additionally, in some embodiments, the number of second partitioning groups may differ from the number of first partitioning groups. For example, after analyzing the first and second alphanumeric values, three distinct first partitioning groups and four distinct second partitioning groups may be determined.

Some disclosed embodiments may involve, based on the first partitioning, identifying a first set of visual characteristics for non-alphanumerically expressing the first alphanumeric values. Visual characteristics refer to any attributes or visual cues used to represent objects visually. These characteristics may be assigned to graphical elements and may describe the attributes of an object. Once an object is associated with a visual characteristic, a user can interpret it as representing specific data. For example, in some embodiments, the first set of visual characteristics may be chosen from a group consisting of size, color, texture, transparency, shadowing, or shape. In some embodiments, a set of visual characteristics may include a plurality of distinct combinations of visual characteristics of different natures. For example, a set of visual characteristics may encompass distinct combinations of colors, transparency, and shadowing. In this context, the first set of visual characteristics is used to visually express the first alphanumerical values. In some embodiments, finding a first set of visual characteristics may involve finding a suitable set of visual characteristics to convey information regarding differences between the first alphanumeric values of some of the items. Additionally, or alternatively, in some embodiment, the first set of visual characteristics may provide insights into the common objective and/or to covey information on progress toward the common objective. An example of identifying a first set of visual characteristics is illustrated as step 310 of FIG. 3.

In some embodiments, identifying the first set of visual characteristics may involve selecting a subset of visual characteristics from a larger predetermined set of visual characteristics based on the first partitioning. For example, by default, ten different sizes may be predetermined for non-alphanumerically expressing the first alphanumeric values. If the number of first partitioning groups is equal to three, identifying the first set of visual characteristics may correspond to selecting three distinct sizes from the predetermined ten different sizes. The selection can be made in a manner that would reflect the differences in criteria for the groupings, to enable a user to deduce relative meaning from the magnitude of difference between the selected subset of visual characteristics. For example, if three sizes are selected such that the ratio between the first and the second sizes is identical to the ratio between the second and third sizes, the user would interpret this differently than if the ratio between the first and the second sizes is three times larger than the ratio between the second and third sizes.

Alternatively, in some embodiments, identifying the first set of visual characteristics may start from scratch, allowing for a more customized approach. This process involves creating visual attributes specifically tailored to effectively represent the first partitioning groups. Various factors such as the nature of the first alphanumeric values, clarity, accessibility, and relevance to the data being represented are taken into account. Such a detailed and customized analysis may be implemented using an AI system tailored for visual representation generation. This AI may analyze the data (first alphanumerical values and/or first partitioning groups), consider best practices in design, and generate visual characteristics that meet the specified criteria. The AI may learn from vast datasets and user interactions, continually improving its ability to create effective visual representations. This approach may ensure a high level of customization and precision in the visualizations produced.

Some disclosed embodiments may involve, based on the second partitioning, identifying a second set of visual characteristics different from the first set of visual characteristics for non-alphanumerically expressing the second alphanumeric values. In some embodiments, the second set of visual characteristics may be chosen from a group consisting of size, color, texture, transparency, shadowing, or shape. In this context, the second set of visual characteristics is used to visually express the second alphanumerical values. In some embodiments, finding a second set of visual characteristics may involve finding a suitable set of visual characteristics to convey information regarding differences between the second alphanumeric values of some of the items. Additionally, or alternatively, in some embodiment, the second set of visual characteristics may provide insights into the common objective and/or to covey information on progress toward the common objective. An example of identifying a second set of visual characteristics is illustrated as step 312 of FIG. 3.

As mentioned earlier, identifying a second set of characteristics may involve selecting visual characteristics from a larger predetermined set based on the second partitioning. For example, choosing specific colors from a large color palette. In some cases, choosing specific colors may be made for emphasize the meaning of each grouping with respect to the others (the colors green, yellow and red can be selected to convey, for example, the values of approved, under review and denied, respectively). Alternatively, a customized approach may be used, creating tailored visual characteristics by considering factors like clarity and relevance. This detailed process may be implemented using an AI system that analyzes the data (second alphanumerical values and/or second partitioning groups) and generates effective visual characteristics, ensuring high customization and precision in the visualizations.

The second set of visual characteristics may be different from the first set of visual characteristics. In this context, differing sets of visual characteristics may entail differences in the nature of the visual characteristics. For example, in some embodiments, the first set of visual characteristics may correspond to different sizes, and the second set of visual characteristics may correspond to different colors. Alternatively, differing sets of visual characteristics may refer to sets consisting of attributes of a same nature but that are mutually exclusive. For example, in some embodiments, the first set of visual characteristics may correspond to different colors chosen from a first color palette, and the second set of visual characteristics may correspond to different colors chosen from a second color palette, distinct from the first color palette.

Some disclosed embodiments may involve generating a plurality of tiles associated with the at least some of the plurality of items, each of the plurality of tiles adopting a first visual characteristic from the first set, and a second visual characteristic from the second set. In this context, a "tile" refers to a discrete graphical element/representation or block that may visually encapsulate data related to an item. A tile may have any suitable shape such as rectangular, square, triangular, round, pentagonal, hexagonal or with any other regular or irregular contour. When the shape is used to convey information, it may be beneficial for the tile shape to be such that it may be readily compared visually with other tiles. Each of these tiles may adopt a first visual characteristic from the first set and a second visual characteristic from the second set. For example, in some embodiments, if the first set of visual characteristics corresponds to different sizes, and the second set of visual characteristics corresponds to different colors, each tile might use a tile size to express the first alphanumeric value of an associated item and a color to express the second alphanumeric value of the associated item. This combination of two distinct visual characteristics may allow for a multidimensional visualization, where each tile conveys complex data in an intuitive and easily interpretable and comparable manner. An example of generating a plurality of tiles is illustrated as step 314 of FIG. 3.

While in some disclosed embodiments adopting a visual characteristic includes complete adoption of the feature by a tile, meaning that the entirety of the tile will express the feature, some disclosed embodiments may alternatively involve determining how the visual characteristic will be adopted by a tile. In some cases, the importance of the visual characteristic can be determined, and the adoption thereof may vary accordingly. For example, if a tile adopts color as a visual characteristic, the color might be used as the background color for the entire tile or only for a portion of it, depending on its significance. Tuning the importance of the visual characteristics may enable a user to receive visually conveyed information more effectively. For example, emphasizing more critical data by using a dominant background color for the entire tile, while less critical data could be represented by a smaller colored section or border. This approach allows users to quickly grasp key information at a glance and understand finer details through more subtle visual cues, enhancing overall data comprehension and usability.

Some disclosed embodiments may involve arranging the plurality of tiles in groupings based on at least one of the first set of visual characteristics or the second set of visual characteristics. In this context, "arranging tiles" refers to the organization of tiles into groupings such that each grouping includes at least one tile. This process may involve determining a unique position for each of the plurality of tiles, thereby ensuring that each tile is placed in a specific location within the overall arrangement, facilitating an organized and coherent visual representation. A grouping corresponds to a collection or arrangement of tiles that share a common visual characteristic. For example, tiles could be grouped together if they share the same size (a first visual characteristic) or the same color (a second visual characteristic), visually reflecting the underlying partitioning of the items they represent and concurrently enabling differentiation of items within the group based one of the first set of visual characteristics or the second set of visual characteristics. In other words, the groupings correspond to either the first partitioning groups or the second partitioning groups, but for tiles associated with the items in these partitioning groups. These groupings help organize and visually represent the items via tiles based on their relevant attributes, aiding in data interpretation and analysis. An example of arranging the plurality of tiles in groupings is illustrated as step 316 of FIG. 3.

Some disclosed embodiments may involve causing the groupings to be presented on a common display. As used herein, the term "display" refers to any physical device capable of providing a visual presentation of data. Examples of physical devices acting as displays include computer screens, smartphone screens, tablet screens, smartwatch screens, laptop screens, video walls, projectors, head-mounted displays or virtual/extended reality headsets. Additionally, displays may utilize graphical user interfaces (GUIs) to permit user interaction with data. In many GUIs, a visual presentation of data is often provided using a graphical user interface component known as a window, or a page. In this context a common display refers to the situation wherein groupings are presented on a single widow or page. Any visual presentation of a device or display may be characterized by dimensions. An example of causing the groupings to be presented on a common display is illustrated as step 318 of FIG. 3.

In some embodiments, identifying a set of visual characteristics (e.g., first set or second set of visual characteristics) may be based on one or more properties of the common display. For example, the set of different tile sizes may be determined by considering the dimensions of the display, such as its resolution and aspect ratio, or a set of different colors may be determining based on the number of available colors that the display can render. Other properties, such as brightness, contrast ratio, and refresh rate, may also influence the selection of visual characteristics to ensure optimal visibility and clarity of the information presented. This approach allows the visual characteristics to be tailored to the capabilities of the display, enhancing the overall user experience and effectiveness of the data visualization. Additionally, in cases where visual characteristics may be affected by a different in properties of a display, the system may change the visual characteristics of groupings while maintaining the ratio, or relative differences therebetween.

FIGS. 4A-4H are exemplary illustrations of arrangements of a plurality of tiles in groupings presented on a display, consistent with some of the disclosed embodiments. In these figures, the dimensions of the common display are represented by the dash-dotted line 410. A plurality of tiles 402 arranged in groupings are shown, with each tile associated with an item included in the data structure 200 presented in FIG. 2. More specifically, each tile represents a row (or item 202) in the data structure 200, which includes data relating to a particular deal within a sales funnel or sales pipeline of a sales team. Each of the plurality of tiles 402 adopts a first visual characteristic, specifically a tile size chosen from a first set of visual characteristics, which includes three tile sizes: a first tile size (small size), a second tile size (medium size) larger than the first tile size, and a third tile size (large size) larger than both the first and second tile sizes. Additionally, each of the tiles adopts a second visual characteristic, namely a tile color, chosen from a second set of visual characteristics consisting of different shades of grey. It is to be appreciated that the different shades of grey are merely an example of this set of second visual characteristics. Instead of shades of grey, different colors such as red, orange, yellow, and green may also be used, for example. Consistent with the disclosed embodiments, the first set of visual characteristics has been determined by analyzing the first alphanumeric values of the items associated with the tiles— in these examples, the deal size value and sorting them in first partitioning groups. The second set of visual characteristics has been determined by analyzing the second alphanumeric values of the items associated with the tiles—in these examples, the phase of the deal in the sales funnel and sorting them in second partitioning groups. Accordingly, in these figures, the first visual characteristic of a tile, i.e., its size, is expressing the deal value in a non-alphanumeric manner, while the second visual characteristic of a tile, i.e., its color, is expressing the deal phase in the sales funnel in a non-alphanumeric manner.

It is to be appreciated that each of the plurality of tiles may adopt one or more additional visual characteristics that are not configured to express an alphanumeric value in a non-alphanumeric manner. For example, in any of FIGS. 4A-4H, each of the plurality of tiles 402 adopts a shape, specifically a square shape with rounded corners. However, this particular shape does not express an alphanumeric value. The same holds true for the color, width, line type, and thickness of the borders of tiles 402. In any of FIGS. 4A to 4H, these visual characteristics are not configured to express alphanumeric values about associated items. Nonetheless, these additional visual characteristics could be utilized to express alphanumeric values if needed, offering further customization and flexibility in the visual representation of the data. Additionally, any of these additional visual characteristics may still convey information, for example all tiles sharing a same shape may be correspond to items taken from a same data structure and therefore indicates that such items are comparable. Furthermore, it is to be appreciated, as discussed earlier, that tiles may adopt any sort of shape, such as triangles, rectangles, circles, ovals, hexagons, or any other polygons. Although FIGS. 4A-4H illustrate tiles as 2D graphical elements, any of the disclosed embodiments may be extended to tiles as 3D graphical elements. For example, tiles could be rendered as cubes, spheres, or any other 3D shapes.

In some embodiments, the different sizes may be proportional to the first alphanumeric values. For example, a tile may possess at least one characteristic dimension (e.g., length, width, radius) proportional to the first alphanumeric value, such that its size and/or area is, physically or relatively/directly or indirectly, proportional to the first alphanumeric value. Alternatively, in some other embodiments, the different sizes may correspond to different ranges for the first alphanumeric values. For instance, as illustrated in FIGS. 4A-4H, the three different tile sizes correspond to distinct ranges of deal values. Specifically, the small size corresponds to deal values strictly below 10 k, the medium size corresponds to deal values between 10 k and 100 k, and the large size corresponds to deal values strictly above 100 k. In some embodiments, differences in tile size between a first tile size and a second tile size may be the result of at least one of an increase in tile area or a change of tile shape. For example, as illustrated in FIGS. 4A-4H, both the medium and large sizes correspond to scaled-up versions of the small size, maintaining the same shape but with an increased area. However, in some alternative examples, the large size could correspond to a rectangular shape with rounded corners, with a length twice that of the medium size. This would represent a change in the tile size, i.e., increasing the tile area, while also changing the tile shape.

Figure 4A:
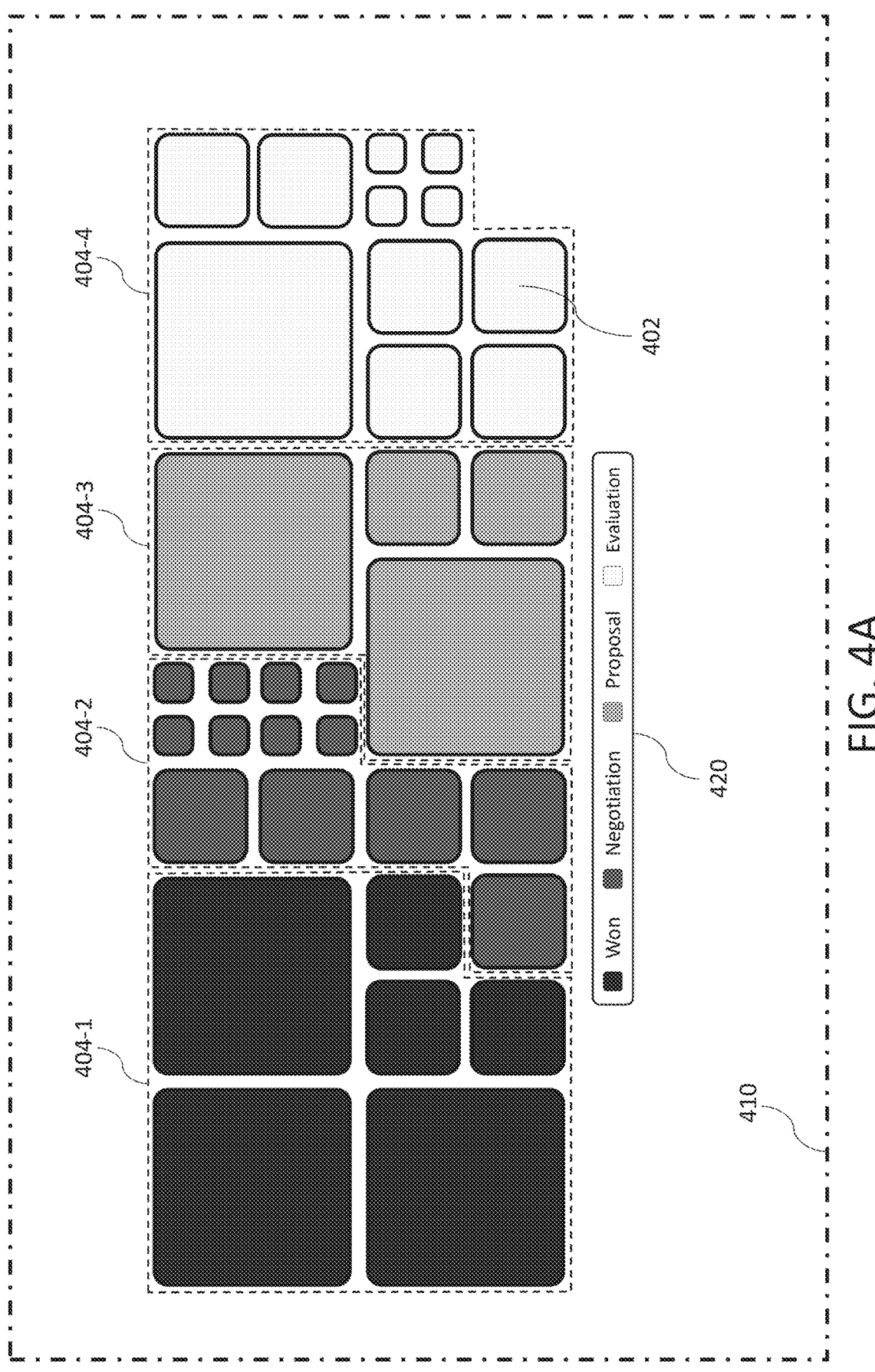
FIGS. 4A-4H are exemplary illustrations of arrangements of a plurality of tiles in groupings presented on a display, consistent with some of the disclosed embodiments.
Figure 4B:
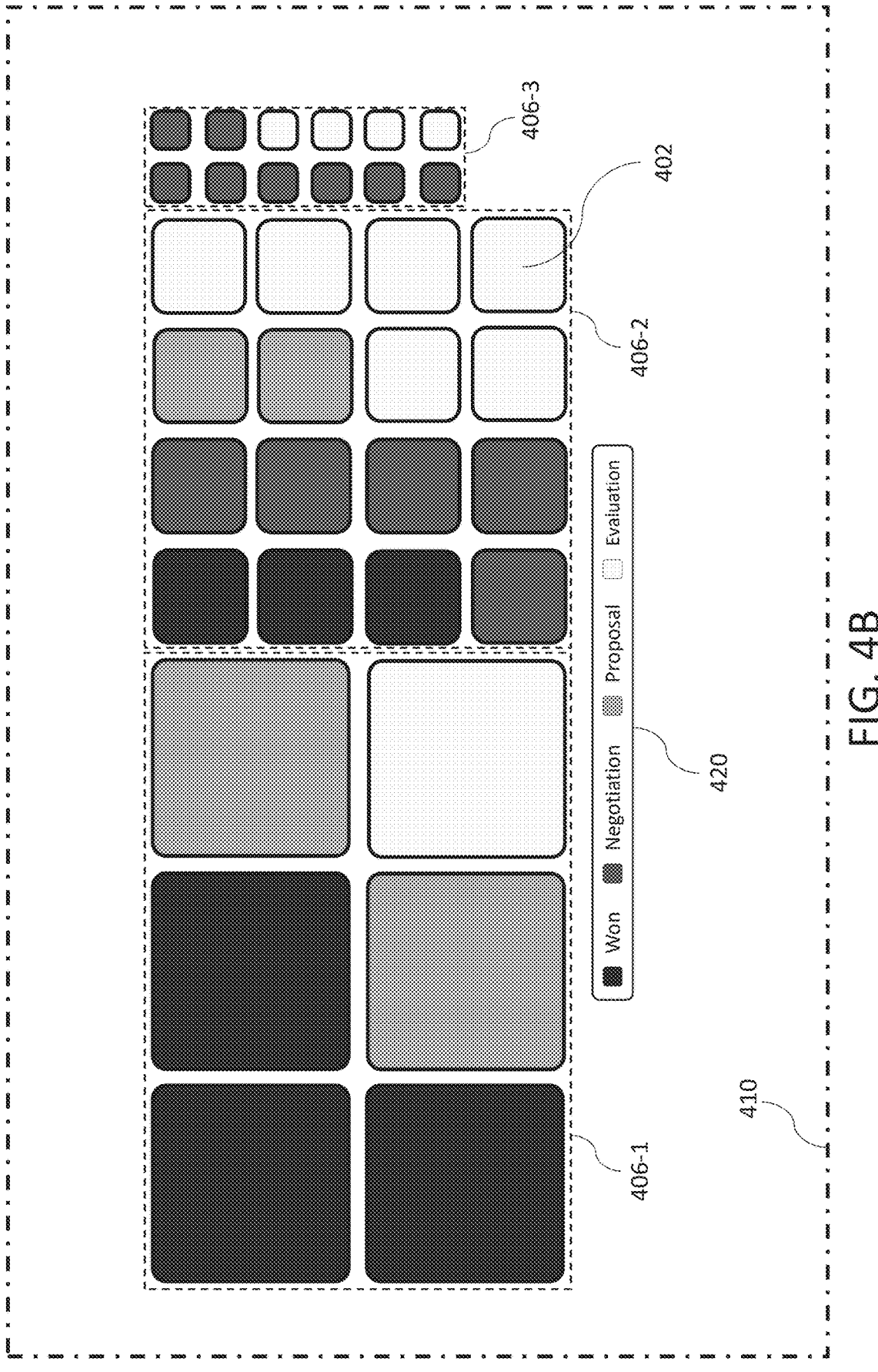

The plurality of tiles may be arranged into groupings based on either the first set of visual characteristics or the second set of visual characteristics. Arranging the tiles into groupings may involve assigning a unique position within the display to each tile. Referring to FIG. 4A, the plurality of tiles 402 is arranged into four distinct groupings (404-1 through 404-4), with boundaries illustrated as dashed lines (such boundary lines may or may not appear on a display). In this example, the groupings are based on the second set of visual characteristics, i.e., the tile colors, with each color corresponding to a distinct deal phase in the sales funnel (second alphanumeric value), namely "Won" (grouping 404-1), "Negotiation" (grouping 404-2), "Proposal" (grouping 404-3), and "Evaluation" (grouping 404-4). Referring now to FIG. 4B, the plurality of tiles 402 is arranged into three distinct groupings (406-1 through 406-3), with boundaries illustrated as dashed lines. In this example, the groupings are based on the first set of visual characteristics, i.e., the tile sizes, with each size corresponding to a distinct range of deal values (first alphanumeric value). Specifically, deals with values strictly above 100 k (grouping 406-1), deals with values between 10 k and 100 k (grouping 406-2), and deals with values strictly below 10 k (grouping 406-3).

Some disclose embodiments may further involve enabling toggling between a first grouping presentation on the common display based on the first set of visual characteristics and a second grouping presentation on the common display based on the second set of visual characteristics. Toggling refers to switching from one to another. For example, a user may be enabled to toggle between the first grouping presentation based on the first set of visual characteristics (i.e., tile size) shown in FIG. 4B and the second grouping presentation based on the second set of visual characteristics (i.e., tile color) shown in FIG. 4A. Enabling toggling may involve providing a GUI component that allows users to switch between the different grouping's presentations. This functionality enhances the user experience by offering flexibility in how the data is visualized. For example, the GUI component could be a button labeled "Toggle View," a toggle switch, a dropdown menu with options for each grouping presentation, or tabs labeled "Group by Size" and "Group by Color." When the user interacts with this component, the display updates to reflect the chosen grouping presentation. Implementing such a toggling feature ensures that users can interact with the data dynamically and view it in the way that best suits their needs at any given moment. In some embodiments, the transition between the first and the second grouping presentation may be instantaneous or may be accompanied by an animation that shows how each of the plurality of tiles is resorted. This animation may visually demonstrate how the tiles gradually transition from their unique position and grouping in the first presentation to their unique position and grouping in the second presentation.

In some embodiments, the groupings may be presented on the common display in a non-overlapping manner. In other words, none of the groupings overlap with one another, ensuring that each tile is clearly visible and distinct within its respective grouping. This arrangement may facilitate a clearer and more organized visual representation of the data. For example, referring to FIG. 4A, the groupings 404-1 through 404-4 are presented without any overlap. The non-overlapping arrangement ensures that each deal phase is visually segregated, making it easier to interpret the data at a glance. Similarly, in FIG. 4B, the groupings 406-1 through 406-3 are also presented without any overlap. By ensuring that these groupings do not overlap, the display remains organized and each grouping is easily distinguishable, enhancing the user's ability to analyze and interpret the underlying deal values efficiently.

In some embodiments, visualizing progress toward the common objective may include determining an order in which the groupings are to be presented on the common display. In this context, determining an order refers to ascertaining the organization of the groupings. In some embodiments, determining an order involves establishing a unique position for each of the groupings on the display. This may involve deciding how the different groupings will be arranged or sequenced visually to convey progress toward the common objective effectively. For instance, referring to FIG. 4A, if the common objective corresponds to reaching a sales target, in order to visualize the progression of sales deals through various stages of the sales pipeline, determining the order of the groupings would involve deciding the sequence in which each stage appears. In FIG. 4A, each grouping (404-1 through 404-4) represents a deal phase in the sales funnel and is positioned on the common display in a specific sequence, from left to right, to reflect the logical flow of deal progression. Referring now to FIG. 4B, visualizing the progression toward the objective (sales target) involves determining the order of the groupings to reflect the sequence in which each range of deal values appears. In FIG. 4B, each grouping (406-1 through 406-3) represents deals falling within a particular range of deal values and is positioned on the common display in a specific sequence, from left to right, to reflect the decreasing value of the deal ranges. Reaching a sales target as an objective would be represented by having as many tiles as possible on the left portion of the display, indicating deals with higher values.

In some embodiments arranging the plurality of tiles in groupings based on at least one of the first visual characteristic or the second visual characteristic may include arranging the plurality of tiles in groupings based on the first set of visual characteristics and arranging the plurality of tiles within the groupings based on the second set of visual characteristics. For example, in FIG. 4B, the plurality of tiles 402 is arranged into groupings 406-1 to 406-3 based on tile size, and within each grouping 406-1 to 406-3, the plurality of tiles is further arranged based on tile color. This arrangement of the tiles may involve the creation of sub-groupings, which may be further arranged to visualize progress toward the common objective and/or provide an additional perspective on the objective. For instance, in FIG. 4B, if the common objective corresponds to maximizing each deal value, arranging the tiles within groupings 406-1 through 406-3 based on color from top to bottom and left to right enables users to gain insights into the advancement of deals once their values have been maximized, or to identify which deal phase is most conducive to maximizing deal value. This hierarchical arrangement allows for a comprehensive understanding of both the progression of deals and the factors influencing their value optimization.

Alternatively in some other embodiments, arranging the plurality of tiles in groupings based on at least one of the first visual characteristic or the second visual characteristic may include arranging the plurality of tiles in groupings based on the second set of visual characteristics and arranging the plurality of tiles within the groupings based on the first set of visual characteristics. For example, in FIG. 4A, the plurality of tiles 402 is arranged into groupings 404-1 to 404-4 based on tile color, and within each grouping 404-1 to 404-4, the plurality of tiles is further arranged based on tile size from top to bottom and left to right. This arrangement may enable visualization of progress toward the common objective of reaching a sales target and offers an additional perspective to the user to understand the number of deals, their sizes, and their degree of progress through the sales funnel required to reach the sales target.

In some embodiments, once presented, each of the plurality of tiles may represent a graphical user interface (GUI) component that a user can engage with. For instance, after being displayed, a user may click on a specific tile or drag it across different groupings. These various interactions may allow a user to directly engage with the underlying item and data structure through the tile. For example, clicking on a tile may trigger a pop-up window to appear on the common display, containing editable fields corresponding to the item characteristics and associated values. In another scenario, dragging a tile from one grouping to another may update the alphanumeric value expressed by the visual characteristic and switch the visual characteristic adopted by the tile from the set of visual characteristics on which the groupings are based.

In some embodiments, the groupings may be presented in a gapless manner. A gapless arrangement refers to a configuration that efficiently utilizes the available space on the display, or on the portion of the display dedicated to displaying tiles, without leaving any empty or unused tile sized areas between the groupings. Instead of having gaps or spaces between the groupings, the tiles are positioned closely together to maximize the display area usage. This gapless arrangement may ensure that the visual representation is compact and optimally organized, allowing for a more comprehensive and detailed view of the data without any wasted space. By minimizing gaps between groupings, users can seamlessly navigate through the displayed information and easily compare different elements without distractions or interruptions. For example, referring to FIG. 4A, groupings 404-1 to 404-4 are presented in a gapless manner, with groupings nesting within each other, ensuring efficient use of the available display space. A gapless arrangement does not necessarily mean that there is no space whatsoever between tiles. For example, FIG. 4A illustrates a gapless arrangement in that additional tiles cannot be fit between existing tiles, despite a narrow border gap around each tile.

Figure 4C:
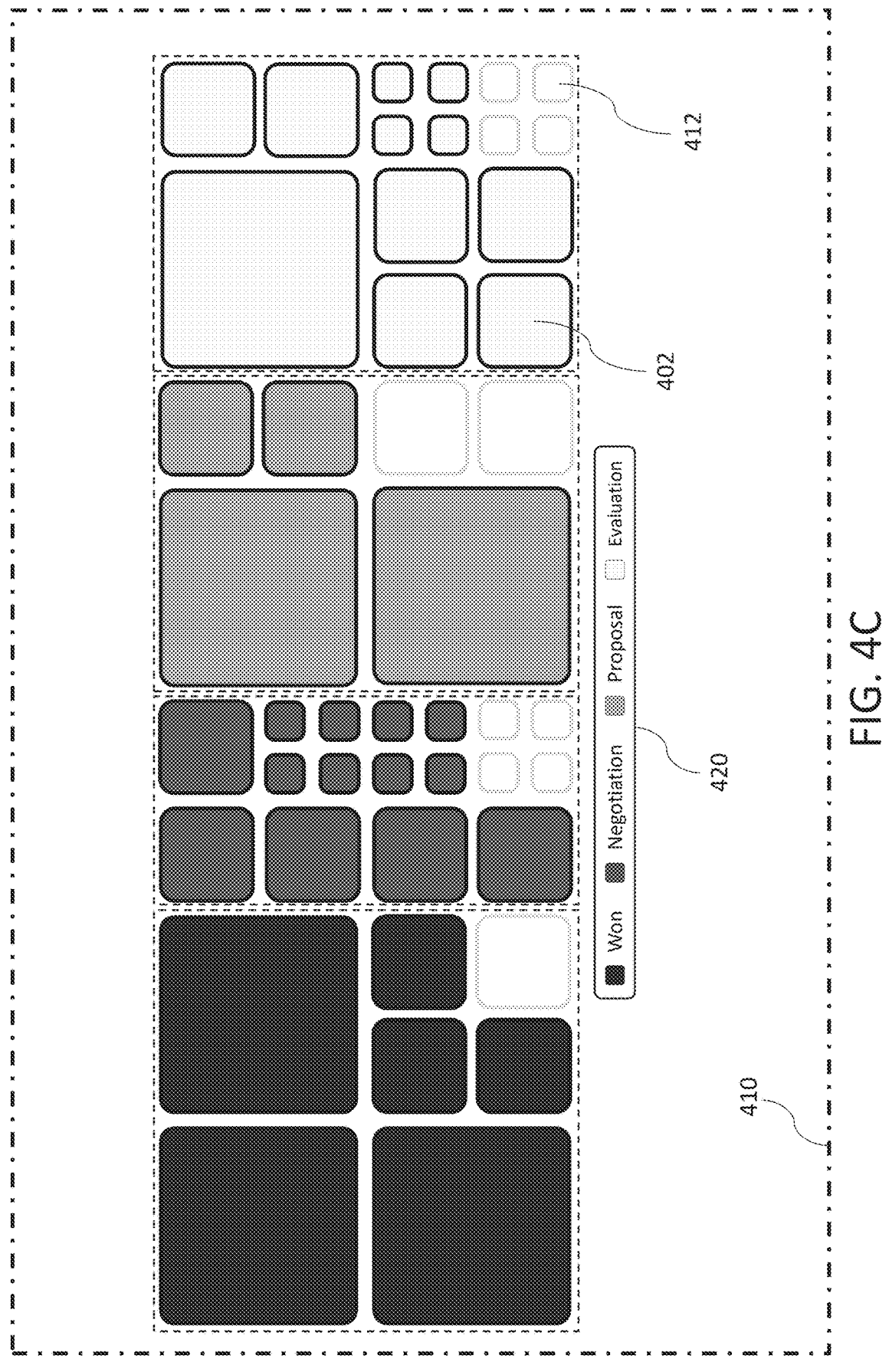

Alternatively, in some other embodiments, placeholder tiles may be interposed within the groupings. A placeholder tile, as used herein, refers to a tile adopting visual characteristics not configured to convey information. In other words, placeholder tiles are not associated with any item of a data structure. The sole purpose of the placeholder tile may be to occupy a portion of the display (a portion in which one or more regular tiles could be placed), maintaining visual consistency and alignment. Within the arrangement, placeholder tiles may all adopt one or more identical visual characteristic regardless of their positions within distinct groupings. For example, placeholder tiles may all adopts a same color and a same border color. These placeholder tiles serve as filler elements, ensuring a uniform appearance and spacing throughout the display. They help maintain the overall layout and structure of the visualization, contributing to its aesthetic appeal and clarity. For example, FIG. 4C illustrates an exemplary arrangement where the plurality of tiles is organized into groupings 408-1 through 408-4 based on the second set of visual characteristics, i.e., tile colors. In contrast with the arrangement illustrated in FIG. 4A, where groupings 404-1 through 404-4 are also based on the second set of visual characteristics but arranged in a gapless manner, each of the groupings 408-1 through 408-4 of FIG. 4C includes one or more placeholder tiles 412. Placeholder tiles 412 adopt a shape similar to that of regular tiles 402, further emphasizing where regular tiles could be placed, but they all consistently adopt a white color across groupings 408-1 through 408-4. As a direct consequence of the interposition of placeholder tiles, the overall portion of the display occupied by groupings 408-1 through 408-4 in FIG. 4C is larger than that occupied by groupings 404-1 through 404-4 in FIG. 4A. However, the presence of placeholder tiles visually provides the user with a sense of completion and structure within the groupings. This approach can help users quickly understand the organization and boundaries of each grouping, improving readability and comprehension of the displayed information. Regarding the size of placeholder tiles 412, in the example illustrated in FIG. 4C, a convention is used where placeholder tiles 412 adopt the same size as the last tile 402 of the groupings. However, it is to be appreciated that different conventions may be employed. For instance, placeholder tiles 412 could all adopt a uniform size, such as a small size, regardless of the size of the other tiles in the groupings. This flexibility allows for various approaches to ensure the visual representation is both functional and aesthetically consistent.

Some disclosed embodiments may further involve causing a legend of at least one of the first set of visual characteristics or the second set of visual characteristics to be presented on the common display. In this context, a legend refers to a visual guide or key that provides an explanation or interpretation of the visual characteristics used in the display. It may accompany the visual representation and helps users understand the meaning or significance of various elements within the display. For example, if the first set of visual characteristics corresponds to different tile sizes representing deal values and the second set corresponds to different tile colors representing deal phases, the legend would provide information about what each size and color represents. It could include labels or symbols indicating the range of deal values associated with each size, as well as the meaning of each color in terms of deal phases (e.g., "Negotiation," "Proposal," "Won," etc.). Including a legend on the common display may ensure that users can easily interpret and make sense of the visual representation, enhancing their understanding and enabling more effective analysis of the data presented. For example, referring to FIGS. 4A-4G, legend 420 includes labels indicating the meaning of each tile color in terms of deal phase.

Figure 4D:
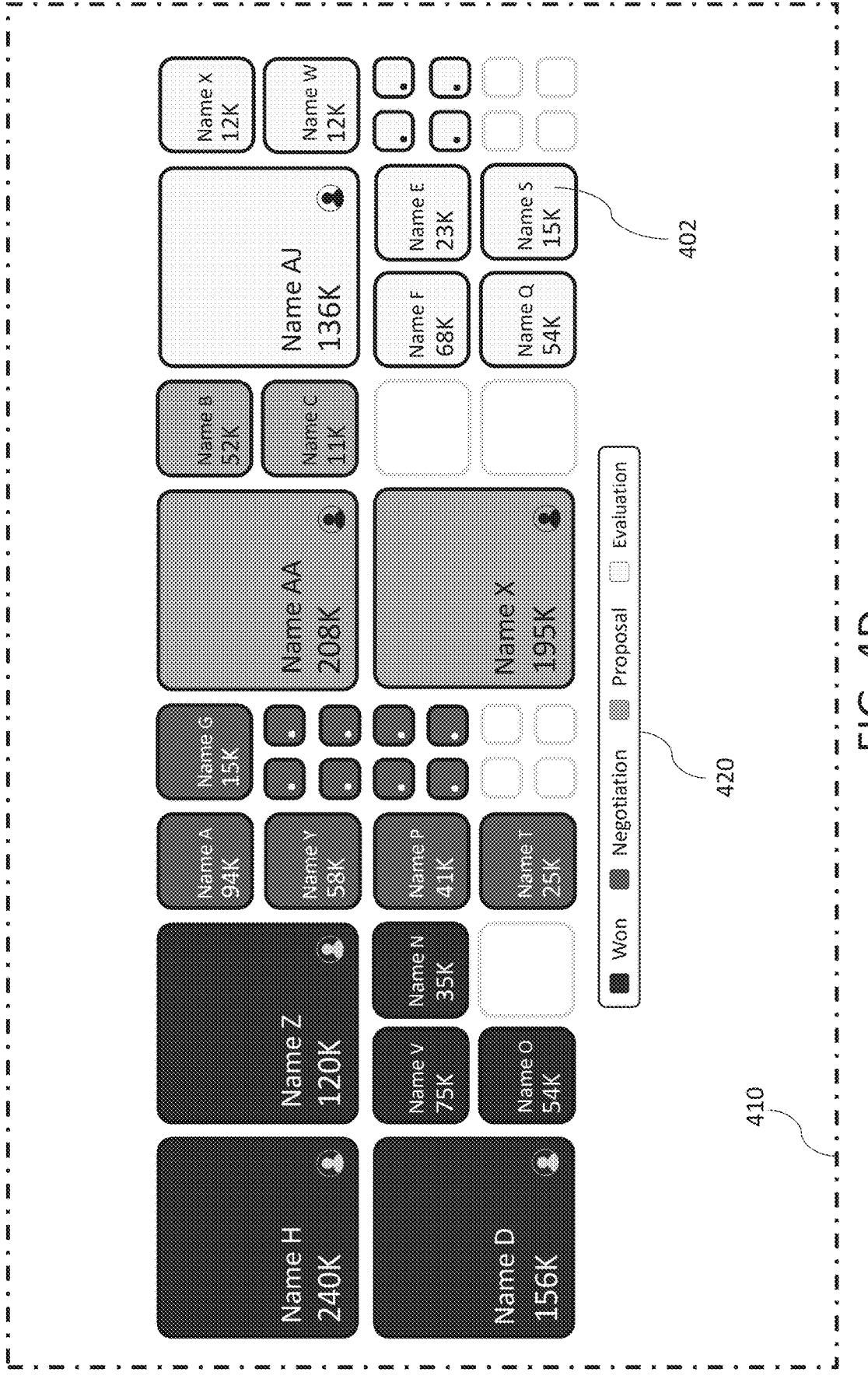

In some embodiments, each of the plurality of tiles may include at least one alphanumeric field configured to present at least one alphanumeric value of an associated item. For example, in some embodiments, each tile may include an alphanumeric field configured to present the first alphanumeric value corresponding to the first characteristic of an associated item. Thus, in addition to being visually expressed via the first visual characteristic adopted by the tile, the first alphanumeric value will also be conveyed through the alphanumeric field on the tile. For instance, FIG. 4D illustrates an exemplary arrangement of a plurality of tiles similar to the one presented in FIG. 4C, but where each tile includes at least one alphanumeric field presenting the first alphanumeric value of the associated item, such as the deal value. As shown, placeholder tiles 412 do not possess such an alphanumeric field, as they are not associated with any item. In some embodiments, the presentation of the alphanumeric value may be based on the first set of visual characteristics. For example, in FIG. 4D, tiles adopting a large size have a sufficiently large area to display the deal value with a relatively large font size, while tiles adopting a medium size present the deal value with a smaller font size. Tiles adopting a small size may be too small to present the deal value in a reasonable font size and, therefore, present a dot instead of the first alphanumeric value, inviting the user to interact with the tile to gather the deal value. Additionally, in some embodiments, the alphanumerical filed of each tile may be configured to present in addition to the first alphanumerical value, an alphanumerical value of an associated item that is not expressed by a visual characteristic of the tile. For example, referring to FIG. 4D, tiles adopting a large size and tiles adopting a medium size further present in addition to the deal value (first alphanumerical value), the client name, i.e., a value corresponding to a characteristic of the associated items that is not expressed by visual characteristics of these tiles. In some embodiments, each of the plurality of tiles may include at least one pictorial field configured to present at least one pictorial element corresponding to a value of a characteristic of an associated item. For example, referring to FIG. 4D, tiles adopting a large size present a profile picture representing the one or more salespersons corresponding to the "Salesperson(s)" characteristic of the associated items.

Some disclosed embodiments may further involve receiving an alphanumeric target value associated with the common objective, calculating from the first alphanumeric values a boundary location within the groupings corresponding to the target value, and interposing on the common display a boundary at the boundary location. As used herein a target alphanumeric value refers to any alphanumeric value that may help quantify or represent the common objective. For instance, if the common objective corresponds to reaching a sales target, the alphanumeric target value may correspond to the specific sales target that needs to be achieved. This value serves as a measurable goal or benchmark that guides the actions and decisions related to achieving the common objective. The alphanumeric target value may be compared with the first alphanumeric values of the plurality of items to assess progress towards the common objective. For instance, if the first alphanumeric values represent deal values and the alphanumeric target corresponds to a quarterly sales target, a comparison can be made between these values. Specifically, any combination of or calculation on (e.g., summing) the first alphanumeric values may be compared with the alphanumeric target to evaluate the progress toward achieving the quarterly sales target. Based on this comparison, a boundary location within the groupings corresponding to the alphanumeric target may be inferred. Once this boundary location is determined, a boundary may be interposed on the common display at the boundary location. As used herein, a boundary refers to any type of graphical element or feature configured to segregate or separate the plurality of tiles within the display. This boundary may serve to visually distinguish the individual tiles or the groupings of tiles on the display, providing insight into the progress towards the common objective. It acts as a visual marker or divider, helping to structure the layout of the display and enhance the user's understanding of the content being presented. A boundary may include a physical element such as a visual border, or emphasize lacking of a graphical element, such as a visual gap that lacks any additional visual presentation.

Figure 4E:
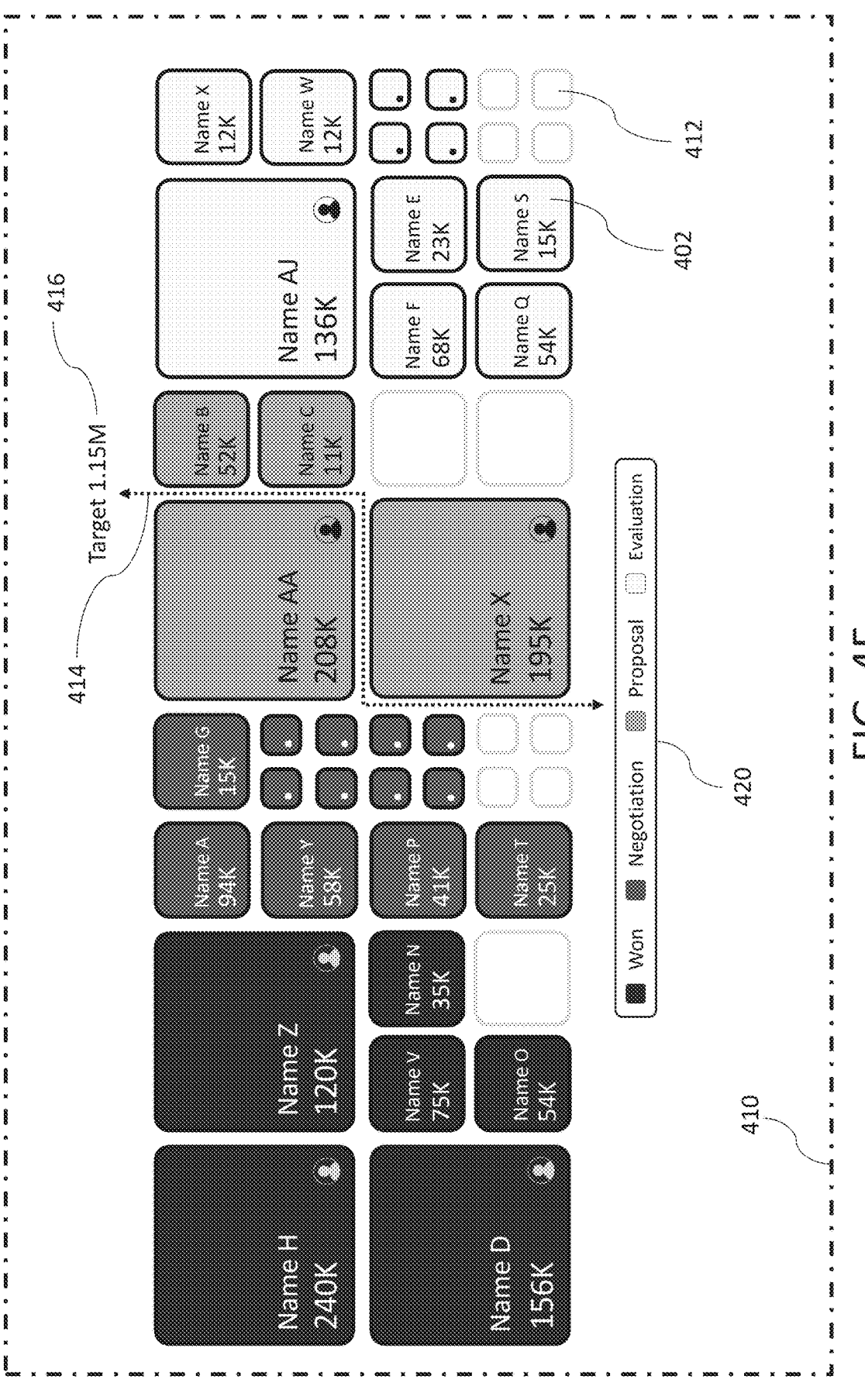

FIG. 4E illustrates an exemplary arrangement of a plurality of tiles 402 similar to the one presented in FIG. 4D, and further featuring a boundary 414 illustrated as a discontinuous double arrow interposed on the display. Boundary 414 represents a sales target, visually indicating the position among the groupings that corresponds to reaching the sales target. This visual cue helps users quickly understand how close they are to achieving their objective, making it easier to track progress and identify areas needing attention. As illustrated, boundary 414 circumvents the tiles and does not overlap them, ensuring that each tile remains fully visible and unobstructed. In some embodiments, when the alphanumeric target value is lower than the sum of the first alphanumeric values, the interposed boundary may divide the plurality of tiles into two ensembles. For example, as illustrated in FIG. 4E, boundary 414 separates the plurality of tiles into two ensembles: a first ensemble of tiles located on the left side of boundary 414, representing the tiles necessary to reach the common objective, and a second ensemble of tiles located on the right side of boundary 414, representing the tiles that will enable surpassing the objective. The addition of boundary 414, along with other visual characteristics (such as size and color) provided by the tiles, enables a user to quickly understand the status of progress towards the common sales objective. At a glance, the user can see how many tiles, thus deals are not yet closed/won and what their sizes are before reaching the common sales objective. This clear visual distinction helps in tracking progress and quickly identifying the remaining effort required to achieve and surpass the target. As shown in FIG. 4E, a boundary may separate tiles of the same grouping into two ensembles, as is the case for the third grouping corresponding to the "Proposal" phase. Some disclosed embodiments may further involve presenting on the display a label associated with the boundary, the label representing the alphanumeric target value. For example, in FIG. 4E, label 416 presents the alphanumeric target value, i.e., "1.15M."

While FIG. 4E illustrates a boundary determined based on the first alphanumeric value (e.g., deal value), it is to be appreciated that all the above embodiments remain valid for a boundary determined based on the second alphanumeric values of the plurality of items. For example, a boundary may be associated with an alphanumeric target value corresponding to a target number of deals closed. In this scenario, the boundary location would be determined based on the number of deals closed. If the second alphanumeric values represent deal phases, the boundary could visually represent progress towards achieving the target number of closed deals. This way, the boundary would help users quickly assess how many deals are required to meet the target and how many deals have already been closed, providing a clear visual indicator of progress towards the common objective.

In some embodiments, each of the plurality of items may include a third characteristic having a third alphanumeric value. A third characteristic may be chosen from the group from which the first and second characteristics are described above. For example, referring to FIG. 2 representing in the context of a CRM solution a data structure 200 corresponding to a plurality of deals of a sales team, each item 202 in addition to a first characteristic corresponding to deal size and a second characteristic corresponding to a deal phase in the sales funnel may further include a third characteristic corresponding to e.g., a level of risk. In that situation, some disclosed embodiments may involve analyzing third alphanumeric values of the at least some of the plurality of items to segregate the at least some of the plurality of items in a third partitioning to thereby identify third partitioning groups. Akin to the analysis of the first and second alphanumeric values, the analysis of the third alphanumeric values may represent a third method of sorting the at least some of the plurality of items (i.e., a third partitioning). In some embodiments, analyzing the third alphanumeric values may involve creating a group for each distinct third alphanumeric value or creating groups for a plurality of distinct third alphanumeric values. In some embodiments, each of the third partitioning groups may include at least one item, with each item being uniquely attributed to a single third partitioning group. In other words, items cannot simultaneously belong to two distinct third partitioning groups. Additionally, in some embodiments, the number of third partitioning groups may differ from the number of first partitioning groups and the number of second partitioning groups. For example, after analyzing the first, second, and third alphanumeric values, three distinct first partitioning groups, four distinct second partitioning groups, and two distinct third partitioning group may be determined.

Additionally, some disclosed embodiments may involve, based on the third partitioning, identifying a third set of visual characteristics, different from the first set of visual characteristics and the second set of visual characteristics, for non-alphanumerically expressing the third alphanumeric value. In some embodiments, the third set of visual characteristics may be chosen from a group consisting of size, color, texture, transparency, shadowing, or shape. In this context, the third set of visual characteristics is used to visually express the third alphanumerical values. In some embodiments, finding a third set of visual characteristics may involve finding a suitable set of visual characteristics to convey information regarding differences between the third alphanumeric values of some of the items. Additionally, or alternatively, in some embodiment, the third set of visual characteristics may provide insights into the common objective and/or to covey information on progress toward the common objective. As mentioned earlier, identifying a third set of characteristics may involve selecting visual characteristics from a larger predetermined set based on the third partitioning. For example, choosing specific levels of transparency from a plurality of levels of transparency. Alternatively, a customized approach may be used, creating tailored visual characteristics by considering factors like clarity and relevance. This detailed process may be implemented using an AI system that analyzes the data (third alphanumerical values and/or third partitioning groups) and generates effective visual characteristics, ensuring high customization and precision in the visualizations.

The third set of visual characteristics may be different from the first and second set of visual characteristics. In this context, differing sets of visual characteristics may entail differences in the nature of the visual characteristics. For example, in some embodiments, the first set of visual characteristics may correspond to different sizes, the second set of visual characteristics may correspond to different colors, and the third set of visual characteristics may correspond to different transparency levels. Alternatively, differing sets of visual characteristics may refer to sets consisting of attributes of a same nature but that are mutually exclusive. For example, in some embodiments, the first set of visual characteristics may correspond to different colors chosen from a first color palette, the second set of visual characteristics may correspond to different colors chosen from a second color palette, distinct from the first color palette, and the third set of visual characteristics may correspond to different colors chosen from a third color palette, distinct from the first and the second color palette.

Some disclosed embodiments may involve applying a third set of visual characteristics to the plurality of tiles. In addition to adopting a first and second visual characteristic from the first and second set of visual characteristics, respectively, each tile may also adopt a third visual characteristic from the third set of visual characteristics. In other words, each tile may express three distinct alphanumeric values in a non-alphanumeric manner. For example, while the first visual characteristic might represent deal value through size and the second visual characteristic might represent deal phase through color, the third visual characteristic could represent deal risk through a level of transparency. This multi-dimensional visual encoding allows users to quickly interpret multiple aspects of the data associated with each tile.

Consequently, in some embodiments, arranging the plurality of tiles in groupings may be based on at least one of the first set of visual characteristics, the second set of visual characteristics, or the third set of visual characteristics. In other words, the groupings may be organized according to any permutation of these three visual characteristics. Exemplary combinations include but are not limited to: grouping based on the first set of visual characteristics, sub-grouping based on the second set of visual characteristics, grouping based on the second set of visual characteristics, sub-grouping based on the third set of visual characteristics, grouping based on the third set of visual characteristics, sub-grouping based on the first set of visual characteristics, or mixed arrangement (e.g., tiles could be arranged in groupings based on the second set of visual characteristics (color) and within those groupings, arranged by the first set (size) and further by the third set (transparency level). This flexible approach to arranging the tiles allows for a highly customizable and informative visual representation, enabling users to discern different layers of information based on how the tiles are grouped and arranged within those groupings.

Some disclosed embodiments may further involve enabling toggling between a first presentation wherein each of the plurality of tiles adopts any two visual characteristics from the first, second, or third set of visual characteristics and a second presentation wherein each of the plurality of tiles adopts three visual characteristics, one from each of the first, second, and third sets of visual characteristics.

Enabling toggling between these two presentations may involve providing a graphical user interface (GUI) component, such as a button, switch, or menu option, that allows the user to switch between the two modes. This functionality allows users to view the data in different ways, either focusing on two key characteristics in a simplified view or on three characteristics in a more detailed and comprehensive view. For example, in the first presentation mode, a display may present tiles differentiated by size and color, representing deal value and deal phase respectively. By toggling to the second presentation mode, the same tiles might also include a transparency level, representing an additional layer of information such as a level of risk. The GUI component makes it easy for users to switch between these views, enhancing their ability to analyze and interpret the data effectively.

It is to be appreciated that the aforementioned embodiments, which involve the adoption for the tiles of a third visual characteristic allowing for the visual expression of a third alphanumeric value and effectively adding a third dimension to the data representation may be generalized to tiles adopting any number of visual characteristics or distinct combination of visual characteristics, such as four, five, six, or more. Each additional visual characteristic or distinct combination of visual characteristics would enable the expression of another alphanumeric value corresponding to a distinct characteristic of an associated item, providing an even richer and more detailed visual representation.

Figure 4F:
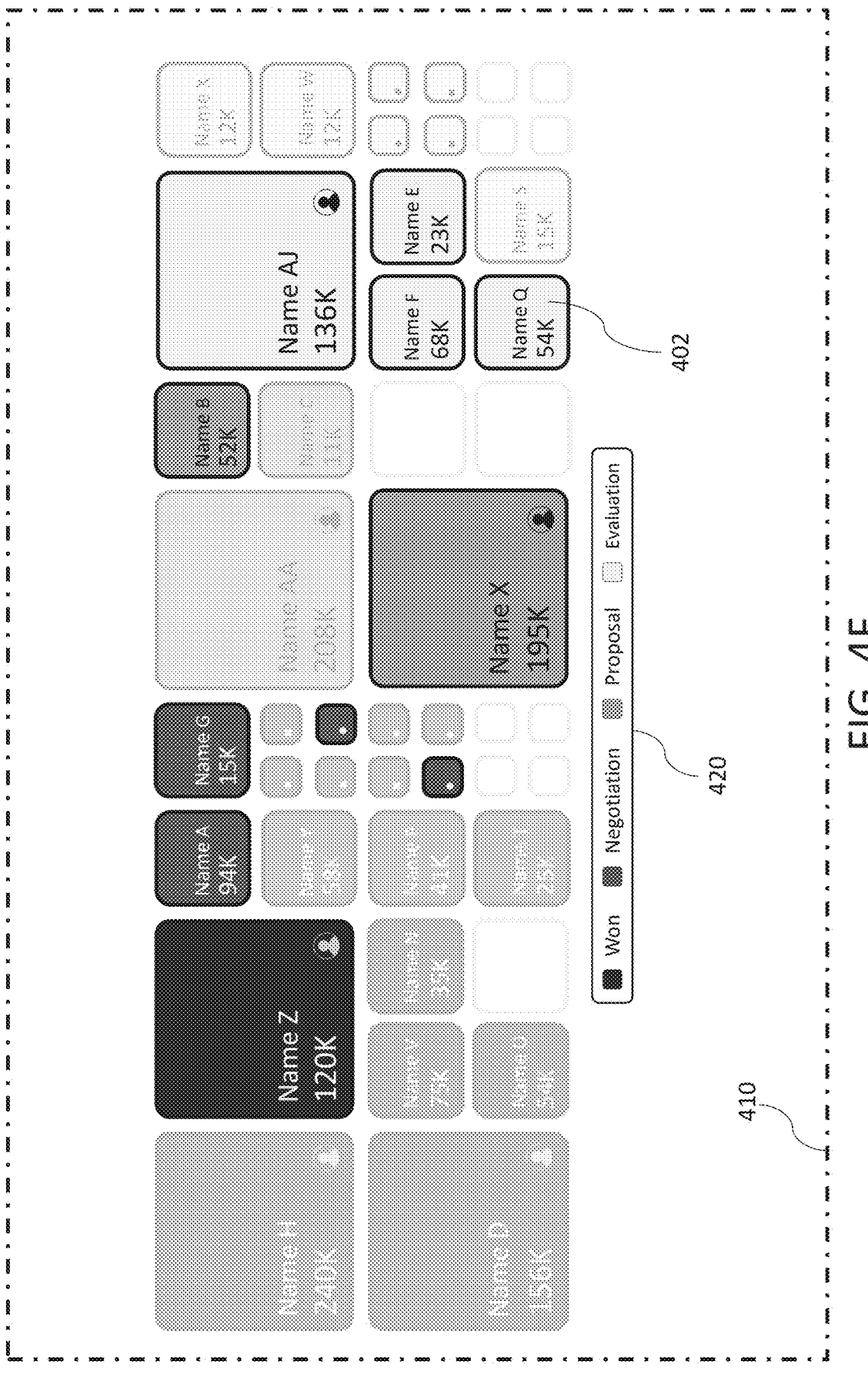
Figure 4G:
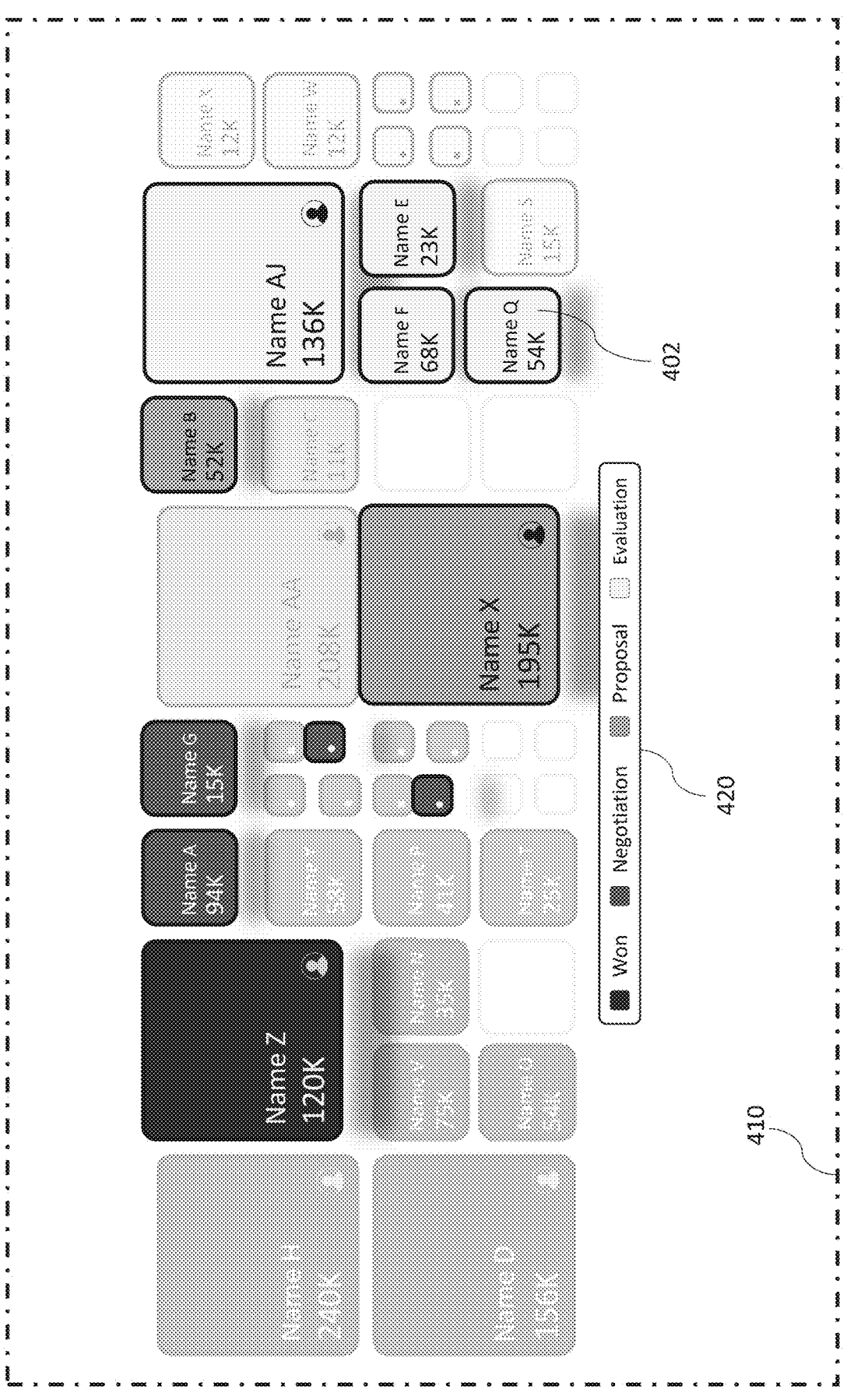

FIG. 4F illustrates an exemplary arrangement of a plurality of tiles 402 grouped based on the second set of visual characteristics (e.g., tile colors) and further arranged within those groupings based on the first set of visual characteristics (e.g., tile sizes). This arrangement is similar to the one presented in FIG. 4D, but with each of the plurality of tiles 402 also adopting a third visual characteristic, i.e., a transparency level chosen from a third set of visual characteristics. This third set of visual characteristics consists of two levels of transparency: one where the transparency is 100% and another where the transparency is 25%. Consistent with the disclosed embodiments, the third set of visual characteristics is determined by analyzing the third alphanumeric values of the items associated with the tiles—in this example, the level of risk associated with each deal, and sorting them in third partitioning groups. In this example, two third partitioning groups have been determined, a first third partitioning group corresponding to deal having a "low" risk level, and second third partitioning group having a "moderate" or "high" risk level. Accordingly, in FIG. 4F, the first visual characteristic of a tile, its size, expresses the deal value in a non-alphanumeric manner, the second visual characteristic of a tile, its color, expresses the deal phase in the sales funnel in a non-alphanumeric manner, and the third visual characteristic of a tile, its transparency level, expresses the level of risk associated with the deal in a non-alphanumeric manner. This multi-dimensional visual representation allows users to quickly assess not only the value and phase of each deal but also the risk level, providing a more comprehensive understanding of the sales data at a glance.

As mentioned earlier, the display presented in FIG. 4F may be generated in response to a toggling signal initiated by a user. For example, a user may click on a GUI component (e.g., a button), effectively switching from the presentation illustrated in FIG. 4D to the presentation illustrated in FIG. 4F. Consistent with the disclosed embodiments, the third set of visual characteristics may include distinct combinations of visual effects. For instance, in FIG. 4G, the third set of visual characteristics applied to the tiles corresponds to: a transparency level of 25% for tiles in the first third partitioning group ("low" risk level), and a combination of a transparency level of 100%, shadowing, and a positional offset within the unique arrangement for tiles in the second third partitioning group ("moderate" or "high" risk level). Distinct combinations of visual characteristics may enable further differentiation of the tiles and enhance visualization and understanding for the user.

Some disclosed embodiments may further involve causing a table to be presented on the common display, wherein the table includes rows corresponding to the at least some of the plurality of items and at least two columns corresponding to the first characteristic and the second characteristic included in each of the at least some of the plurality of items. For instance, if each tile represents a sales deal, the rows in the table would represent individual deals. The columns would then display specific details about each deal: one column for the deal value (the first characteristic) and another for the deal phase in the sales funnel (the second characteristic). This table allows users to see a more detailed and structured view of the same data represented visually by the tiles, facilitating easier comparison and analysis. By integrating this table with the visual tile arrangement, users are provided with multiple perspectives on the data, enhancing their ability to understand and interpret the information effectively. The table may serve as a detailed reference point, while the visual tiles provide an at-a-glance overview of the data's distribution and relationships.

In some embodiments, the table, once presented, may act as an interactive graphical user interface (GUI) component that users can engage with. For instance, after the table is displayed, a user can click on a specific row to select the associated item. This action may trigger a pop-up window on the common display, containing editable fields corresponding to the item's characteristics and associated values. Additionally, in some embodiments the rows in the table may be sorted in a manner consistent with the arrangement of the associated plurality of tiles. For example, the first tile displayed at the uppermost and leftmost position in the arrangement may be considered the first tile within the arrangement, and its associated item will be displayed in the first row of the table. This consistent sorting ensures that the visual and tabular representations of the data are aligned, making it easier for users to cross-reference and interact with the information.

Figure 4H:
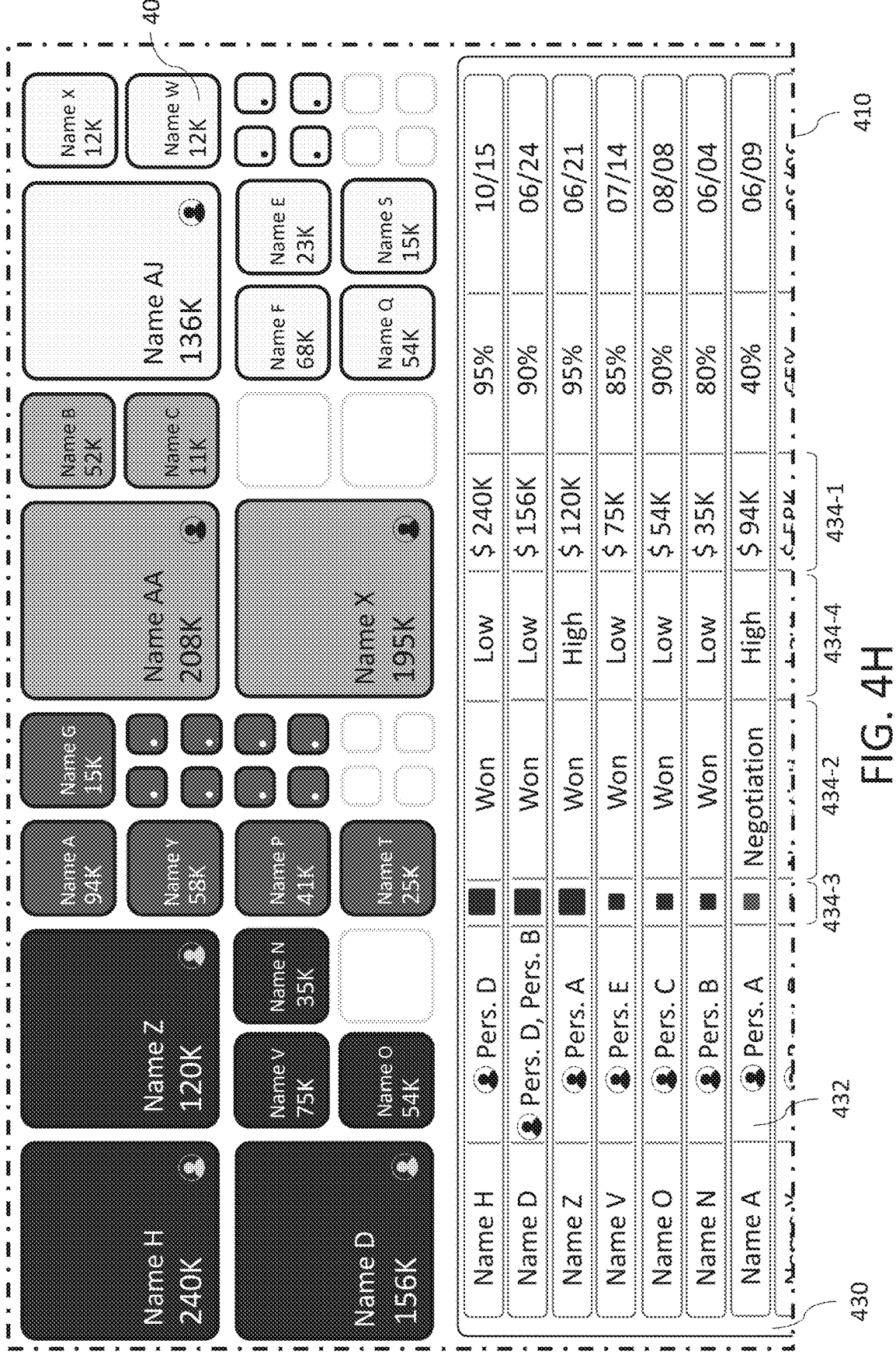

FIG. 4H illustrates an exemplary arrangement of a plurality of tiles 402, similar to the one presented in FIG. 4D, and further featuring a table 430 displayed below the arrangement of the tiles. Table 430 includes a plurality of rows 432, with a first column 434-1 representing the deal value (first characteristic) and a second column 434-2 representing the deal phase (second characteristic). In some embodiments, the table may include a third column corresponding to graphical representations of tiles associated with the at least some of the plurality of items. As used herein, a graphical representation of a tile may refer to a visual replica or a miniature version of the tiles. Graphical representations of tiles may include visual characteristics consistent with the tiles and may express alphanumeric values of the items associated with the tiles in a non-alphanumerical manner. For instance, in table 430 depicted in FIG. 4H, a third column 434-3 is included, containing a series of graphical representations, each corresponding to one of the plurality of tiles 402 displayed above. These graphical representations mirror the visual characteristics of the tiles, such as color, size, and shape. By aligning with the appearance of the tiles, these representations effectively convey the same information presented visually. Differences between tiles are therefore reflected in the corresponding differences between the graphical representations in the table. The utilization of graphical representations of tiles serves to enhance the user experience by providing a visual link between the table entries and the tiles displayed above. Users may easily correlate the information presented in the table with the visual representations of the tiles, facilitating a more intuitive understanding of the data. In some embodiments, the table may include additional columns corresponding to further characteristics of the items. For example, in table 430 of FIG. 4H, a fourth column 434-4 represents the risk level associated with each deal.

Once displayed, any arrangement of a plurality of tiles in groupings, as discussed in the present disclosure (e.g., as shown in FIGS. 4A-4H), may constitute a widget. As mentioned earlier, widgets can provide users with deep and meaningful insights into their operations and enable the visualization of alphanumeric data in a non-alphanumeric manner. In some embodiments, the arrangement of the plurality of tiles in groupings (representing a widget), may be defined by boundaries. As used herein, "boundaries" refers to the defined edges or limits that separate and distinguish one element from another. Accordingly, widget boundaries may separate the different groupings of tiles from other displayed elements (e.g., on a user device) such as a table, ensuring a clear and organized presentation of data. Boundaries may be visible (e.g., a frame or a line outlining the widget) or invisible. In some embodiments, widget boundaries may fit within at least one dimension of the display and include a representation (e.g., a tile) for each item in the data structure for which relative insight is sought. For example, as shown in FIGS. 4A-H, the arrangement of the plurality of tiles in groupings fits the width and height of display 410, and the arrangement includes a tile 402 for each of the items included in data structure 200. Displaying all the items visually on the display may enable users to gain insight into the common objective.

Alternatively, in some disclosed embodiments, the dimensions of a display, particularly on mobile devices like smartphones or tablets, may be limited. Consequently, if the cumulative size of the groupings (widget) or the table exceeds at least one dimension of the common display, the operations may involve augmenting the display with a scroll bar. This scroll bar facilitates scrolling through the presented groupings or table on the common display, ensuring that all content remains accessible within the confines of the display.

Some disclosed embodiments may involve causing discrete graphical elements to be organized in a segmented manner and exhibiting alphanumeric data as graphical distinctions. As mentioned earlier, alphanumeric data refers to data composed of either or both letters (alphabetic) and numbers. A discrete graphical element refers to a visual component that conveys information. By way of non-limiting examples, graphical elements can include shapes, lines, colors, textures, images, icons, and symbols. Discrete graphical elements refer to individual visual components that are distinct from one another, enabling visual comparison between them. Each element may adopt a plurality of graphical characteristics such as shape, color, size/dimensions, borderline, texture or position with respect to a screen and/or other presented elements, that may be used to visually encode information. In this disclosure, unless specified otherwise, a graphical element may equally refer to the visual representation/entity as presented on a display and/or to the underlying data model of the visual representation that can be readily understood and manipulated by a processing device and that includes properties defining the graphical characteristics of the visual representation.

By organizing discrete graphical elements in a segmented manner, effectively exhibiting alphanumeric data as graphical distinctions, alphanumeric data may be conveyed in a graphical, non-alphanumeric manner. In other words, this approach enables alphanumeric data to be interpreted visually rather than through traditional text-based methods, which can be useful for creating visually enhanced data presentations, enabling easier pattern recognition, or providing an alternative way to encode and decode information.

In the context of a CRM solution, especially regarding sales pipelines, transforming complex alphanumeric data into visual elements can significantly enhance user experience. Salespersons, managers, and other users can quickly compare different characteristics and gain immediate insights from these visual representations. By organizing graphical elements into segments or collections, users can easily identify patterns and trends that might be overlooked in alphanumeric data. This segmentation allows sales managers to swiftly see which deals fall into which categories, their relative sizes, and their probabilities of closing, thereby facilitating faster decision-making. Additionally, visual data is generally more universally understood than alphanumeric data, making it accessible to diverse teams with varying levels of familiarity with the CRM system. Graphical elements can bridge gaps in understanding, ensuring that all team members are on the same page.

FIG. 5 is a flowchart of an exemplary process (500) for causing discrete graphical elements to be organized in a segmented manner and exhibiting alphanumeric data as graphical distinctions. Process 500 is discussed herein for explanatory purposes and is not intended to be limiting. In some embodiments, steps of process 500 may be changed, modified, substituted, or rearranged, consistent with the present disclosure. Process 500 may be implemented using one or more components of a computing device 3000 (discussed in FIG. 30) or user device 3120 of computing architecture 3100 (discussed in FIG. 31). Some disclosed embodiments may include at least one processor that may be configured to execute stored instructions to perform operations for causing discrete graphical elements to be organized in a segmented manner and exhibiting alphanumeric data as graphical distinctions. As shown in FIG. 5, process 500 may include steps 502, 504, 506, 508, 510, 512 and 514, discussed in further detail below.

Some disclosed embodiments may involve accessing a data structure including a plurality of items. Each item may be associated with a common objective, and each item may include a first characteristic having a first alphanumeric value and a second characteristic having a second alphanumeric value. Accessing a data structure (as defined earlier) from the point of view of a software component or a processing unit relates to performing operations to retrieve, modify, or manage data contained within that structure. For example, a processing unit by accessing a data structure may extract data from the structure. This may involve reading specific elements, searching for particular values, or querying the data based on certain criteria. In another example, accessing a data structure may involve updating or changing the data within the structure such as inserting new elements, updating existing values, or deleting elements. Additionally, accessing a data structure may include performing tasks that ensure the data structure is maintained and operates efficiently. This may involve tasks like sorting, reorganizing, or balancing the data structure to optimize performance. An example of accessing a data structure is illustrated as step 502 of FIG. 5, and an exemplary data structure 200 is shown in FIG. 2.

The data structure may include a plurality of items, each including a first and a second characteristic. Items and characteristics may be understood as discussed earlier. For example, referring to FIG. 2 representing in the context of a CRM solution a data structure 200 corresponding to a plurality of deals of a sales team, each item 202 includes a first characteristic, e.g., deal size, and a second characteristic e.g., phase or level of risk. The first and second characteristics may be associated with a first and a second alphanumeric value. For example, the first deal included in the first row of data structure 200, includes a deal size (first characteristic) associated with the alphanumeric value "94K" or "94,000" (first alphanumeric value), and a phase in the sales funnel (second characteristic) corresponding to the alphanumeric value "Negotiation" (second alphanumeric value). Additionally, each item may be associated with a common objective. This objective could span a broad spectrum, ranging from high-level aspirations, such as maximizing profitability or efficiency, to more specific aims, such as streamlining processes or achieving targeted outcomes. For example, within the data structure 200, each item 202 may be associated with a collective goal, such as meeting quarterly sales targets, generating revenue, finalizing all deals, or mitigating risks associated with each deal. In some embodiments, at least one of the first alphanumeric values or the second alphanumeric values may be relative alphanumeric values. As mentioned earlier, values may be relative if, for example, they indicate a common parameter or may be compared with each other.

Some disclosed embodiments may involve receiving a trigger requesting that at least some of the plurality of items from the data structure be graphically represented in a grouped manner for visualizing progress toward the common objective. A trigger refers to a signal or event that causes something else to happen. For example, a trigger may initiate a specific action or process within a system, software component, or application. Triggers may stem from a user-initiated action. For example, in some embodiments, receiving a trigger may include at least one of receiving a scroll signal resulting from a motion of a user on a display (e.g., a display wherein the data structure would be graphically represented), loading a certain URL, or receiving a trigger via a Graphical User Interface (GUI) component (e.g., a button, a check box, etc.) present on the display. Alternatively, in some embodiments, receiving a trigger may be an automated event such as reaching a certain number of items in the data structure or time threshold. An example of receiving a trigger is illustrated as step 504 of FIG. 5. Once the trigger is received, preparation of the graphical representation of at least some of the plurality of items may be presented. The presentation may occur by grouping the items based on relevant criteria related to the common objective. This grouped visualization may enable users to gain insights into the overall progress towards the common objective, identifying trends, patterns, or areas requiring attention more effectively than when examining raw data. It may support decision-making by providing a clear overview of where efforts should be focused to maximize progress towards the objective. It is to be appreciated that not all items from the plurality of items may be graphically represented. For example, items missing either the first or second alphanumeric value may be excluded from graphical representation. In some embodiments, the selection of items to be represented may be based on the common objective. For instance, if the common objective corresponds to meet quarterly sales targets, deals with due dates later than the end of the quarter may not be displayed. In other embodiments, a null value can be introduced into the missing first or second alphanumeric values in order to prevent the exclusion of partially filled items from the graphical representation.

Some disclosed embodiments may involve analyzing first alphanumeric values of the at least some of the plurality of items to segment the at least some of the plurality of items in a first partitioning to thereby define first partitioning groups. In this context, "analyzing" refers to the evaluating or examining. For example, analyzing values For example, analyzing values may involve examining the values to identify patterns, relationships, or criteria that can be used to categorize or segment the items into distinct partitioning groups. This analysis of the first alphanumeric values may represent a first method of sorting the at least some of the plurality of items (i.e., a first partitioning). An example of analyzing first alphanumeric values to thereby define first partitioning groups is illustrated as step 506 of FIG. 5. In some embodiments, each of the first partitioning groups may include at least one item, with each item being uniquely attributed to a single first partitioning group. In other words, in this context, items cannot simultaneously be associated with two distinct first partitioning groups.

In some embodiments, analyzing the first alphanumeric values may involve creating a group for each distinct first alphanumeric value, effectively sorting items based on these values. For example, if the alphanumeric values correspond to client names, the items may be sorted by client name and a first partitioning group would be provided for each distinct value. In other embodiments, analyzing the first alphanumeric values may involve creating groups for a plurality of distinct first alphanumeric values. For instance, in the context of relative alphanumeric values, the first partitioning groups may correspond to different non-overlapping ranges. This analysis process might involve comparing each alphanumeric value to thresholds or boundary values associated with these groupings. For example, if the alphanumeric values correspond to deal sizes, the first partitioning groups could be defined by distinct deal size ranges, such as a group for items with deal sizes strictly below 10 k, a group for items with deal sizes between 10 k and 100 k, and a group for items with deal sizes strictly above 100 k. In some embodiments, the threshold or boundary values for the partitioning groups may be determined during the analysis. After evaluating the span of all alphanumeric values and their statistical distribution, different boundary values may be established to create groups that efficiently represent this distribution. Alternatively, the boundary or threshold values may be specified by a user through a GUI component as part of a customization process. For example, a user interested in greater granularity for items with large deal sizes may adjust the partitioning groups (e.g., default predetermined portioning groups) to emphasize differences among items with large deal sizes by creating multiple groups for detailed visualization, while creating a single, larger group for all items with moderate to low deal sizes.

Some disclosed embodiments may involve analyzing second alphanumeric values of the at least some of the plurality of items to segment the at least some of the plurality of items in a second partitioning to thereby define second partitioning groups. Akin to the analysis of the first alphanumeric values, the analysis of the second alphanumeric values may involve examining or evaluating the second alphanumeric values. This may occur to sort at least some of the plurality of items (i.e., a second partitioning). An example of analyzing second alphanumeric values to thereby define second partitioning groups is illustrated as step 508 of FIG. 5. In line with the above, in some embodiments, each second partitioning group may be associated with at least one of a distinct second alphanumerical value or a distinct range of second alphanumerical values. In some embodiments, each of the second partitioning groups may include at least one item, with each item being uniquely attributed to a single second partitioning group. In other words, in this context, items cannot simultaneously be associated with two distinct second partitioning groups. Additionally, in some embodiments, the number of second partitioning groups may differ from the number of first partitioning groups. For example, after analyzing the first and second alphanumeric values, three distinct first partitioning groups and four distinct second partitioning groups may be determined.

Some disclosed embodiments may involve generating a plurality of differently sized tiles associated with the at least some of the plurality of items. In this context, a "tile" refers to a discrete graphical element/representation or block that may visually encapsulate data or otherwise represent data related to an item. A tile may have any suitable shape such as rectangular, square, triangular, round, pentagonal, hexagonal, or any other regular or irregular contour. When the shape is used to convey information, it may be beneficial for the tile shape to be such that it may be readily compared visually with other tiles. Each of these tiles may adopt one or more visual characteristics. For example, in the present context, each of the plurality of tiles may adopt a size. More specifically, the differently sized tiles may include some tiles of at least a first tile size and other tiles of at least a second tile size larger than the first tile size. In some embodiments, differences in tile size between the first tile size and the second tile size may be a result of at least one of an increase in tile area or a change of tile shape. In other words, the second tile size may be a scaled-up version of the first tile size, where one or more dimensions (e.g., length, width) are increased while maintaining the same shape but an increased tile area, or that the second tile size may be larger not just by scaling up the first tile size's dimensions, but also by altering its shape. For example, if a tile of a first tile size corresponds to a square, an other tile of a second tile size could be a scaled-up version of the square (larger square) or a rectangle or another shape entirely, as long as it is larger in size/area. An example of generating a plurality of differently sized tiles is illustrated as step 510 of FIG. 5.

In some embodiments, the first tile size may be configured to convey a first magnitude of the first alphanumeric value of the first characteristic, and the second tile size may be configured to convey a second magnitude of the first alphanumeric value of the first characteristic, the second magnitude being greater than the first magnitude. As used herein, the magnitude of a value (e.g., first alphanumeric value) refers to the extent or quantity of that value. In the present context, the magnitude representing the first alphanumerical numerical value or a quantity associated with the first alphanumeric value. For example, if the first characteristic corresponds to a deal size, the magnitude would be the actual deal size amount. A first magnitude could therefore represent a smaller deal value, while a second, greater magnitude would represent a larger deal. The differently tile sizes visually represent these varying magnitudes, making it easy to see which values are larger or smaller at a glance. Depending on the particular implementation, a tile size may or may not be directly proportional to a value. For example, if one value is double that of another, the area of one tile may be double the area of another. Alternatively, one tile may simply be larger than another without direct proportionality. In some cases, the magnitude may be related to a quantity that is inversely proportional to the first alphanumeric value or to the absolute value of the first alphanumerical value. For example, if items correspond to transactions, involving transaction amounts as the first characteristic, a first item with a negative first alphanumeric value that is smaller (i.e., more negative) than a first alphanumeric value of a second item but larger in absolute value, may be represented by a tile larger in size than the tile representing the second item. This is because the magnitude, in this case, is determined by the absolute value of the transaction amounts. Thus, despite the first item's alphanumeric value being more negative, its greater absolute value results in a larger tile size to visually indicate its higher magnitude. This approach allows users to easily identify items with significant magnitudes, regardless of whether the values are positive or negative, facilitating quicker and more intuitive data analysis.

It is to be appreciated that each tile of the plurality of differently sized tiles may adopt a tile size from a set of different tile sizes that includes more than two different tile sizes. For example, the plurality of differently sized tiles may include some tiles of at least a first tile size, other tiles of at least a second tile size larger than the first tile size, and yet other tiles of at least a third tile size larger than both the first and second tile size.

In some embodiments, the different sizes of the plurality of tiles may be proportional to the first alphanumeric values, or the different sizes may correspond to different ranges for the first alphanumeric values. Proportional refers to a correlation between a value and a size. Corresponding to ranges refers to a group of values corresponding to a single size. For example, the different sizes may have been determined by analyzing the first alphanumeric values of the items associated with the tiles, and each different size may correspond to one first partitioning group. Accordingly, analyzing the first alphanumeric values may involve creating a group for each distinct first alphanumeric value, effectively sorting items based on these values, and determining a tile size proportional to each distinct first alphanumeric value. For example, a tile may possess at least one characteristic dimension (e.g., length, width, radius) proportional to the first alphanumeric value of the associated item, such that its size and/or area is, physically or relatively/directly or indirectly, proportional to the first alphanumeric value. Alternatively analyzing the first alphanumeric values may involve creating groups for a plurality of distinct first alphanumeric values. For instance, in the context of relative alphanumeric values, the first partitioning groups may correspond to different non-overlapping ranges. This analysis process might involve comparing each alphanumeric value to thresholds or boundary values associated with these groupings. For example, if the alphanumeric values correspond to deal sizes, the first partitioning groups could be defined by distinct deal size ranges, such as a group for items with deal sizes strictly below 10 k, a group for items with deal sizes between 10 k and 100 k, and a group for items with deal sizes strictly above 100 k. In some embodiments, the threshold or boundary values for the partitioning groups may be determined during the analysis. After evaluating the span of all alphanumeric values and their statistical distribution, different boundary values may be established to create groups that efficiently represent this distribution, and ultimately different tile sizes. Alternatively, the boundary or threshold values may be specified by a user through a GUI component as part of a customization process. For example, a user interested in greater granularity for items with large deal sizes may adjust the partitioning groups (e.g., default predetermined portioning groups) to emphasize differences among items with large deal sizes by creating multiple groups for detailed visualization, while creating a single, larger group for all items with moderate to low deal sizes.

In some embodiments, the different sizes of the plurality of tiles may enable to conveyance of information about the common objective, and/or conveyance of information on progress toward the common objective. A tile size may convey information if there is some correlation between the tile size and an underlying associated value. As discussed, that correlation may be a proportional correlation or a more general indicator or relativity such as a smaller tile representing a smaller value than a value associated with a larger tile. Through differing sizes, tiles of different sizes (e.g., first tile size and second tile size) may convey varying magnitudes (e.g., first magnitude and second magnitude) representing the relative importance or contribution of each item to the common objective. Tiles adopting the second tile size larger than the first tile size might indicate a more significant impact or a greater proportion of the objective being met, while tiles adopting the first size could signify lesser contributions.

Some disclosed embodiments may involve causing an organizational structure dividing the plurality of tiles into distinct collections based on the second partitioning groups. In this context, collections refer to groups or sets of entities that are gathered or categorized together based on shared characteristics or criteria. In this scenario, collections correspond to sets of tiles that are organized together based on the second partitioning groups. Each collection contains tiles that share a common attribute defined by the second partitioning groups. Accordingly, in some embodiments, the second partitioning groups may be configured to cause the organizational structure. Put differently, the collections correspond to the second partitioning groups, but for tiles associated with the items in these second partitioning groups. These groupings help organize and visually represent the items via tiles aiding in data interpretation and analysis. Determining and causing the organizational structure by dividing the plurality of tiles into distinct collections may involve determining a unique position for each of the plurality of tiles, thereby ensuring that each tile is placed in a specific location within the overall structure, facilitating an organized and coherent visual representation. In some embodiments, each collection may include at least one tile. An example of causing an organizational structure dividing the plurality of tiles is illustrated as step 512 of FIG. 5.

In some embodiments, within the distinct collections, the tiles of the distinct collections may visually differ based on the different sizes. For example, in a sales pipeline CRM solution, one collection might represent deals from a particular second partitioning group associated with a particular deal phase (e.g., "Proposal"). Within this collection, each tile represents an individual deal, and the size of each tile could vary based on the deal's value. Larger tiles (e.g., adopting the second tile size) might indicate higher-value deals, while smaller tiles (e.g., adopting the first tile size) might represent lower-value deals. This visual differentiation helps users quickly identify and focus on the most important items within each collection. It enhances the user's ability to perform comparative analysis and gain insights at a glance, facilitating better understanding and quicker decision-making. By organizing tiles into distinct collections and varying their sizes, the system provides a more intuitive and efficient way to interpret complex data sets.

Some disclosed embodiments may involve causing the distinct collections to be presented on a common display. As used herein, the term "display" refers to any physical device capable of providing a visual presentation of data. Examples of physical devices acting as displays include computer screens, smartphone screens, tablet screens, smartwatch screens, laptop screens, video walls, projectors, head-mounted displays, or virtual/extended reality headsets. Additionally, displays may utilize graphical user interfaces (GUIs) to permit user interaction with data. In many GUIs, a visual presentation of data is often provided using a graphical user interface component known as a window, or a page. In this context, a common display refers to the situation wherein groupings are presented on a single window or page. Any visual presentation of a device or display may be characterized by dimensions. An example of causing the distinct collections to be presented on a common display is illustrated as step 514 of FIG. 5.

FIGS. 6A-6F are exemplary illustrations of organizational structures dividing the plurality of tiles into distinct collections presented on a display, consistent with some of the disclosed embodiments. In these figures, the dimensions of the common display are represented by the dash-dotted line 610. A plurality of differently sized tiles 602 divided into distinct collections are shown, with each tile associated with an item included in the data structure 200 presented in FIG. 2. More specifically, each tile represents a row (or item 202) in the data structure 200, which includes data relating to a particular deal within a sales funnel or sales pipeline of a sales team. The plurality of differently sized tiles 602 includes some tiles of at least a first tile size (small size), other tiles of at least a second tile size larger than the first tile size (medium), and yet some other tiles of at least a third tile size larger than both the first and second tile sizes (large size). The three different tile sizes in these examples correspond to distinct ranges of deal values. Specifically, the small size corresponds to deal values strictly below 10 k, the medium size corresponds to deal values between 10 k and 100 k, and the large size corresponds to deal values strictly above 100 k. Differences in tile size between the first tile size, the second tile size, and the third tile size are the result of an increase in tile area. For example, as illustrated in FIGS. 6A-6F, both the medium and large sizes correspond to scaled-up versions of the small size, maintaining the same shape but with an increased area. Consistent with the disclosed embodiments, the different sizes may have been determined by analyzing the first alphanumeric values of the items associated with the tiles in these examples, the deal size value and sorting them in first partitioning groups.

As illustrated in FIGS. 6A-6F, the plurality of differently sized tiles 602 are divided into four distinct collections based on four second partitioning groups corresponding to distinct deal phases in the sales funnel (second alphanumeric value), namely "Won", "Negotiation", "Proposal", and "Evaluation".

Figure 6A:
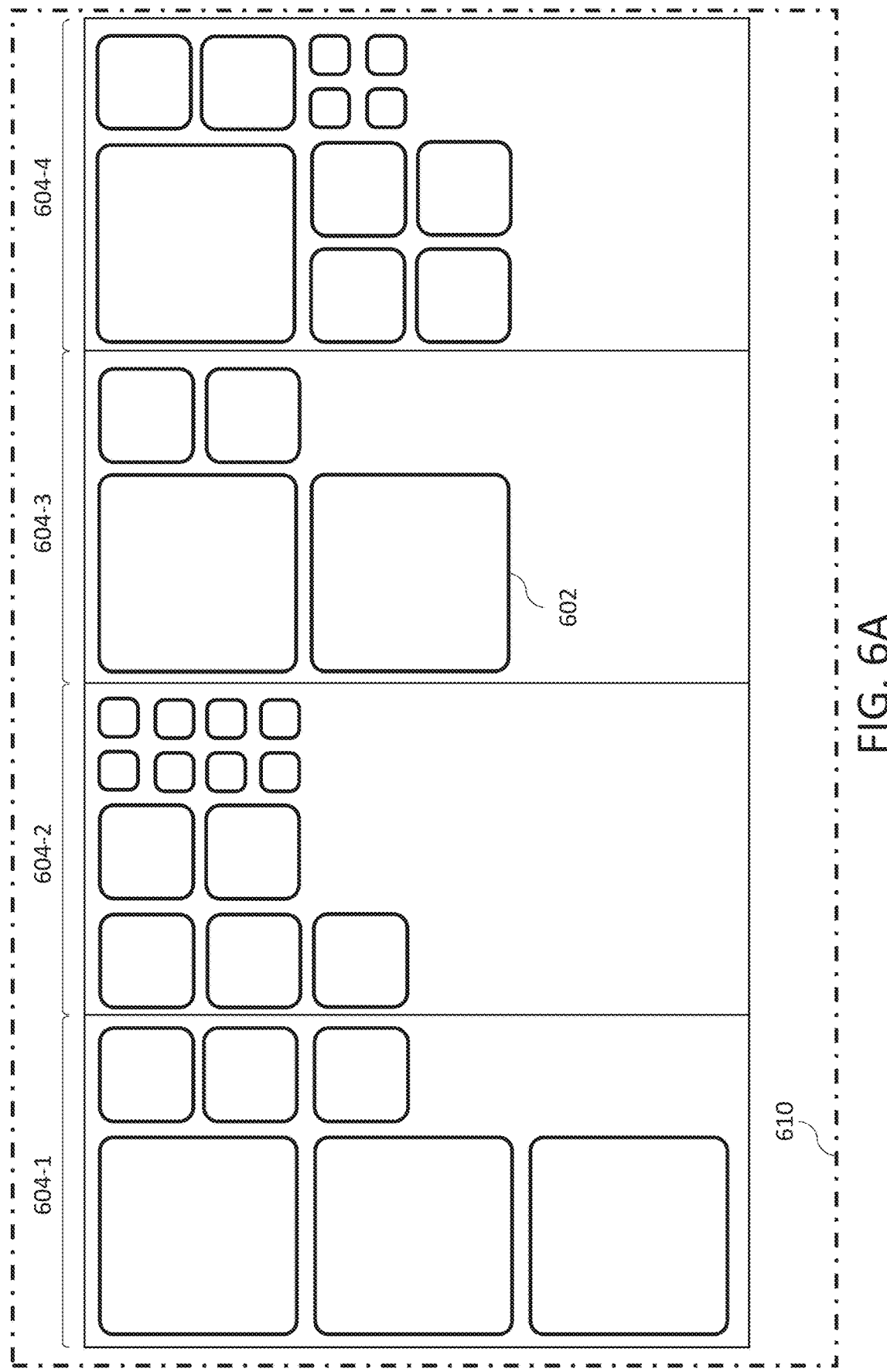
FIGS. 6A-6F are exemplary illustrations of organizational structures dividing the plurality of tiles into distinct collections presented on a display, consistent with some of the disclosed embodiments.
Figure 6B:
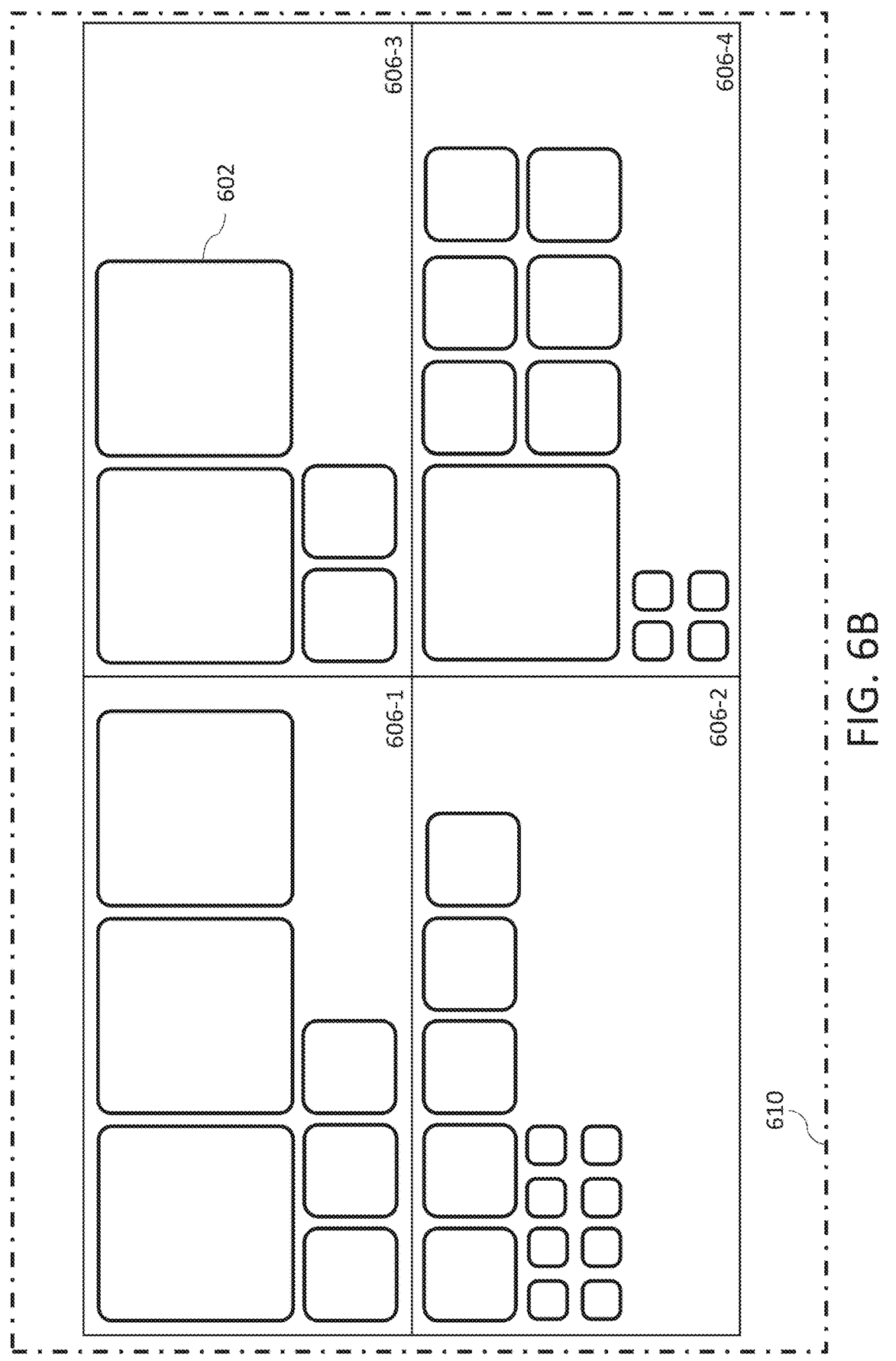
Figure 6C:
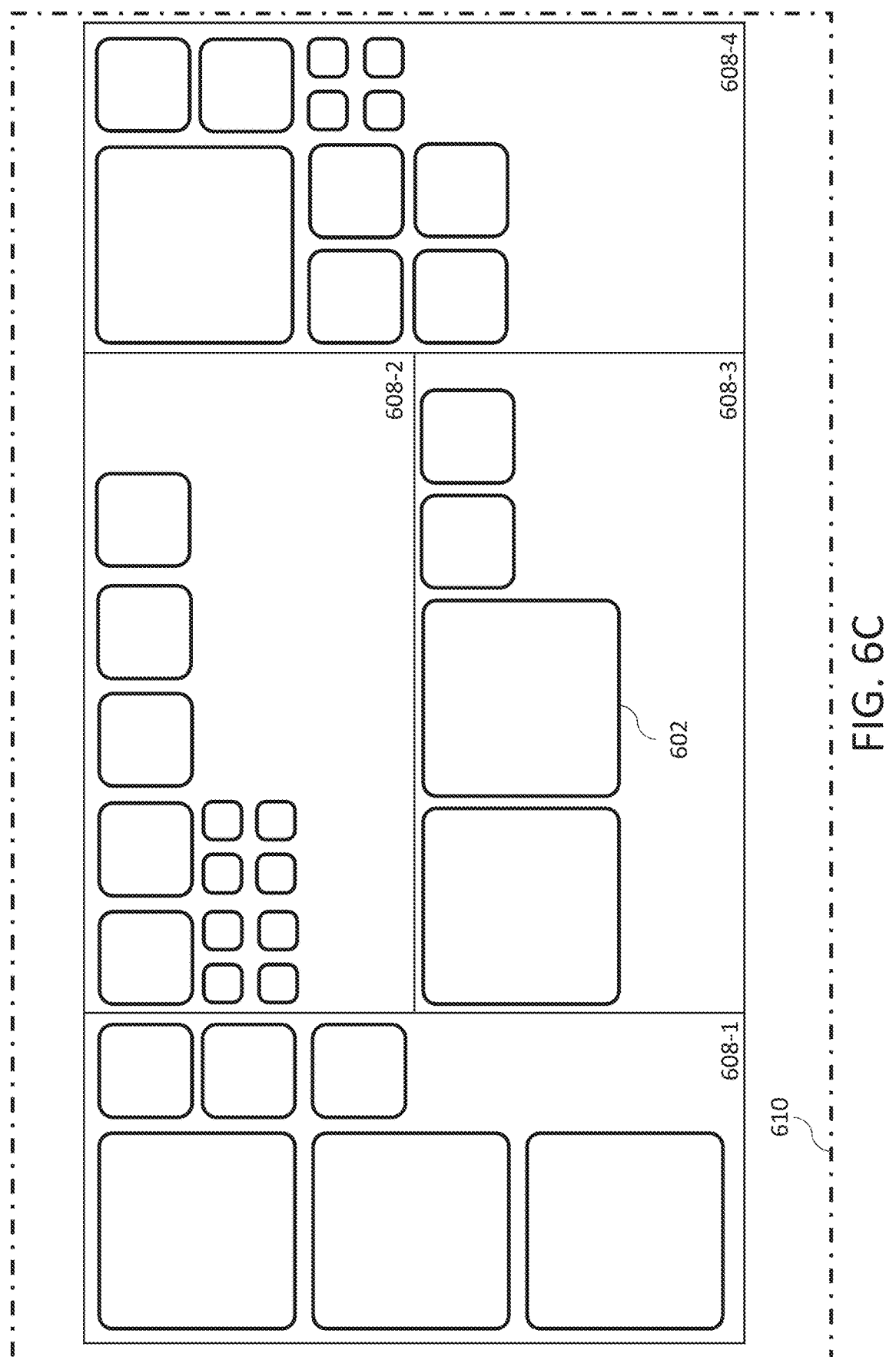
Figure 6D:
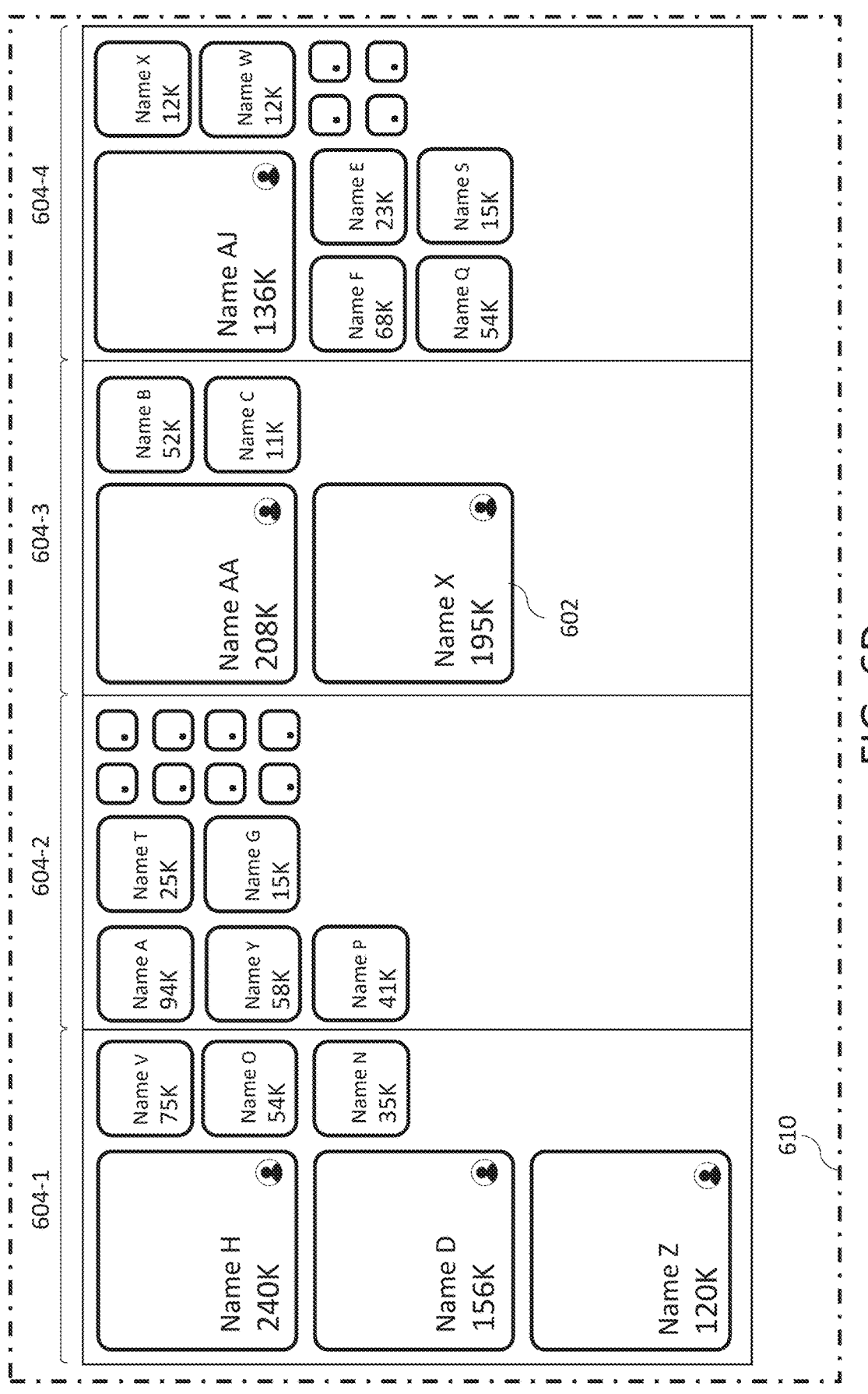

It is to be appreciated that each of the plurality of tiles may adopt one or more additional visual characteristics that are not configured to express an alphanumeric value in a non-alphanumeric manner. For example, in any of FIGS. 6A-6E, each of the plurality of tiles 602 adopts a white color and a shape, specifically a square shape with rounded corners. However, this particular shape and white color do not express an alphanumeric value. The same holds true for the color, width, line type, and thickness of the borders of tiles 602. In any of FIGS. 6A to 6E, these visual characteristics are not configured to express alphanumeric values about associated items. Nonetheless, these additional visual characteristics could be utilized to express alphanumeric values if needed, offering further customization and flexibility in the visual representation of the data. For example, as shown in FIG. 6F and detailed in subsequent sections, the color of a tile may be configured to express an alphanumeric value. Additionally, any of these additional visual characteristics may still convey information, for example, all tiles sharing a same shape may correspond to items taken from a same data structure and therefore indicates that such items are comparable. Furthermore, it is to be appreciated, as discussed earlier, that tiles may adopt any sort of shape, such as triangles, rectangles, circles, ovals, hexagons, or any other polygons. Although FIGS. 6A-6F illustrate tiles as 2D graphical elements, any of the disclosed embodiments may be extended to tiles as 3D graphical elements. For example, tiles could be rendered as cubes, spheres, or any other 3D shapes.

In some embodiments, the distinct collections may be visually organized and sorted in a columnar form. A columnar form refers to a structured organization where information is arranged in distinct columns. For example, a Kanban layout is considered a columnar form. Within each column, tiles may be positioned one above the other and/or side by side, meaning two or more different tiles can share a same horizontal alignment. Organizing the distinct collections in a columnar form allows for a clear and structured presentation of data. Each column represents a different category or grouping (second partitioning group), such as a distinct stage in a sales pipeline. Within each column, the tiles may be sorted vertically and/or horizontally, facilitating easy comparison of items within the same collection and across different collections. The size of the tiles within each column may vary to visually express an item's characteristics (e.g., deal value). This organized columnar arrangement helps users quickly scan and compare data within each category, providing a clear visual representation of how different segments of data relate to each other. The columnar layout also aids in maintaining an orderly and user-friendly interface, making it easier for users to navigate and interpret the information presented. For example, referring to FIG. 6A, the plurality of differently sized tiles 602 are organized in four distinct collections, each corresponding to a distinct column 604-1 through 604-4 (embodied by black continuous lines), themselves each corresponding to a distinct second partitioning group (i.e., deal phase in a sales pipeline). While columns 604-1 to 604-4 are represented as having identical column widths, it should be appreciated that the different columns in the columnar organization may vary in width, with some columns being wider than others.

Furthermore, some disclosed embodiments may further involve identifying the set of different sizes is based on the first alphanumerical values and at least one of: a display dimension; a total number of tiles; or widths associated with columns of the columnar form. As mentioned above, the first alphanumeric values representing the items' first characteristic, such as deal values may influence tile size proportionally and or the number of different tile sizes. Display dimensions refer to the overall size and resolution of a screen or user device, affecting how tiles may fit within the available space. The total number of tiles displayed simultaneously may also impact their size, with more tiles requiring smaller sizes to fit within the display area. Additionally, the widths of columns in the columnar form constrain the horizontal space available for each tile, influencing their dimensions. By considering these factors individually, in combination, or collectively, tile sizes may be dynamically adjusted to ensure an optimal and clear visual representation of the data, making it easy to read and interpret while fitting appropriately within the display and columnar structure. For example, referring to FIG. 6A, the different sizes (large, medium, and small) of the plurality of tiles 602 may be determined based on one or more dimensions of display 610, the total number of differently sized tiles 602, and/or the widths associated with columns 604-1 to 604-4.

Additionally or alternatively, some disclosed embodiments may further involve determining for each column of the columnar form a width based on at least one of: tiles included therein; tiles included in at least one other column; or a display dimension. The width of a column may be adjusted according to the number and size of the tiles it contains, ensuring adequate space without overcrowding. Furthermore, the widths of other columns may influence the width of a specific column to maintain a balanced and visually appealing layout, ensuring consistency and readability across the entire display. Finally, the overall size and resolution of the display area may dictate how wide each column can be, ensuring all columns fit within the screen while keeping the tiles clear and legible. By considering these factors individually, in combination or collectively, each column may be optimally sized enhancing the clarity and usability of the columnar layout. For example, referring to FIG. 4A, the width of any of columns 604-1 to 604-4 may be determined based on the number and different sizes of the tiles 602 it contains, the number and different sizes of the tiles 602 in at least one other column, and/or one or more dimensions of display 610.

Moreover, in some embodiments, determining the width of each column in the columnar form may involve setting a common width across all columns or using different widths for each column. A common column width can provide a visually appealing and balanced presentation of data. In contrast, differently sized columns can emphasize the most critical information, making it easier for users to focus on and interpret the most important data. Larger columns can accommodate more significant items, drawing attention to key metrics or high-priority tasks. Furthermore, adjusting column widths based on the content they contain allows for a more efficient use of the available display area.

In some embodiments, the width of each column of the columnar form may be predetermined. Predetermining column widths may simplify the design process and ensure a consistent, organized appearance across different displays and data sets. This approach may be beneficial in situations where uniformity and predictability are useful, such as in standardized reporting, dashboards or widgets that need to adhere to specific design guidelines. Predetermined column widths may be employed to emphasize particular categories or metrics by allocating more space to columns containing important information, thereby ensuring that key data or tiles are highlighted and easily accessible, improving the user's ability to interpret and analyze important information quickly. Conversely, less important or supplementary data may be placed in narrower columns, conserving display space while maintaining clarity. Furthermore, in cases where the display area has fixed dimensions, such as on specific devices or screens, predetermined column widths may ensure that all columns fit within the available space without requiring dynamic adjustments. This may prevent issues related to overcrowding or misalignment, providing a cleaner and more professional presentation. In some embodiments, a column width may be predetermined to represent an empty group, with or without placeholder tiles. As mentioned earlier, placeholder tiles refer to tiles adopting visual characteristics not configured to convey information.

Having an empty column with a predetermined width may be useful in scenarios where certain item characteristics are not applicable or have no data available. By assigning a fixed width to these columns, the layout remains visually balanced and structured, allowing users to easily recognize the absence of data and maintain an understanding of the overall data organization.

In some embodiments, the distinct collections may be visually organized and sorted in a non-columnar form. A non-columnar form refers to an arrangement where items are not aligned vertically in columns. Instead, they may be organized horizontally in rows, arranged in a grid, or presented in a different layout altogether. In this context, organizing the distinct collections in a non-columnar form may offer flexibility in how the data is displayed. Each collection may still be visually separated and organized, but the arrangement may vary to better suit the specific needs of the user or the nature of the data. This alternative layout could enhance readability, facilitate comparisons, or provide a more visually engaging presentation of the information. For example, referring to FIG. 6B, the plurality of differently sized tiles 602 are organized in four distinct collections, each corresponding to a distinct quadrant 606-1 through 606-4 (embodied by black continuous lines), themselves each corresponding to a distinct second partitioning group (i.e., deal phase in a sales pipeline). While quadrant 606-1 to 606-4 are represented as having identical column widths and height, it should be appreciated that the different quadrant in such a non-columnar organization may vary in width and height. For example quadrants 606-1 and 606-3 may have a smaller height than quadrants 606-2 and 606-4, and quadrants 606-1 and 606-2 may have a smaller width than quadrants 606-3 and 606-4. In another example, referring to FIG. 63, the plurality of differently sized tiles 602 are organized in four distinct collections, each corresponding to a distinct sections 608-1 through 608-4 (a mixture of column and quadrant, embodied by black continuous lines), themselves each corresponding to a distinct second partitioning group (i.e., deal phase in a sales pipeline).

In some embodiments, the distinct collection may be presented on the common display in a non-overlapping manner. In other words, none of the distinct collections overlap with one another, ensuring that each tile is clearly visible and distinct within its respective collection. This arrangement may facilitate a clearer and more organized visual representation of the data. For example, referring to FIGS. 6A-6C, all of the collections 604-1 through 604-4, 606-1 through 606-4, 608-1 through 608-4 are presented without any overlap. The non-overlapping arrangement ensures that each deal phase is visually segregated, making it easier to interpret the data at a glance. By ensuring that these groupings do not overlap, the display remains organized and each grouping is easily distinguishable, enhancing the user's ability to analyze and interpret the underlying deal values efficiently.

In some embodiments, visualizing progress toward the common objective may include determining an order in which the distinct collections are to be presented on the common display. In this context, determining an order refers to ascertaining the organization of the distinct collections. In some embodiments, determining an order involves establishing a unique position for each of the collections on the display. This may involve deciding how the different collections will be arranged or sequenced visually to convey progress toward the common objective effectively. For instance, referring to FIG. 6A, if the common objective corresponds to reaching a sales target, in order to visualize the progression of sales deals through various stages of the sales pipeline, determining the order of the collections would involve deciding the sequence in which each stage appears. In FIG. 6A, each distinct collection (604-1 through 604-4) represents a deal phase in the sales funnel and is positioned on the common display 610 in a specific sequence, from left to right, to reflect the logical flow of deal progression.

Some disclosed embodiments may further involve arranging the plurality of tiles within the distinct collections based on the different sizes of the plurality of tiles. For example, in FIG. 6A, the plurality of tiles 602 is arranged into distinct collections (columns) 604-1 to 604-4 based second partitioning group (deal phase), and within each column 604-1 to 604-4, the plurality of tiles is further arranged based on tile size from top to bottom and left to right. This arrangement may enable visualization of progress toward the common objective of reaching a sales target and offers an additional perspective to the user to understand the number of deals, their sizes, and their degree of progress through the sales funnel required to reach the sales target.

In some embodiments, once presented, each of the plurality of tiles may represent a graphical user interface (GUI) component that a user can engage with. For instance, after being displayed, a user may click on a specific tile or drag it across different collections. These various interactions may allow a user to directly engage with the underlying item and data structure through the tile. For example, clicking on a tile may trigger a pop-up window to appear on the common display, containing editable fields corresponding to the item characteristics and associated values. In another scenario, dragging a tile from one collection to another may update the second alphanumeric value of the corresponding from the second alphanumeric value corresponding to the collection to the second alphanumeric value corresponding to the other collection.

In some embodiments, each of the plurality of tiles may include at least one alphanumeric field configured to present at least one alphanumeric value of an associated item. For example, in some embodiments, each tile may include an alphanumeric field configured to present the first alphanumeric value corresponding to the first characteristic of an associated item. Thus, in addition to being visually expressed via the tile size adopted by the tile, the first alphanumeric value will also be conveyed through the alphanumeric field on the tile. For instance, FIG. 6D illustrates an exemplary arrangement of a plurality of tiles similar to the one presented in FIG. 6A, but where each tile includes at least one alphanumeric field presenting the first alphanumeric value of the associated item, such as the deal value. Additionally, some disclosed embodiments may further involve presenting on each of the plurality of tiles the first alphanumeric value of the associated item in the at least one alphanumerical field as a function of the size of the tile. For example, in FIG. 6D, tiles adopting a large size have a sufficiently large area to display the deal value with a relatively large font size, while tiles adopting a medium size present the deal value with a smaller font size. Tiles adopting a small size may be too small to present the deal value in a reasonable font size and, therefore, present a dot instead of the first alphanumeric value, inviting the user to interact with the tile to gather the deal value. Additionally, in some embodiments, the alphanumerical filed of each tile may be configured to present in addition to the first alphanumerical value, an alphanumerical value of an associated item that is not expressed by a visual characteristic of the tile. For example, referring to FIG. 6D, tiles adopting a large size and tiles adopting a medium size further present in addition to the deal value (first alphanumerical value), the client name, i.e., a value corresponding to a characteristic of the associated items that is not expressed by visual characteristics of these tiles. In some embodiments, each of the plurality of tiles may include at least one pictorial field configured to present at least one pictorial element corresponding to a value of a characteristic of an associated item. For example, referring to FIG. 6D, tiles adopting a large size present a profile picture representing the one or more salespersons corresponding to the "Salesperson(s)" characteristic of the associated items.

Some disclosed embodiments may further involve based on the second partitioning, identifying a set of visual characteristics for non-alphanumerically expressing the second alphanumeric values. Visual characteristics refer to any attributes or visual cues used to represent objects visually. These characteristics may be assigned to graphical elements and may describe the attributes of an object. Once an object is associated with a visual characteristic, a user can interpret it as representing specific data. For example, in some embodiments, the set of visual characteristics may be chosen from a group consisting of size, color, texture, transparency, shadowing, or shape. In some embodiments, a set of visual characteristics may include a plurality of distinct combinations of visual characteristics of different natures. For example, a set of visual characteristics may encompass distinct combinations of colors, transparency, and shadowing. In this context, the set of visual characteristics is used to visually express the second alphanumerical values. In some embodiments, finding a set of visual characteristics may involve finding a suitable set of visual characteristics to convey information regarding differences between the second alphanumeric values of some of the items. Additionally, or alternatively, in some embodiment, the set of visual characteristics may provide insights into the common objective and/or to covey information on progress toward the common objective.

In some embodiments, identifying the set of visual characteristics may involve selecting a subset of visual characteristics from a larger predetermined set of visual characteristics based on the second partitioning. For example, by default, ten different colors may be predetermined for non-alphanumerically expressing the second alphanumeric values. If the number of second partitioning groups is equal to four, identifying the set of visual characteristics may correspond to selecting four distinct color from the predetermined ten different color. Alternatively, in some embodiments, identifying the set of visual characteristics may start from scratch, allowing for a more customized approach. This process involves creating visual attributes specifically tailored to effectively represent the second partitioning groups. Various factors such as the nature of the second alphanumeric values, clarity, accessibility, and relevance to the data being represented are taken into account. Such a detailed and customized analysis may be implemented using an AI system tailored for visual representation generation. This AI may analyze the data (second alphanumerical values and/or second partitioning groups), consider best practices in design, and generate visual characteristics that meet the specified criteria. The AI may learn from vast datasets and user interactions, continually improving its ability to create effective visual representations. This approach may ensure a high level of customization and precision in the visualizations produced.

In some embodiments, each distinct collection may include an associated label including a graphical element adopting a visual characteristic from the set of visual characteristics. Additionally, in some embodiments, each label may include an alphanumerical field configured to present a second alphanumerical value associated with the second partitioning group corresponding to the distinct collection. A label in this context refers to a tag or identifier that provides information (in an alphanumerical manner and/or non-alphanumerical/visual manner) about a specific collection of tiles. It may include at least one of graphical elements or alphanumerical characters to help users easily identify and understand the category or characteristic represented by the collection. For example, in a sales pipeline CRM solution, a label for a collection of tiles representing deals from a particular deal phase might include the deal phase name along with a graphical icon that visually distinguishes it. The visual characteristics of the graphical element of the label, such as color, shape, or iconography, may be chosen from the predefined set of visual characteristics to ensure consistency and enhance the user's ability to quickly recognize and differentiate between collections. By including such labels, clear and immediate context may be provided for each collection, aiding in navigation and interpretation of the data. Labels with graphical elements and alphanumerical characters or fields improve the visual appeal and usability of the interface, making it easier for users to find and focus on the information they need.

Figure 6E:
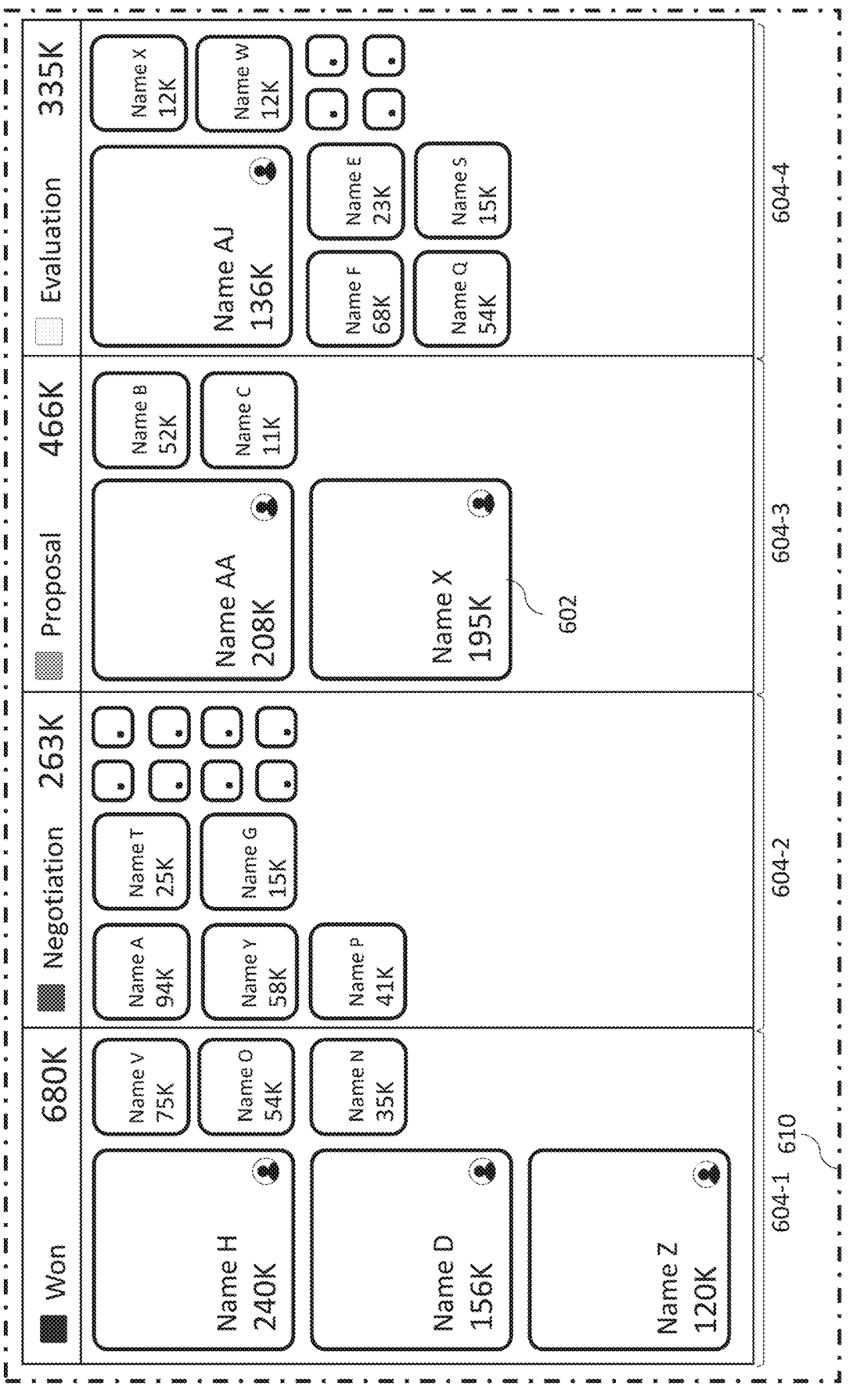
Figure 6F:
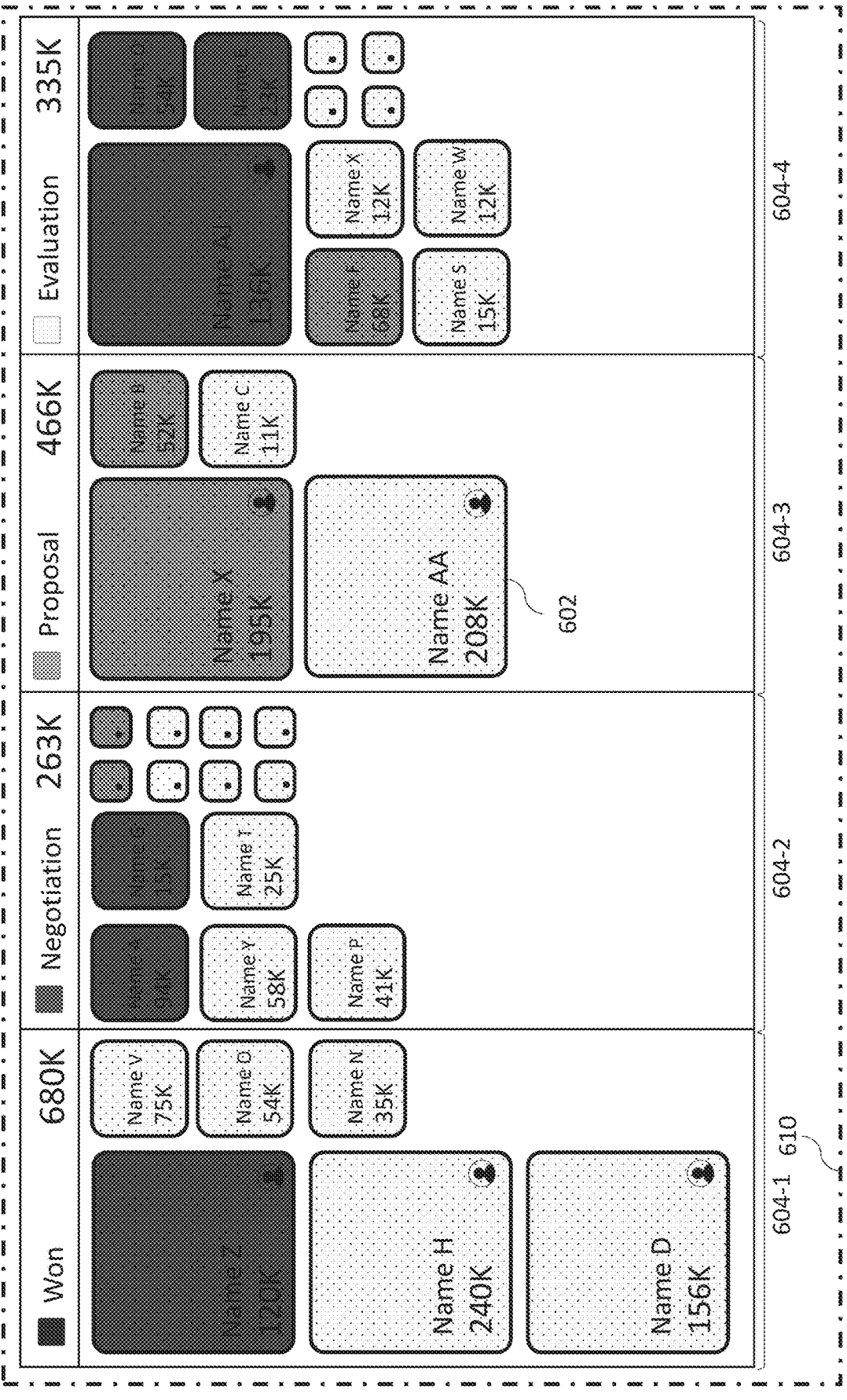

For instance, FIG. 6E illustrates an exemplary arrangement of a plurality of tiles similar to the one presented in FIG. 6D, but where each distinct collection 604-1 through 604-4 includes an associated label located at the top of each column and delineated by black continuous lines. Each of these labels includes a graphical element (a square) adopting a visual characteristic (a color) from a set of different visual characteristics (different shades of grey) determined based on the second partitioning groups. In addition, each of these labels further include an alphanumerical field presenting the second alphanumeric value associated to the second partitioning groups and corresponding collections, i.e., in this context the name of a deal phase ("Won", "Negotiation", "Proposal", "Evaluation").

Some disclosed embodiments may further involve for each distinct collection, calculating a sum of the first alphanumerical values of items associated with tiles included in the associated distinct collection. In other words, the first alphanumeric values representing by the first characteristic of each item within each distinct collection may be added up. In a CRM solution, tiles might represent individual deals or transactions, each with an associated first alphanumeric value such as a deal size. If a collection represents deals from a particular deal phase, the deal sizes of all the tiles within that collection may be summed. This calculation provides a cumulative value for each distinct collection, offering insights into the total value or magnitude of items within each distinct collections. By doing so, users may quickly see the aggregate impact or significance of items in each collection. For instance, a sales manager might use this information to understand the total sales volume from different deal phase or the total potential revenue at various stages of the sales pipeline.

Additionally, in some embodiments, each label may include an additional alphanumerical field configured to present the sum of the first alphanumerical values of items associated with tiles included in the associated distinct collection. In other words, this sum man be displayed prominently, aiding in comparison and decision-making processes by highlighting which collections hold the greatest total value. For example, referring to FIG. 6E, each label displayed on top of columns 604-1 to 604-4 includes an additional field presenting the sum of the first alphanumeric values, which in this example are the deal sizes of items associated with tiles 602 included in the respective columns 604-1 to 604-4.

In some embodiments, each of the plurality of items may include a third characteristic having a third alphanumeric value. A third characteristic may be chosen from the group from which the first and second characteristics are described above. For example, referring to FIG. 2 representing in the context of a CRM solution a data structure 200 corresponding to a plurality of deals of a sales team, each item 202 in addition to a first characteristic corresponding to deal size and a second characteristic corresponding to a deal phase in the sales funnel may further include a third characteristic corresponding to e.g., a level of risk. In that situation, some disclosed embodiments may involve analyzing third alphanumeric values of the at least some of the plurality of items to segregate the at least some of the plurality of items in a third partitioning to thereby identify third partitioning groups. Akin to the analysis of the first and second alphanumeric values, the analysis of the third alphanumeric values may represent a third method of sorting the at least some of the plurality of items (i.e., a third partitioning). In some embodiments, analyzing the third alphanumeric values may involve creating a group for each distinct third alphanumeric value or creating groups for a plurality of distinct third alphanumeric values. In some embodiments, each of the third partitioning groups may include at least one item, with each item being uniquely attributed to a single third partitioning group. In other words, items cannot simultaneously belong to two distinct third partitioning groups. Additionally, in some embodiments, the number of third partitioning groups may differ from the number of first partitioning groups and/or the number of second partitioning groups. For example, after analyzing the first, second, and third alphanumeric values, three distinct first partitioning groups, four distinct second partitioning groups, and three distinct third partitioning group may be determined.

Additionally, some disclosed embodiments may involve, based on the third partitioning, identifying an additional set of visual characteristics to be applied to the plurality of tiles, for non-alphanumerically expressing the third alphanumeric value. In some embodiments, the additional set of visual characteristics may be chosen from a group consisting of size, color, texture, transparency, shadowing, or shape. For example, in some embodiments, the additional set of visual characteristics may be a set of different colors. In this context, the additional set of visual characteristics may be used to visually express the third alphanumerical values. In some embodiments, finding an additional set of visual characteristics may involve finding a suitable set of visual characteristics to convey information regarding differences between the third alphanumeric values of some of the items. Additionally, or alternatively, in some embodiment, the additional set of visual characteristics may provide insights into the common objective and/or to covey information on progress toward the common objective. As mentioned earlier, identifying an additional set of characteristics may involve selecting visual characteristics from a larger predetermined set based on the third partitioning. For example, choosing specific colors or textures from a plurality of colors or textures. Alternatively, a customized approach may be used, creating tailored visual characteristics by considering factors like clarity and relevance. This detailed process may be implemented using an AI system that analyzes the data (third alphanumerical values and/or third partitioning groups) and generates effective visual characteristics, ensuring high customization and precision in the visualizations.

In some embodiments the additional set of visual characteristics determined based on the third partitioning groups may be different from the set of visual characteristics determined based on the second partitioning groups. In this context, differing sets of visual characteristics may entail differences in the nature of the visual characteristics. Alternatively, differing sets of visual characteristics may refer to sets consisting of attributes of a same nature but that are mutually exclusive. For example, in some embodiments, the set of visual characteristics may correspond to different colors chosen from a first color palette, and the additional set of visual characteristics may correspond to different colors chosen from a second color palette, distinct from the first color palette.

Consistent with some of the disclosed embodiments the additional set of visual characteristics may be applied to the plurality of tiles. In addition to adopting a first visual characteristics, i.e., a tile size, each tile may also adopt a second visual characteristic from the additional set of visual characteristics. In other words, each tile may express two distinct alphanumeric values in a non-alphanumeric manner. For example, while the first visual characteristic might represent deal value through size, the second visual characteristic could represent deal risk through a color. This dual-dimensional visual encoding allows users to quickly interpret multiple aspects of the data associated with each tile.

Some disclosed embodiments may further involve, arranging the plurality of tiles within the distinct collections based on the set of different sizes and the additional set of visual characteristics. In other words, the plurality of tiles once divided into multiple distinct collections may be further arranged within the collection as a function of their sizes and as a function the set of additional visual characteristics (e.g., set of different colors). This flexible approach to arranging the tiles allows for a highly customizable and informative visual representation, enabling users to discern different layers of information based on how the tiles are grouped and arranged within those groupings.

Some disclosed embodiments may further involve enabling toggling between a first presentation wherein each of the plurality of tiles adopts a single visual characteristic namely a tile size and a second presentation wherein each of the plurality of tiles adopts two visual characteristics, a tile size and one visual characteristics form the additional set of visual characteristics. Enabling toggling between these two presentations may involve providing a graphical user interface (GUI) component, such as a button, switch, or menu option, that allows the user to switch between the two modes. This functionality allows users to view the data in different ways, either focusing on one key characteristics in a simplified view or on two characteristics in a more detailed and comprehensive view. For example, in the first presentation mode, a display may present tiles differentiated by size, representing deal value and arranged into distinct collections including a label with a graphical element adopting a visual characteristics from the set of visual characteristics. By toggling to the second presentation mode, the same tiles might also include a visual characteristics from the additional set of visual characteristics, representing an additional layer of information such as a level of risk. The GUI component makes it easy for users to switch between these views, enhancing their ability to analyze and interpret the data effectively.

It is to be appreciated that the aforementioned embodiments, which involve the adoption for the tiles of a second visual characteristic allowing for the visual expression of a third alphanumeric value and effectively adding a third dimension to the data representation (first dimension corresponding to tile size, second dimension corresponding to distinct collections, and third dimension corresponding to the second tile visual characteristics e.g., color) may be generalized to tiles adopting any number of visual characteristics or distinct combination of visual characteristics, such as three, four, five, six, or more. Each additional visual characteristic or distinct combination of visual characteristics would enable the expression of another alphanumeric value corresponding to a distinct characteristic of an associated item, providing an even richer and more detailed visual representation.

FIG. 6F illustrates an exemplary arrangement of a plurality of tiles 602 divided into collections/column 604-1 to 604-4 based on the second partitioning group and further arranged within those collection based on the tile sizes. This arrangement is similar to the one presented in FIG. 6E, but with each of the plurality of tiles 402 also adopting a second visual characteristic, i.e., a combination of a dotted patterns and a shade of grey chosen from an additional set of visual characteristics different from the set of visual characteristics used for the graphical element of the label (four different shades of grey). Consistent with the disclosed embodiments, the additional set of visual characteristics is determined by analyzing the third alphanumeric values of the items associated with the tiles—in this example, the level of risk associated with each deal, and sorting them in third partitioning groups. In this example, three third partitioning groups have been determined, a first third partitioning group corresponding to deal having a "low" risk level, and second third partitioning group having a "moderate" risk level, and third partitioning group having a "high" risk level. Accordingly, in FIG. 6F, the first visual characteristic of a tile, its size, expresses the deal value in a non-alphanumeric manner, the second visual characteristic of a tile, its combination of a dotted patterns and color, expresses the level of risk associated with the deal in a non-alphanumeric manner. This multi-dimensional visual representation allows users to quickly assess not only the value via the tile size and phase via the distinct collection of each deal but also the risk level, providing a more comprehensive understanding of the sales data at a glance.

As mentioned earlier, the display presented in FIG. 6F may be generated in response to a toggling signal initiated by a user. For example, a user may click on a GUI component (e.g., a button), effectively switching from the presentation illustrated in FIG. 6E to the presentation illustrated in FIG. 6F.

Some disclosed embodiments may further involve in response to receiving a switching signal, cause the organizational structure of the plurality of tiles into the distinct collections to be switched to an alternative organizational structure. A switching signal refers to a mechanism used to notify a process or a thread that a specific event has occurred. Thus, an event may initiate a specific action or process within a system, software component, or application. A switching signal may stem from a user-initiated action. For example, in some embodiments, receiving a switching signal may include at least one of receiving a scroll signal resulting from a motion of a user on a display (e.g., a display wherein the data structure would be graphically represented), loading a certain URL, or receiving a switching signal via a Graphical User Interface (GUI) component (e.g., a button, a check box etc.) present on the display. Once the switching signal is received, the alternative organization structure may be presented. In some embodiments the alternative organizational structure may be obtained by arranging the plurality of tiles in groupings based on at least one of the set of different sizes or the additional set of visual characteristics. Details of such an arrangement of the plurality of tiles in groupings based on at least one of a first set of visual characteristics (e.g., a set of different sizes determined based on the first partitioning groups) or a second set of visual characteristics (e.g., the additional set of visual characteristics determined based on the third partitioning groups) are those described above with reference to FIGS. 4A-4G which will be not repeated herein. An advantage of this switching feature for the user is enhanced flexibility and adaptability in data visualization. By allowing the organizational structure to be switched, users can view the same data in different formats, which can provide new insights and perspectives. For example, a user might switch from a columnar organization to an arrangement based on groupings presented in a gapless manner. This capability enables users to tailor the presentation of information to their specific needs, making it easier to analyze complex data, identify patterns, and make informed decisions.

Some disclosed embodiments may further involve causing a table to be presented on the common display, wherein the table includes rows corresponding to the at least some of the plurality of items and at least two columns corresponding to the first characteristic and the second characteristic included in each of the at least some of the plurality of items. For instance, if each tile represents a sales deal, the rows in the table would represent individual deals. The columns would then display specific details about each deal: one column for the deal value (the first characteristic) and another for the deal phase in the sales funnel (the second characteristic). This table allows users to see a more detailed and structured view of the same data represented visually by the tiles, facilitating easier comparison and analysis. By integrating this table with the visual tile arrangement, users are provided with multiple perspectives on the data, enhancing their ability to understand and interpret the information effectively. The table may serve as a detailed reference point, while the visual tiles provide an at-a-glance overview of the data's distribution and relationships.

In some embodiments, the table, once presented, may act as an interactive graphical user interface (GUI) component that users can engage with. For instance, after the table is displayed, a user can click on a specific row to select the associated item. This action may trigger a pop-up window on the common display, containing editable fields corresponding to the item's characteristics and associated values. Additionally, in some embodiments the rows in the table may be sorted in a manner consistent with the distinct collections dividing the plurality of tiles. For example, tiles displayed at the leftmost collection of the organizational structure may be considered the first tiles within the organizational structure, and their associated item may be displayed in the first rows of the table. This consistent sorting ensures that the visual and tabular representations of the data are aligned, making it easier for users to cross-reference and interact with the information.

In some embodiments, the table may include a third column corresponding to graphical representations of tiles associated with the at least some of the plurality of items. An example of such table is illustrated as table 430 in FIG. 4H.

Consistent with the disclosed embodiments such a table may be displayed below the distinct collections shown in any of FIGS. 6A-6F.

Once displayed, any collections of tiles arranged in a form (e.g., columnar form), as discussed in the present disclosure (e.g., as shown in FIGS. 6A-6F), may constitute a widget. As mentioned earlier, widgets can provide users with deep and meaningful insights into their operations and enable the visualization of alphanumeric data in a non-alphanumeric manner. In some embodiments, the distinct collections of tiles (represent a widget), may be defined by boundaries. As used herein, "boundaries" refers to the defined edges or limits that separate and distinguish one element from another. Accordingly, widget boundaries may separate the distinct collections of tiles from other displayed elements (e.g., on a user device) such as a table, ensuring a clear and organized presentation of data. Boundaries may be visible (e.g., a frame or a line outlining the widget) or invisible. For example, in any of FIGS. 6A-6F the distinct collections of tiles are delineated by black continuous lines. In some embodiments, widget boundaries may fit within at least one dimension of the display and include a representation (e.g., a tile) for each item in the data structure for which relative insight is sought. For example, as shown in FIGS. 6A-6F, the distinct collections of tiles fit the width and height of display 610, and the distinct collections of tiles include a tile 602 for each of the items included in data structure 200. Displaying all the items visually on the display may enable users to gain insight into the common objective.

Alternatively, in some disclosed embodiments, the dimensions of a display, particularly on mobile devices like smartphones or tablets, may be limited. Consequently, if the cumulative size of the distinct collections or the table exceeds at least one dimension of the common display, the operations may involve augmenting the display with a scroll bar. This scroll bar facilitates scrolling through the presented collections or table on the common display, ensuring that all content remains accessible within the confines of the display.

Project management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, these platforms may correspond to a Software-as-a-Service (SaaS) platform. The following disclosure describes operations for arranging discrete graphical elements, wherein each graphical elements conveys alphanumeric data in a non-alphanumeric manner. FIGS. 7 through 19 provide exemplary embodiments of the disclosed operations for arranging discrete graphical elements.

Some disclosed embodiments involve arranging discrete graphical elements having a plurality of graphical characteristics conveying representations of alphanumeric data in a non-alphanumeric manner. Arranging refers to organizing objects in a specific order. Here, the object may be a discrete graphical element.

Discrete graphical elements refer to any visual component that may be presented for display. For example, each discrete graphical element visually convey information that may differ in some way from another discrete graphical element. The discrete graphical elements may be presented to enable visual comparison between them, as discussed and exemplified elsewhere in this disclosure. A discrete graphical element may be a tile or any other object that may visually express data via visible graphical characteristics. A tile may have any suitable shape such as rectangular, square, triangular, round, pentagonal, hexagonal or with any other regular or irregular contour, as discussed elsewhere in this disclosure.

Graphical characteristics refer to one or more visual features that define each discrete graphical element. Such graphical characteristics may include, for example, shapes, size, lines, colors, textures, images, icons, and symbols, or any other visible attribute such as discussed and exemplified elsewhere in this disclosure. Convey representations refers to portraying or otherwise showing something.

Arranging discrete graphical elements having a plurality of graphical characteristics conveying representations of alphanumeric data in a non-alphanumeric manner refers to placing or ordering one or more elements on a display, wherein the elements convey information. Each element's information may be visually displayed such that a user can easily perceive that information. In one example, tiles may contain information directed to a deal a sales team is looking to close, and the tiles may be arranged based on tile size and/or tile color to convey a size of a deal and/or a type of a deal.

Some disclosed embodiments include causing an initial arrangement of a plurality of tiles on a display. Causing refers to making something happen. Consistent with disclosed embodiments, the at least one processor causes a plurality of events to occur, including interacting with and arranging single graphic element or a plurality of graphical elements.

An initial arrangement of a plurality of tiles refers to a first or default tile configuration, layout, or spatial distribution, made up of initial data retrieved from a memory by the at least one processor. In a non-limiting example, each tile may correspond to a sales deal that a company is pursuing and/or negotiating. In this example, the plurality of tiles may refer to all sales deals a company is involved in. A display refers to an electronic device for the visual presentation of data. Non-limiting examples of displays may include an LED display, augmented reality (AR), or virtual reality (VR) display, as exemplified elsewhere in this disclosure. In one example, the display may contain up to 10, 20, 30, 40, or 50 tiles. A user or HR manager may configured the number of tiles on a display.

Consistent with some disclosed embodiments, causing an initial arrangement of a plurality of tiles on a display refers to the at least one processor ordering or spacing each tile based on information associated with each tile. For example, where a sales team is looking to pursue multiple deals, the at least one processor may cause the initial tile arrangement to be based on each deal's value.

Figure 7:
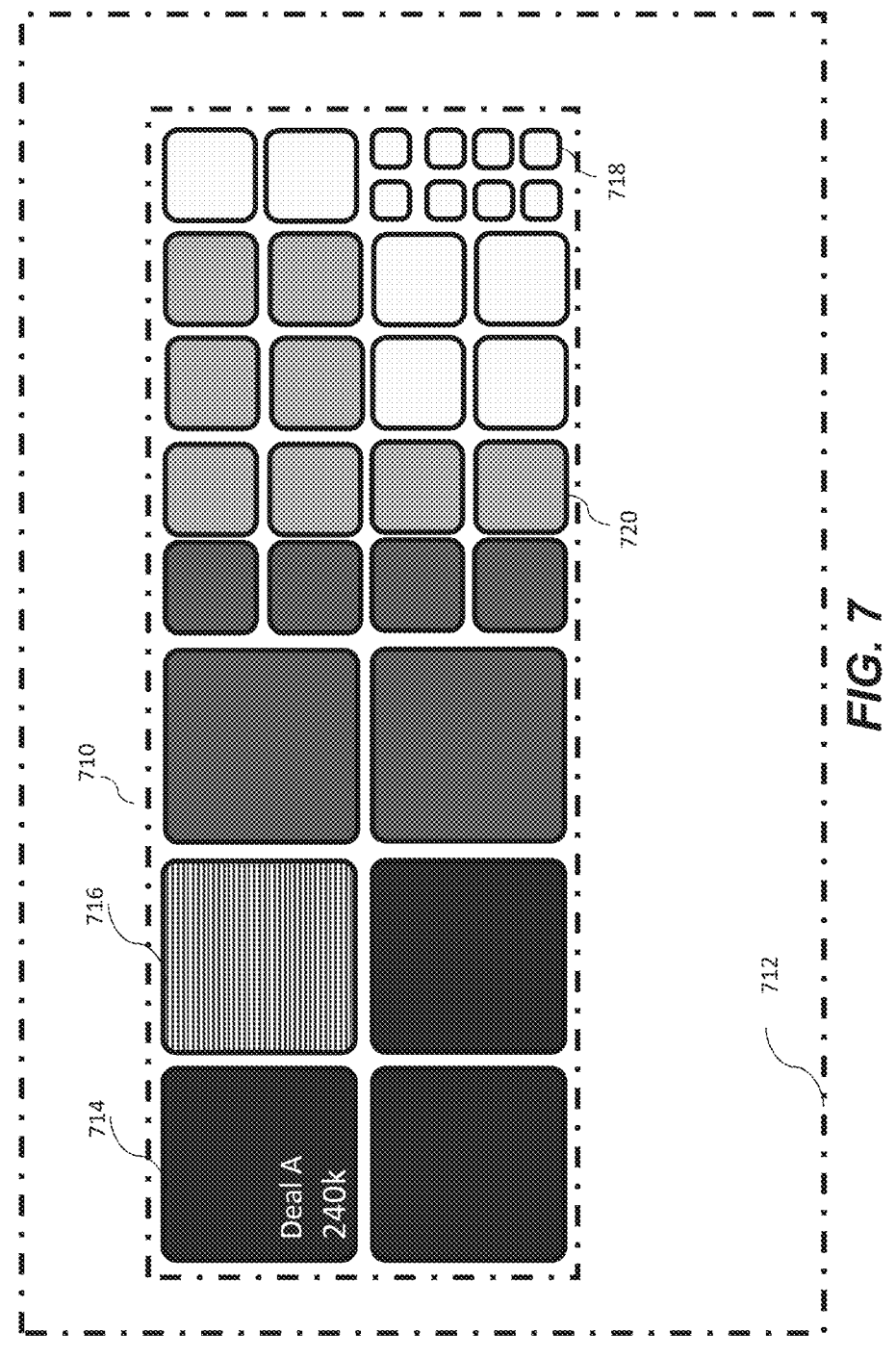
FIG. 7 is an exemplary initial arrangement of a plurality of tiles presented on a display, consistent with some of the disclosed embodiments.

By way of example, FIG. 7 is an exemplary initial arrangement of a plurality of tiles 710 presented on a display 712, consistent with some disclosed embodiments. Here, the initial arrangement may be based on tile size. Large tiles 714 and 716 may be located towards left of display 712, whereas smaller tiles, such as small tile 718 and medium tile 720, are located towards the right of display 712.

In some embodiments, each of the plurality of tiles is associated with an item including a first characteristic having a first alphanumeric value and a second characteristic having a second alphanumeric value, and each item is associated with a common objective.

An item refers to a discrete collection of data in a data structure, as described and exemplified elsewhere in this disclosure. In one example, an item may refer to a deal that a sales team is negotiating. In another example, an item may refer to a candidate that a company is looking to hire. In yet another example, an item may refer to potential locations where a company would like to expand. These are just a few examples, it being understood that an item can vary widely depending on the use case. A characteristic refers to a type of information associated with an item. Non-limiting examples of characteristics include an item's value, duration, risk level, constraints, conditions, parties, subject matter, and/or location. Each characteristic may have a first alphanumeric value. In one example, a deal may be worth $100,000, and the alphanumeric value may be "100 k." Throughout this disclosure, dollar values may be referred to alphanumerically. Any one of the above characteristics may be the first characteristic and another characteristic may be the second characteristic.

For example, the first characteristic may refer to a sales deal's value and the second characteristic may refer to the level of risk associated with that deal. Risk associated with a deal may be based on a myriad of factors, including, but not limited to, information asymmetry, misaligned expectations, overconfidence, emotional factors, legal and regulatory risks, market volatility, external influences, and inflexibility. The second characteristic, here, the deal's risk, may have a second alphanumeric value. The second alphanumeric value may refer to a deal's risk score, wherein the risk score may range from 0 to 100. In this example, a risk score ranging from 0 to 30 may reflect a low-risk deal, a risk score ranging from 30 to 70 may reflect a medium-risk deal, and a risk score ranging from 70 to 100 may reflect a high-risk deal.

The common objective refers to a shared goal or aim, as described and exemplified elsewhere in this disclosure. Examples of common objectives in a business context include increasing revenues, sales, profitability, customer retention, or number of customers; or decreasing waste, expense, or loss of customers. In general, in a business context, a common objective refers to increasing a positive measure and/or decreasing a negative measure. In another example, a common objective refers to negotiating and winning a plurality of sales deals, which may increase a company's revenue, sales, and profitability.

In some embodiments, each tile adopts a first visual characteristic from a first set of visual characteristics, and a second visual characteristic from a second set of visual characteristics. A visual characteristic refers to any attributes or visual cues used to represent data visually, as described and exemplified elsewhere in this disclosure. A set of visual characteristics may include a plurality of distinct combinations of visual characteristics of different natures. For example, a set of visual characteristics may encompass distinct combinations of colors, transparency, and/or shadowing. Non-limiting examples of visual characteristics within a set of visual characteristics may include the tile's size, color, pattern, shading, texture, shape, image, animation, brightness, and/or saturation. Each set of visual characteristics may contain a set or varying numbers of that visual characteristic. For example, a set of visual characteristics may be tile sizes, wherein there may be multiple tile sizes within the set of tile sizes. In one example, the set of tile sizes may contain between 3 and 5 different tile sizes. In another example, the set of tile sizes may contain 10 different tile sizes. In the example where the set of visual characteristic is tile colors, the set of visual characteristics may contain at least 3 and up to 10 different colors.

Consistent with some disclosed embodiments, one of the above visual characteristics may be the first visual characteristic, and another characteristic may be the second visual characteristic. In some embodiments, the first set of visual characteristics and the second set of visual characteristics are chosen from a group consisting of size, color, texture, transparency, or shape. A tile's color may also include secondary elements such as a tile's pattern, shading, or gradient. For example, the first set of visual characteristic may correspond to the size of each of the plurality of tiles, wherein the first set of visual characteristics contains small, medium, and large tiles.

In one example, the first visual characteristic may correspond to the size of the tile, and the second visual characteristic may correspond to the color of the tile. In this example, the tile may be green, red, yellow, or another or color configured by a user to visually represent data. The second visual characteristic may also be selected from a group of consisting of a plurality of patterns and/or shading schemes. For example, the second set of visual characteristics may contain various patterns, such as a horizontal lines, vertical lines, cross-hatching, and/or solid shading.

By way of example, referring to FIG. 7, each of the plurality of tiles 710 adopts a first visual characteristic from a first set of visual characteristics and a second visual characteristic from a second set of visual characteristics. In this example, the first set of visual characteristics corresponds to tile size, wherein a tile may be a small, medium, or large tile. A medium tile may be larger than the small tile, and a large tile may be larger than the medium tile. Here, tile 714 may be a large tile. The second set of visual characteristics may be a tile's pattern. In this example, the second visual characteristic associated with tile 714 is the tile's pattern. Here, tile 714 adopts a solid pattern, whereas tile 716 adopts a horizontal line pattern.

In some embodiments, the first set of visual characteristics are different sizes and the second set of visual characteristics are different colors. The first set of visual characteristics may contain a plurality of sizes, consisting, in a non-limiting example, of small, medium, and large tiles. The second set of visual characteristics may contain a plurality of colors, consisting, in a non-limiting example, of green, yellow, and/or red tiles. In this example, the plurality of colors may include a tile's pattern, shading, and gradient. For example, a green tile may contain solid shading, or it may contain a horizontal line pattern. In lieu of colors, each of the plurality of tiles may be in grayscale, wherein second set of visual characteristics includes varying patterns or shading arrangements.

In some embodiments, the first set of visual characteristics is determined by analyzing the first alphanumeric values of each item associated with each of the plurality of tiles, and the second set of visual characteristics is determined by analyzing the second alphanumeric values of each item associated with each of the plurality of tiles. Determining a set of visual characteristics refers to identifying one or more visual attributes for conveying information. For example, the at least one processor may determine that deal's value may be represented by varying tile sizes, and a deal's risk may be represented by various tile patterns. In another example, the at least one processor may determine that project due dates may be represented by various tile colors. In this context, analyzing refers to evaluating the first and second alphanumeric values associated with the at least some of the plurality of items to be graphically represented. This process may involve scrutinizing these values to identify patterns, relationships, or criteria that should be used to determine which visual characteristics best represent the analyzed data. In this example, the at least one processor may analyze the first alphanumeric values of each item associated with each of the plurality of tiles, here a deal's value, and determine that various tile sizes are an appropriate way to convey that information. In another example, the at least one processor may analyze the second alphanumeric values of each item associated with each of the plurality of tiles, here, a deal's risk, and determine that various tile patterns are an appropriate way to convey that information.

Consistent with disclosed embodiments, the at least one processor may be configured to analyze each of the first and second alphanumeric values using an artificial intelligence (AI) system tailored for visual representation generation, as described and exemplified elsewhere in this disclosure. For example, the AI system may consider best/preferred practices in design and generate visual characteristics meet the analyzed data in the best way or in a preferred way. The AI system may also learn from vast datasets and user interactions to continually improve its ability to create effective visual representations.

In one example, a sales team may be working on a plurality of deals, with each deal containing a first alphanumeric value, e.g., a deal size, and a second alphanumeric value, e.g., the level of risk that the deal presents. The at least one processor may be configured to analyze each of the first and second alphanumeric values-here, the deal's value and the deal's risk score—and determine a first and second set of visual characteristics that best represent that data. In this example, the at least one processor may determine that a deal's value is best represented by varying tile sizes because it provides a visual representation that is easy for a sales manager or other user to understand. The at least one processor may determine that a deal's risk is best represented by varying colors or patterns for similar reasons. For example, a high-risk deal may be red, a medium-risk deal may be yellow, and a low-risk deal may be green. In the example where the risk score is represented by varying patterns, a solid color may be associated with a low risk score, horizontal lines may be associated with a medium risk score, and cross-hatching may be associated with a high risk score. The at least one processor may also use an artificial intelligence (AI) system to determine the first and second set of visual characteristics, wherein the AI system uses training examples as input, as described and exemplified elsewhere in this disclosure.

Referring to FIG. 7, the at least one processor may be configured to determine a first and second set of visual characteristics by analyzing the first and second set of alphanumeric values of each item associated with each of the plurality of tiles. In this example, display 712 contains a plurality of tiles representing a plurality of deals that a sales team is working on. In this example, the first alphanumeric value may be the deal size or value, and the second alphanumeric value may deal's risk score. In this example, the at least one processor may determine that Deal A, represented by tile 714, is worth 240 k. The at least one processor may determine that the best way to visually convey this information is by displaying it as a large tile, as opposed to medium tile 720 or small tile 718. The at least one processor may also analyze the second alphanumeric value, here, the deal's risk score. In this example, the at least one processor may determine that Deal A presents a low risk, and may determine that the best way to visually convey this information is via various patterns. In this example, a low-risk deal is conveyed by a solid fill pattern. In another example, the at least one processor may determine that a deal associated with tile 716 is medium risk. Tile 716 may therefore adopt a horizontal line pattern.

In some embodiments, each tile has a unique position within the initial arrangement. A unique position refers to each tile's location or placement within the initial arrangement based on a plurality of characteristics associated with each tile, wherein the initial arrangement refers to how the tiles are grouped based on the common objective. Each tile may be placed in the initial arrangement based on the tile's first and second visual characteristics. For example, large tiles may be placed next to other large tiles, medium tiles may be placed next to other medium tiles, and so forth. The at least one processor may also analyze data associated with each tile and may place each tile in a unique position based on that data. Each tile's unique position may present the clearest way (or a preferred way) to visually convey the relevant data, as determined by the at least one processor. For example, the at least one processor may determine that the best way or a preferred way to visually convey the data in the initial arrangement is to group each tile based on the first visual characteristic, wherein the first visual characteristic refers to deal size.

Referring to FIG. 7, tiles 714 and 716 may have a unique position within the initial arrangement, wherein each position may convey information relevant to the sales deal that a company is looking to pursue or win. Tiles 714 and 716 may be placed in their unique position based on, for example, deal size or deal risk. For example, the at least one processor may determine that the most optimal way or a preferred way to convey information associated with each tile is to place large tiles 714 and 716 towards the left of the display, and smaller tiles, such as small tile 718 and medium tile 720 towards the right of the display. In this example, larger tiles are associated with higher-value sales deals, and smaller tiles are associated with smaller-value sales deals.

In some embodiments, the initial arrangement corresponds to the plurality of tiles being arranged in groupings based on at least one of the first set of visual characteristics or the second set of visual characteristics. A grouping refers to a plurality of tiles that clustered together based on relevant criteria related to the common objective, as described and exemplified elsewhere in this disclosure. This grouped visualization may enable users to gain insights into the overall progress towards the common objective, identifying trends, patterns, or areas requiring attention more effectively than when examining raw data. In one example, a grouping may be based on the first set of visual characteristics, wherein the first set of visual characteristics is a tile's size. In this example, the plurality of tiles are grouped based on size. In another example, a grouping may be based on the second set of visual characteristics, wherein the second set of visual characteristics is a tile's color or a tile's pattern. In this example, the plurality of tiles may be grouped according to color or pattern. Grouping may support decision-making by providing a clear overview of where efforts should be focused to maximize progress towards the common objective, as described and exemplified elsewhere in this disclosure.

In some embodiments, the first tile and the second tile are within a same grouping. The first and second tile may be grouped based on at least one of the first set of visual characteristics or the second set of visual characteristics. In one example, the plurality of tiles may be grouped based on size, i.e., the first set of visual characteristics. For example, the first and second tile may both be small tiles, and are thus in the same grouping. The tile size may indicate the value of a deal that the sales team is interested in pursuing, in other words, the deal's size. In another example, the first and second tile may be grouped based on color, i.e., the second set of visual characteristics. In this example, the color of the tile may correspond to the risk associated with a deal that a company is interested in pursuing. Here, the first and second tile may be green, indicating that the deal is low risk. In another example, the second set of visual characteristics comprises a tile's pattern, wherein the pattern indicates the level of risk associated with the deal. In this example, the first and second tiles may have a solid filled pattern, which may indicate a low level of risk associated with the deal.

Figure 8:
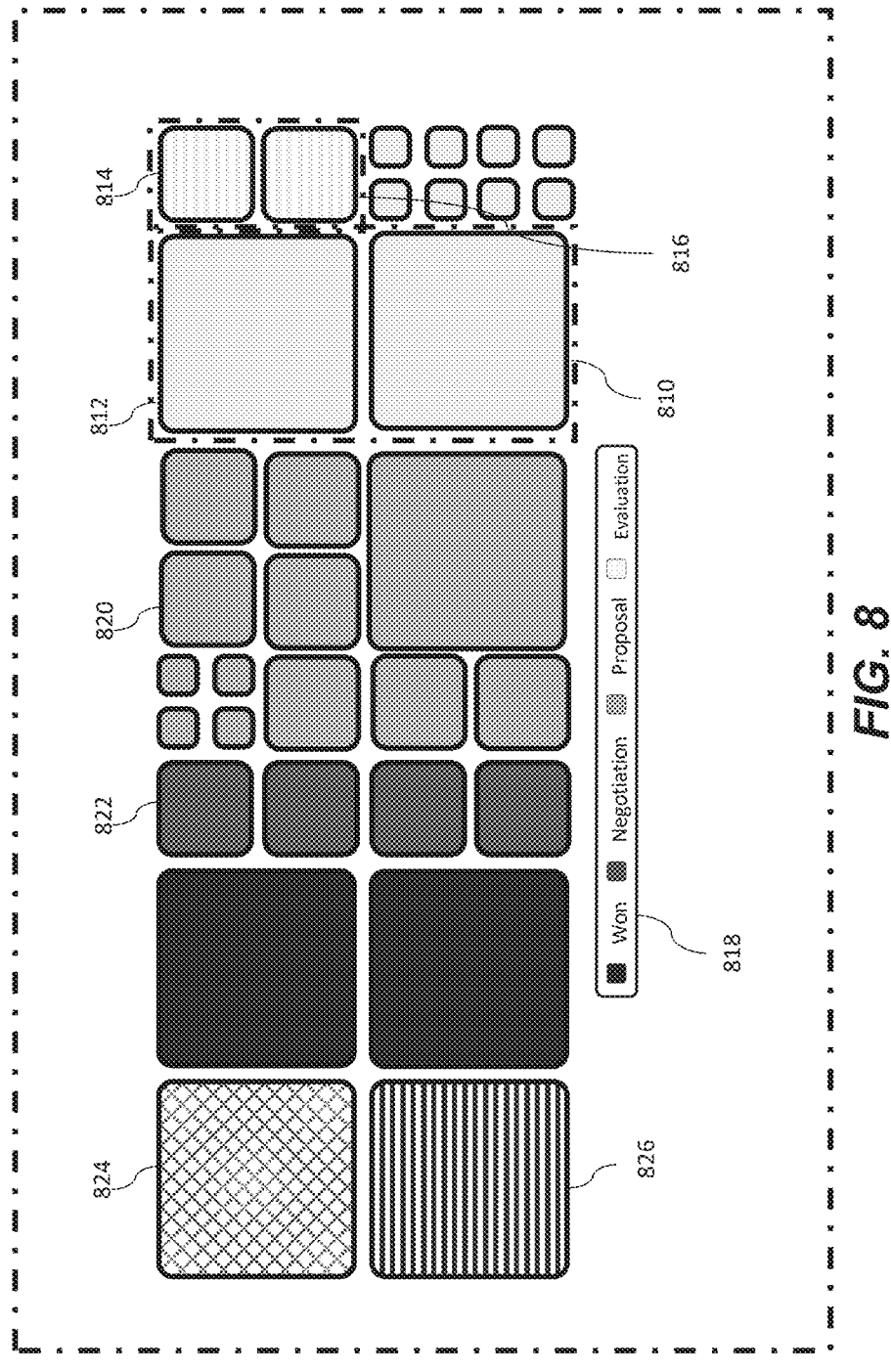
FIG. 8 is an exemplary arrangement of a plurality of tiles in groupings presented on a display, consistent with some disclosed embodiments.

By way of example, FIG. 8 illustrates an exemplary arrangement of a plurality of tiles in groupings presented on a display, consistent with disclosed embodiments. Tiles 810 and 812 may each be large tiles. In this example, tiles 810 and 812 may be grouped together based on size. The size of the tile in this example may correspond to the size of the deal a company is working on pursuing, i.e., the deal's value. Large tiles 810 and 812 may represent deals above a threshold value and may be grouped together. Similarly, medium tiles 814 and 816 may represent deals having values less than the threshold value and may also be grouped together.

In some embodiments, the plurality of tiles conveys a visualization of progress towards the common objective. Visualization refers to the representation of an object, situation, or set of information as an image visually perceptible to a viewer. Progress refers to forward movement or advancement in reaching a specific objective or target. Accordingly, visualization of progress refers to representing tile information such that a user can perceive progress toward meeting a goal, i.e., the common objective. The visualization of progress may be presented on the display 712. In this example, large tiles 714, 716 are placed at the left of the display, with smaller tiles 718 and 720 being placed at the right of the display 712. In this example, higher-value sales deals are associated with large tiles. In this example, the common objective may be to pursue only high-value sales deals, such that display 712 will eventually only consist of large tiles. The display 712 will visualize the progress towards this goal based on how many large tiles 714, 714 are present on display 712.

Progress may be visualized by updating at least one of the first or second visual characteristics when a task has been completed, a deal increases in value, and/or a deal decreases in risk. Such a visualization may enable a deeper understanding of how individual items contribute to the overarching goal. In one example, a deal size that triples in value may represent progress towards a quarterly sales objective. In another example, a deal that decreases in risk may similarly represent progress towards a quarterly sales objective. In this example, the quarterly objective may also include pursuing only low to medium-risk deals, and avoiding higher-risk deals. Consistent with disclosed embodiments, the deal risk may be visually presented on display 712, such that a manager can monitor how many deals are high-risk and how many deals are low-risk. In this example, the manager may have a goal of how many low-risk deals he or she wants to pursue in a given time period.

Visualizing progress towards the common objective may facilitate the identification of key trends, dependencies, and potential optimizations that can propel progress towards achieving the common objective, as discussed and exemplified elsewhere in this disclosure.

In some disclosed embodiments certain operations are performed in response to a value change in at least one of the first alphanumeric value or the second alphanumeric value of a first item associated with a first tile of the plurality of tiles. A value change refers to a modification, alteration, transformation, replacement, switch, and/or shift in at least one of the first alphanumeric value or second alphanumeric value. For example, a value change may include an increase or decrease in magnitude based on one or more factors. In one example, each tile may be associated with a deal that a sales team is looking to close. Here, the value change in the first alphanumeric value may refer to an increase or decrease in deal size. The value change in the second alphanumeric value may refer to an increase or decrease in deal risk.

Some embodiments include causing a re-sorting of the tiles to an updated arrangement differing from the initial arrangement in response to a value change in at least one of the first alphanumeric value or the second alphanumeric value of a first item associated with the first tile of the plurality of tiles. Re-sorting the tiles refers to updating, changing, modifying, altering, or otherwise adjusting the tile layout in response to a value change in at least one of the first alphanumeric value or the second alphanumeric value of a first item associated with the first tile of the plurality of tiles. An updated arrangement refers to formation of a new tile layout that reflects the value change in at least one of the first alphanumeric value or the second alphanumeric value of a first item associated with the first tile of the plurality of tiles. In one example, the initial tile arrangement may correspond to various deals that a company is interested in completing, wherein each tile corresponds to a different deal. Each deal may be arranged based on alphanumeric data. For example, tiles corresponding to larger deals may be located at the top of the initial arrangement, whereas smaller deals may be located at the middle or bottom of the initial arrangement. The initial arrangement may include one deal, Deal A, located below another deal, Deal B, based on value. In response to an increase in Deal A's value, the at least one processor may re-sort the tiles such that Deal A is now located above Deal B.

Figure 9A:
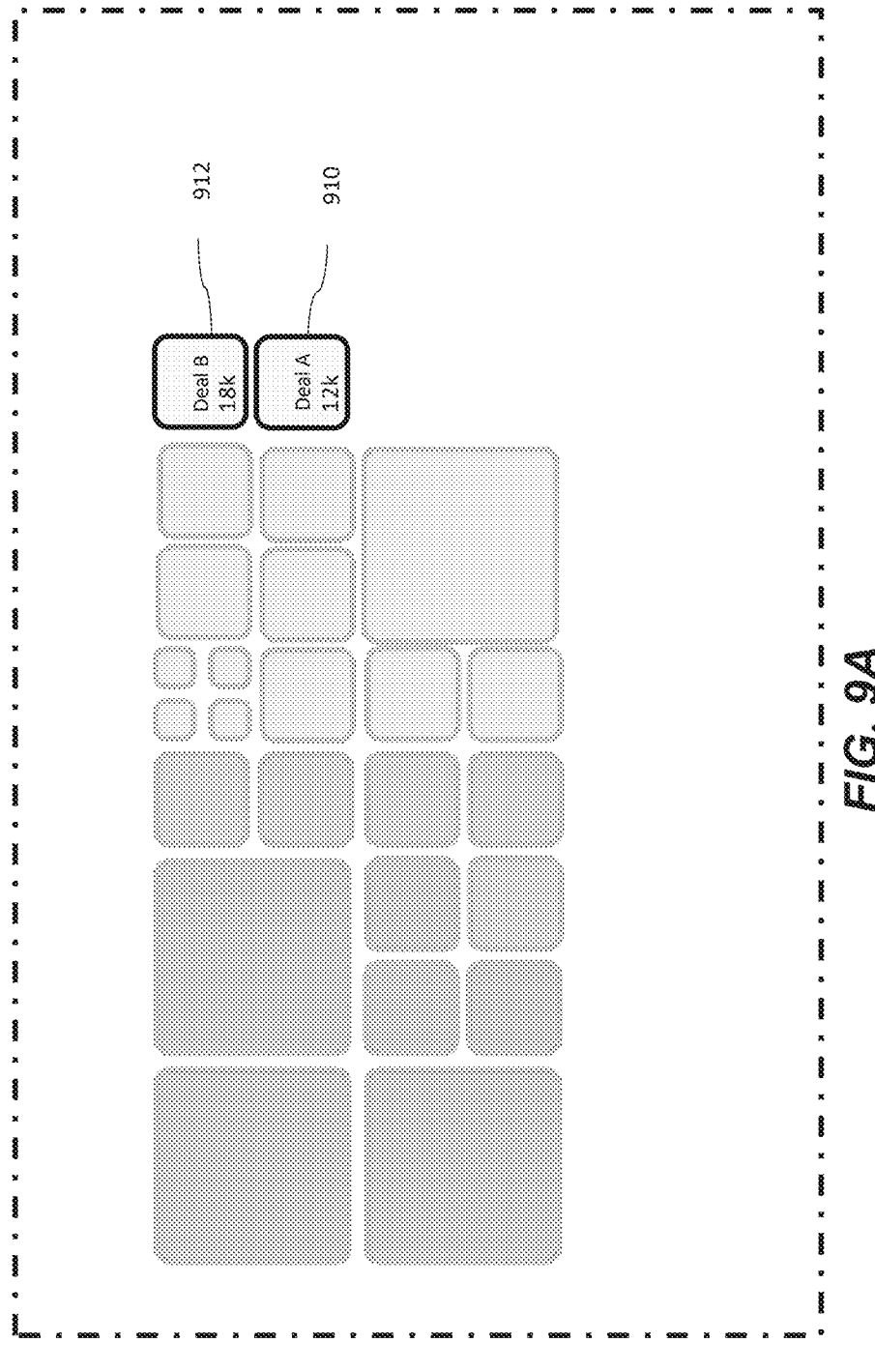
FIGS. 9A-9C are exemplary illustrations of arrangements of a plurality of tiles reflecting a re-sorting of tiles, consistent with some disclosed embodiments.
Figure 9B:
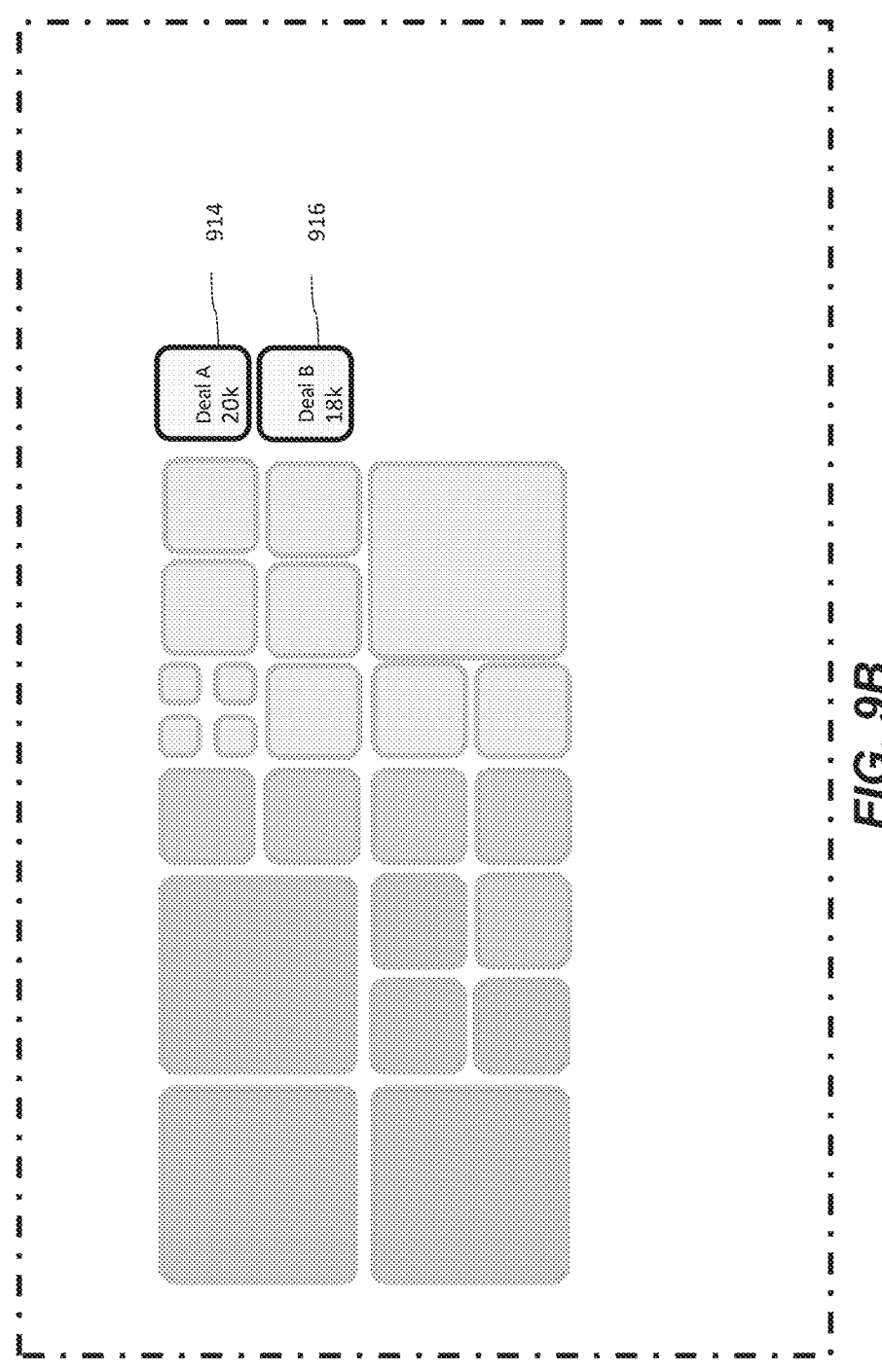

By way of example, FIG. 9A is an exemplary illustration of an arrangement of a plurality of tiles consistent with disclosed embodiments. In this example, tile 910 may correspond to a deal worth 12K and may be labeled Deal A. Tile 912 may correspond to a deal worth 18K and may be labeled Deal B. In this example, Deal A increases in value from 12K to 20K. FIG. 9B is an exemplary illustration of an arrangement of a plurality of tiles reflecting a re-sorting of tiles consistent with disclosed embodiments. As illustrated in FIG. 9B, tiles 910 and 912 are re-sorted relative to the arrangement of FIG. 9A to reflect Deal A's increase in value, such that tile 914 is now located above tile 102-3-16. Re-sorting the tiles such that the higher-value deals are at the top of the plurality of tiles may help those deals stand out to a manager or other user, and may help better visualize a sales team's common objective.

In some embodiments, re-sorting the initial arrangement includes modifying spacings between tiles in the initial arrangement. Spacing may refer to the distance between two respective tiles among the plurality of tiles on the display. In one example, each tile may be placed between 1 mm and 15 mm away from one another. The spacing may depend on the amount of data that a user wishes to convey on the display. Tighter spacing between tiles may allow for additional tiles to be displayed, based on user preference. In one example, the plurality of tiles may be spaced 10 mm away from one another. A first tile may increase in size in response to an increase in deal size, i.e., a first alphanumeric value change. To accommodate this increase in size, the spacing between each of the plurality of tiles may be reduced to 5 mm.

In some embodiments, re-sorting the initial arrangement includes introducing at least one placeholder tile in the initial arrangement. A placeholder tile refers to a tile adopting visual characteristics not configured to convey information, as described and exemplified elsewhere in this disclosure. Introducing the placeholder tile refers to adding the placeholder tile to the plurality of tiles. Note that a placeholder tile is not necessary to visualize progress towards the common objective. Rather, the placeholder tile may only serve to maintain visual consistency and alignment.

Figure 9C:
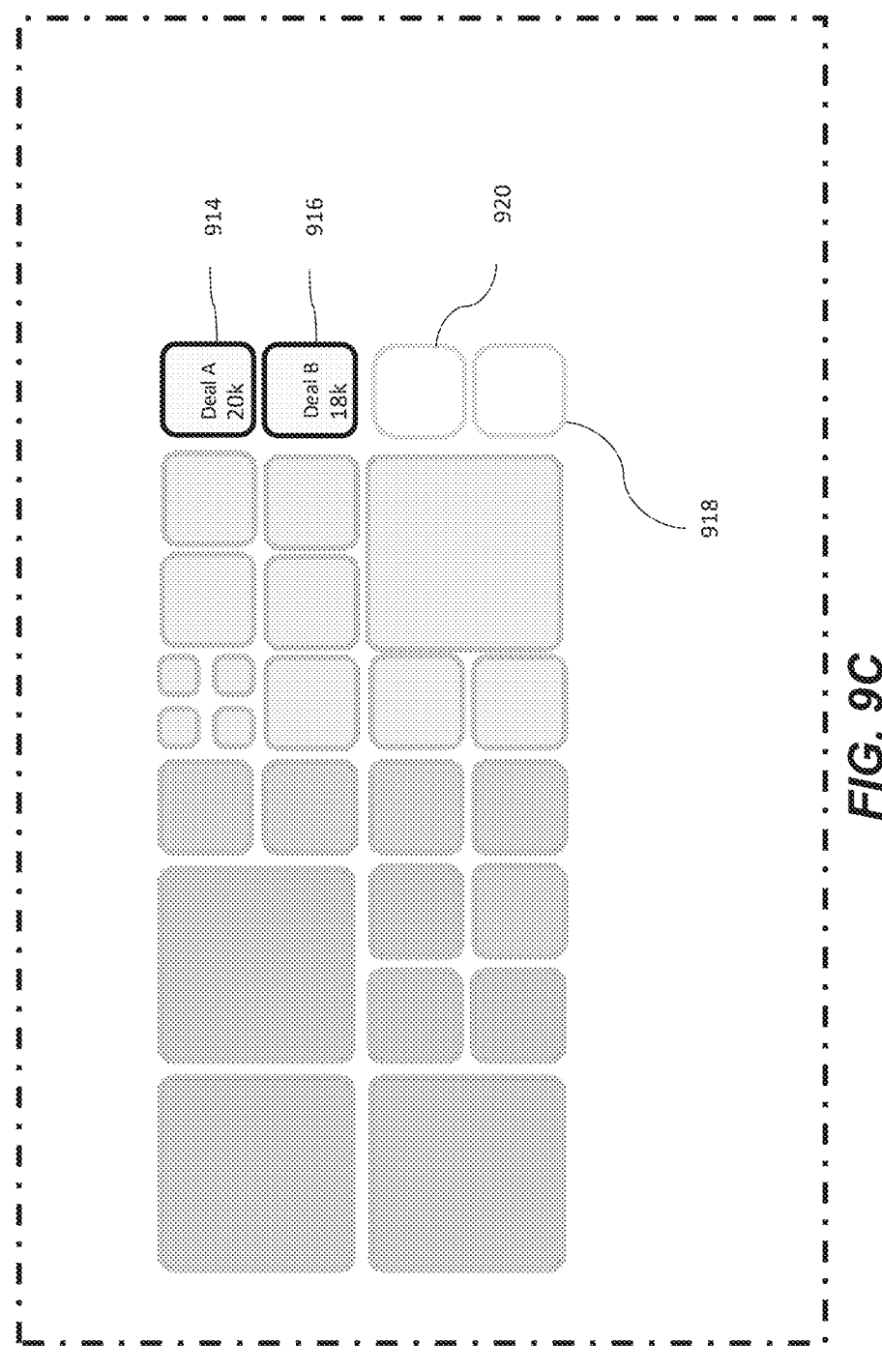

Referring to FIG. 9C, tiles 918 and 920 may be placeholder tiles. In this example, placeholder tiles 918, 920 adopt a shape similar to that of tiles 914 and 916, further emphasizing where regular tiles could be placed, as described and exemplified elsewhere in this disclosure. In this example, placeholder tiles 918 and 920 ensure that display 712 does not contain any missing tiles to improve readability and show a user where there are potential gaps in a company's deal strategy. In this example, FIG. 9C represents a complete array of tiles on display 712, whereas FIGS. 9A and 9B are missing tiles. Placeholder tiles 918 and 920 fill the missing space.

In some embodiments, re-sorting the initial arrangement includes modifying at least one placeholder tile included in the initial arrangement. Modifying at least one placeholder tile refers to adjusting the placeholder tile such that it adopts one or more visual characteristics from at least one of the first or second set of visual characteristics to match at least one adjacent tile in the plurality of tiles. For example, the placeholder tile may be introduced such that it is adjacent to a large tile. The placeholder tile may, to avoid modifying the spacing between each tile and/or the general layout of the plurality of tiles, adopt the size of the large tile. In another example, the placeholder may decrease its size to maintain uniformity. In yet another example, the at least one placeholder tile may modify its color or pattern to match the surrounding tiles.

Referring to FIG. 9C, the at least one processor may modify placeholder tile 918 such that it matches surrounding tiles 914 and 916. FIG. 9C shows modified placeholder tile 920, wherein modified placeholders 918 and 920 conform to the same size and shape as 914 and 916 to maintain order and consistency within the plurality of tile displayed on display 912.

Some embodiments include causing a first visual change in at least one of the first visual characteristic or the second visual characteristic of the first tile in response to a value change in at least one of the first alphanumeric value or the second alphanumeric value of a first item associated with the first tile of the plurality of tiles. A visual change refers to a modification, alteration, switch, and/or transformation of a visual characteristic such that the modification, alteration, switch, and/or transformation is perceptible by a user. A first visual change may apply to the first visual characteristic or the second visual characteristic. For example, a visual change may be an increase or decrease in size, a change in color, a change in pattern, and/or a change in shading. In one example, the plurality of tiles may visually represent multiple deals. The size of each tile may correspond to the value of the deal, wherein the size of each tile is the first visual characteristic. For example, deals under 10 k may be a first tile size, i.e., a small tile, deals between 10 k and 100 k may be a second tile size, i.e., a medium tile, and deals over 100 k may be a third tile size, i.e., a large tile. In this example, a deal may increase in value from 88 k to 110 k. In response the size of the first tile may increase based on the increased value of the tile.

In another example, the first tile may change color based on the risk level of the deal, corresponding to an increase or decrease in risk score. The color of the tiles may be the second visual characteristic. In this example, low-risk deals may be color-coded as green, medium-risk deals may be color-coded as yellow, and high-risk deals may be color-coded as red. In this example, the at least one processor may cause the first tile to change from yellow to green to represent a decrease in deal risk. In another example, the second visual characteristic may correspond to a pattern associated with each tile, wherein a low-risk has a solid pattern, a medium-risk deal has a horizontal line pattern, and a high-risk deal has a cross-hatching pattern. Here, in response to a deal that increases in risk score from low to medium, a visual change may occur in the first tile, such that either the tile's color or pattern changes.

Figure 10A:
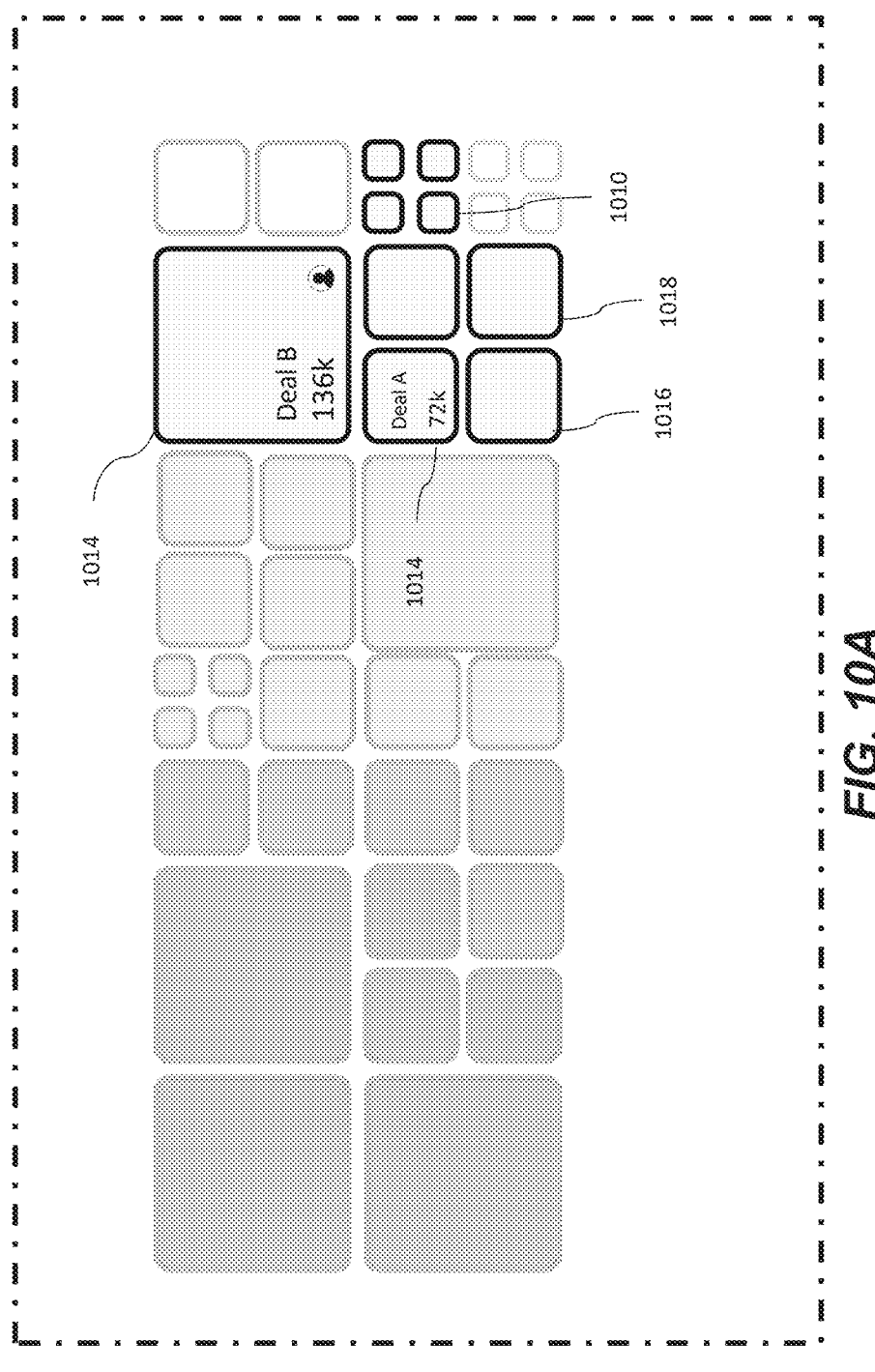
FIGS. 10A-10B are exemplary illustrations of arrangements of a plurality of tiles reflecting a first visual change of a first visual characteristic, consistent with some disclosed embodiments.
Figure 10B:
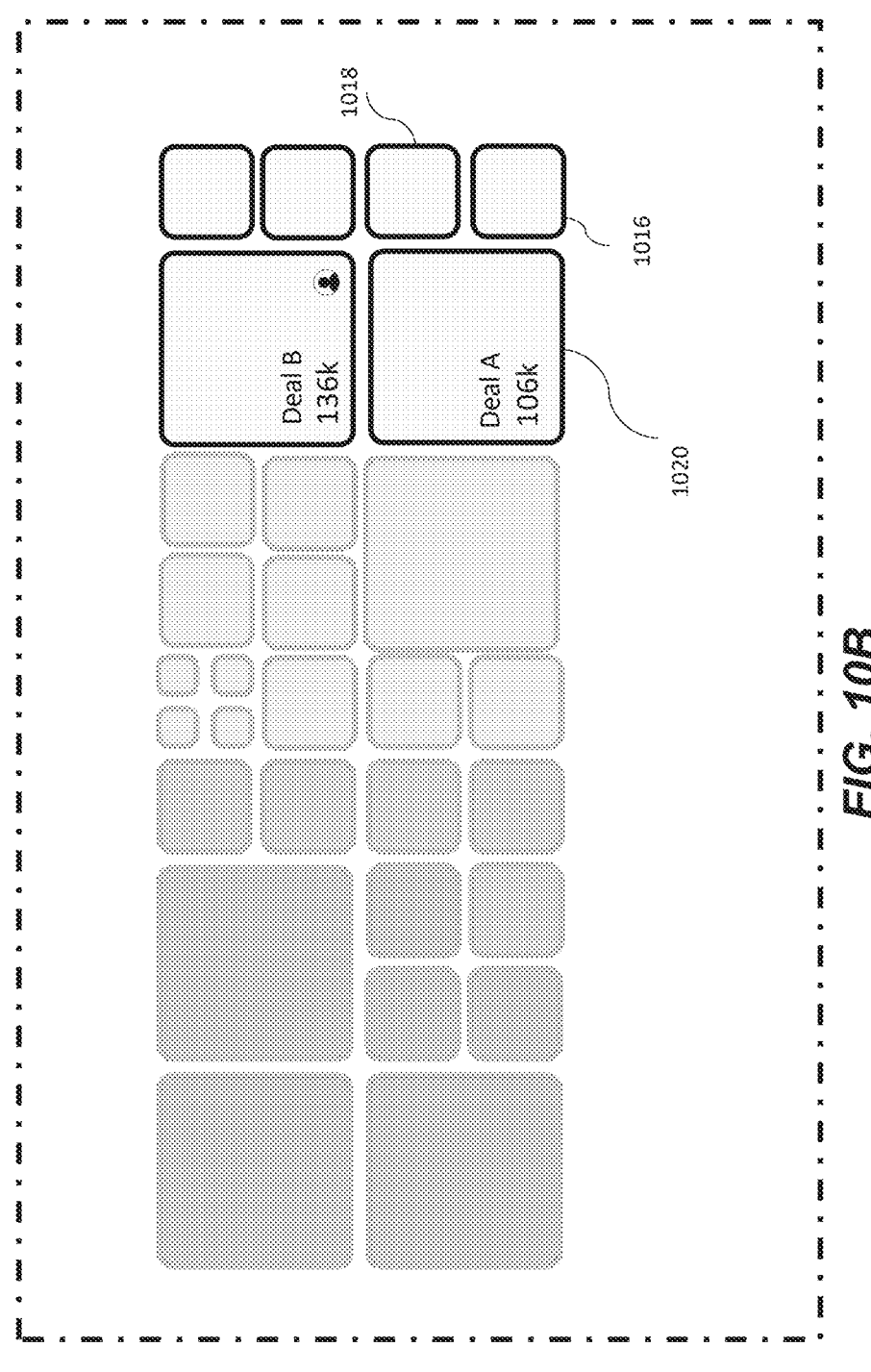

FIGS. 10A-10B are exemplary illustrations of arrangements of a plurality of tiles reflecting a first visual change of a first visual characteristic, consistent with disclosed embodiments. Referring to FIG. 10A, tile 1010 may be a small tile, tile 1012 may be a medium tile, and tile 1014 may be a large tile. In this example, tile 1012 represents a potential sales deal, Deal A, worth 72 k. Tile 1014 represents another potential sales deal, Deal B, which has a higher potential value than Deal A, at 136K. In this example, display 712 may contain additional tiles, for example tiles 1016, 1018, wherein each tile corresponds to a different sales deal that a company is pursuing.

In this example, Deal A may increase in value to over 100 k, for example, to 106 k, thereby causing the tile to increase in size. By way of example, FIG. 10B shows Deal A, tile 1020, at an increased size in response to the value change. Consistent with disclosed embodiments, the at least one processor may also be configured to re-sort the plurality of tiles such that small tile 1010 is no longer visible on the display, and medium tiles 1016, 104-9-18 are re-sorted to where tile 1010 previously was located.

In some embodiments, causing the first visual change includes replacing the first visual characteristic adopted by the first tile with a different visual characteristic from the first set of visual characteristics. By way of example only, the first set of visual characteristics may include a tile's size or shape. The least one processor may be configured to replace the first visual characteristic adopted by the first tile, such as the tile's size, with a different visual characteristic from the first set of visual characteristics. In this example, the at least one processor may be configured to replace a large tile with a medium tile. In another example, the at least one processor may replace a small tile with a large tile.

Figure 11A:
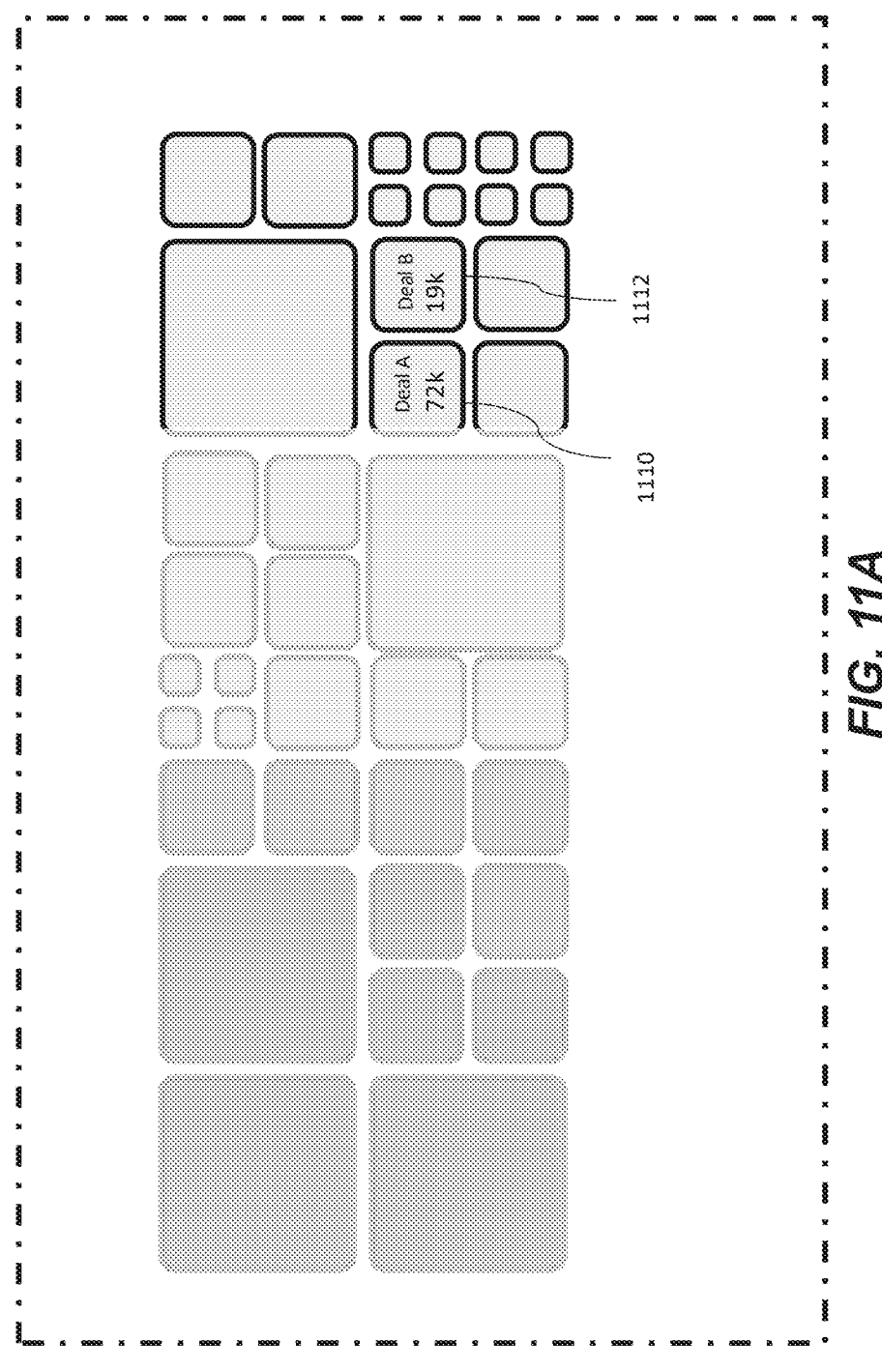
FIGS. 11A-11B are exemplary illustrations of arrangements of a plurality of tiles reflecting another visual change of a first visual characteristic, consistent with disclosed embodiments.
Figure 11B:
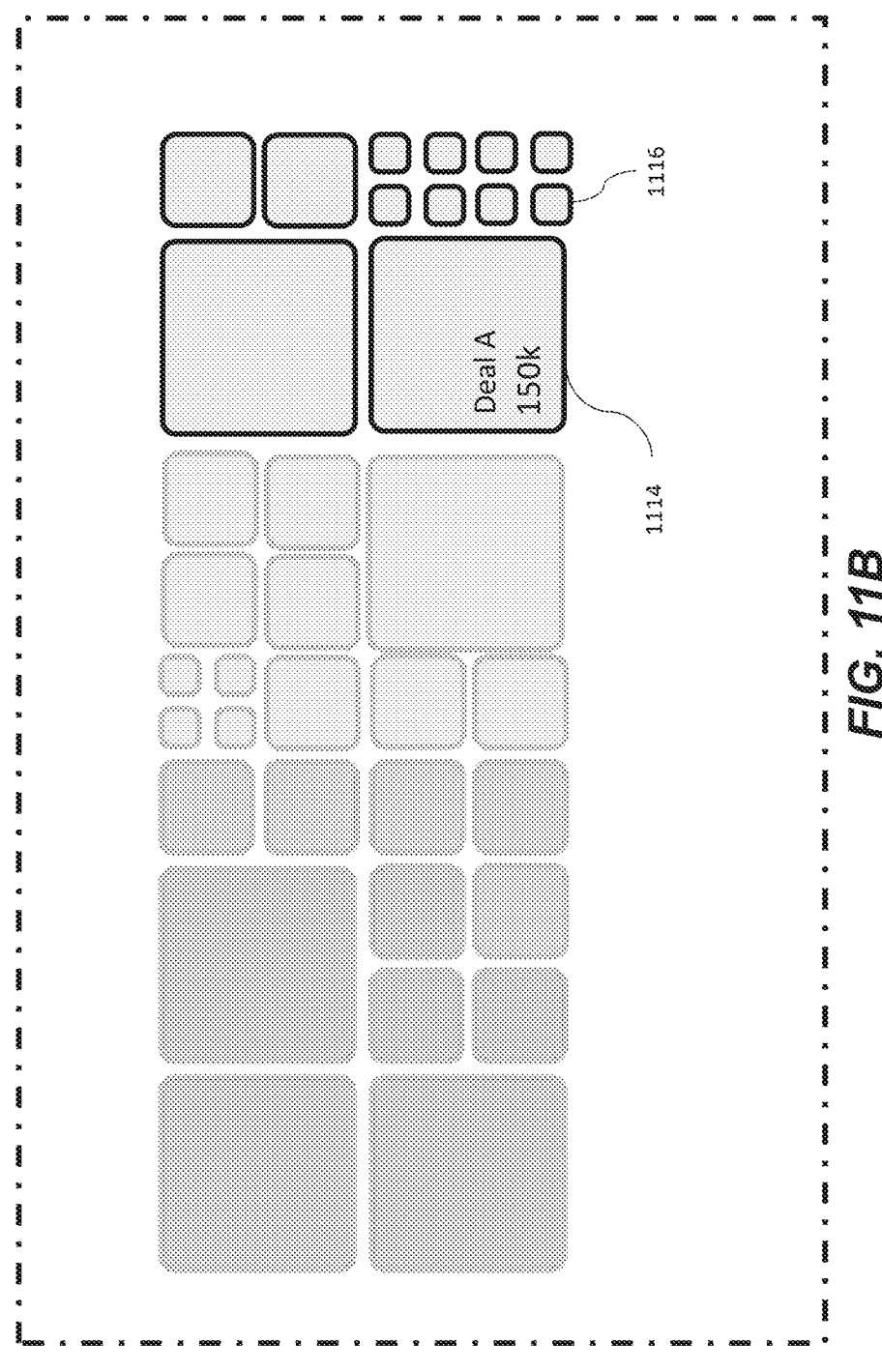

By way of example, FIGS. 11A-11B are exemplary illustrations of arrangements of a plurality of tiles reflecting a visual change of a first visual characteristic, consistent with disclosed embodiments. Referring to FIG. 5A, which is an exemplary illustration of an initial arrangement of a plurality of tiles, tile 1110 may be a medium tile, based on a deal value of 72 k. In this example, the deal size may increase to 150 k. Turning to FIG. 11B, the at least processor may replace medium tile 1010 with large tile 1014. In this example, the first set of visual characteristics comprises small, medium, and large tiles.

In some embodiments, causing the first visual change includes replacing the second visual characteristic adopted by the first tile with a different visual characteristic from the second set of visual characteristics. By way of example only, the second set of visual characteristics may include the tile's color or a pattern associated with the tile, which, in this example, corresponds to the risk level of a sales deal that a company is pursuing. In this example, the second set of visual characteristics refers to a pattern associated with each tile. Here, a deal may be downgraded in risk from medium to low. Accordingly, the at least one processor may be configured to replace a horizontally-lined tile with a solid filled tile.

Figure 12A:
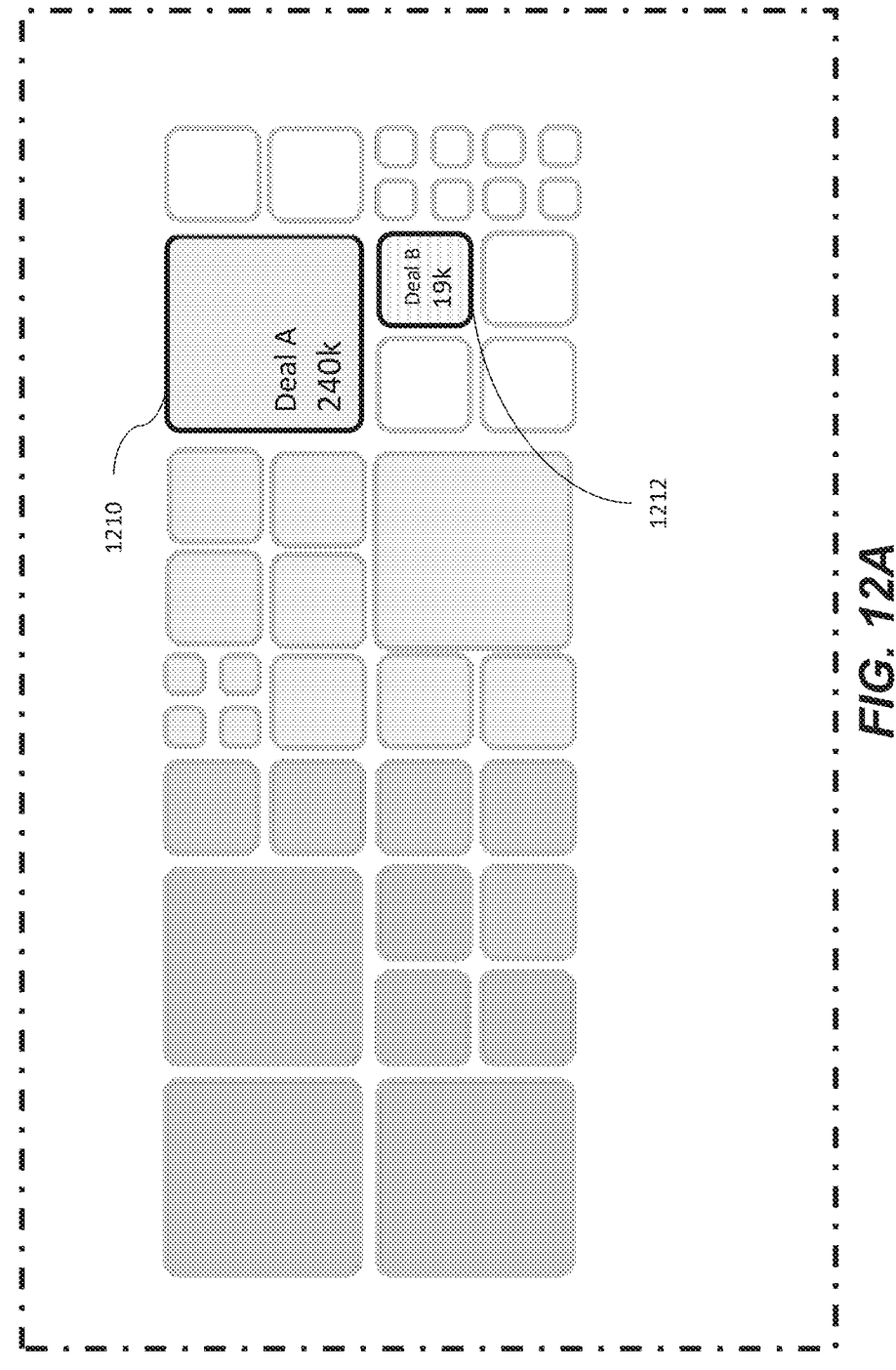
FIGS. 12A-12B are exemplary illustrations of arrangements of a plurality of tiles reflecting a first visual change of a second visual characteristic, consistent with some disclosed embodiments.
Figure 12B:
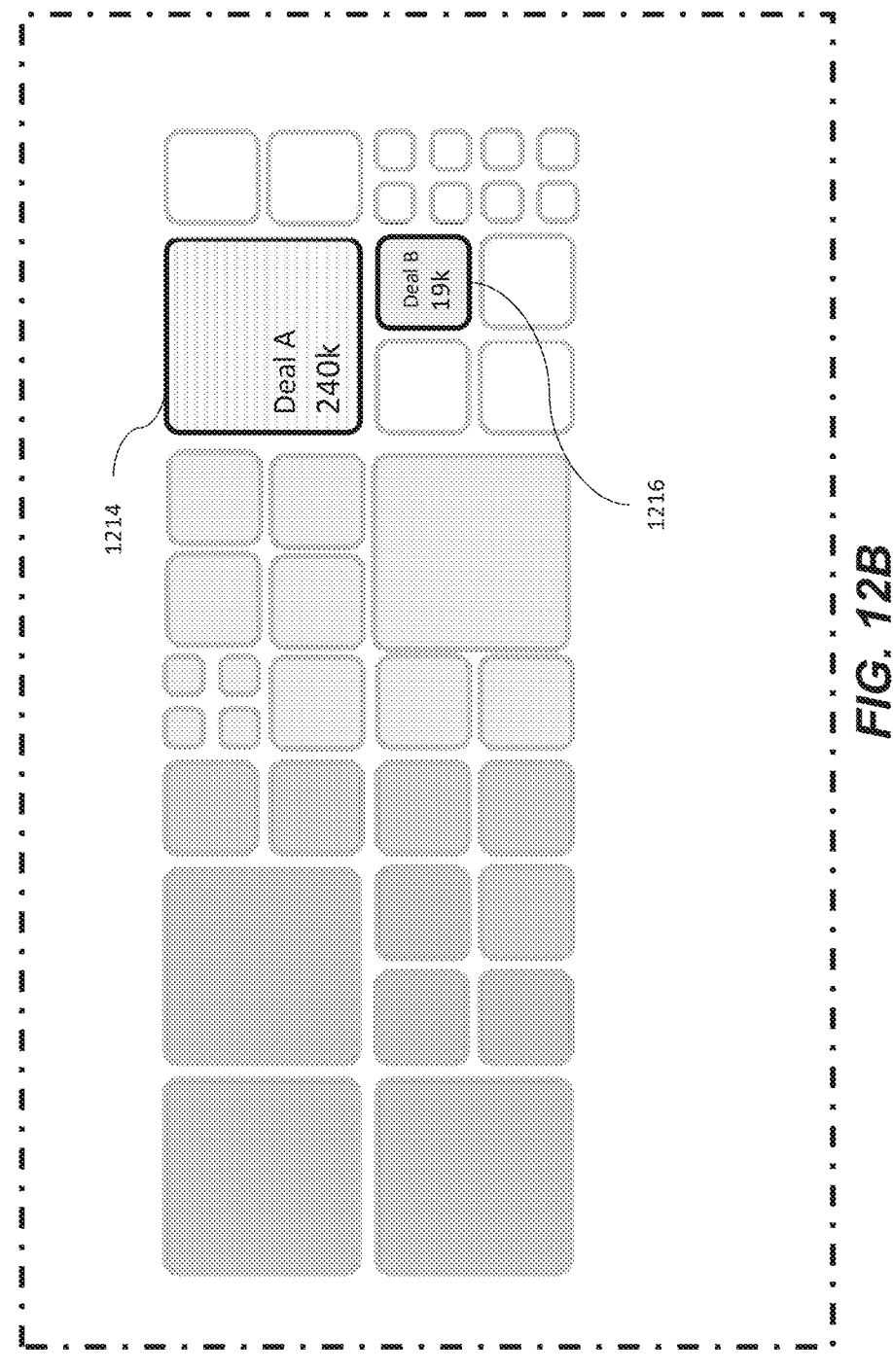

By way of example, FIGS. 12A-12B are exemplary illustrations of arrangements of a plurality of tiles reflecting a first visual change of a second visual characteristic, consistent with disclosed embodiments Referring to FIG. 12A, tile 1210, labeled as Deal A, may have solid shading, corresponding to a low-risk deal. The plurality of tiles may also contain a second tile, tile 1212, labeled as Deal B and also corresponding to a low-risk deal. The deal risk may be associated with a risk score, wherein a higher risk score corresponds to a higher-risk deal, and vice versa. In response to a change in at least one alphanumeric value associated with tile 1210, here, an increased deal risk score, the at least one processor may be configured to replace the solid tile 1210 with a horizontally lined tile 1214, as shown in FIG. 12B.

In some embodiments, causing the first visual change includes determining an updated first set of visual characteristics by analyzing the first alphanumeric values of each item associated with each of the plurality of tiles. An updated first set of visual characteristics refers a revised set of visual characteristics. In one example, an updated first set of visual characteristics may refer to tile sizes or shapes that incorporate recent information received by the at least one processor. This may include changing the number of sizes or shapes associated with the plurality of tiles. For example, the initial arrangement may contain three different tile sizes, and the updated arrangement may contain four or more tile sizes. In one example, the plurality of tiles may represent various deals that a company is interested in pursuing. The tile size may vary based on the deal size. The processor may determine that three different tile sizes—small, medium, and large—are appropriate to convey deal size information in the initial arrangement, wherein small tiles correspond to deal sizes under 10 k, medium tiles correspond to deal sizes between 10 k and 100 k, and large tiles correspond to deals over 100 k.

However, as a company and its associated sales team pursue more deals, or multiple deals increase in value, the previous tile sizes may no longer accurately convey deal size information and/or the common objective. In this example, the at least one processor may analyze the first alphanumeric value of each item associated with each of the plurality of tiles, here, the deal size associated with each of the plurality of tiles, and determine that the number of deals worth over 100 k has increased, for example, from three deals to eight deals, such additional tile sizes are needed to accurately convey the plurality of sales deals. Updated tile sizes may also be required to more accurately convey the common objective, such as a quarterly or yearly sales goal. Accordingly, the processor may update the set of tile sizes to include small, medium, large, and extra-large tiles. In this example, small tiles may correspond to deal sizes under 10 k, medium tiles may correspond to deal sizes between 10 k and 100 k, large tiles may correspond to deal sizes between 100 k and 250 k, and extra-large tiles may correspond to deal sizes over 250 k.

In some embodiments, causing the first visual change includes determining an updated second set of visual characteristics by analyzing the second alphanumeric values of each item associated with each of the plurality of tiles.

By way of example only, an updated second set of visual characteristics may refer to tile colors, shading, or patterns that incorporate recent information received by the at least one processor. In the example where the plurality of tiles represents various deals that a company is interested in pursuing, the second visual characteristic, here, the tile pattern, may vary based on changes in deal risk. The at least one processor may analyze the risk score, here, the second alphanumeric value, associated with each deal and may determine that additional patterns are needed to accurately convey the risk score based on new risk factors that each new deal represents. For example, the at least one processor, in preparing the initial tile arrangement, may have previously evaluated deal risk based on information asymmetry and misaligned expectations. Now, based on new data associated with new sales deals that the processor analyzed over time, the processor may consider other factors such as overconfidence, emotional factors, legal and regulatory risks, market volatility, external influences, and inflexibility. In this example, the at least one processor may update the deal risk associated with each tile to determine that a risk score between 0 and 20 is a low-risk deal, a risk score between 20 and 40 is a medium-low-risk deal, a risk score between 40 and 60 is a medium-risk deal, a risk score between 60 and 80 is a medium-high-risk deal, and a score between 80 and 100 is a high-risk deal. In another example, it may be more helpful for a sales manager, in meeting a quarterly sales goal, to understand which sales deals are lower risk and which are higher risk. The at least one processor may analyze the second alphanumeric value associated with each of the plurality of tiles to evaluate that risk.

Accordingly, a tile corresponding to a low-risk deal may have a shaded fill pattern, a tile corresponding to a medium-low risk deal may have a checkered pattern, a tile corresponding to a medium-risk deal may have a horizontal line pattern, a tile corresponding to a medium-high risk deal may have a vertical line pattern, and a high-risk deal may have a cross-hatched pattern.

In some embodiments, causing the first visual change includes replacing the first visual characteristic adopted by the first tile with a different visual characteristic from the updated first set of visual characteristics. In the example above, the updated first set of visual characteristics refers to tile sizes or shapes that incorporate recent information received by the at least one processor. The at least one processor may replace a previous tile size with an updated tile size. In this example, the at least one processor may determine that a deal is worth 260 k, which was previously represented by a large tile. Based on the updated first set of visual characteristics, the at least one processor may replace the large tile with an extra-large tile to reflect the updated deal size information.

Figure 13A:
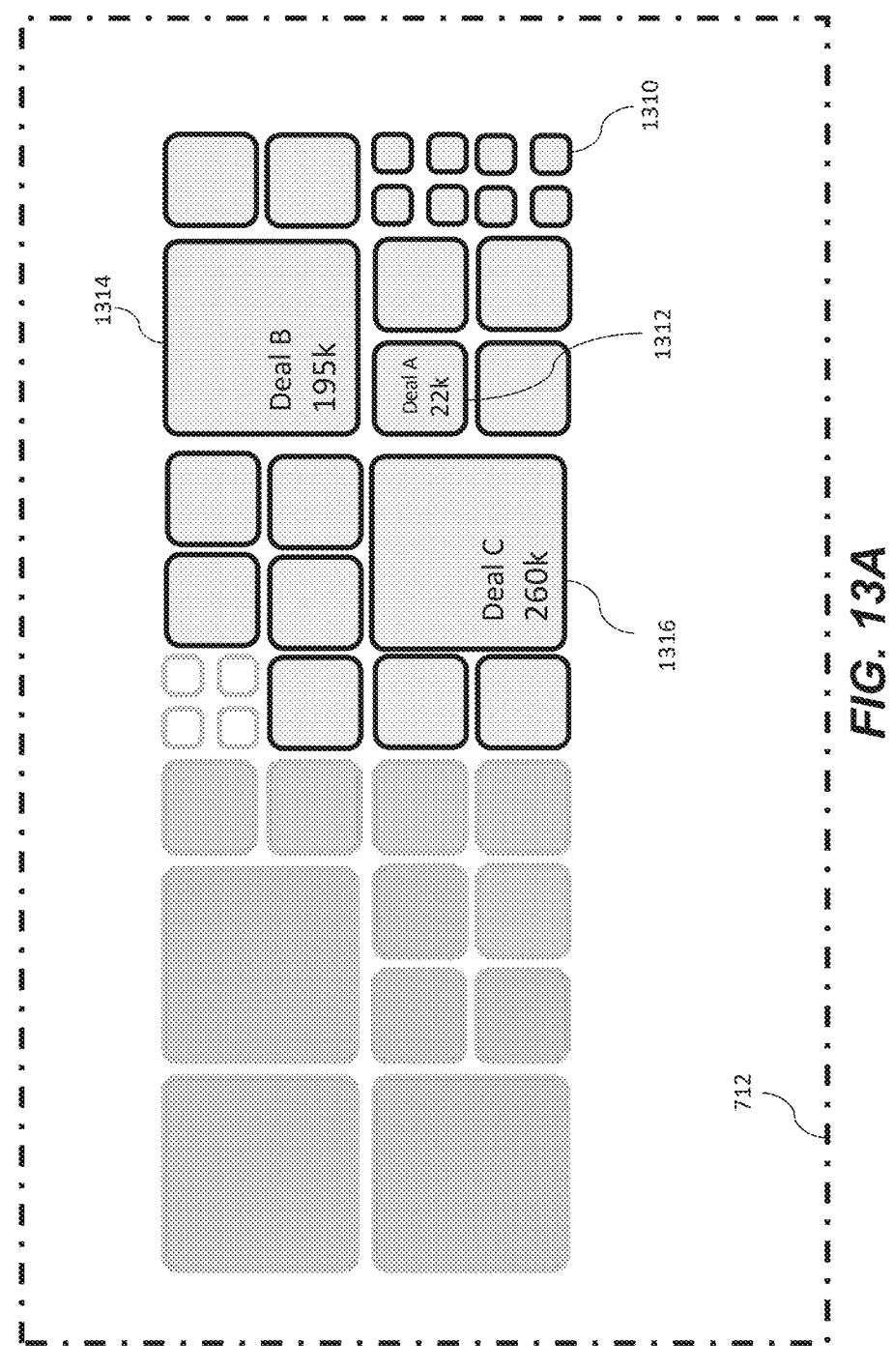
FIGS. 13A-13B are exemplary illustrations of arrangements of a plurality of tiles reflecting a first visual change based on an updated first visual characteristic, consistent with some disclosed embodiments.
Figure 13B:
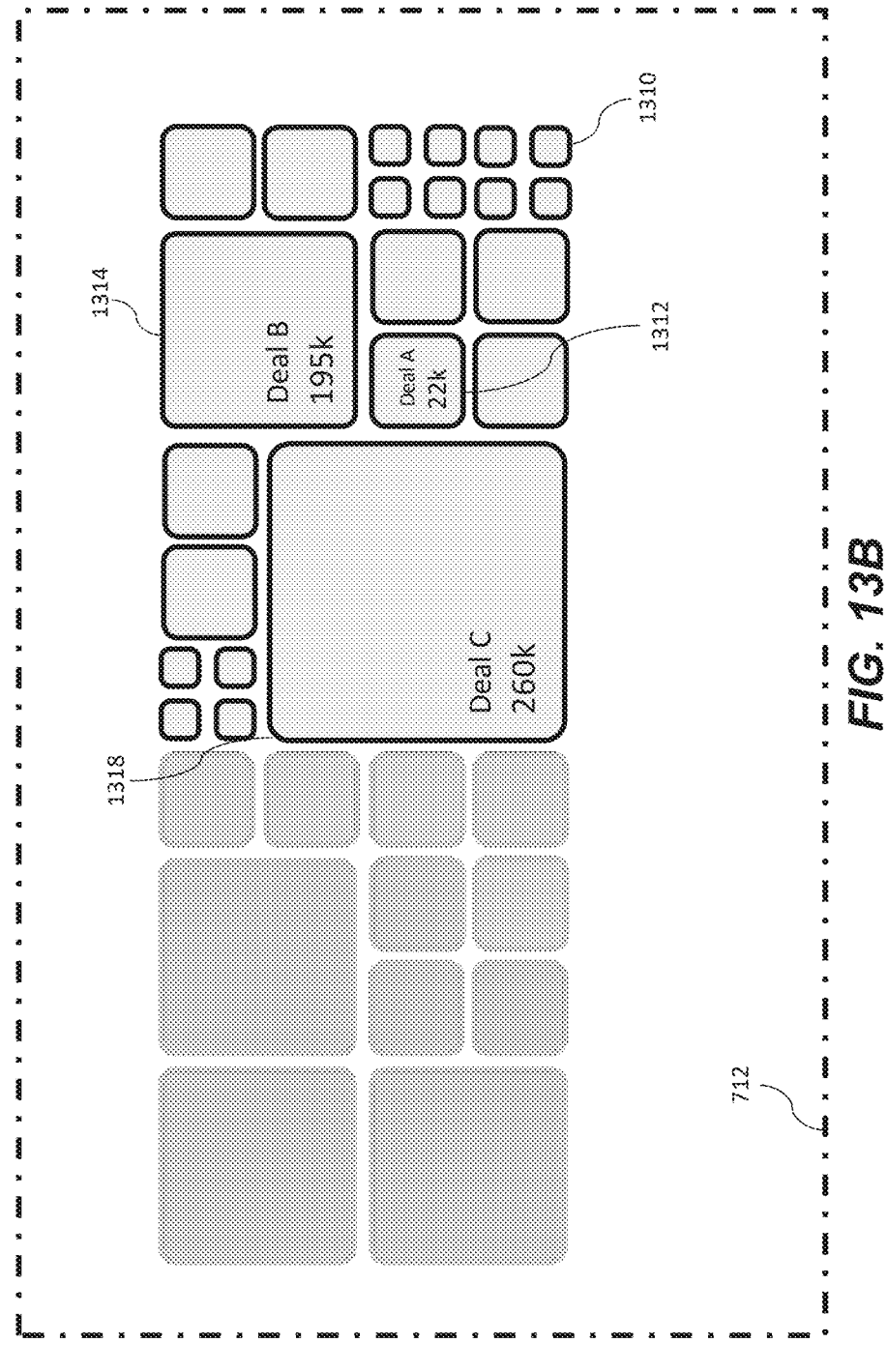

By way of example, FIGS. 13A-13B are exemplary illustrations of arrangements of a plurality of tiles reflecting a first visual change based on an updated first visual characteristic, consistent with disclosed embodiments. First referring to FIG. 13A, a plurality of tiles is displayed on display 712, each corresponding to a different deal a sales team is pursuing. In this example, tile 1310 is a small tile, which may correspond to a deal size under 10 k. Tile 1312 may be a medium tile, corresponding to a deal size between 10 k and 100 k. Tile 1312 may also contain an alphanumeric label corresponding to the deal title and the deal size. In this example, tile 1312 is labeled "Deal A," and is worth 22K. Tile 1314 may be a large tile, corresponding to a deal size between 100 k and 250 k. Tile 1314 may also contain an alphanumeric label corresponding to the deal title and the deal size. In this example, tile 1314 is labeled "Deal B," and is worth 195K. Tile 1316, may also be a large tile, corresponding to a deal size over 100 k. Tile 1316 may also contain an alphanumeric label corresponding to the deal title and the deal size. In this example, tile 1316 is titled "Deal C," and is worth 260 k.

FIG. 13B is an exemplary illustration of an arrangement of a plurality of tiles reflecting an updated first set of visual characteristics, consistent with disclosed embodiments. In this example, the at least one processor is configured to replace the large tiles with extra-large tiles if the deal is worth over 250 k. Accordingly, the at least one processor may replace large tile 1316 with extra-large tile 1318, which reflects the updated first set of visual characteristics. Here, the updated first set of visual characteristics incorporates extra-large tiles into the existing set of small, medium, and large tiles.

In some embodiments, causing the first visual change includes replacing the second visual characteristic adopted by the first tile with a different visual characteristic from the updated second set of visual characteristics. In the above example, the updated second set of visual characteristics refers to tile color, shading, or a tile pattern that incorporates recent information received by the at least one processor. The at least one processor may replace a previous tile pattern with an updated tile pattern based on an updated risk level associated with the deal. Additionally, the at least one processor may determine that, based on the number of pending deals, only three risk levels—low, medium, and high—may no longer accurately convey the risks associated with each deal. In one example, the at least one processor may determine that a deal that was previously categorized as "low risk," based on additional risk factors considered by the at least one processor, may be assigned a higher risk score corresponding to a medium-low-risk deal. In this example, the at least one processor may replace a solid-shaded tile with a checkered tile.

Figure 14A:
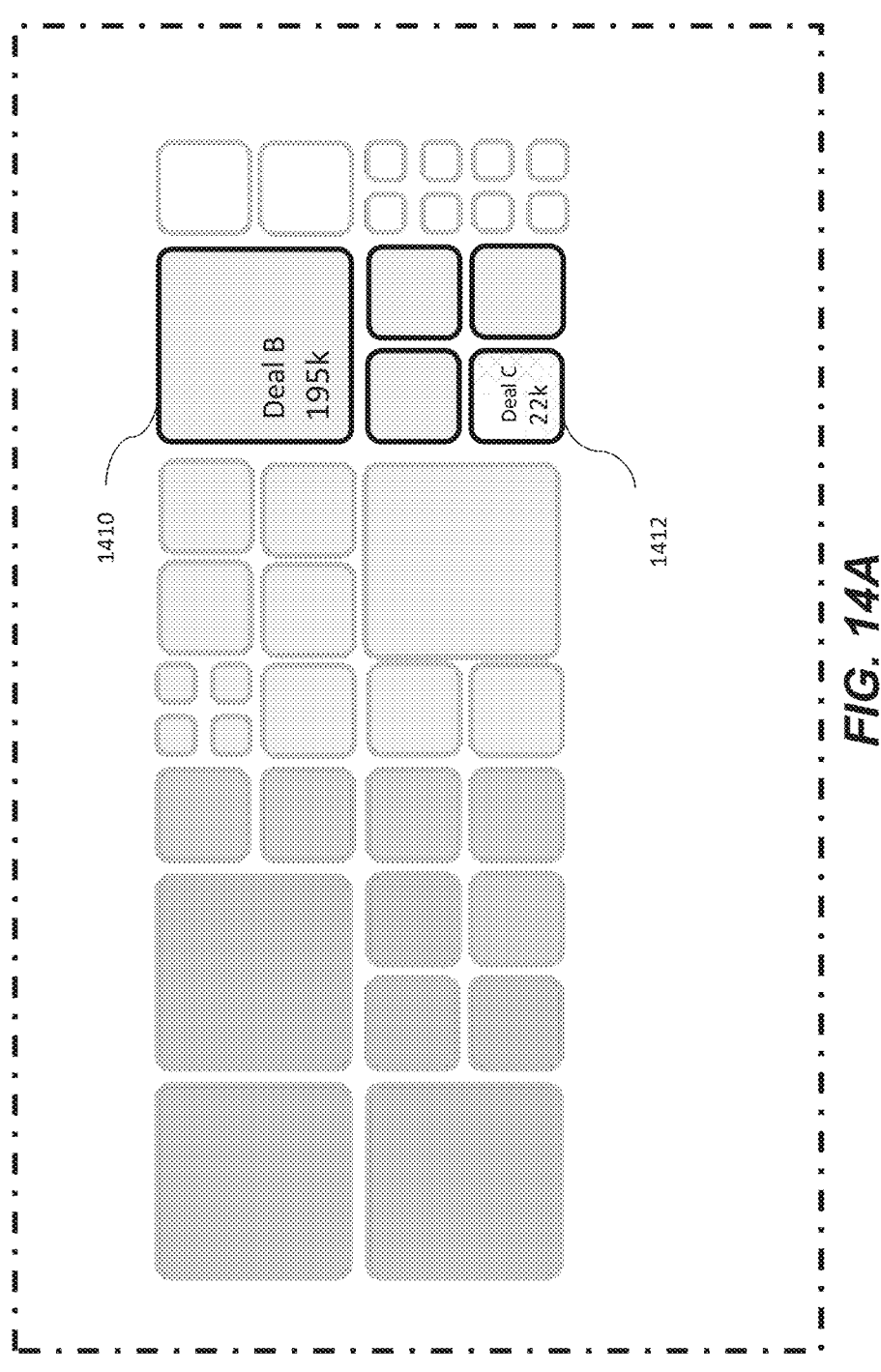
FIGS. 14A-14B are exemplary illustrations of arrangements of a plurality of tiles reflecting a first visual change based on an updated second visual characteristic, consistent with some disclosed embodiments.
Figure 14B:
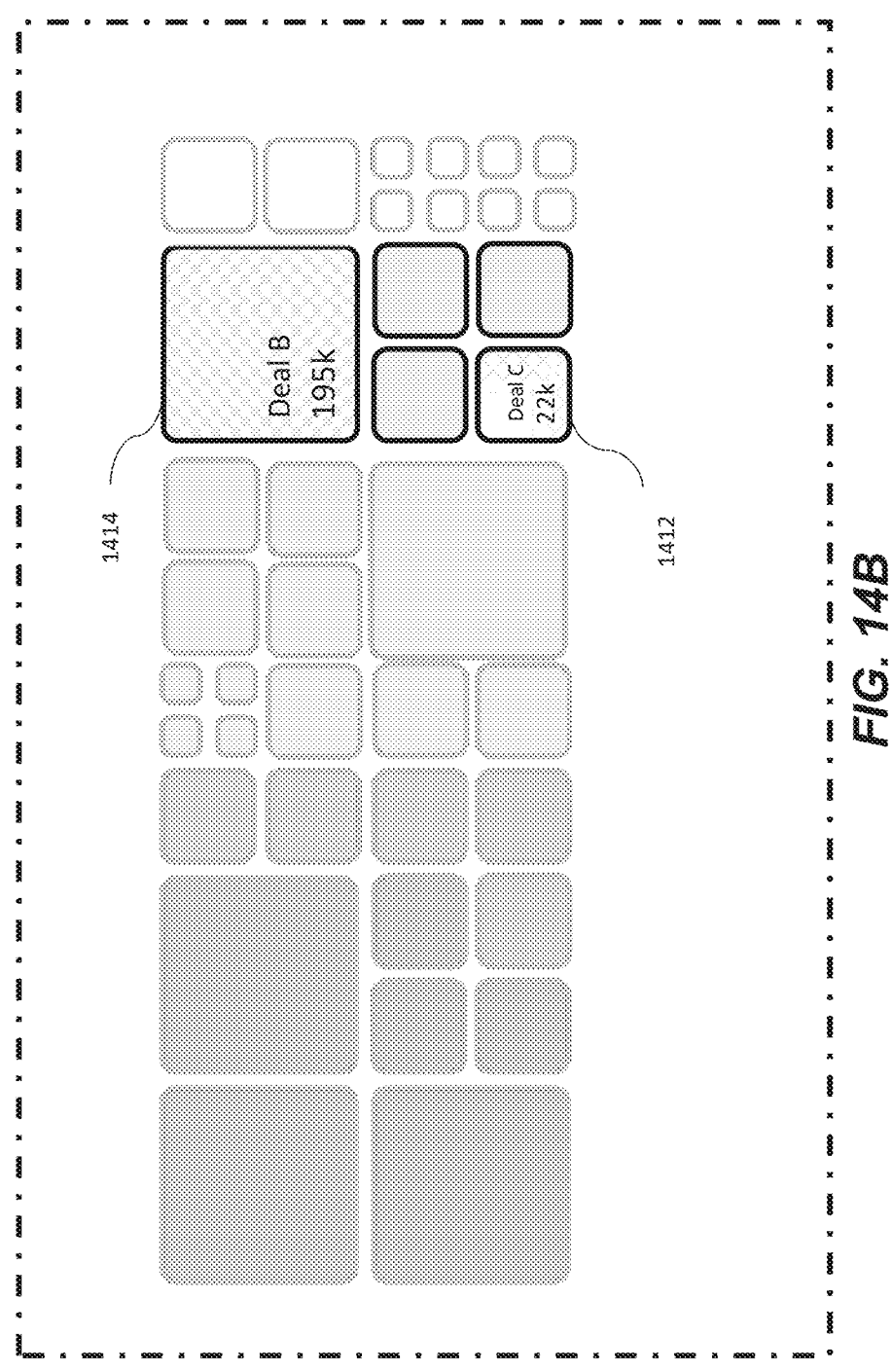

By way of example, FIGS. 14A-14B are exemplary illustrations of arrangements of a plurality of tiles reflecting a first visual change based on an updated second visual characteristic, consistent with disclosed embodiments. Referring to FIG. 14A, tile 1410, labeled as Deal B, may have a solid fill pattern, indicating that the sales deal is low-risk. Tile 1412, labeled as Deal C, may have a cross-hatch pattern, indicating that the sales deal is low-risk. However, as the company pursues more deals, each deal may involve a growing number of risk factors. Accordingly, the processor may be able to better evaluate deal risk based on an increased number of risk factors. In this example, three levels of risk—low, medium, and high—no longer accurately convey the risks associated with each deal, and more levels are required. Additionally, a manager or other user may configure the processor to determine an updated set of visual characteristics in order to better visualize a sales goal or objective.

Referring to FIG. 14B, the at least one processor may replace a second visual characteristic adopted by the first tile, tile 1410, Deal B, with a different visual characteristic from the updated second set of visual characteristics. The updated second set of visual characteristics may include the tile pattern. In this example, the at least one processor may replace tile 1410 with tile 1414, wherein tile 1414 has a checkered pattern. The checkered pattern may indicate that the risk score associated with the deal is in the medium-low range, rather than the low range. In this example, the risk level for tile 1412 may remain the same.

In some embodiments, the first visual change conveys information about the value change. Information about the value change refers to a data associated with a change in at least one of the first alphanumeric or second alphanumeric values associated with the first element (e.g., a first tile). This data may be stored in the memory associated with the at least one processor. A user may thus not be able to immediately perceive a value change, but he or she will be able to immediately perceive a visual change. For example, the at least one processor may determine that a deal associated with a first tile increased in value, which in turn leads to a first visual change associated with the first visual characteristic, here, an increase in the tile size. In this example, the user will be able to immediately discern from the first visual change that the deal size associated with the first tile increased.

Some embodiments include causing a second visual change in at least one of the first visual characteristic or the second visual characteristic of a second tile of the plurality of tiles in response to a value change in at least one of the first alphanumeric value or the second alphanumeric value of a first item associated with the first tile of the plurality of tiles. A second visual change refers to an alteration or modification that is perceptible by a user which occurs in addition to the first visual change. The second visual change may occur based on the first visual change. The second tile may be located adjacent to the first tile. The second tile may also be located nearby the first tile, i.e., within a certain number of tiles of the first tile. For example, the first tile may be within three adjacent tiles of the first tile. In another example, the second tile may be the same size, color, or pattern as the first tile.

In one example, a first tile increasing in size may cause the at least one processor to re-sort the plurality of tiles. Continuing with the above example, a second smaller tile may increase in size to accommodate the first tile increasing in size. Consistent with disclosed embodiments, the second smaller tile increasing in size corresponds to the second visual change associated with the second tile. In another example, the first tile increasing in size may cause the second tile to decrease in size. In yet another example, the first tile may change in color or pattern based on an increase or decrease in the deal risk score, which may in turn cause the second tile to change in color or pattern.

In yet another example, based on a value change associated with the first alphanumeric value or the second alphanumeric value of a first item associated with the first tile, the at least one processor may adjust the cutoff values associated with the first set of visual characteristics or the second set of visual characteristics, thereby causing a visual change in the second tile. Here, a deal associated with a first tile may increase in value, i.e., experience a value change associated with the first alphanumeric value. The first tile may increase in size. In this example, the increase in value associated with the first tile may cause the at least one processor to adjust the cutoffs associated with each of the small, medium, and large tiles. The at least one processor may adjust the cutoff values associated with each tile size to more accurately convey pending deal information. For example, initially the small tiles may be associated with deals under 10 k, medium tiles may be associated with deals between 10 k and 100 k, and large tiles may be associated with deals over 100 k. In this example, in response to the increase in deal size, the cutoff values 10 k and 100 k may be changed. For example, the cutoff values may be changed to 25 k and 100 k respectively. Thus, a small tile may now correspond to any deal under 25 k, a medium tile may correspond to any deal between 25 k and 100 k, and a large tile may correspond to any deal over 100 k. Thus, in this example, a medium sized tile representing a deal worth 20 k may change to a small tile when the cutoff values are changed.

Referring to FIG. 11A, the first visual characteristic is the tile size. In this example, a small tile may correspond to a deal under 10 k, a medium tile may correspond to a deal between 10 k and 100 k, and a large tile may correspond to a deal worth over 100 k. Tile 1110 may correspond to a deal worth 72 k and be labeled as "Deal A." In this example, tile 1110 is a medium tile. Tile 1112 may correspond to a deal 19K, labeled as "Deal B." In this example, tile 1112 is also a medium tile.

Turning to FIG. 11B, Deal A may increase in value to 150 k. The at least one processor may also determine that the deal size data in the plurality of tiles may be more clearly represented if the cutoff values between the small, medium, and large tiles change. Here, the at least one processor may adjust the plurality of tiles such that a small tile corresponds to any deal under 25 k, a medium tile corresponds to any deal between 25 k and 100 k, and a large tile corresponds to any deal over 100 k. This in turn may cause a second visual change in the first visual characteristic of a second tile of the plurality of tiles. In this example, the second visual change may be a decrease in tile size. Accordingly, the at least one processor may replace medium tile 1112 with small tile 106-5-16.

A value change in the first alphanumeric value or the second alphanumeric value of a first item associated with a first tile may a cause a second visual change in the second visual characteristic of a second tile. In this example, the second alphanumeric value of the first item associated with the first tile may be a potential deal's risk score. The deal's risk score may be visually represented by a pattern or color. In this example, the risk score associated with the first tile may increase, thereby causing a first visual change in that tile. The first visual change may cause a deal risk score associated with the second tile to decrease, thereby causing a change in color or pattern in the second tile. In another example, the at least one processor may cause a change in the second tile independent of a change to the first tile.

In another example, an increased risk score associated with the first tile may cause the at least one processor to change the risk score cutoffs associated with the other tiles in the plurality of tiles, including the second tile. In this example, a risk score ranging from 0 to 30 may initially reflect a low-risk deal, a risk score ranging from 30 to 70 may initially reflect a medium-risk deal, and a risk score ranging from 70 to 100 may initially reflect a high-risk deal. Here, the risk score associated with the first tile may increase from 30 to 50, and the at least one processor may adjust the cutoffs such that a risk score ranging from 0 to 40 may reflect a low-risk deal, a risk score ranging from 40 to 75 may reflect a medium-risk deal, and a risk score ranging from 75 to 100 may reflect a high-risk deal. In this example, a second deal associated with a second tile may have a risk score of 35, which was previously categorized as a medium-risk deal, but is now a low-risk deal. The change in risk score may therefore cause a second visual change in the second tile.

Referring to FIG. 12A, tile 1210, labeled as Deal A, may have solid shading, corresponding to a low-risk deal. The plurality of tiles may also contain a second tile, tile 1212, labeled as Deal B and corresponding to a medium-risk deal and represented by horizontal lines. The deal risk may be associated with a risk score, wherein a higher risk score corresponds to a higher-risk deal, and vice versa. The risk score associated with Deal A (tile 1210) may increase, for example, from 18 to 40. In this example, a low-risk deal may be any deal with a risk score between 0 and 30. Here, Deal A's risk score increase upgrades it to a medium-risk deal rather than a low-risk deal. Deal B may have a risk score of 32, which does not change.

The increased risk score associated with tile 1210 may increase the risk score cutoffs values for each of the plurality tiles included in display 712. For example, the at least one processor may update the cutoff for low-risk deals from 30 to 35. In this example, tile 1212, Deal B, whose risk score did not change, now has a low risk score because it is under 35.

In some embodiments, causing the second visual change includes replacing the first visual characteristic adopted by the second tile with a different visual characteristic from the first set of visual characteristics. As discussed herein, the second visual change may occur based on the first visual change.

In one example, the second tile may be a medium tile, and the first set of visual characteristics may be differing tile sizes. Based on a value change in the first alphanumeric value of the first item associated with the first tile, such as a change in deal size and/or a subsequent change in deal size cutoff value, the at least one processor may replace the second tile with a small tile. Continuing with an earlier example, an increase in deal size associated with the first tile causes a first visual change, but also adjusts the deal size cutoff values associated with other tiles in the plurality of tiles. In this example, the at least one processor may adjust the cutoff value for the plurality of tiles such that a small tile now corresponds to any deal under 25 k (where a small tile previously only corresponded to a deal under 10 k), a medium tile corresponds to any deal between 25 k and 100 k, and a large tile corresponds to any deal over 100 k. In this example, the second tile may be a deal worth 22 k. Accordingly, the value change in the first alphanumeric value associated with the first tile, the deal size, causes a second visual change in the second tile because the adjusted deal size cutoff values cause the second medium tile to be replaced by a small tile. Referring to FIG. 10B, the at least one processor may replace medium tile 1012 with small tile 106-4-16, based on the available visual characteristics in the first set of visual characteristics.

In some embodiments, causing the second visual change includes replacing the second visual characteristic adopted by the second tile with a different second visual characteristic from the second set of visual characteristics. The second set of visual characteristics may refer, for example, to a pattern, color, or shading associated with each tile. The tile pattern, color, or shading, in some examples, corresponds to the risk level of a sales deal that a company is pursuing. In this example, the at least one processor may determine that the risk score associated with a first tile increases. The increase in risk score associated with the first tile may cause a first visual change in the first tile, which in turn causes a second visual change in a second tile. As described herein, the at least one processor may adjust the risk score cutoff value based on the increased or decreased risk score associated with the first tile. In this example, a risk score ranging from 0 to 30 may initially reflect a low-risk deal, a risk score ranging from 30 to 70 may initially reflect a medium-risk deal, and a risk score ranging from 70 to 100 may initially reflect a high-risk deal. Here, the risk score associated with the first tile may increase from 30 to 40, and the at least one processor may adjust the cutoffs such that a risk score ranging from 0 to 35 may reflect a low-risk deal, a risk score ranging from 35 to 75 may reflect a medium-risk deal, and a risk score ranging from 75 to 100 may reflect a high-risk deal. A risk score associated with a second tile may have a risk score of 32, which does not change.

In this example, the risk score associated with the second tile may decrease based on the adjusted risk score cutoffs. Here, the second deal was previously a medium-risk deal, but based on the adjusted risk score cutoffs, was downgraded to a low-risk deal. Accordingly, the at least one processor may replace a pattern associated with a medium-risk deal, such as horizontal lines, with a pattern associated with a low-risk deal, such as a solid fill.

Referring to FIG. 12B, the at least one processor may, in response to the adjusted risk score cutoffs for the plurality of tiles, replace tile 1212, which has a horizontal line pattern, with tile 1216, which contains a solid fill pattern. As described elsewhere in this disclosure, a first tile's increase in risk score may adjust risk score cutoffs for other tiles in the plurality of tiles. For example, even though tile 1212's risk score did not change, tile 1210's, Deal A's, increase in risk score may adjust the cutoff such that tile 1212, Deal B, is now a low-risk deal. Consistent with disclosed embodiments, a horizontal line pattern may reflect a medium-risk deal, and the second tile may adopt this pattern based on the available visual characteristics in the second set of visual characteristics.

In some embodiments, causing the second visual change includes determining an updated first set of visual characteristics by analyzing the first alphanumeric values of each item associated with each of the plurality of tiles. As described herein, the first set of visual characteristics may no longer accurately convey deal sizes that a company is interested in pursuing. Similar to the analysis the processor performs when causing the first visual change, the at least one processor may determine that updated tile sizes are required to more accurately convey the common objective. In other words, determining an updated first set of characteristics when causing the second visual change is similar to determining an updated first set of characteristics when causing the first visual change as described elsewhere herein.

In some embodiments, causing the second visual change includes determining an updated second set of visual characteristics by analyzing the second alphanumeric values of each item associated with each of the plurality of tiles. Determining an updated second set of visual characteristics by analyzing the second alphanumeric values of each item associated with each of the plurality of tiles is similar to determining an updated second set of characteristics when causing the first visual change as described elsewhere herein.

In some embodiments, causing the second visual change includes replacing the first visual characteristic adopted by the second tile with a different visual characteristic from the updated first set of visual characteristics. Replacing the first visual characteristic adopted by the second tile is similar to replacing the first visual characteristic adopted by the first tile, as described elsewhere herein.

Figure 15A:
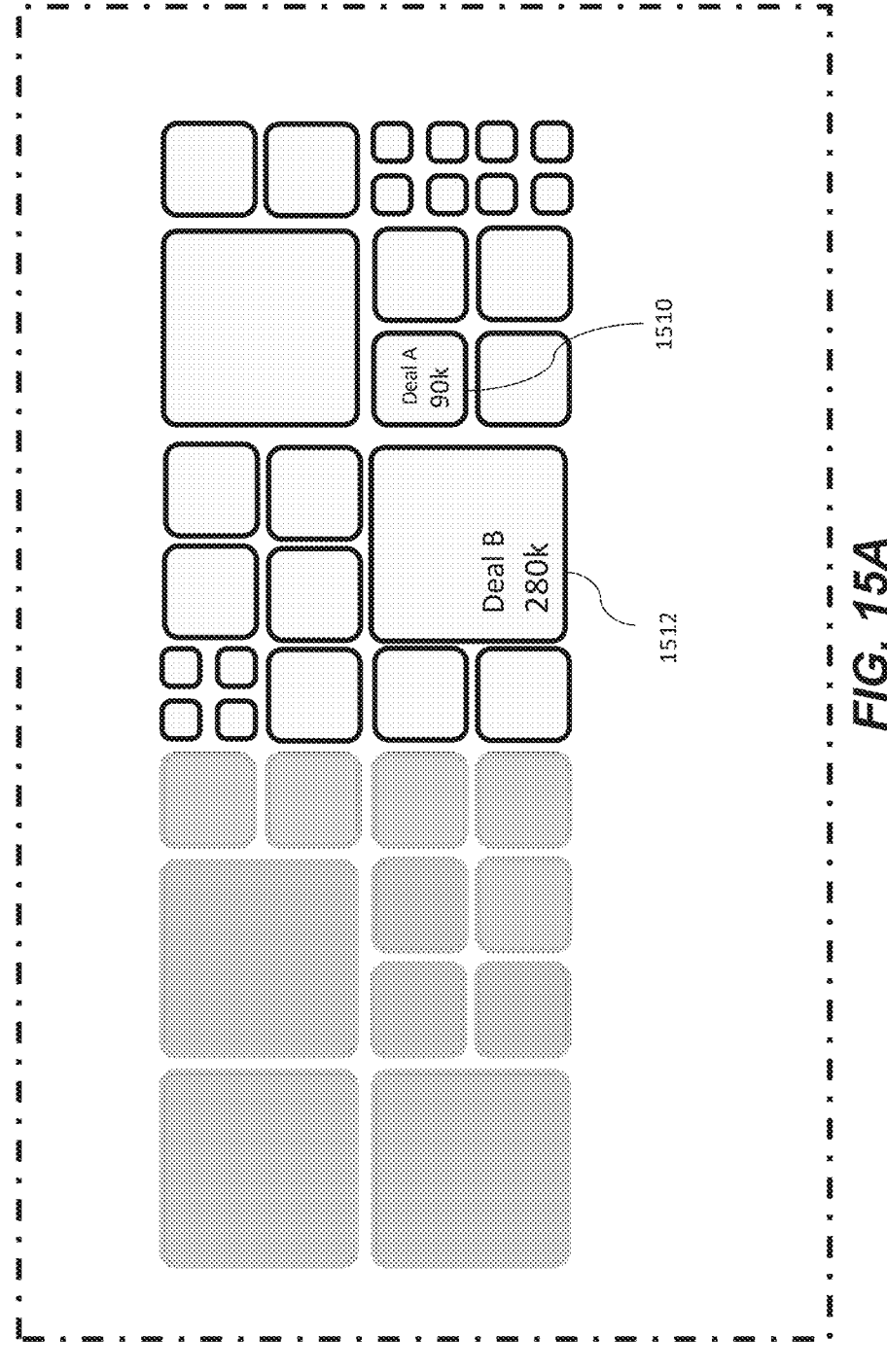
FIGS. 15A-15B are exemplary illustrations of arrangements of a plurality of tiles reflecting a second visual change based on an updated first visual characteristic, consistent with some disclosed embodiments.
Figure 15B:
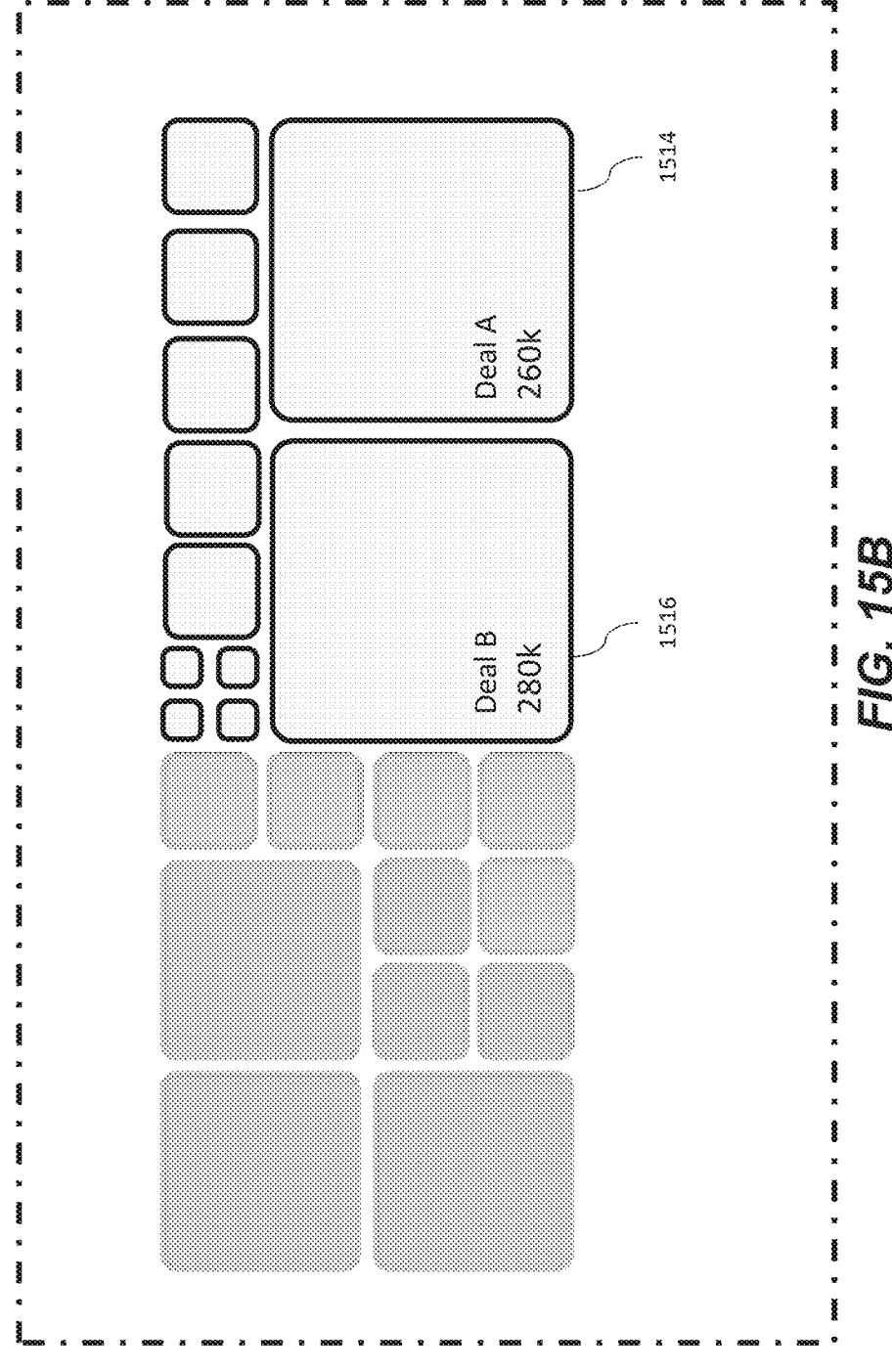

By way of example, FIGS. 15A-15B are exemplary illustrations of arrangements of a plurality of tiles reflecting a second visual change based on an updated first visual characteristic, consistent with disclosed embodiments. Turning to FIG. 15A, tile 1510 may be a medium tile, corresponding to a deal size between 10 k and 100 k. Tile 1510 may be worth 90 k. Tile 1510 may also be labeled as "Deal A." Tile 1512 may be a large tile, corresponding to a deal size over 100 k. Tile 1512 may be worth 280 k. Tile 1512 may also be labeled as "Deal B."

Turning to FIG. 15B, Deal A may increase in size from 90 k to 260 k. The at least one processor may update the first set of visual characteristics to add an extra-large tile to the existing first set of small, medium, and large tiles. In this example, increasing the deal size of the first tile, i.e., a value change in the first alphanumeric value associated with the first tile, causes the at least one processor to associate deals over 250 k with an extra-large tile. Here, the at least one processor may replace medium tile 1510 with extra-large tile 1514. In response to the updated first set of visual characteristics and the value change associated with the first tile, the at least one processor may replace large tile 1512 with extra-large tile 1516.

In some embodiments, causing the second visual change includes replacing the second visual characteristic adopted by the second tile with a different visual characteristic from the updated second set of visual characteristics. Replacing the second visual characteristic adopted by the second tile with a different visual characteristic from the updated second set of visual characteristics is similar to replacing the second visual characteristic adopted by the first tile, as described herein.

Figure 16A:
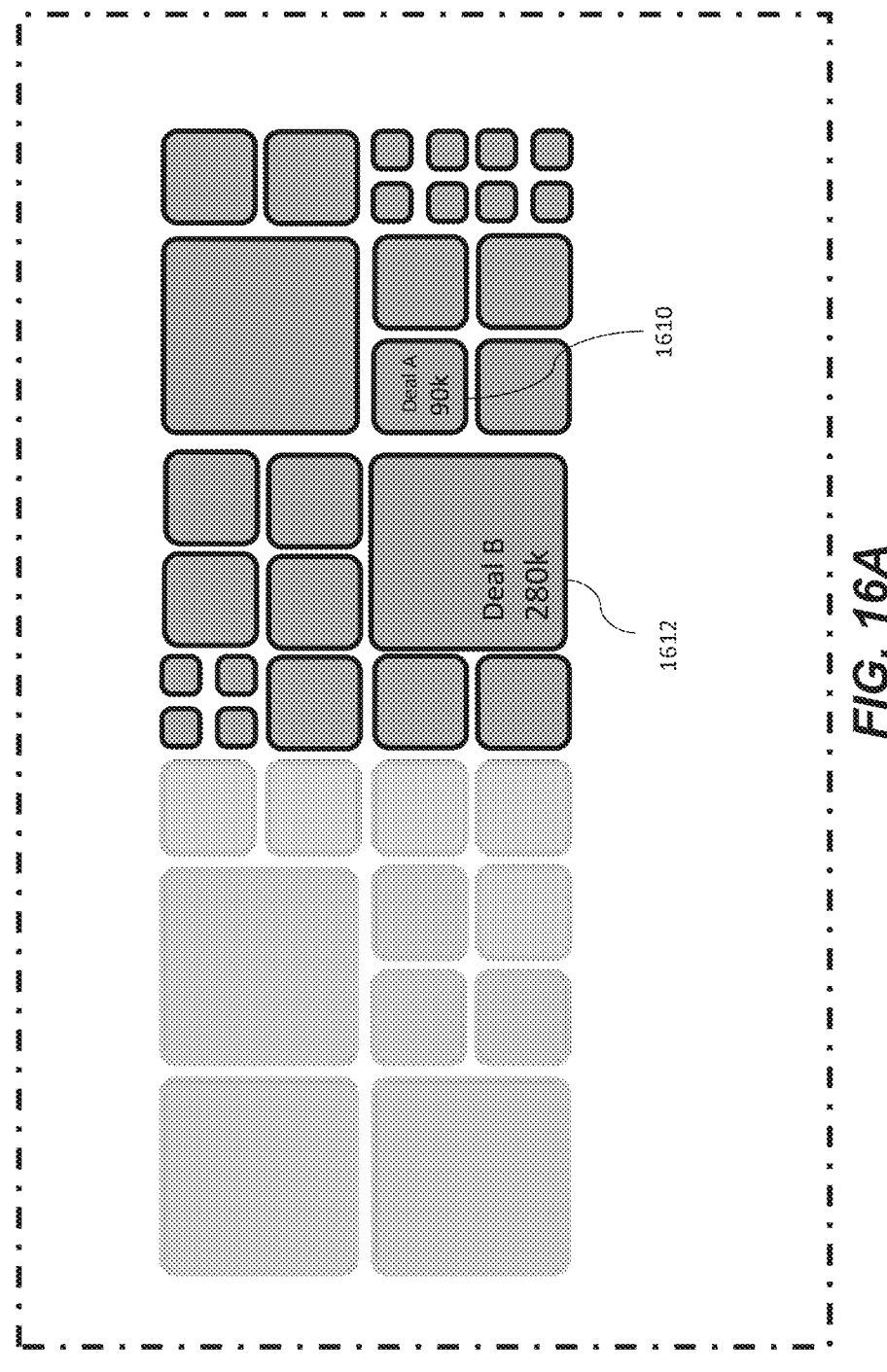
FIGS. 16A-16B are exemplary illustrations of arrangements of a plurality of tiles reflecting a second visual change based on an updated second visual characteristic, consistent with some disclosed embodiments.
Figure 16B:
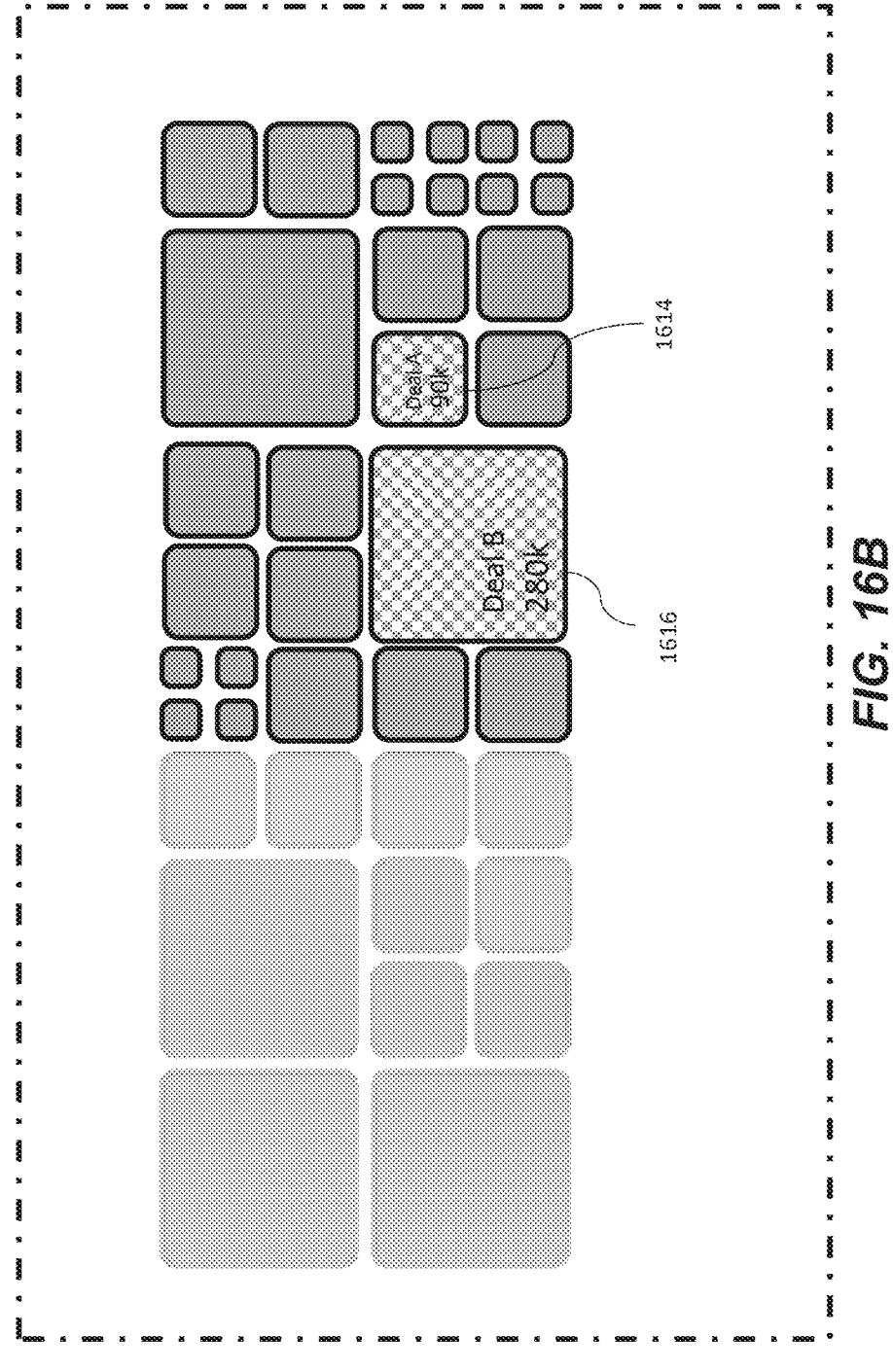

By way of example, FIGS. 16A-16B are exemplary illustrations of arrangements of a plurality of tiles reflecting a second visual change based on an updated second visual characteristic, consistent with disclosed embodiments. Referring to FIG. 16A, tile 1610 is a first deal associated with a low-risk score. Tile 1612 is also a deal associated with a low risk score. The at least one processor may increase tile 1610's risk score based on factors discussed elsewhere in this disclosure. This change may represent a value change in a second alphanumeric value of an item associated with the first tile in a plurality of tiles. In this example, the change is risk score associated with tile 1610 may adjust the risk score cutoffs for other tiles in the plurality of tiles, including second tile 1612.

Turning to FIG. 16B, the at least one processor may, in response to the increased risk score associated with tile 1610 and/or the adjusted risk score cutoff, replace solid tile 1610 with checkered tile 1614. In this example, the visual change associated with tile 1610 causes a second visual change associated with tile 1612. The at least one processor may replace solid tile 1612 with checkered tile 1616.

In some embodiments, the second visual change conveys information about the value change. A user may not be able to immediately perceive a value change, but he or she may be able to immediately perceive a visual change. For example, the at least one processor may determine that a deal associated with a first tile increased in value, which in turn leads to a first visual change associated with the first visual characteristic, here, an increase in the tile size. Consistent with disclosed embodiments and the examples discussed herein, the value change in at least one of the first alphanumeric value or the second alphanumeric value associated with a first tile may cause a second visual change in a second tile of the plurality of tiles. For example, the at least one processor may adjust the cutoff values associated with the first set of visual characteristics or the second set of visual characteristics, thereby causing a visual change in the second tile.

In this example, the increase in value associated with the first tile may cause the at least one processor to adjust the cutoffs associated with each of the small, medium, and large tiles. The at least one processor may adjust the cutoff values associated with each tile size to more accurately convey pending deal information. For example, initially the small tiles may be associated with deals under 10 k, medium tiles may be associated with deals between 10 k and 100 k, and large tiles may be associated with deals over 100 k. In this example, in response to the increase in deal size, the cutoff values 10 k and 100 k may be changed. For example, the cutoff values may be changed to 25 k and 100 k respectively. Thus, a small tile may now correspond to any deal under 25 k, a medium tile may correspond to any deal between 25 k and 100 k, and a large tile may correspond to any deal over 100 k. Thus, in this example, a medium sized tile representing a deal worth 20 k may change to a small tile when the at least one processor adjusts the deal size cutoff values.

Accordingly, the first tile increasing in size may cause the second tile to decrease in size. In this example, the second tile decreasing in size may be the second visual change. The second tile decreasing in size may convey to a user that the second deal decreased in value relative to other deals associated with the plurality of tiles, even though the actual value of the second deal stayed the same. Similarly, an increase in risk score, and an accompanying change in pattern, may cause a second visual change in a second tile, even though the second tile does not experience a change in risk score.

In some embodiments, each item associated with each of the plurality of tiles further includes a third characteristic having a third alphanumerical value, and the initial arrangement corresponds to the plurality of tiles being arranged in an organizational structure dividing the plurality of tiles into distinct collections based on partitioning groups determined by analyzing the third alphanumerical values of each item associated with each of the plurality of tiles.

A third characteristic refers to a third type of information associated with the item. A third characteristic may be chosen from the group from which the first and second characteristics are described, consistent with this disclosure. For example, the first characteristic may be a deal's value, the second characteristic may be the deal's risk, and the third characteristic may be the deal's phase in the sales process.

An organizational structure refers to any method of grouping objects based on certain qualities or characteristics associated with the objects. Distinct collections refer to groups or sets of entities that are gathered or categorized together based on shared characteristics or criteria, as described and exemplified elsewhere in this disclosure. Partitioned refers to being separated or otherwise divergent from other tiles. The at least one processor may analyze the third alphanumerical value of each item associated with each of the plurality of tiles and may divide the plurality of tiles into distinct collections. The third alphanumeric value may contain information related to the deal's phase.

The at least one processor may be configured to analyze the third alphanumeric value to determine the deal's phase. For example, the at least one processor may be configured to visually represent the deal's phases as either "Won," "Negotiation," "Proposal," or "Evaluation," as described and exemplified elsewhere in this disclosure. In this example, the at least one processor may associate the third characteristic with distinct shading or colors. Here, the at least one processor may arrange the tiles in distinct collections based on the deal's phase.

In some embodiments, the tiles of the plurality of tiles are further arranged within the distinct collections based on the first set of visual characteristics and the second set of visual characteristics. In the above example, the tiles are arranged based on the phase of each respective deal. Here, the tiles may be further arranged based on the first set of visual characteristics, i.e., tile size, and the second set of visual characteristics, i.e., tile pattern or tile color.

In one example, the tiles may be arranged in a distinct collection based on whether the deal is in the "Evaluation" phase. Of the deals that are in this phase, the at least one processor may be further configured to arrange the tiles according to size and/or tile pattern. In this example, all large tiles may be grouped together, and/or all tiles may be grouped together based on the tile pattern associated with a deal risk.

In some embodiments, the first tile and the second tile are within a same distinct collection. For example, the first and second tile may both correspond to deals that are in the "Evaluation" phase. The distinct collection may only include deals that are in the same deal phase. The first and second tile may be of the same shape, corresponding to deal size, and the same pattern, corresponding to deal risk, as discussed and exemplified elsewhere in this disclosure.

Referring to FIG. 8, the plurality of tiles may be divided into distinct collections based on a third characteristic having a third alphanumeric value. The display 812 may contain a legend 818 that contains information related to the third characteristic having a third alphanumeric value, i.e., the phase of deal. Legend 818 may specify various phases of a sales deal, including "Evaluation," "Proposal," "Negotiation," and "Won." In this example, tiles 814 and 816 are in the same distinct collection, corresponding to the "Evaluation" phase of a sales deal. The third characteristic may be visually represented by shading or color. In this example, all tiles corresponding to the "Evaluation" deal phase are a certain shade, such as light gray. Tiles corresponding to the other deal phases may be different shades. For example, tile 820 may be part of a distinct grouping involving sales deals in the "Proposal" phase, corresponding to a darker shade of gray. Tile 822 may be part of a distinct grouping involving sales deals in the "Negotiation" phase, corresponding to a darker shade of gray. Tile 824 may be part of a distinct grouping involving sales deals in the "Won" phase, corresponding to a still darker shade of gray. In this example, tiles 824 and 826 are grouped together because they both correspond to large deals, are medium-risk deals (based on the horizontal line shading), and are part of the same deal phase, "Won."

In some embodiments, at least one of the first alphanumerical values or the second alphanumerical values of each item associated with each of the plurality of tiles are relative alphanumerical values. Relative alphanumerical values refer to alphanumeric data that may be compared with each other (as may occur for example, when multiple values share a common unit of measurement or other common category indicator, as discussed and exemplified elsewhere in this disclosure. Referring to FIG. 8, tiles 824 and 826 may contain a horizontal line pattern, corresponding to a medium-risk score. In this example, a medium risk score may correspond to a risk score between 30 and 70, wherein a deal's risk score ranges from 0 to 100.

Some embodiments include causing a third visual change in at least one of the first visual characteristic or the second visual characteristic of a third tile of the plurality of tiles. As discussed herein, a visual change refers to an alteration or modification that is perceptible by a user. The third visual change may be in addition to the first change and the second visual change. In one example, the third tile may be adjacent to the first and second tiles. In another example, the third tile may not be adjacent to the first and second tiles, but may be in the same distinct collection as the first and second tiles. In yet another example, the third tile may be positioned in a distinct collection different from the first and second tiles.

The third visual change may be based on the first visual characteristic or the second visual characteristic. In one example, the first visual characteristic may be the third tile's size, and the second visual characteristic may be the third tile's color. Here, the third visual change may involve changing the third tile's size.

In one example, a small tile may correspond to a deal size under 10 k, a medium tile may correspond to a deal between 10 k and 100 k, and a large tile may correspond to a deal over 100 k. In this example, a deal associated with a first tile in the plurality of tiles—Deal A—may increase in size from 50 k to 120 k. In this example, the at least one processor may also determine that, in response to the increase in Deal A's value, deal size data may be more clearly represented if the cutoff values between the small, medium, and large tiles change.

In this example, the at least one processor may adjust the cutoff value for the plurality of tiles such that a small tile now corresponds to any deal under 25 k, a medium tile corresponds to any deal between 25 k and 100 k, and a large tile corresponds to any deal over 100 k. The cutoff value adjustment may cause a second visual change in a second tile, as well as a third change in a third tile. For example, a second deal corresponding to a second tile, i.e., Deal B, may be worth 15 k, and a third deal corresponding to a third tile, i.e., Deal C, may be worth 12 k. Both Deal B and Deal C may have been previously represented by a medium tile. However, based on the adjusted cutoff values, the at least one processor may replace each of the medium tiles corresponding to Deals B and C with small tiles.

Figure 17A:
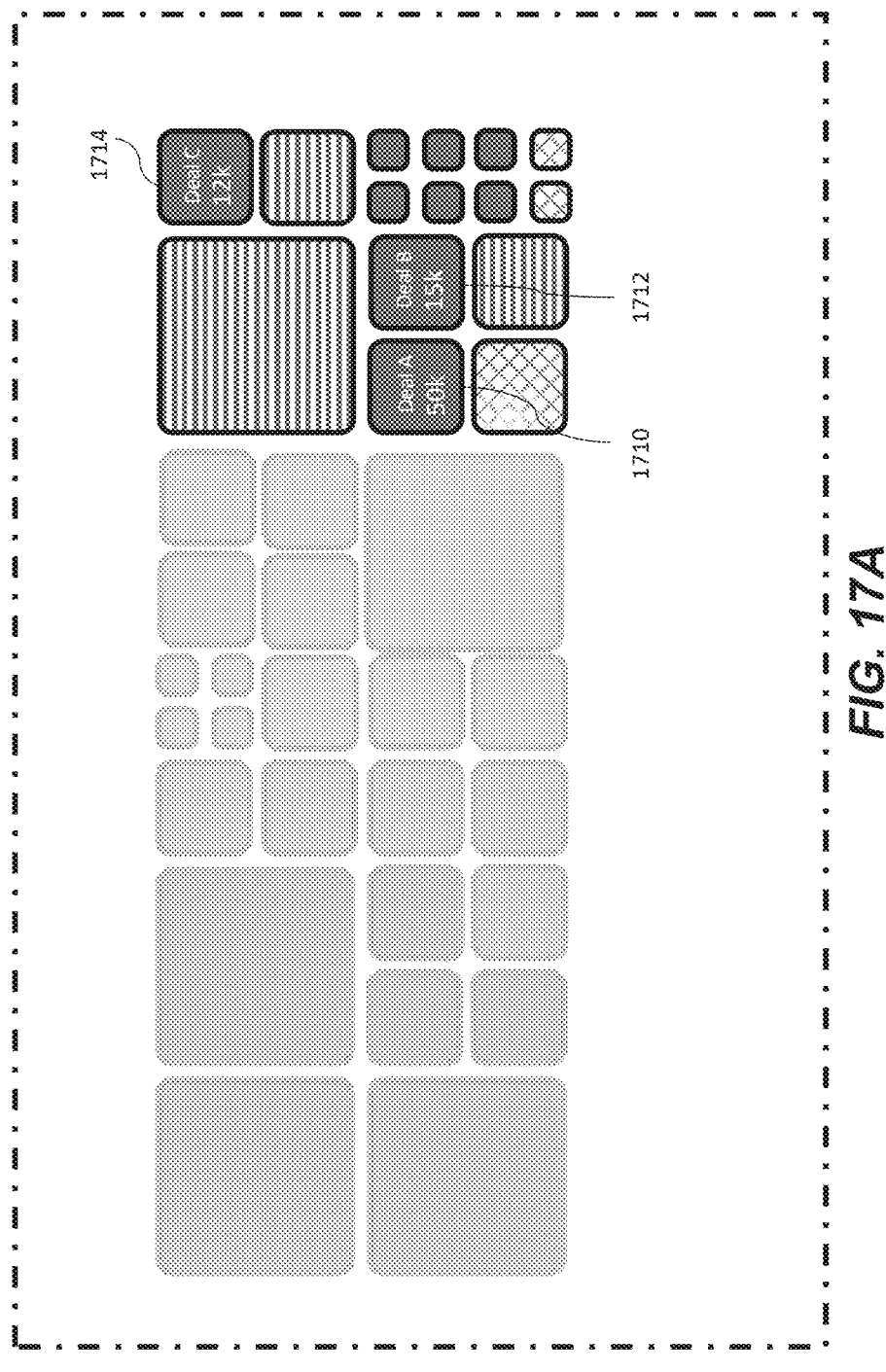
FIGS. 17A-17B are exemplary illustrations of arrangements of a plurality of tiles reflecting a third visual change in a first visual characteristic consistent with some disclosed embodiments.
Figure 17B:
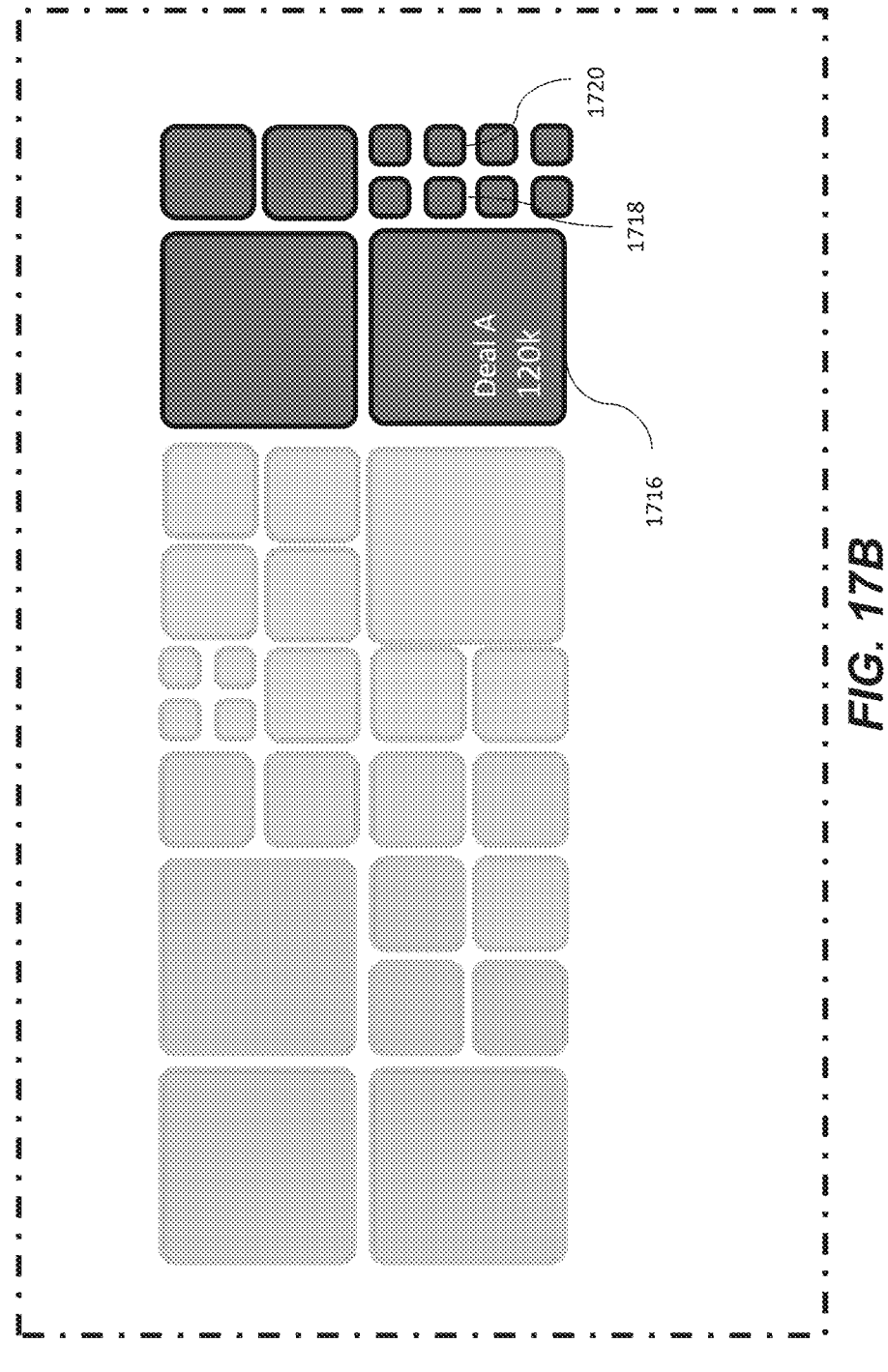

By way of example, FIGS. 17A-17B are exemplary illustrations of arrangements of a plurality of tiles reflecting a third visual change in a first visual characteristic. FIG. 17A may contain a first tile 1710, a second tile 1712, and a third tile 1714. Tile 1710 may be labeled as "Deal A," tile 1712 may be labeled as "Deal B," and tile 1714 may be labeled as "Deal C." In this example, Deal A may be worth 50 k, Deal B may be worth 15 k, and Deal C may be worth 12 k. In this example, each of tiles 1710, 1712, and 1714 may be represented by medium tiles.

Turning to FIG. 17B, Deal A may increase in value to 120 k. The at least one processor may replace medium tile 1710 with large tile 1716. In this example, the at least one processor may adjust the tile size cutoffs such that a small tile now corresponds to any deal under 25 k, a medium tile corresponds to any deal between 25 k and 100 k, and a large tile corresponds to any deal over 100 k. In this example, the at least one processor may therefore replace medium tile 1712 with small tile 1718, and may also replace medium tile 1714 with small tile 1720.

The third visual change may be also based on the second visual characteristic, wherein the second visual characteristic is the tile's color or pattern. In this example, the second visual characteristic may correspond to a deal's risk score. As described herein, the processor may be able to better evaluate deal risk based on an increased number of risk factors. In this example, the at least one processor may determine that the risk score of a deal associated with a first tile has increased, which consistent with this disclosure, may cause a second visual change in a second tile in the plurality of tiles, and a third visual change in the third tile in a plurality of tiles. Different risk scores may be represented by different patterns in the plurality of tiles. A low-risk deal may be represented by a solid-color pattern. A medium-risk deal may be represented by horizontal lines. A high-risk deal may be represented by cross-hatching.

Figure 18A:
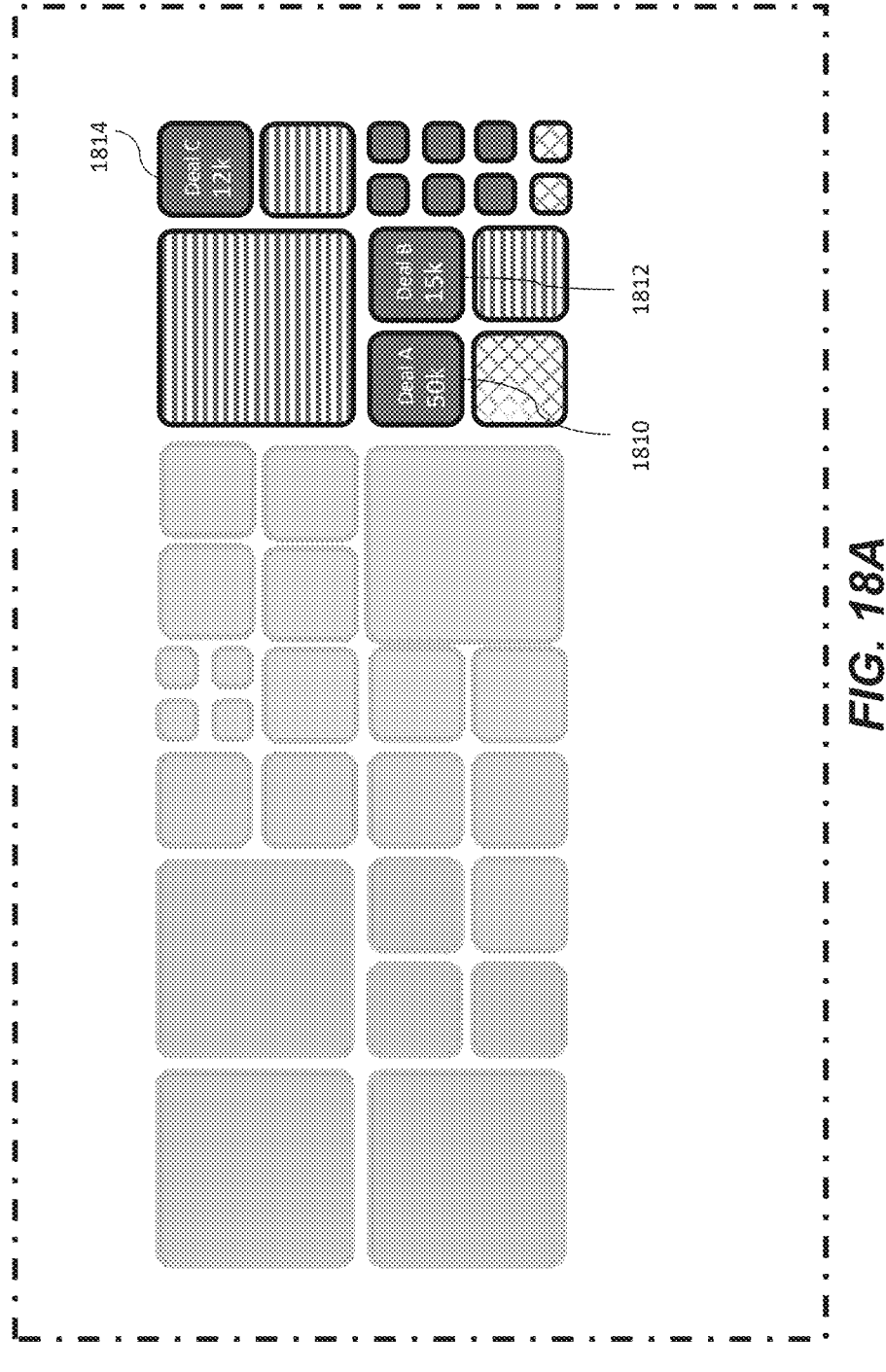
FIGS. 18A-18B are exemplary illustrations of arrangements of a plurality of tiles reflecting a third visual change in a second visual characteristic, consistent with some disclosed embodiments.
Figure 18B:
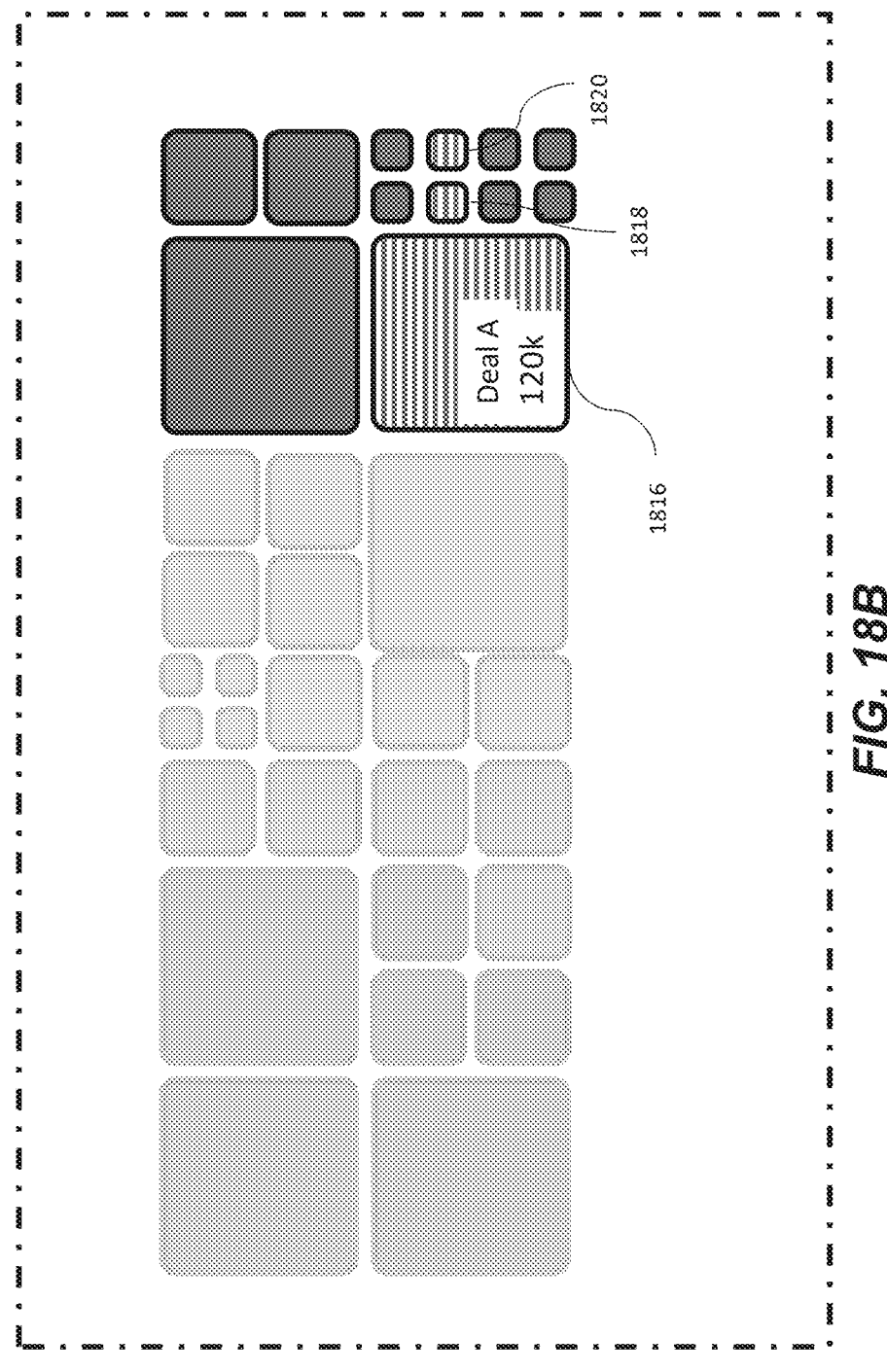

By way of example, FIGS. 18A-18B are exemplary illustrations of arrangements of a plurality of tiles reflecting a third visual change in a second visual characteristic, consistent with disclosed embodiments. Referring to FIG. 18A, tile 1810 (Deal A) may be initially associated with a low risk score, indicated by solid shading. However, Deal A may increase in risk, thereby changing tile 1810's pattern. A change in risk score may also cause a change in risk score associated with tiles 1812 (Deal B) and 1814 (Deal C), based on, for example, a change in deal risk score cutoff value. In another example, the at least one processor may adjust risk score cutoffs based on a variety of risk factors associated with each of Deals A, B, and C.

Turning to FIG. 18B, first tile 1810 may increase in risk from low-risk to medium risk. The at least one processor may replace low-risk tile 1810 with medium risk tile 1816, containing a horizontal line pattern. Deal A's change in risk score may also cause a change in risk score in second tile 1812 and third tile 1814. In this example, the at least one processor may replace low-risk tiles 1812 and 1814 with medium-risk tiles 1818 and 1820. It may be appreciated that the different patterns are merely an example of this set of second visual characteristics. Instead of shades of grey, different colors such as red, orange, yellow, and green may also be used, for example.

By way of example, FIG. 19 is a flowchart illustrating an exemplary method 1910 for arranging discrete graphical elements having a plurality of graphical characteristics that convey representations of alphanumeric data in a non-alphanumeric manner, consistent with disclosed embodiments. Method 1910 is discussed herein for explanatory purposes and is not intended to be limiting. In some embodiments, steps of method 1910 may be changed, modified, substituted, or rearranged, consistent with the present disclosure. Method 1910 may be implemented using one or more components of a computing device or user device, as described an exemplified elsewhere in this disclosure. Some disclosed embodiments may include at least one processor that may be configured to execute stored instructions to perform operations for converting stored alphanumeric data into discrete graphical elements having a plurality of graphical characteristics that convey representations of the alphanumeric data in a non-alphanumeric manner. As shown in FIG. 19, method 1910 includes steps 1912 through 1926, discussed in further detail below.

Method 1910 may contain step 1912, wherein the at least one processor may cause an initial arrangement of a plurality of tiles on a display. At step 1914, the at least one processor may associate each of the plurality of tiles with an item including a first characteristic having a first alphanumeric value and a second characteristic having a second alphanumeric value, and each item is associated with a common objective. At step 1916, each tile may adopt a visual characteristic from a first set of visual characteristics, and a second visual characteristic from a second set of visual characteristics. At step 1918, the processor may ensure that each tile has a unique position within the initial arrangement. At step 1920, the processor may be configured to convey, via the plurality of tiles, a visualization of progress toward the common objective. At step 1922, the at least one processor may, in response to a value change in at least one of the first alphanumeric value or the second alphanumeric value of a first item associated with a first tile of the plurality of tiles, cause a re-sorting of the tiles to an updated arrangement differing from the initial arrangement. At step 1924, the at least one processor may cause a first visual change in at least one of the first visual characteristic or the second visual characteristic of the first tile. At step 1926, the at least one processor may cause a second visual change in at least one of the first visual characteristic or the second visual characteristic of a second tile of the plurality of tiles.

In some instances, it may be useful to transform aggregate values of items to visual elements for comparison. For example, items may be categorized according to various criteria, and it may be useful to visually compare aggregate costs for each category. Embodiments are disclosed for presenting aggregate values of different categories and/or groupings of items visually.

Some disclosed embodiments involve toggling between different arrangements of discrete graphical elements having a plurality of graphical characteristics conveying representations of alphanumeric data in a non-alphanumeric manner. Discrete graphical elements refers to individual visual components that are distinct from one another, enabling visual comparison between them, as described elsewhere herein. Toggling refers to switching alternating, and/or changing from one to another. Alphanumeric data refers to data composed of either or both letters (alphabetic) and numbers, as described elsewhere herein. Different arrangements of discrete graphical elements refers to dissimilar, distinct, and/or varying organizations, orders, layouts, and/or positionings of discrete graphical elements, e.g., into groupings, as described elsewhere herein. For example, at least one processor may generate multiple partitions for a plurality of discrete graphical elements, each partition organizing the graphical elements into a different set of grouping (e.g., subsets) based on one or more characteristics. The at least one processor may position the groupings of each partition according to different layouts, orders, patterns, hierarchies, and/or locations on a visual display. Graphical characteristics refer to visual, illustrative, and/or pictorial attributes. Some examples of graphical characteristics may include a shape, a color, a size, a dimension, a texture, a position, an orientation, an alignment, a transparency, brightness, and/or saturation setting, and/or any other visual attribute for displaying content in a visual display. To convey refers to communicate, express, and/or indicate. In a non-alphanumeric manner refers to using symbols other than text (e.g., characters and/or number) to communicate and/or express information. For example, information encoded using alphanumeric symbols may be converted and/or translated to a different encoding scheme including non-alphanumeric symbols. Such non-alphanumeric symbols may include graphical forms having distinct visual characteristics (e.g., different sizes, colors, shapes, and/or styles) for conveying different pieces of information. In some embodiments, this approach may enable alphanumeric data to be interpreted visually rather than through traditional text-based methods, as described elsewhere herein. Representations of alphanumeric data in a non-alphanumeric manner refers to depictions, illustrations, and/or portrayals of information, originally encoded using alphanumeric symbols, transformed to an encoding scheme including non-alphanumeric symbols.

Some disclosed embodiments involve causing an initial arrangement of a plurality of tiles on a display. Causing refers to invoking, producing, and/or effecting. A tile refers to a discrete graphical element/representation or block that may visually encapsulate data related to an item, as described elsewhere herein. A tile may assume a square, rectangular, circular, oval, polygon, and/or any other geometric and/or closed shape. An initial arrangement of a plurality of tiles refers to a first and/or introductory layout and/or organization of tiles. A display refers to any presentation by a physical device capable of conveying a visual presentation of data (e.g., a LED, OLED, and/or LCD monitor/screen; or any other technology for physically or virtually displaying information. Such virtual displays may be associated with AR, MR, or XR presentations.), as described elsewhere herein. Thus, at least one processor may determine positions, orientations, sizes, colors, and/or any other display attribute for presenting a plurality of tiles on a visual display, and activate selected pixels of the display accordingly.

Figure 20:
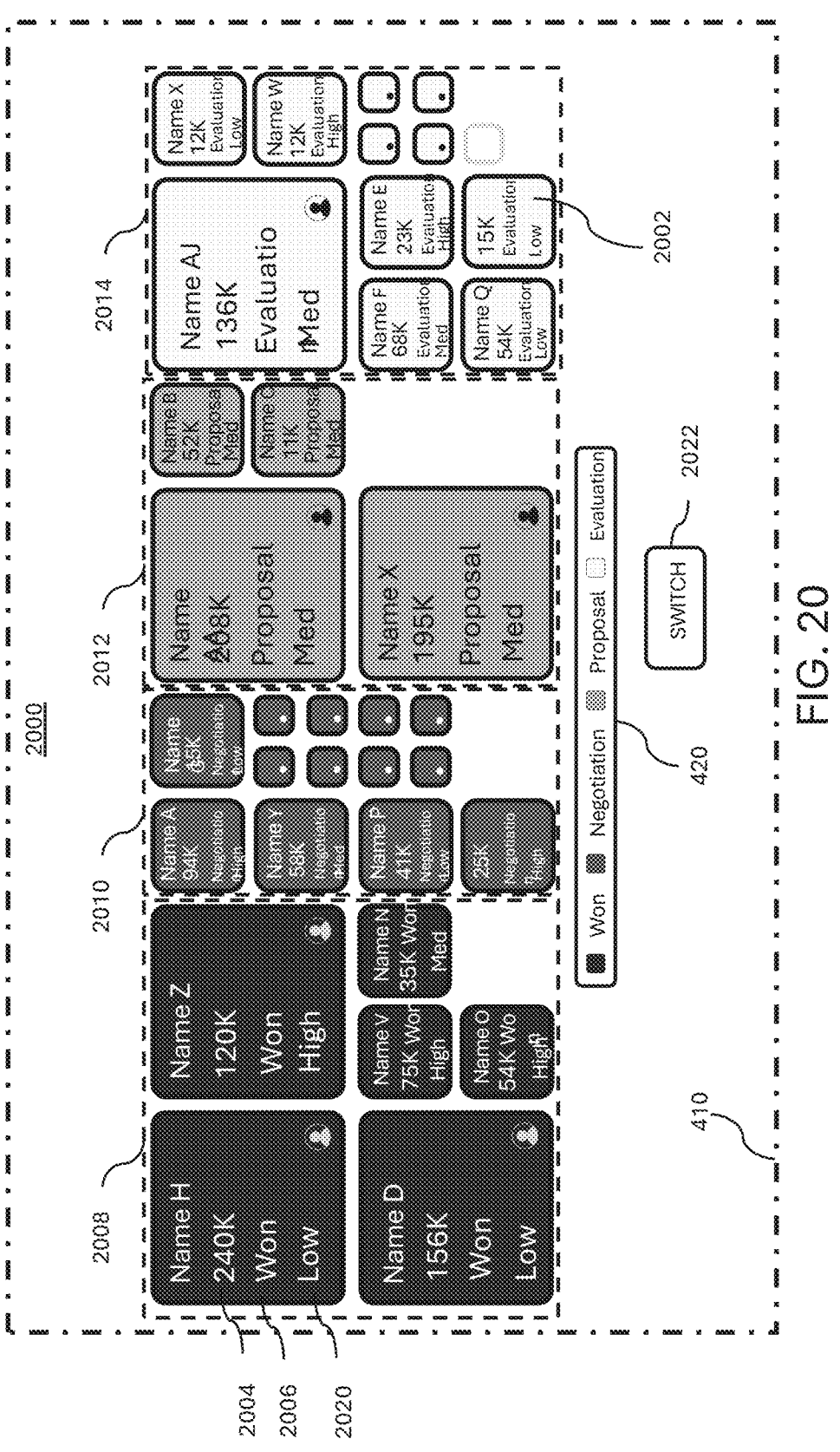
FIG. 20 illustrates an initial arrangement of a plurality of tiles, consistent with some disclosed embodiments.

By way of a non-limiting example, reference is made to FIG. 20, illustrating an initial arrangement of a plurality of tiles, consistent with some disclosed embodiments of the present disclosure. At least one processor (e.g., processing circuitry 3010 in FIG. 30) may cause an initial arrangement 2000 of a plurality of tiles 2002 on a display (e.g., display 3050).

In some disclosed embodiments, in the initial arrangement, each of the plurality of tiles is associated with an item including a first characteristic having a first alphanumeric value and a second characteristic having a second alphanumeric value. An item refers to a unit and/or component of a data structure, as described elsewhere herein. For example, a unit may include and/or be associated with one or more pieces of information. An item may be associated with an object, a person, a location, a process, an abstract concept and/or idea, and/or any other subject matter or element of interest. In some embodiments, an item may be represented as a record in a data structure. Such an item may be associated with a plurality of fields, each field designated for storing a different characteristic pertaining to the item. By way of example, each product offered by a retailer may be represented by an item stored in a data structure as a record including a plurality of fields. Such fields may include, for example, a product code, a product ranking, an inventory level, a cost, a wholesale price, a retail price, a profit margin, a timeline to market, a stage in a pipeline, and/or any other characteristic relevant to the item. By way of another example, each employee in a company may be represented by an item stored as a record in a data structure including a plurality of fields for storing characteristics. Such characteristics may include, for example, an employee name, a social security number, a job title, a department, a salary, and/or a grade. Each of the plurality of tiles is associated with an item refers to representing each item visually using a tile. Each tile may express one or more characteristics of each item (e.g., stored in fields of the data structure) as a visual characteristic of the tile, (e.g., tile color, shape, and/or size). Additionally or alternatively, one or more characteristic of an item may be displayed as text and/or a graphical image within an associated tile. A characteristic refers to a quality, attribute, and/or trait. Each characteristic of an item may represent a different piece of information associated with the item. A characteristic of an item may include any distinctive feature or quality that helps to identify or define an item, as described elsewhere herein. An alphanumeric value refers to a sequence of alphanumeric characters encoding and/or representing information. Some examples of alphanumeric values may include digits representing numeric quantities and/or an order, letters representing words, and/or a combination of digits and letters representing a code. An item including a first characteristic having a first alphanumeric value and a second characteristic having a second alphanumeric value refers to a unit including at least two pieces of information, each piece represented by a different alphanumeric value. For example, an item representing a person may include a first alphanumeric value corresponding to a name and a second alphanumeric value corresponding to an age. As another example, an item representing a product may include a first alphanumeric value corresponding to a product type and a second alphanumeric value corresponding to a cost.

In some disclosed embodiments, in the initial arrangement, each item is associated with a common objective. A common objective refers to a shared goal or aim, as described elsewhere herein. For example, each item of each tile may include an employee identity (e.g., a first characteristic having a first alphanumeric value) and a measure of productivity (e.g., a second characteristic having a second alphanumeric value), with a common objecting of improving overall productivity for all the employees. As another example, each item of each tile may include a product type and a popularity measure, with a common objective of improving overall sales. As an addition example, each item of each tile may include a date that a competition took place and the winner of the competition, with a common objective of tracking an overall winner over multiple competitions.

By way of a non-limiting example, in FIG. 20, in initial arrangement 2000, each of the plurality of tiles 2002 may be associated with an item (e.g., items 202 in FIG. 2) including a first characteristic having a first alphanumeric value 2004 (e.g., a deal size) and a second characteristic having a second alphanumeric value (e.g., a phase in the sales funnel). Each item may be associated with a common objective (e.g., maximizing profit or meeting quarterly goals).

In some disclosed embodiments, each of the plurality of tiles adopts a first visual characteristic from a first set of visual characteristics, and a second visual characteristic from a second set of visual characteristics. To adopt refers to take on and/or assume. A visual characteristic refers to an observable and/or viewable trait and/or attribute. A set of visual characteristics may include a group of visible traits, e.g., each associated with a different piece of information. Some examples of visual characteristics may include size, shape, color, hue, saturation level, transparency level, style, texture, pattern, symmetry, orientation, position, brightness, and/or contrast. For instance, a first set of visual characteristics may include a plurality of different colors, and a second set of visual characteristics may include a plurality of different shapes, where each color and each shape may represent a different piece of information along two different dimensions. Alternatively, a first set of visual characteristics may include a plurality of different sizes, and a second set of characteristics may include a plurality of different positions, where each size and each position may represent a different piece of information. By way of example, multiple tiles may represent an inventory. At least one processor may determine a size for each tile to indicate a quantity of an item in stock, and a shape of each tile to indicate the item type. By way of another example, multiple tiles may represent housing availability. At least one processor may determine a color of a tile to indicate location, and a saturation level to indicate cost.

In some disclosed embodiments, the first set of visual characteristics and the second set of visual characteristics are chosen from a group consisting of size, color, texture, transparency, or shape. Size refers to dimensions and/or measurements, as described elsewhere herein. Color refers to a frequency of light perceivable by the human eye. Colors may include primary colors which may be combined to produce a gamut of different colors. For example, each combination of red, green, and blue sub-pixels of an electronic display may emit a different frequency of light, and which may be perceived by the human eye as a different color (e.g., different shades of orange, green, pink, purple, and/or any other color within a gamut). Texture refers to a perceived surface quality and/or feel of a graphical element, and may simulate a tactile surface. For example, a grey scale of a graphical element may be adjusted to simulate a bumpy, ridged, smooth, grainy, concave, convex, flat, rough, and/or shiny surface. A texture may simulate a substance, such as wood, metal, glass, cloth, and/or any other substance. Transparency refers to a visual property permitting light to pass through a graphical element, allowing to at least partially see through the graphical element. Transparency may be used to create layers of graphical elements, e.g., to convey a hierarchy and relevance for different graphical elements, and/or to indicate a focus for a particular graphical element. A shape refers to a form and/or outline of a graphical element, e.g., having a regular or irregular contour, as described elsewhere herein. Shapes may include geometric shapes (e.g., polygons, ellipses, and/or circles), organic shapes corresponding to natural objects (e.g., flowers, leaves, trees, and/or rocks), and/or abstract shapes including straight and/or curved borders outlining a form.

In some disclosed embodiments, the first set of visual characteristics are different sizes and the second set of visual characteristics are different colors. Different sizes refers to varying scales and/or proportions. For example, each size may correspond to a different number of pixels displayed electronically. In some embodiments, a first set of visual characteristics may be chose from a finite number of predetermined sizes. Different sizes for a graphical element may be measured relatively (e.g., scaled in comparison to a baseline as a percentage), and/or absolutely as a number of pixels, millimeters, centimeters, inches, and/or any other unit of measurement. Different sizes may be associated with a different length, a different width, a different perimeter, a different circumference, a different diameter, a different area, and/or any other measure of size for a graphic image displayed on an electronic screen. Different colors refers to different combinations of red, green, and blue sub-pixels, and/or grey scale modulation), causing pixels of an electronic display to emit different frequencies of visible light. In some embodiments, different colors may be chosen from predefined color palette, as described elsewhere herein.

By way of a non-limiting example, in FIG. 20, each of plurality of tiles 2002 may adopt a first characteristic (e.g., a tile size) from a first set of visual characteristics and a second visual characteristic (e.g., a tile color) from a second set of characteristics. In some embodiments, the first set of visual characteristics and the second set of visual characteristics may be chosen from a group consisting of size, color, texture, transparency, or shape. In some embodiments, the first set of visual characteristics are different sizes and the second set of visual characteristics are different colors. For instance, for the first set of visual characteristics, tiles 2002 may assume a size corresponding to deal size (e.g., first alphanumeric value 2004), thus some of tiles 2002 may be larger and other of tiles 2002 may be smaller, depending on the value of the deal size 2004 attribute of each tile 2002. Similarly, for the second set of visual characteristics, different ones of tiles 2002 may be displayed in a different color (e.g., black, dark grey, medium gray, and light grey) corresponding to a phase 2006 in a sales funnel (e.g., Won, Negotiation, Proposal, and Evaluation).

In some disclosed embodiments, the plurality of tiles is arranged in groupings based on the second set of visual characteristics. A grouping corresponds to a collection or arrangement of tiles that share a common visual characteristic, as described elsewhere herein. For example, at least one processor may partition the plurality of tiles into groupings, each grouping associated with a different shape (e.g., a second visual characteristic), where a first grouping may include round tiles, a second grouping may include square tiles, and a third grouping may include triangular tiles. A plurality of tiles arranged in groupings based on the second set of visual characteristics refers to using the second set of visual characteristics to organize, position, and/or layout the plurality of tiles for display. For instance the second set of visual characteristics may be used to cluster the plurality of tiles into subsets based on a similarity measure associated with the second visual characteristics. By way of example, at least one processor may use the second set of visual characteristics (e.g., tile shape) to determine one or more of a format, layout, and/or position for arranging a group of tiles. For instance, at least one processor may group all the circular tiles towards the right side of a display, group all the square tiles in a the middle of the display, and group all the triangular tiles towards the left side of the display.

In some disclosed embodiments, the plurality of tiles is arranged to convey a visualization of progress toward the common objective. A visualization of progress refers to a graphical representation of an advancement and/or status of a process, project, or task over time. Visualization of progress may facilitate tracking achievement, and/or realization of a goal, and may be used to identify bottlenecks and/or obstacles towards achieving the goal. Graphically depicting items organized into groupings based on one or more visual characteristics may highlight distinguishing and/or similar features between one or more grouping in a more salient and/or immediate manner than presenting the items in a tabular format.

In some embodiments, organizing a plurality of tiles into groupings based on a set of visual characteristics may permit a visual assessment and/or evaluation of how many items may fall into each category. Such a visual assessment may permit determination of a cost (e.g., time, money, processing power, and/or work) for reaching an objective common to each of the items associated with the number of items. For example, at least one processor may display a first grouping including tiles associated with projects completed under budget on a right side of a screen, display a second grouping including tiles associated with projects completed at budget in the middle of the screen, and display a third grouping including tiles associated with projects completed over budget on a left side of the screen, thereby permitting a visual assessment of how many projects require write-offs relative to how many projects do not require write-offs. By way of another example, grouping a set of projects according to phase in a pipeline to completion may permit visually assessing how many projects are in each stage. By way of a further example, grouping investments options according to risk may permit a visual assessment of how many investment options are included in each risk category to thereby evaluate a degree of flexibility for allocating risk.

By way of a non-limiting example, in FIG. 20, in response to a trigger signal (e.g., via input output devices 3060 in FIG. 3010), at least one processor (e.g., processing circuitry 3010) may arrange plurality of tiles 2002 in groupings 2008, 2010, 2012, and 2014 based on the second set of visual characteristics (e.g., tile color). At least one processor may arrange plurality of tiles 2002 to convey a visualization of progress toward the common objective. For example, arranging tiles 2002 in a progressing sequence related to the phase of each item in the sales funnel may convey a visualization of progress towards a common objective of improving overall sales. Thus, all the tiles in grouping 2008 (black) may represent items at a "won" phase, all the tiles in grouping 2010 (dark grey) may represent items at a "Negotiation" phase, all the tiles in grouping 2012 (medium grey) may represent items at a "Proposal" phase, and all the tiles in grouping 2014 (light grey) may represent items at a "Evaluation" phase. Such a presentation may permit a user to visual progress of each item 2102 towards a common objective of improving sales.

Some disclosed embodiments involve a response to a trigger signal. A response refers to a reaction and/or reply. A trigger signal refers to an indication and/or notification of an event initiating a specific, action, and/or process within a system, software component, or application, as described elsewhere herein. Some disclosed embodiments involve, on a grouping-by-grouping basis, aggregating underlying associated first alphanumeric values of each item. A grouping-by-grouping basis refers to handling, addressing, and/or attending to each item associated with each tile according to the grouping for the tile. Aggregating underlying associated first alphanumeric values refers to accumulating, summing, and/or totaling the first alphanumeric values associated with each tile. For instance, at least one processor may sum all the first alphanumeric values associated with tiles in a first grouping, sum all the alphanumeric values associated with tiles in a second grouping, and so on, to thereby determine an aggregated value for each grouping. By way of an example, a plurality of tiles, each associated with a different retail locations, may include a first visual characteristic (e.g., a size) indicating an inventory level, and a second visual characteristic (e.g., color) indicating a product. At least one processor may arrange the plurality of tiles according to the second visual characteristics (e.g., color), each color representing a different product for sale at each of the retail locations. Thus, all the blue tiles representing a first product for sale at the different retail locations may be arranged in a first grouping, all the red tiles representing a second product may be arranged in a second grouping, and so on. For each grouping (e.g., each color) at least one processor may aggregate the first alphanumeric value (e.g., inventory) to determine a net inventory level for each product across all the retail locations.

In some disclosed embodiments, receiving the trigger signal includes receiving at least one of: receiving a scroll signal resulting from a motion of a user on the display; or receiving a trigger via a Graphical User Interface (GUI) component present on a display. A scroll signal resulting from a motion of a user on the display refers to an indication that a user changed a position on a display screen. For example, a scroll signal may result from moving a cursor or content up, down, left or right on a display screen. A scroll signal may include a user input associated with a vertical and/or horizontal scroll bar, a scroll button, a scroll arrow, a page up and/or phage down arrow, and/or any other graphical component associated with scrolling. A Graphical User Interface (GUI) component refers to a pictorial element for receiving input from a user and/or presenting an output to a user, e.g., permitting the user to engage therewith. Some examples of GUI components may include a button, a check box, a menu option, a switch, and/or any other graphical interfacing element. Receiving a trigger via a Graphical User Interface (GUI) component present on a display refers to obtaining a signal for causing an action for a GUI component displayed on an electronic screen. For example, a user may input a trigger signal using an input device. Some examples of input devices may include an electronic mouse, a keyboard, an electronic stylus, a touch based screen a visual input, a camera (e.g., for detecting a gesture), an eye tracker, a motion sensor, and/or a microphone (e.g., for capturing an audio input).

Some disclosed embodiments involve causing each of the groupings to merge into an associated merged tile expressing the second visual characteristic. To merge refers to consolidate, unite, and/or fuse. Expressing refers to communicating and/or conveying, e.g., information. Causing each of the groupings to merge into an associated merged tile refers to combining the tiles in each grouping to thereby consolidate the tiles into a tile representative of all the tiles in the grouping (e.g., larger tile). Thus, all the tiles in the first grouping may be merged into a first merged tile, all the tiles in the second grouping may be merged into a second merged tile, and so on. An associated merged tile expressing the second visual characteristic refers to a merged tile conveying and/or communicating the second visual characteristic. For instance, if the second visual characteristic of all the tiles included in a first grouping is a square shape, the merged tile for the first grouping may be square. Similarly, if the second visual characteristic of all the tiles included in a second grouping is a round shape, the merged tile for the second grouping may be round.

In some embodiments, merging tiles of each grouping into merged tiles expressing a second visual characteristic may permit a visual assessment and/or evaluation of relative relationships between each grouping in a more salient and/or immediate manner than presenting the items in a tabular format and/or in a grouping arrangement. For instance, whereas an initial arrangement of groupings of tiles may permit a visual assessment of how many items belong to each grouping in a more salient manner than presenting the items in a tabular format, a grouping-by-grouping merged tile arrangement may permit a visual assessment of a relative net magnitude, weight, and/or cost for each grouping in a more salient manner than presenting the items in the initial arrangement of groupings. For instance, a grouping-by-grouping merged tile arrangement may permit a more immediate visual assessment of relative net cost, risk, and/or value between each of the groupings. For example, a first grouping may include more items than a second grouping, however, an aggregate value of the first grouping may be smaller than an aggregate value of the second grouping. Whereas the grouping arrangement may visually convey how many items are in each grouping, the merged tile arrangement may visually convey a relative aggregate value for each grouping. In some embodiments, tiles in a grouping may be collapsed to form a merged tile. For instance, a presentation of a merged tile for a grouping on a display may require fewer pixels than the initial presentation of the grouping.

Figure 21:
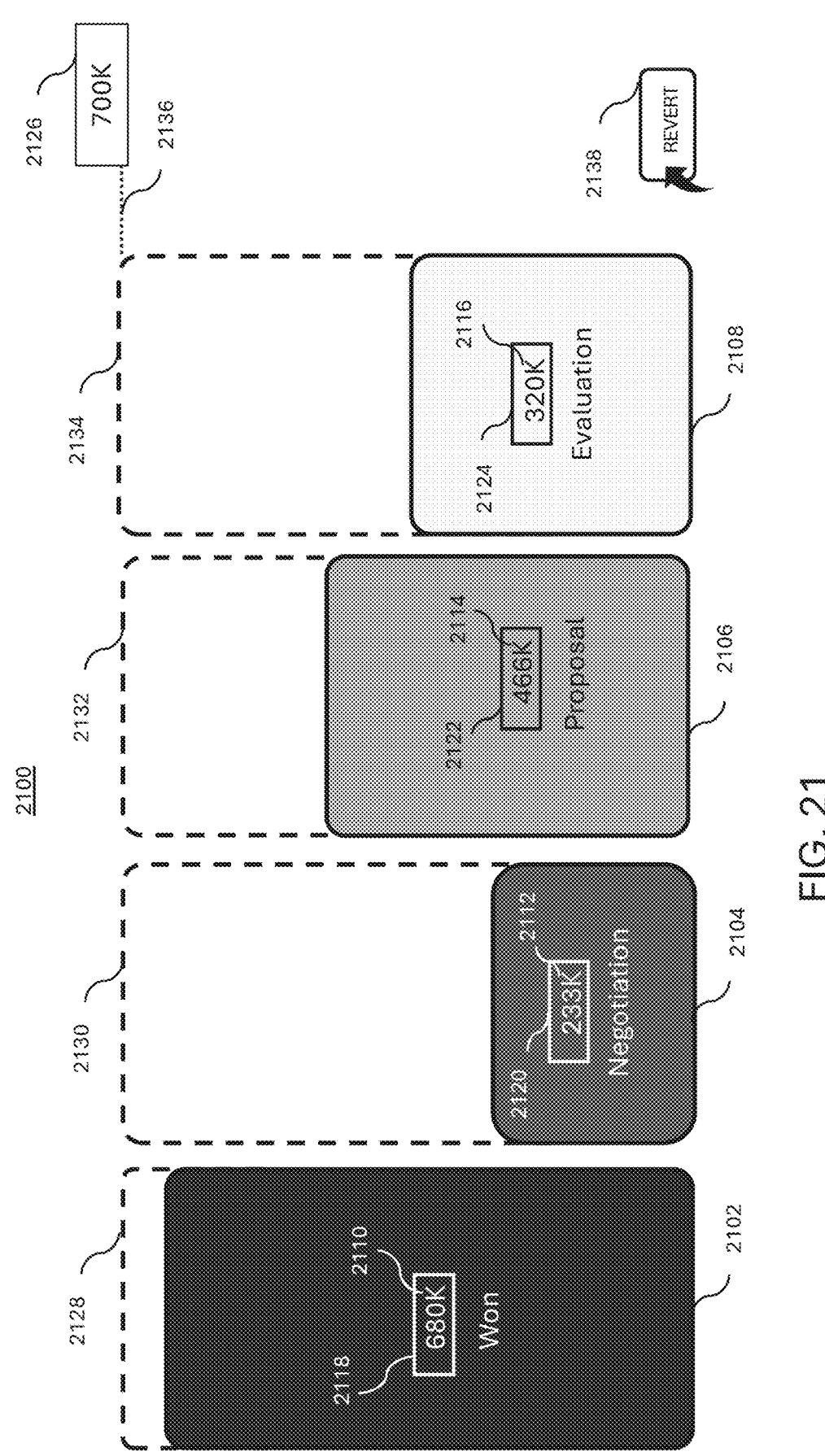
FIG. 21 illustrates a presentation of merged tiles juxtaposed in accordance with a second set of visual characteristics, consistent with some disclosed embodiments.

By way of a non-limiting example, reference is made to FIG. 21, which illustrates a presentation 2100 of merged tiles juxtaposed in accordance with the second set of visual characteristics (e.g., color), consistent with some disclosed embodiments. In response to a trigger signal (e.g., received via input output devices 3060 in FIG. 30), on a grouping-by-grouping basis, at least one processor (e.g., processing circuitry 3050) may aggregate underlying associated first alphanumeric values 2004 of each item 2002. Presentation 2100 may include merged tiles 2102, 2104, 2106, and 2108. At least one processor may merge tiles 2002 of grouping 2008 to form merged tile 2102, expressing the second visual characteristic (e.g., the color black representing the "won" phase in a sales pipeline) for grouping 2008. At least one processor may merge tiles 2002 of grouping 2010 to form merged tile 2104, expressing the second visual characteristic (e.g., the color dark grey representing the "negotiation"

phase in the sales pipeline) for grouping 2010. At least one processor may merge tiles 2002 of grouping 2012 to form merged tile 2106, expressing the second visual characteristic (e.g., the color medium grey representing the "proposal" phase in the sales pipeline) for grouping 2012. At least one processor may merge tiles 2002 of grouping 2014 to form merged tile 2108, expressing the second visual characteristic (e.g., the color light grey representing the "evaluation" phase in the sales pipeline) for grouping 2012. At least one processor may aggregate associated first alphanumeric values 2004 of each item 2002 to determine aggregates 2110 to 2116 of merged tiles 2102 to 2108, respectively. In some embodiments, receiving the trigger signal includes receiving at least one of a scroll signal resulting from a motion of a user on display (e.g., display 3050), or receiving a trigger via a Graphical User Interface (GUI) component present on the display. For example, a user may input a scroll signal using I/O 3060.

Figure 27:
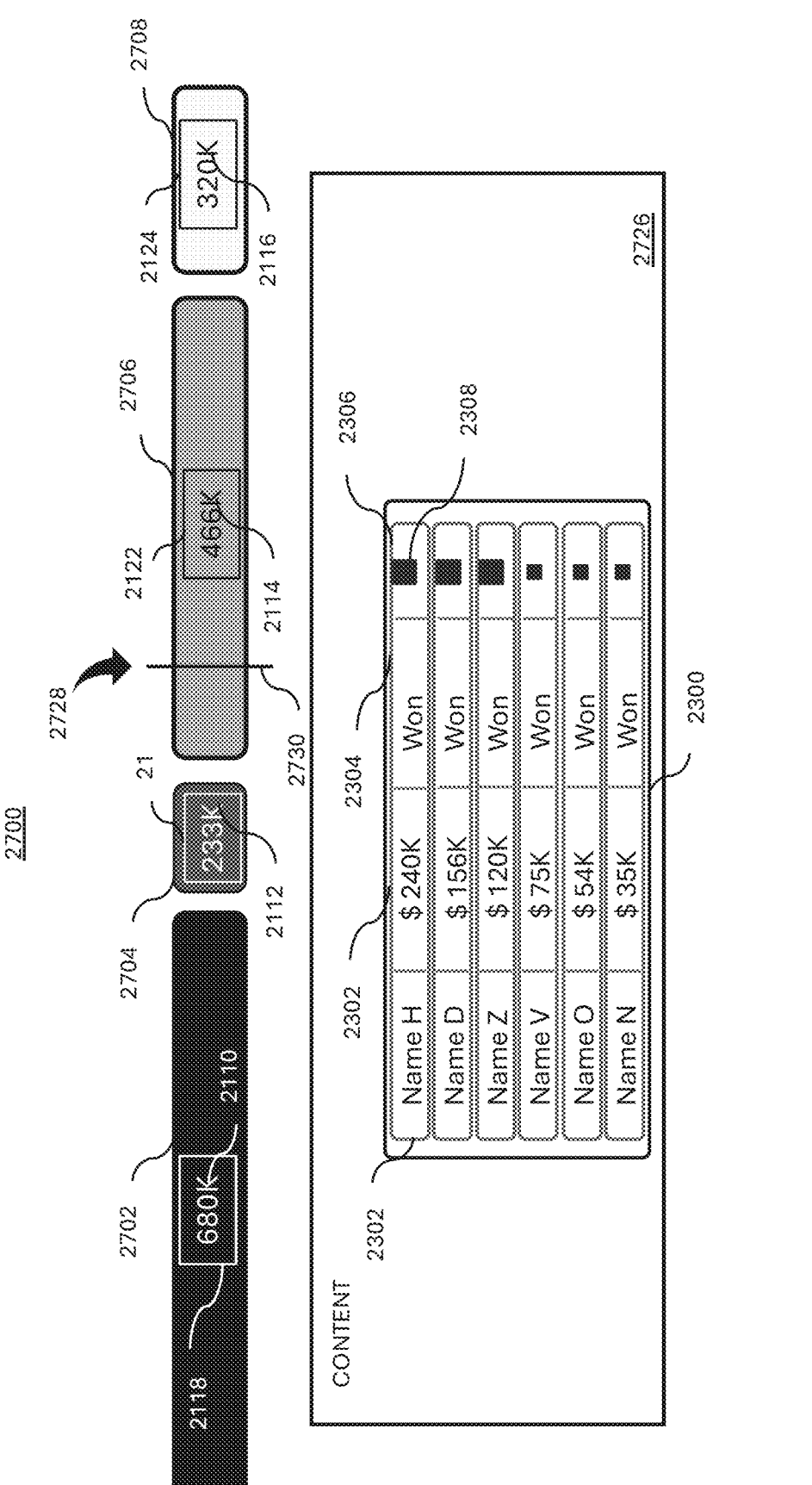
FIG. 27 illustrates another presentation of merged tiles juxtaposed in accordance with a second set of visual characteristics, consistent with some disclosed embodiments.

By way of another non-limiting example, reference is made to FIG. 27 which illustrates another presentation 2700 of merged tiles juxtaposed in accordance with a second set of visual characteristics, consistent with some disclosed embodiments. In response to a trigger signal, on a grouping-by-grouping basis, at least one processor may aggregate underlying associated first alphanumeric values 2004 of each item 2002 (see FIG. 20). Presentation 2700 may include merged tiles 2702, 2704, 2706, and 2708. At least one processor may merge tiles 2002 of groupings 2008, 2010, 2012, and 2014 to form merged tiles 2702, 2704, 2706, and 2708, each expressing the second visual characteristics groupings 2008, 2010, 2012, and 2014, respectively. Thus, merged tile 2702 may be colored black corresponding to the second visual characteristic for grouping 2008, merged tile 2704 may be colored dark grey corresponding to the second visual characteristic for grouping 2010, merged tile 2706 may be colored medium grey corresponding to the second visual characteristic for grouping 2012, and merged tile 2708 may be colored light grey corresponding to the second visual characteristic for grouping 2014.

In some disclosed embodiments, the merged tiles have different sizes based on the aggregating of the underlying associated first alphanumeric values. Sizes refer to dimensions and/or measurements, and may be measured in pixels, millimeters, centimeters, inches, and/or any other unit of size. Different sizes based on the aggregating of the underlying associated first alphanumeric values refers to particular and/or distinguishing sizes corresponding to the combined alphanumeric value of all the first alphanumeric values associated with a specific grouping. Thus, a first merged tile for a first grouping may be sized in proportion to the sum of the first alphanumeric values associated with the tiles in the first grouping, a second merged tile for a second grouping may be sized in proportion to the sum of the first alphanumeric values associated with the tiles in the second grouping, and so on. By way of example, a plurality of tiles may adopt a particular pattern (e.g., hash marks, dots, chevron) as a second visual characteristic. At least one processor may arrange the plurality of tiles into groupings according to pattern. Thus, a first grouping may include all the dotted tiles, a second grouping may include all the hash marked tiles, a third grouping may include all the chevron tiles, and so on. At least one processor may aggregate the first alphanumeric values for all the dotted tiles and display a merged dotted tile sized according to the aggregate value for all the dotted tiles, aggregate the first alphanumeric values for all the hash marked tiles and display a merged hash marked tile sized according to the aggregate value for all the hash marked tiles, and so on.

In some embodiments, a horizontal dimension of a horizontal arrangement of the merged tiles across a display may be substantially the same as a horizontal dimension of the initial arrangement of all of the groupings, e.g., both presentations may occupy the same width of a visual display. In some embodiments, the merged tiles may have a uniform height and a relative length scaled to an aggregate value for each grouping. The merged tiles may be arranged horizontally across a display as a horizontal banner. The uniform height of the merged tiles may be substantially smaller than the height of the groupings in the initial arrangement, e.g., permitting a presentation of additional content above and/or below the horizontal banner of merged tiles. Such additional content may include, for example, a table, chart, graph, and/or any other content related to the plurality of items. In some embodiments, selecting one of the merged tiles may cause content associated with the selected merged tile to be presented above and/or below the horizontal banner of merged tiles.

In some embodiments, a vertical dimension of a vertical arrangement of the merged tiles on a display may be substantially the same as a vertical dimension of the initial arrangement of all of the groupings, e.g., both presentations may occupy the same height of a visual display. In some embodiments, the merged tiles may have a uniform width and a relative length scaled to an aggregate value for each grouping. The merged tiles may be arranged vertically on a display as a vertical banner. The uniform width of the merged tiles may be substantially smaller than the width of the groupings in the initial arrangement, e.g., permitting presentation of additional content to the right and/or left of the vertical banner of merged tiles, similar to that described above. In some embodiments, selecting one of the merged tiles may cause content associated with the selected merged tile to be presented to the right and/or left of the vertical banner of merged tiles.

Some disclosed embodiments involve presenting on the display the merged tiles by juxtaposing the merged tiles in accordance with the second set of visual characteristics. Presenting on a display the merged tiles refers to determining a layout and/or size for a merged tile, and rendering and/or showing each merged tile by selectively activating pixels of an electronic screen to thereby cause a graphic image of each merged tile to appear. Juxtaposing refers to arranging two or more objects in a manner permitting comparing, contrasting, and/or evaluating differences and/or similarities. For example, tiles may be arranged horizontally (e.g., side-by-side), vertically, diagonally, around a circle, around a square, hierarchically (e.g., as a tree), and/or according to any other arrangement and/or alignment permitting comparisons there between. Juxtaposing the merged tiles in accordance with the second set of visual characteristics refers to displaying the merged tiles in a manner permitting comparisons therebetween based on the second set of visual characteristics. Returning to the example above, at least one processor may display the merged dotted tile sized in proportion to the sum of the first alphanumeric values for all the dotted tiles in proximity to the merged hash marked tile sized in proportion to the sum of the first alphanumeric values for all the hash marked tiles. Displaying the merged tiles thus may permit comparing the aggregate value for the dotted tiles with the aggregate value for the hash marked tiles visually (e.g., instead of numerically). For instance, the dotted tiles may represent sales for the previous year, and the hash marked tiles may represent sales for the current year. Juxtaposing the merged dotted tile with the merged hash marked tile may permit a visual comparison between the net sales for the previous year with the net sales for the current year.

By way of a non-limiting example, in FIG. 21, merged tiles 2102 to 2108 may have different sizes based on the aggregating of the underlying associated first alphanumeric values 2004. Merged tiles 2102 to 2108 may be sized in proportion to the aggregate (e.g., aggregates 2110 to 2116) of the underlying associated first alphanumeric values 2004 for all the tiles in groupings 2008 to 2014. In some disclosed embodiments, at least one processor may present on display (e.g., display 3050) merged tiles 2102 to 2108 by juxtaposing merged tiles 2102 to 2108 in accordance with the second set of visual characteristics (e.g., color).

By way of a non-limiting example, in FIG. 27, merged tiles 2702 to 2708 may have different sizes based on the aggregating of the underlying associated first alphanumeric values 2004. Merged tiles 2702 to 2708 may be sized in proportion to the aggregate (e.g., aggregates 2110 to 2116) of the underlying associated first alphanumeric values 2004 for all the tiles in groupings 2008 to 2014. In some disclosed embodiments, at least one processor may present on a display merged tiles 2702 to 2708 by juxtaposing merged tiles 2702 to 2708 in accordance with the second set of visual characteristics (e.g., color). For instance, at least one processor may present merged tiles 2702 to 2708 as a banner across display 3050, each of merged tiles having a uniform height and a variable length scaled to represent a weight of each aggregate for each grouping relative to a total for all of tiles 2002 (e.g., for the first alphanumeric value). In other words, the lengths of merged tiles 2702 to 2708 may be scaled to visually represent the ratios between aggregates 2110 to 2116 of first alphanumeric values 2004 associated with groupings 2008 to 2014 relative to a total for first alphanumeric values 2004 for all of tiles 2002. Consequently, merged tile 2702 may occupy approximately 40% of the width of the display, merged tile 2704 may occupy approximately 14% of the width of the display, merged tile 2706 may occupy approximately 27% of the width of the display, and merged tile 2708 may occupy approximately 19% of the width of the display, each ratio visually demonstrating a relative weight, cost, and/or score for each grouping in a manner that may be more salient and/or immediate than initial presentation 2000 of groupings 2008 to 2014 and/or a tabular representation of items 2002. In some embodiments, at least one processor may display content 2726 beneath and/or above the horizontal banner of merged tiles 2702 to 2708. Content 2726 may be associated with one or more of merged tiles 2702 to 2708. In some embodiments, merged tiles 2702 to 2708 may be arranged in a vertical banner, and content 2726 may be displayed to the left and/or right of merged tiles 2702 to 2708.

Some disclosed embodiments involve comparing the aggregated underlying associated first alphanumeric values of each grouping to determine relative merged tile sizes. Comparing refers to equating, contrasting, differentiating, and/or evaluating (e.g., for differences and/or similarities). Relative refers to compared with, and/or correlated to something. For example, a given element may be relatively large compared to a first (e.g., small) object, and relatively small compared to a second (e.g., large) object. In some embodiments, values may be relative if they indicate a common parameter, are part of a common group, may be compared with each other, or are in any way related to each other, as described elsewhere herein. Comparing the aggregated underlying associated first alphanumeric values of each grouping to determine relative merged tile sizes refers to contrasting the sum of the first alphanumeric values for each grouping of tiles to calculate comparative dimensions for each merged tile. At least one processor may allocate a greater number of pixels for displaying a merged tile associated with a larger aggregate value and allocate a smaller number of pixels for a merged tile associated with a smaller aggregate value. The number of pixels allocated for each merged tile may be proportional to the associated aggregate values. For instance, if a first aggregated sum of first alphanumeric values for a first grouping of tiles is twice as large as a second aggregated sum of first alphanumeric values for a second grouping of tiles, at least one processor may allocate twice as many pixels for displaying a first merged tile for the first grouping as for displaying a second merged tile for the second grouping, such that the first merged tile may be twice the size of the second merged tile.

In some disclosed embodiments, each merged tile includes at least one alphanumerical field configured to present a sum of the first alphanumerical values of each item associated with each tile included in each associated grouping. Each merged tile includes at least one alphanumeric field refers to a delineated region and/or area within each merged tile allocated for displaying alphanumeric data. In some embodiments, an alphanumeric field may be associated with rules for excluding any type of data other than alphanumeric data from being displayed therein. For example, an alphanumeric field may include a rule to only present a date, a number, text, and/or any other type of formatted alphanumeric data. To present a sum of the first alphanumerical values of each item associated with each tile included in each associated grouping refers to display the net alphanumeric value resulting from adding together the first alphanumeric values for each item of each tile in each grouping. Thus, each merged tile may indicate the sum of the first alphanumerical values of the items associated with a particular grouping as a size of the merged tile and as a digit displayed in a field within the merged tile.

By way of a non-limiting example, in FIG. 21, at least one processor (e.g., processing circuitry 3010 in FIG. 30), may compare the aggregated underlying associated first alphanumeric values 2110 to 2116 of each grouping 2008 to 2014 (see FIG. 20) to determine relative merged tile sizes for merged tiles 2102 to 2108. For instance, aggregate 2110 for grouping 2008 may be the largest aggregate for groupings 2008 to 2014. Consequently, at least one processor may determine merged tile 2102 representing grouping 2008 to be the largest tile. Aggregate 2112 for grouping 2010 may be the smallest aggregate for groupings 2008 to 2014. Consequently, at least one processor may determine merged tile 2104 representing grouping 2010 to be the smallest tile, e.g., proportional in size to merged tile 2102. Similarly, aggregates 2114 and 2116 for groupings 2012 and 2014 may be between aggregates 2110 and 2104 for groupings 2008 and 2010. At least one processor may determine merged tiles 2106 and 2108 to be smaller than merged tile 2110 and larger than merged tile 2104, each sized in proportion to aggregates 2114 and 2116, respectively. In some embodiments, each merged tile 2102 to 2108 may include at least one alphanumerical field 2118 to 2124 to 2116 for presenting a sum of the first alphanumerical values (e.g., aggregates 2110 to 2116) of each item associated with each tile included in each associated grouping 2008 to 2014, respectively.

By way of another non-limiting example, in connection with FIG. 27, at least one processor may compare the aggregated underlying associated first alphanumeric values 2110 to 2116 of each grouping 2008 to 2014 (see FIG. 20) to determine relative merged tile sizes for merged tiles 2702 to 2708. In some embodiments, each merged tile 2702 to 2708 may include alphanumerical fields 2118 to 2124 to 2116 for presenting a sum of the first alphanumerical values (e.g., aggregates 2110 to 2116) of each item associated with each tile included in each associated grouping 2008 to 2014, respectively.

Some disclosed embodiments involve receiving an alphanumeric target value associated with the common objective. Receiving refers to obtaining and/or gaining access to. An alphanumeric target value associated with a common objective refers to a quantity that may be aspired to and/or sought after in association with the common objective. In some embodiments, a target alphanumeric value refers to any alphanumeric value that may help quantify or represent the common objective, as described elsewhere herein. For example, a sales team may aspire to reach a target net sales volume for a plurality of sales persons, a police force may aspire to solve a target number of cases for a plurality of detectives, and an athletic team may aspire to win a target number of races by a plurality of team members. Some disclosed embodiments involve calculating from the first alphanumeric values of each item associated with each of the plurality of tiles a boundary location within the juxtaposition of the merged tiles corresponding to the target value. Calculating refers to computing and/or determining. A boundary location within the juxtaposition of the merged tiles corresponding to a target value refers to a position among the merged tiles for displaying a delineation and/or border at a distance from an edge of each merged tile indicative of the target value. Thus, a boundary location may be external to merged tiles associated with aggregate values below a target value. For example, if a target value is 20% greater than a sum of first alphanumeric values of items associated with a grouping, a boundary location may be located at a distance from an edge of an associated merged tile that is 20% times the length of the merged tile. Some disclosed embodiments involve further presenting on the display a boundary at the boundary location. A boundary refers to any type of graphical element and/or feature configured to segregate or separate a plurality of objects such as tiles within a display, as described elsewhere herein. Presenting on a display a boundary at a boundary location refers to activating pixels at the boundary location to show the boundary at the boundary location. The boundary may be indicated, for example, as a line and/or arrow extending from an edge of a merged tile, a character (e.g., an asterisk) and/or emoji (e.g., an index pointer) at a specified distance from the edge, and/or any other graphical indication of a target value. Returning to the example above, at least one processor may display an arrow extending from the edge of a merged tile by 20% the length of the merged tile, thereby indicating a target value exceeding the current aggregate of the first alphanumerical values by 20%.

By way of a non-limiting example, in FIG. 21, at least one processor (e.g., processing circuitry 3010 in FIG. 30) may receive (e.g., via input output devices 3060) an alphanumeric target value 2126 associated with the common objective (e.g., a goal of reaching $700K in deals). At least one processor may calculate from the first alphanumeric values of each item associated with each of the plurality of tiles a boundary location 2136 within the juxtaposition 2100 of merged tiles 2102 to 2108 corresponding to target value 2126. The at least one processor may present on the display (e.g., display 3050) a boundary (e.g., boundaries 2128 to 2134 for merged tiles 2102 to 2108, respectively) at boundary location 2136.

By way of another non-limiting example, in connection with FIG. 27, at least one processor may receive alphanumeric target value 2126 associated with the common objective. At least one processor may calculate from the first alphanumeric values of each item associated with each of the plurality of tiles 2002 a boundary location 2728 within the juxtaposition 2700 of merged tiles 2702 to 2708 corresponding to target value 2126. The at least one processor may present a boundary 2730 at boundary location 2728. For example, any of merged tiles 2702 to 2708 and/or portions thereof on one side of boundary location 2728 may represent items that if complete, may permit achieving the common objective. Boundary 2728 may permit a visual assessment of a cost associated with achieving the common objective in a manner that is more salient and/or immediate than representation 2000 of grouping 2008 to 2014 and/or a tabular representation of items 2002.

Some disclosed embodiments involve combining at least some of the merged tiles into a combined tile based on the second alphanumerical values of each item associated with each tile included in each associated grouping of the at least some of the merged tiles. Combining at least some of the merged tiles into a combined tile refers to adjoining and/or fusing two or more of the merged tiles to form a composite and/or conglomerate tile. Based on the second alphanumerical values of each item associated with each tile included in each associated grouping of the at least some of the merged tiles refers to combining the at least some of the merged tiles according to associations indicated by the second alphanumerical values of the respective items.

In some disclosed embodiments, the combined tile includes at least one alphanumerical field configured to present a sum of the first alphanumerical values of each item associated with each tile included in each associated grouping of the at least some of the merged tiles. A combined tile includes at least one alphanumerical field configured to present a sum of the first alphanumerical values of each item associated with each tile included in each associated grouping of the at least some of the merged may be understood as described elsewhere herein for each merged tile. For instance, each combined tile may include a field for displaying the sum of all the first alphanumeric values associated with any tile included therein. For example, a combined tile may exclude any tile associated with a final stage of a pipeline, and include all tiles associated with a non-final stage of the pipeline. Alternatively, a combined tile may exclude any tile associated with an initial stage of a pipeline, and include all tiles associated with a non-initial stage of the pipeline.

By way of a non-limiting example, reference is made to FIG. 22, which illustrates a presentation 2200 of combined tiles based on second alphanumeric values, consistent with some disclosed embodiments. At least one processor (e.g., processing circuitry 3010 in FIG. 30) may combine at least some of merged tiles 2102 to 2108 into a combined tile 2202 based on second alphanumerical values 2006 (see FIG. 20) of each item associated with each tile 2002 included in each associated grouping of the at least some of merged tiles 2102 to 2108. In the example shown, at least one processor may combine all the non-won deals corresponding to merged tiles 2104, 2106, and 2108 into combined tile 18-302 representing all the non-won deals (e.g., all tiles 2102 associated with the evaluation, proposal, and negotiation phases). At least one processor may juxtapose combined tile

18-302 representing all the non-won deals with merged tile 18-202 representing all the won-deals. For instance, such a juxtaposition may represent a path to achieving the common goal (e.g., indicating how much effort may be left to complete pending sales). In some embodiments, combined tile 2202 may include at least one alphanumerical field 2204 for presenting a sum 2202 of the first alphanumerical values 2004 of each item associated with each tile 2002 included in each associated grouping of the at least some of the merged tiles (e.g., groupings 2010, 2012, and 2014 associated with merged tiles 2104, 2106, and 2108, respectively, associated with non-won deals).

Figure 28:
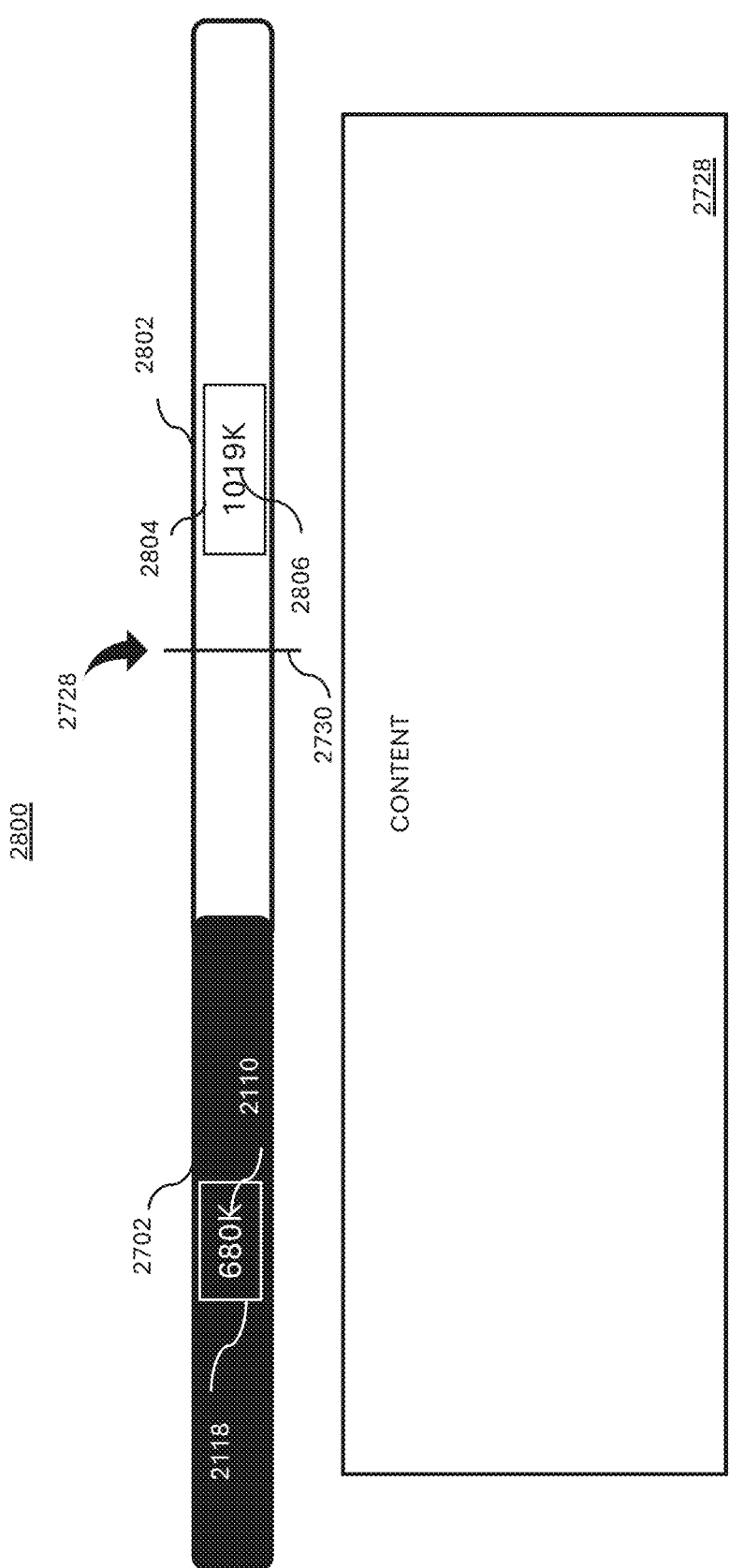
FIG. 28 illustrates a further presentation of combined tiles based on second alphanumeric values, consistent with some disclosed embodiments.

By way of a non-limiting example, reference is made to FIG. 28, which illustrates a presentation 2800 of combined tiles based on second alphanumeric values, consistent with some disclosed embodiments. At least one processor may combine at least some of merged tiles 2702 to 2708 into a combined tile 2802 based on second alphanumerical values 2006 (see FIG. 20) of each item associated with each tile 2002 included in each associated grouping of the at least some of merged tiles 2702 to 2708. In the example shown, at least one processor may combine all the non-won deals corresponding to merged tiles 2704, 2706, and 2708 into combined tile 18-902 representing all the non-won deals. At least one processor may juxtapose combined tile 18-902 (e.g., all the non-won deals) with merged tile 18-802 (e.g., all the won-deals). In some embodiments, combined tile 2802 may include at least one alphanumerical field 2804 for presenting a sum 2806 of the first alphanumerical values 2004 of each item associated with each tile 2002 included in each of associated groupings 2010, 2012, and 2014 associated with merged tiles 2704, 2706, and 2708, respectively, for the non-won deals).

Some disclosed embodiments involve, in response to a reverting signal, causing each of the merged tiles to revert to the initial arrangement. A reverting signal refers to an indication for returning to a previous state and/or condition. A reverting signal may permit a user to toggle between different display modes, e.g., between an initial arrangement, a first merged arrangement based on a first characteristic, a second merged arrangement based on a second characteristic, and to return to the initial arrangement. Causing each of the merged tiles to revert to the initial arrangement refers to separating and/or dividing each of the merged tiles into the individual tiles that were displayed prior to the merging.

In some disclosed embodiments, receiving the reverting signal includes receiving at least one of: receiving a scroll signal resulting from a motion of a user on the display; or receiving a trigger via a Graphical User Interface (GUI) component present on a display. Receiving the reverting signal includes receiving at least one of: receiving a scroll signal resulting from a motion of a user on the display; or receiving a trigger via a Graphical User Interface (GUI) component present on a display may be understood as described elsewhere with reference to receiving a trigger signal.

By way of a non-limiting example, in FIGS. 20 and 21, in response to a reverting signal, at least one processor (e.g., processing circuitry 3010 in FIG. 30) may cause each of merged tiles 2102 to 2108 to revert to initial arrangement 2000. For example, a user may input a reverting signal by selecting button 2138 using input output devices 3060. In response, at least one processor may display arrangement 2000 on display 3050. In some embodiments, receiving the reverting signal includes receiving a trigger (e.g., a button selection) via GUI component (e.g., button 2138) on display 3050.

Some disclosed embodiments involve causing a table to be presented on the display, wherein the table includes rows corresponding to the items associated with the plurality of tiles, a first column corresponding to the first characteristic, and a second column corresponding to the second characteristic. In some embodiments, a table refers to a matrix, array, and/or grid including a plurality of vertical and horizontal rows forming a plurality of cells for organizing data. In some embodiments, a table or tablature refers to data presented in horizontal and vertical rows, (e.g., horizontal rows and vertical columns) defining cells in which data is presented, as described elsewhere herein. A row and/or column may refer to one or more of a horizontal and/or a vertical presentation (e.g., within a table), as described elsewhere herein. Rows corresponding to the items associated with the plurality of tiles refers to each horizontal data record in the table being associated with a different item of a tile. Depending on implementation, a row may alternatively correspond to a vertical data record. A first column corresponding to the first characteristic refers to a first vertical data record in the table being associated with the first characteristic. Depending on implementation, a column may alternatively correspond to a horizontal data record. A second column corresponding to the second characteristic refers to second vertical data record in the table being associated with the second characteristic. For example, at least one processor may organize the information included in the plurality of tiles into a grid of cells arranged into rows and columns of a table. The number of rows may correspond to the number of items, cells in the first column may store information corresponding to the first characteristic and cells in the second column may store information corresponding to the second characteristic. Alternatively, the number of columns may correspond to the number of items, cells in the first row may store information corresponding to the first characteristic and cells in the second row may store information corresponding to the second characteristic.

By way of a non-limiting example, in FIG. 4H, at least one processor (e.g., processing circuitry 3010 in FIG. 30) may cause table 430 to be presented on display 3050. Table 430 may include rows corresponding to the items associated with plurality of tiles 402, a first column 434-1 corresponding to the first characteristic (e.g., first characteristic 2004 in FIG. 20 representing deal value), and second column 434-2 corresponding to the second characteristic (e.g., second characteristic 2006 representing deal phase).

Figure 23:
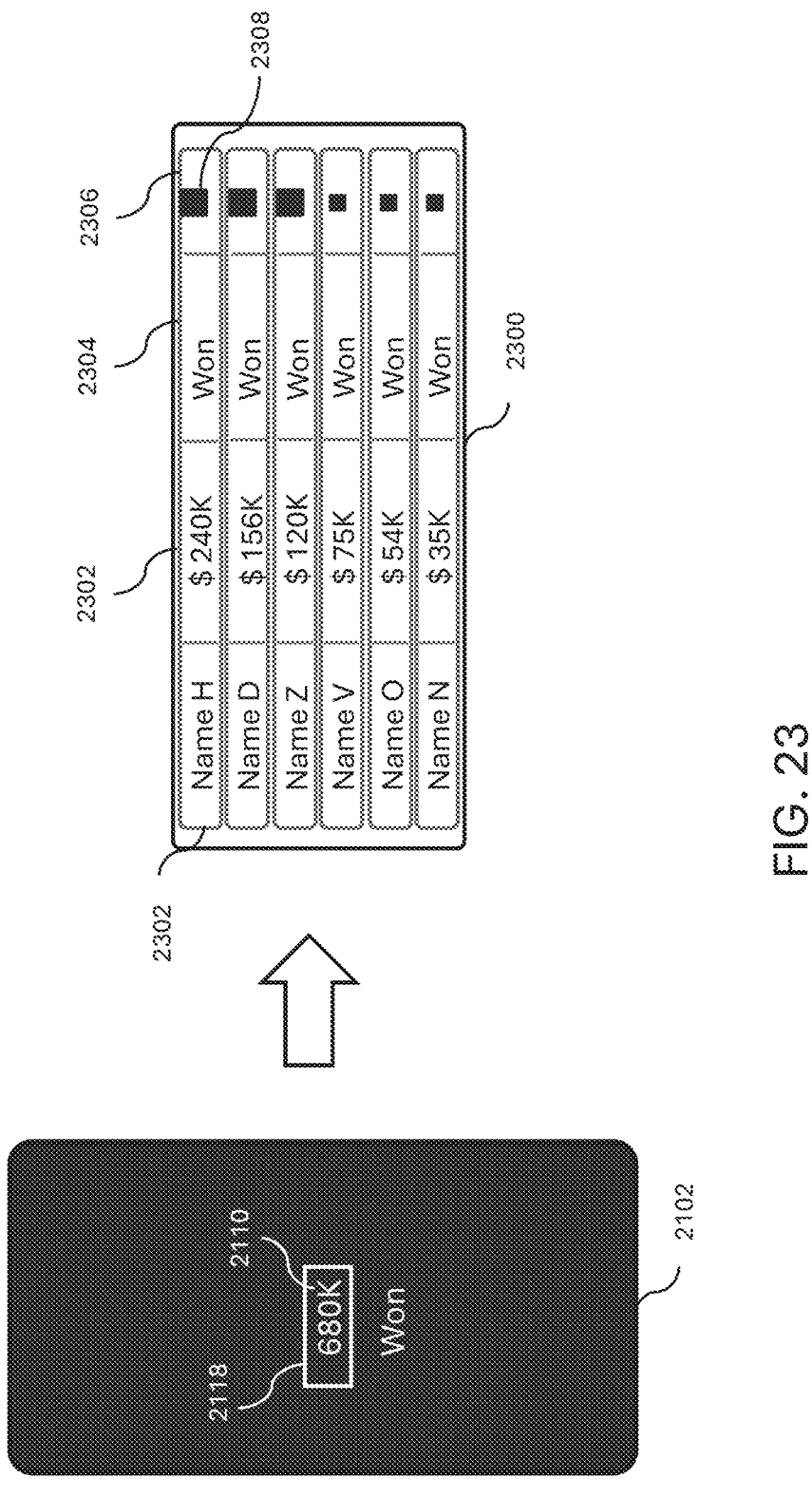
FIG. 23 illustrates a table corresponding to items associated with tiles of a grouping associated with a selected merged tile, consistent with some disclosed embodiments.

By way of another non-limiting example, reference is made to FIG. 23 illustrating a table 2300 corresponding to items associated with tiles of a grouping associated with a selected merged tile, consistent with some disclosed embodiments. At least one processor may cause table 2300 to be presented on display 3050. Table 2300 may include rows 2302 corresponding to the items associated with plurality of tiles 402, a first column 2302 corresponding to first characteristic 2004 (e.g., deal value in FIG. 20), and a second column 2304 corresponding to second characteristic 2006 (e.g., deal phase).

Some disclosed embodiments involve, in response to a selection signal, selecting at least one of the merged tiles, causing the table presented on the display to include rows corresponding to the items associated with each tile of the grouping associated with the at least one selected merged tile. A selection signal in this context refers to an indication that a user chose and/or picked a graphical element. A selection signal may be associated with an input device, as described elsewhere herein. A selection signal selecting a merged tile refers to a selecting signal targeting and/or placing a focus on one of the merged tiles. For example, a user may click on one of the merged tiles using an electronic mouse, and/or touch a merged tile via a touch-sensitive screen. Causing the table presented on the display to include rows corresponding to the items associated with each tile of the grouping associated with the at least one selected merged tile refers to adding a horizontal data record for each item of a tile included in the grouping represented by the selected merged tile. Thus, whereas each merged tile may present an aggregate of the first alphanumeric values, each row of a table representing a selected merged tile may include a cell presenting each of the first alphanumeric values included in the aggregate.

By way of a non-limiting example, in FIG. 23, in response to a selection signal selecting merged tile 2102 (e.g., via input output devices 3060 in FIG. 30), at least one processor (e.g., processing circuitry 3010) may cause table 2300 to be presented on display 3050. Table 2300 may include rows 2302 corresponding to the items associated with each tile 2002 of grouping 2008 associated with selected merged tile 2102. For instance, since grouping 2008 associated with merged tile 2102 includes seven tiles, each associated with a different item, table 2300 corresponding to merged tile 2102 may include seven rows, e.g., a different row for each item of each tile included in merged tile 2102. In some embodiments, table 2300 may be displayed under merged tile 2102. In some embodiments, table 2300 may be displayed under merged tiles 2102 to 2108. For instance, a user may select any one of merged tiles 2102 to cause a corresponding table to be displayed underneath all of merged tiles 2102 to 2108.

By way of another non-limiting example, in FIG. 27, in response to a selection signal selecting merged tile 2702, at least one processor may cause table 2300 (as described earlier) to be presented on display 3050. Table 2300 may be displayed above or below merged tile 2702. For example, table 2300 may be displayed in content 2726.

In some disclosed embodiments, the table includes a third column corresponding to graphical representations of tiles associated with the at least some of the plurality of items. A third column refers to a third row (horizontal or vertical) associated with a data record. graphical representations of tiles associated with the at least some of the plurality of items refers to a pictorial depiction of the tiles associated with the respective items. In some embodiments, the graphical representation of the tiles may include thumbnail representations of the tiles. For instance, each pictorial depiction may adopt adaptations of the first and/or second visual characteristics of the respective tiles in a manner accommodating presentation in the table (e.g., in miniaturized form). Thus, the table may include tiles sized in proportion to the first visual characteristic and displayed in a color corresponding to the second visual characteristic.

By way of a non-limiting example, in FIG. 23, table 2300 may include a third column 2306 corresponding to graphical representations 2308 of tiles 2002 associated with the at least some of the plurality of items. For instance, graphical representations 2308 may represent each tile included in grouping 2008 and included in merged tile 2102. Thus each of graphical representations 2308 may adopt a relative size and color, respectively, corresponding to the first and second visual characteristics of the tiles included in merged tile 2102.

In some disclosed embodiments, the first set of visual characteristics is determined by analyzing the first alphanumeric values of each item associated with each of the plurality of tiles, and the second set of visual characteristics is determined by analyzing the second alphanumeric values of each item associated with each of the plurality of tiles. Analyzing alphanumeric values refers to inspecting, examining, and/or performing computations using the alphanumeric values. Such an analysis may indicate a range, a pattern, a trend, a correlation, a spread (e.g., a standard deviation) a maximum, a minimum, an anomaly, and/or any other (e.g., statistical) trait associated with the alphanumeric values. The first set of visual characteristics is determined by analyzing the first alphanumeric values of each item associated with each of the plurality of tiles refers to selecting and/or assigning the first set of visual characteristics based on the analysis of the first alphanumeric values of the items in the tiles. For example, the first set of visual characteristics may visually indicate the results of the analysis. By way of example, the alphanumeric values may be divided into ranges of values, and each range may be assigned a different color. By way of another example, saturation levels may be selected based on divergence from a statistical mean, and items having first alphanumeric values closer to the mean may be displayed using a higher saturation level than items having first alphanumeric values further from the mean. By way of a further example, tile size may be selected based on a magnitude represented by the first alphanumeric value associated therewith. The second set of visual characteristics is determined by analyzing the second alphanumeric values of each item associated with each of the plurality of tiles may be understood as described above for the first set of visual characteristics.

By way of a non-limiting example, in FIG. 20, at least one processor (e.g., processing circuitry 3010 in FIG. 30) may determine the first set of visual characteristics (e.g., tile size) by analyzing first alphanumeric values 2004 of each item associated with each of the plurality of tiles 2002. At least one processor may determine the second set of visual characteristics (e.g., color) by analyzing second alphanumeric values 2006 of each item associated with each of plurality of tiles 2002. For example, at least one processor may determine a size for each tile 20102 (e.g., a first visual characteristic) in proportion to the magnitude of the respective first alphanumeric values 2004, such that tiles associated with higher first alphanumeric values 2004 may be displayed larger than tiles associated with smaller first alphanumeric values 2004. Similarly, at least one processor may determine a color for each tile 20102 (e.g., a second visual characteristic) to indicate a progression in the phase in a sales funnel, thus tiles associated with a final phase may be colored darker than tiles associated with earlier phases.

In some disclosed embodiments, each item associated with each tile includes a third characteristic having a third alphanumeric value. A third characteristic having a third alphanumeric value refers to each tile including a third piece of information encoded alphanumerically. Some disclosed embodiments involve analyzing the third alphanumeric values of each item associated with each of the plurality of tiles to determine a third set of visual characteristics. Analyzing the third alphanumeric values of each item associated with each of the plurality of tiles to determine a third set of visual characteristics may be understood as described elsewhere herein for the first and second alphanumeric values. By way of example, each item of a tile may represent a different product, and may include a first alphanumeric value corresponding to an inventory level, a second alphanumeric value corresponding to a product rank, and a third alphanumeric value corresponding to net sales. The color of each tile (e.g., a first visual characteristic) may represent the product code (e.g., the first alphanumeric value), the size of each tile (e.g., the second visual characteristic) may represent the inventory level (e.g., the second alphanumeric value), and the saturation level (e.g., the third visual characteristic) may represent the product ranking.

Some disclosed embodiments involve, in response to a switching signal: applying the third set of visual characteristics to the plurality of tiles. In some embodiments, a switching signal refers to an indication and/or notification to alter and/or change, e.g., to a different state. In some embodiments, A switching signal refers to a mechanism used to notify a process or a thread that a specific event has occurred, as described elsewhere herein. Applying the third set of visual characteristics to the plurality of tiles refers to causing the plurality of tiles to exhibit the third set of visual characteristics (e.g., different than the first and second visual characteristics). For example, the third set of visual characteristics may include a set of colors different than a set of colors used for the first or second visual characteristics. Some disclosed embodiments involve arranging the plurality of tiles in alternative groupings based on the third set of visual characteristics. Arranging the plurality of tiles in alternate groupings based on the third set of visual characteristics may be understood as described elsewhere herein for arranging groupings of tiles based on the second set of visual characteristics. For example, at least one processor may determine an alternative partition for the plurality of tiles and cluster the plurality of tiles into subsets (e.g., groupings) based on a similarity measure associated with the third visual characteristics. Each grouping in the alternative partition may thus correspond to a different visual characteristic of the third set of visual characteristics. Some disclosed embodiments involve, on an alternative grouping-by-alternative grouping basis, aggregating underlying associated first alphanumeric values of each item. On an alternative grouping-by-alternative grouping basis refers to handling, addressing, and/or attending to each item associated with each tile according to the alternative grouping scheme for the plurality of tiles. Aggregating underlying associated first alphanumeric values of each tile may be understood as described elsewhere herein. Thus, at least one processor may aggregate first alphanumeric values for each tile in the first alternative grouping, aggregate first alphanumeric values for each tile in the second alternative grouping, and so on. Some disclosed embodiments involve causing each of the alternative groupings to merge into an associated alternative merged tile expressing the third visual characteristic. Causing each of the alternative groupings to merge into an associated alternative merged tile expressing the third visual characteristics may be understood as described elsewhere herein. Thus, the alternative merged tiles may be sized according to the sum of the first alphanumeric values associated with each alternative grouping. For example, in the (e.g., original) grouping, the plurality of tiles may be merged according to product type (e.g., the second alphanumeric value) and sized according to sales volume (e.g., the first alphameric value), such that a size of each merged tile represents the total sales volume for a given product type. In the alternative grouping, the plurality of tiles may be merged according to inventory levels (e.g., the third alphanumeric value) and sized according to sales volume (e.g., the first alphameric value), such that a size of each merged tile represents the total sales volume for a given inventory level.

In some disclosed embodiments, the alternative merged tiles have different sizes based on the aggregating of the underlying associated first alphanumeric values. This may be understood as described elsewhere herein. Some disclosed embodiments involve presenting on the display the alternative merged tiles by juxtaposing the alternative merged tiles in accordance with the third set of visual characteristics. This may be understood as described elsewhere herein. For example, at least one processor may display the alternative merged tiles, merged based on inventory levels by juxtaposing each alternative merged tile to permit comparisons there between. In some embodiments, in response to a selection signal selecting at least one of the alternative merged tiles, at least one processor may cause a table to be presented on the display. The table may include rows corresponding to the items associated with each tile of the alternative grouping associated with the selected alternative merged tile. For example, clicking one of the alternative merged tiles may cause a table presenting characteristic of items associated therewith to be displayed.

In some disclosed embodiments, the first set of visual characteristics are different sizes, the second set of visual characteristics are different colors chosen from a first color palette, and the third set of visual characteristics are different colors chosen from a second color palette different the first color palette. A first color palette refers to a first finite set of distinct colors. A second color palette refers to a second finite set of distinct colors different than the first set of colors. Different sizes may be understood as described elsewhere herein. When displaying the alternative groupings in accordance with the third visual characteristics, at least one processor may select a color for presenting each alternative merged tile from a different set of colors that were used to display the tiles merged based on the second set of visual characteristic. For example, the second set of visual characteristics may include a set of colors ranging from red to yellow, and the third set of visual characteristics may include a set of colors ranging from purple to blue.

In some disclosed embodiments, receiving the switching signal includes receiving at least one of: receiving a scroll signal resulting from a motion of a user on the display; or receiving a trigger via a Graphical User Interface (GUI) component present on a display. Receiving at least one of a scroll signal resulting from a motion of a user on the display; or receiving a trigger via a GUI component present on a display may be understood as described elsewhere herein. For example, a user may click a switching button using an electronic mouse to input a switching signal.

By way of a non-limiting example, in FIG. 20, each item associated with each tile 2002 may include a third characteristic 2020 having a third alphanumeric value (e.g., high, medium, or low risk). At least one processor (e.g., processing circuitry 3010 in FIG. 30) may analyze third alphanumeric values 2020 of each item associated with each of the plurality of tiles 2002 to determine a third set of visual characteristics (e.g., a fill pattern). In response to a switching signal (e.g., by clicking a GUI element via input output devices 3060), at least one processor may apply the third set of visual characteristics to the plurality of tiles. Thus, tiles associated with high risk may adopt a first visual characteristic of the third set of visual characteristics, tiles associated with moderate risk may adopt a second visual characteristic of the third set of visual characteristics, and tiles associated with low risk may adopt a third visual characteristic of the third set of visual characteristics.

Figure 24:
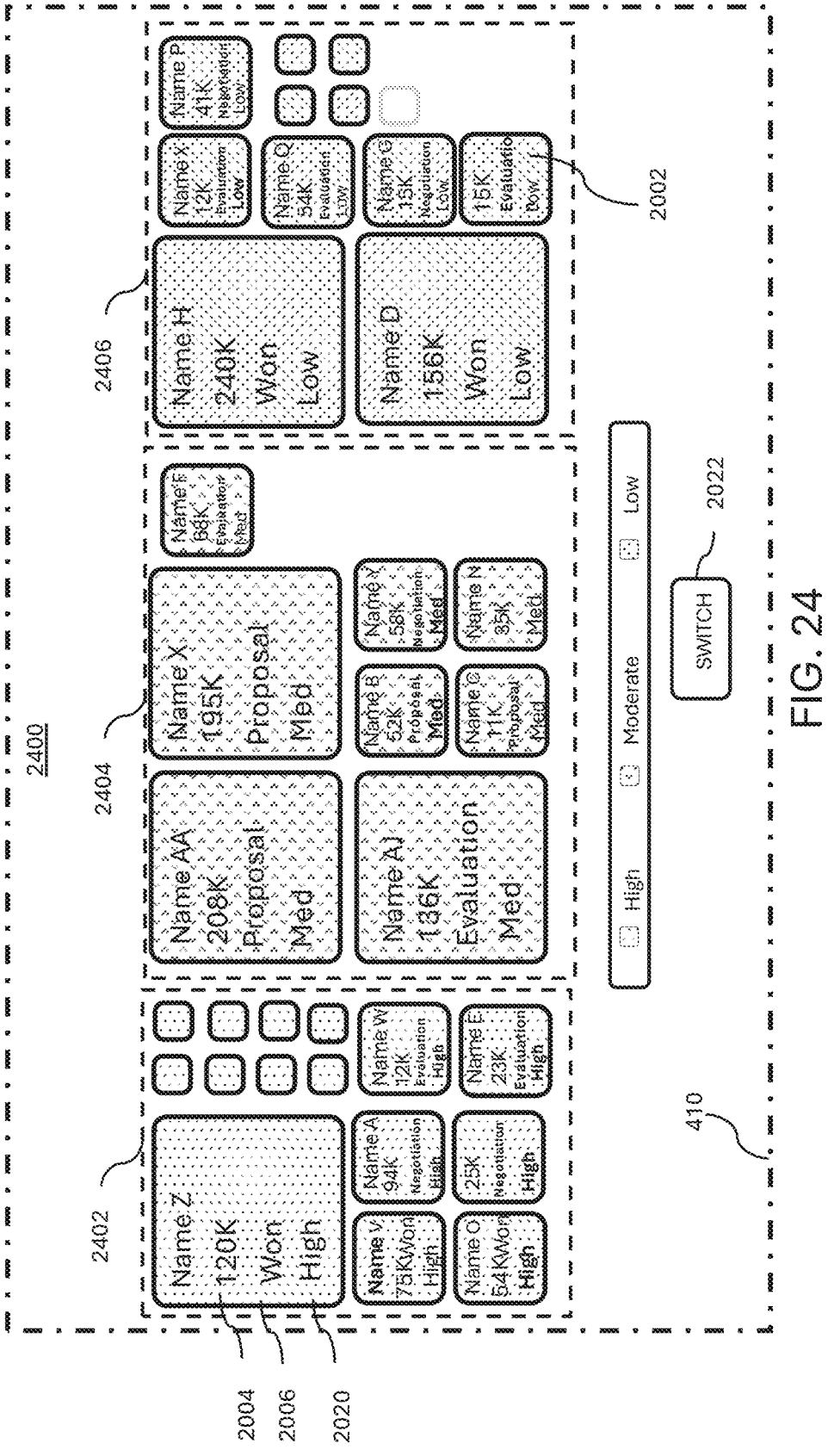
FIG. 24 illustrates an arrangement of tiles in alternative groupings based on a third set of visual characteristics, consistent with some disclosed embodiments.

By way of a non-limiting example, reference is made to FIG. 24 illustrating an arrangement 2400 of tiles in alternative groupings based on a third set of visual characteristics, consistent with some disclosed embodiments. For example, a first alternate grouping 2402 may include tiles associated with items having a high risk factor, a second alternate grouping 2404 may include tiles associated with items having a moderate risk factor, and a third alternate grouping 2406 may include tiles associated with items having a low risk factor. At least one processor may arrange plurality of tiles 2002 in alternative groupings based on the third set of visual characteristics (e.g., fill pattern). On an alternative grouping-by-alternative grouping basis, at least one processor may aggregate underlying associated first alphanumeric values 2004 of each item.

By way of a non-limiting example, reference is made to FIG. 25 illustrating a presentation 2500 of alternative merged tiles juxtaposed in accordance with a third set of visual characteristics, consistent with some disclosed embodiments. At least one processor may cause each of alternative groupings 2402, 2404, and 2406 to merge into an associated alternative merged tile 2502, 2504, and 2506 expressing the third visual characteristic. Alternative merged tiles 2502, 2504, and 2506 may have different sizes based on the aggregating of the underlying associated first alphanumeric values (e.g., aggregated values 2508, 2510, and 2512). At least one processor may present on display 3050 alternative merged tiles 2502, 2504, and 2506 by juxtaposing alternative merged tiles 2502, 2504, and 2506 in accordance with the third set of visual characteristics 2020. In some embodiments, the first set of visual characteristics may be different sizes, the second set of visual characteristics may be different colors chosen from a first color palette (e.g., a grey scale ranging from black to white), and the third set of visual characteristics are different colors chosen from a second color palette different the first color palette (e.g., different fill patterns). In some embodiments, at least one processor may receive a switching signal via a GUI element 2022 presented on display 3050. In some embodiments, GUI element 2022 may be a toggle switch permitting a user to toggle between viewing tiles 2002 grouped according to groupings 2008 to 2014 based on the second visual characteristic and corresponding to the second alphanumeric value (e.g., phase in the sales funnel), or viewing tiles 2002 grouped according to alternative groupings 2402 to 2406 based on the third visual characteristic and corresponding to the third alphanumeric value (e.g., risk).

Figure 29:
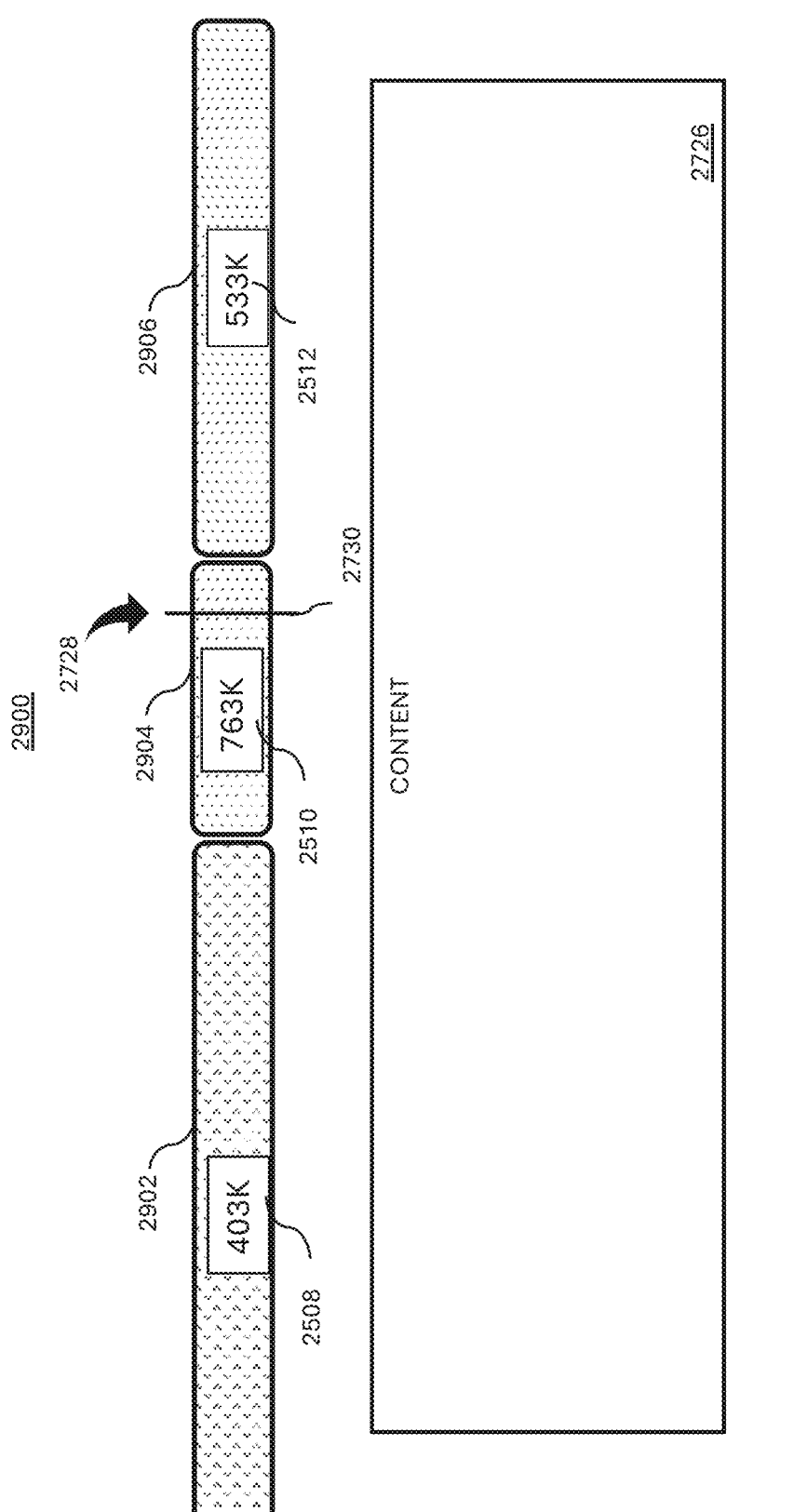
FIG. 29 illustrates an additional presentation of alternative merged tiles juxtaposed in accordance with a third set of visual characteristics, consistent with some disclosed embodiments.

By way of another non-limiting example, reference is made to FIG. 29 illustrating another presentation 2900 of alternative merged tiles juxtaposed in accordance with a third set of visual characteristics, consistent with some disclosed embodiments. At least one processor may cause each of alternative groupings 2402, 2404, and 2406 to merge into an associated alternative merged tiles 2902, 2904, and 2906 expressing the third visual characteristic. Alternative merged tiles 2902, 2904, and 2906 may have different sizes (e.g., lengths) based on the aggregating of the underlying associated first alphanumeric values (e.g., aggregates 2508, 2510, and 2512). For example, alternative merged tiles 2902, 2904, and 2906 may be arranged horizontally across the display as a banner to represent a weight of each aggregate 2508, 2510, and 2512 for each of alternative groupings 2402, 2404, and 2406 relative to a total for all of tiles 2002. In other words, the lengths of merged tiles 2902, 2904, and 2906 may be scaled to visually represent the ratios between aggregates 2508, 2510, and 2512 of first alphanumeric values 2004 associated with alternative groupings 2402, 2404, and 2406 relative to a total for first alphanumeric values 2004 for all of tiles 2002.

At least one processor may present on display 3050 alternative merged tiles 20002, 20004, and 20006 by juxtaposing alternative merged tiles 20002, 20004, and 20006 in accordance with the third set of visual characteristics 2020. In some embodiments, the first set of visual characteristics may be different sizes, the second set of visual characteristics may be different colors chosen from a first color palette (e.g., different fill patterns), and the third set of visual characteristics are different colors chosen from a second color palette different the first color palette (e.g., different fill patterns). In some embodiments, at least one processor may receive a switching signal via a GUI element (e.g., element 2022 presented on display 3050) permitting a user to toggle between viewing merged tiles 2702 to 2708 corresponding to groupings 2008 to 2014 based on the second alphanumeric value (e.g., phase), or viewing alternative merged tiles 20002 to 1006 corresponding to alternative groupings 2402 to 2406 based on the third alphanumeric value (e.g., risk).

FIG. 26 is a flowchart of an exemplary process (2600) for toggling between different arrangements of discrete graphical elements having a plurality of graphical characteristics conveying representations of alphanumeric data in a non-alphanumeric manner consistent with some disclosed embodiments. Process 2600 is discussed herein for explanatory purposes and is not intended to be limiting. Moreover, while the process is described in conjunction with various structures or examples, in its broadest sense, the process is not limited to any particular structure or example. In some embodiments, steps of process 2600 may be changed, modified, substituted, or rearranged, consistent with the present disclosure. Process 2600 may be implemented using one or more components of a computing device 3000 (discussed in FIG. 30) or user device 3120 of computing architecture 3100 (discussed in FIG. 31). Some disclosed embodiments may include at least one processor that may be configured to execute stored instructions to perform operations for causing discrete graphical elements to be organized in a segmented manner and exhibiting alphanumeric data as graphical distinctions. As shown in FIG. 26, process 2600 may include steps 2602 to 2616, discussed in further detail below.

Process 2600 includes a step 2602 for causing an initial arrangement of a plurality of tiles on a display. By way of a non-limiting example, in FIG. 20, at least one processor (e.g., processing circuitry 3010 in FIG. 30) may cause an initial arrangement 2000 of a plurality of tiles 2002 on a display (e.g., display 3050).

Process 2600 includes a step 2604 for, in the initial arrangement: associating each of the plurality of tiles with an item including a first characteristic having a first alphanumeric value and a second characteristic having a second alphanumeric value, and each item is associated with a common objective. By way of a non-limiting example, in FIG. 20, in initial arrangement 2000, each of the plurality of tiles 2002 may be associated with an item (e.g., items 202 in FIG. 2) including a first characteristic having a first alphanumeric value 2004 (e.g., a deal size) and a second characteristic having a second alphanumeric value (e.g., a phase in the sales funnel). Each item may be associated with a common objective (e.g., maximizing profit or meeting quarterly goals).

Process 2600 includes a step 2606 for causing each tile of the plurality of tiles to adopt a first visual characteristic from a first set of visual characteristics, and a second visual characteristic from a second set of visual characteristics. By way of a non-limiting example, in FIG. 20, each of plurality of tiles 2002 may adopt a first characteristic (e.g., a tile size) from a first set of visual characteristics and a second visual characteristic (e.g., a tile color) from a second set of characteristics.

Process 2600 includes a step 2608 for arranging the plurality of tiles in groupings based on the second set of visual characteristics. By way of a non-limiting example, in FIG. 20, in response to a trigger signal (e.g., via input output devices 3060 in FIG. 3010), at least one processor (e.g., processing circuitry 3010) may arrange plurality of tiles 2002 in groupings 2008, 2010, 2012, and 2014 based on the second set of visual characteristics (e.g., tile color).

Process 2600 includes a step 2610 for arranging the plurality of tiles to convey a visualization of progress toward the common objective. By way of a non-limiting example, in FIG. 20, at least one processor (e.g., processing circuitry 3010) may arrange plurality of tiles 2002 to convey a visualization of progress toward the common objective.

Process 2600 includes a step 2612 for, in response to a trigger signal: on a grouping-by-grouping basis, aggregating underlying associated first alphanumeric values of each item. By way of a non-limiting example, in FIG. 20, in response to a trigger signal (e.g., received via input output devices 3060 in FIG. 30), on a grouping-by-grouping basis, at least one processor (e.g., processing circuitry 3050) may aggregate underlying associated first alphanumeric values 2004 of each item 2002.

Process 2600 includes a step 2614 for causing each of the groupings to merge into an associated merged tile expressing the second visual characteristic, and wherein the merged tiles have different sizes based on the aggregating of the underlying associated first alphanumeric values. By way of a non-limiting example, in FIG. 21, at least one processor (e.g., processing circuitry 3050 of FIG. 30) may cause merged tiles 2102 to 2108 have different sizes based on the aggregating of the underlying associated first alphanumeric values 2004 (e.g., merged tiles 2102 to 2108 may be sized in proportion to aggregates 2110 to 2116, respectively).

Process 2600 includes a step 2616 for presenting on the display the merged tiles by juxtaposing the merged tiles in accordance with the second set of visual characteristics. By way of a non-limiting example, in FIG. 21, at least one processor (e.g., processing circuitry 3050 of FIG. 30) may present on display (e.g., display 3050) merged tiles 2102 to 2108 by juxtaposing merged tiles 2102 to 2108 in accordance with the second set of visual characteristics (e.g., color).

While the disclosed and illustrated processes describe different aspects of enabling enhanced data representation operations, in some embodiments, the steps within the disclosed processes can be combined with each other or integrated into a more comprehensive process. This global process can be implemented using one or more components of a computing device 3000 (as discussed in FIG. 30) or a user device 3120 within the computing architecture 3100 (as discussed in FIG. 31). The disclosed embodiments may involve at least one processor configured to execute stored instructions for performing the global process. By combining the steps from various processes or designing a more extensive process, the disclosed embodiments provide a seamless integration of various enhanced computer functionalities into a unified system. The computing resources and processors disclosed herein may play a key role in executing the instructions that drive such a unified or global process.

Figure 30:
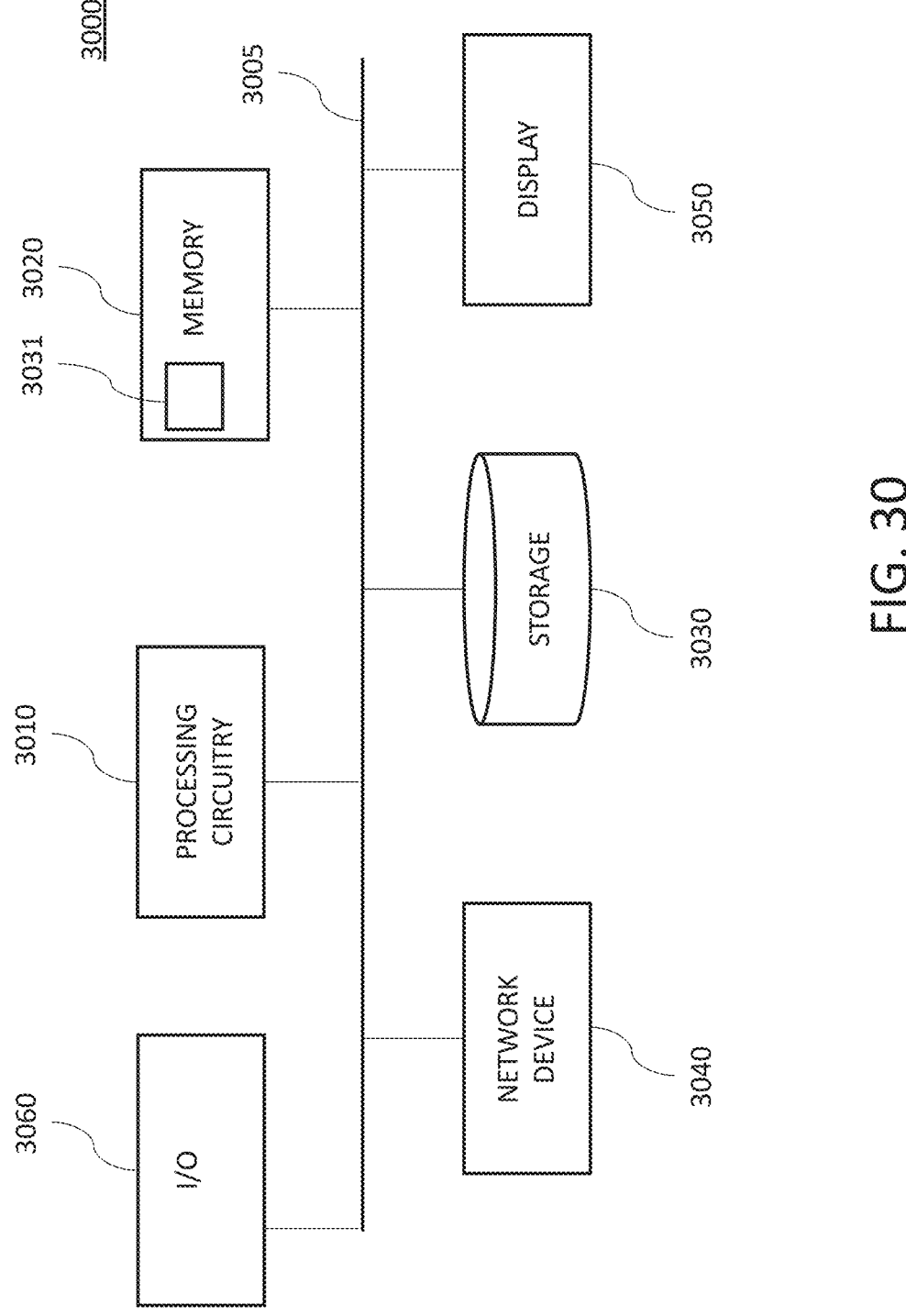
FIG. 30 is a block diagram of an exemplary computing device or system which may be employed in connection with some embodiments of the present disclosure.

FIG. 30 is a block diagram of an exemplary computing device 3000 consistent with some embodiments. In some embodiments, computing device 3000 may be similar in type and function to user device 3120, discussed with respect to FIG. 31. As shown in FIG. 12, computing device 3000 may include processing circuitry 3010, such as, for example, a central processing unit (CPU). In some embodiments, the processing circuitry 3010 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 3010 may be coupled via a bus 3005 to a memory 2020.

The memory 3020 may further include a memory portion 3031 that may contain instructions that when executed by the processing circuitry 2300, may perform the methods described in more detail herein. The memory 19 20 may be further used as a working scratch pad for the processing circuitry 3010, a temporary storage, and others, as the case may be. The memory 3020 may be a volatile memory such as, but not limited to, random access memory (RAM), or non-volatile memory (NVM), such as, but not limited to, flash memory. The processing circuitry 3010 may be further connected to a network device 3040, such as a network interface card, for providing connectivity between the computing device 3000 and a network, such as a network 2300, discussed in more detail with respect to FIG. 31 below. The processing circuitry 3010 may be further coupled with a storage device 3030. The storage device 3030 may be used for the purpose of storing single data type column-oriented data structures, data elements associated with the data structures, or any other data structures. While illustrated in FIG. 30 as a single device, it is to be understood that storage device 3030 may include multiple devices either collocated or distributed.

The processing circuitry 3010 and/or the memory 3020 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 19 may include one or more input and output devices 3060. Input and output devices 3060 may include one or more input interfaces, such as a keyboard device, an electronic mouse, an electronic stylus, a touch-sensitive screen, a camera (e.g., for capturing an input gesture), a microphone (e.g., for capturing audio input), and/or any other type of input interface. Input and output devices 3060 may include one or more output interfaces, such as an electronic screen, a speaker, a haptic output device, and/or any other type of output interface. Computing device may also include a display 19, such as a touchscreen display or other display types discussed herein.

Figure 31:
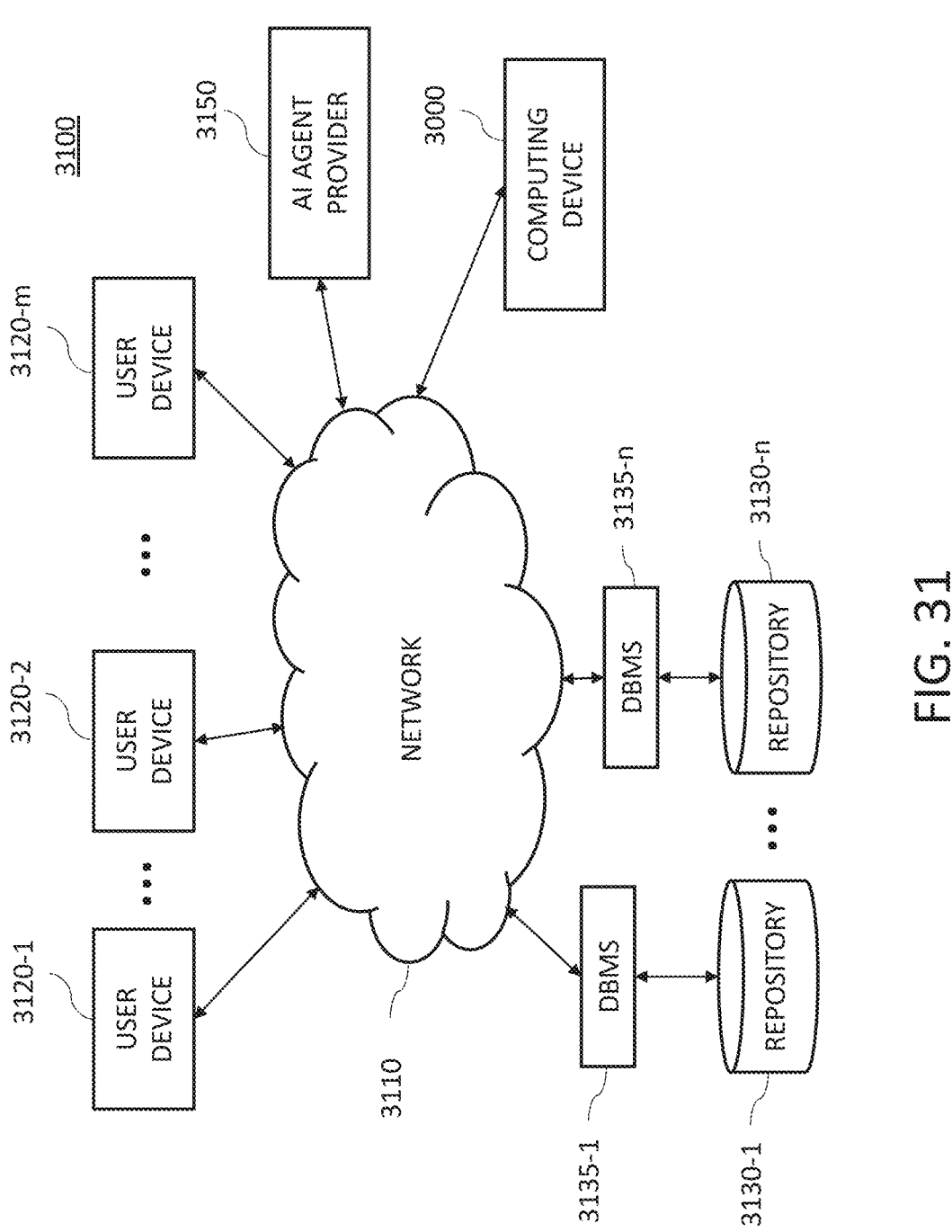
FIG. 31 is a block diagram of an exemplary computing architecture for collaborative work systems, consistent with some embodiments of the present disclosure.

FIG. 31 is a block diagram of computing architecture 3100 that may be used in connection with various disclosed embodiments. The computing device 3000, as described in connection with FIG. 30, may be coupled to network 2300. The network 2300 may enable communication between different elements that may be communicatively coupled with the computing device 1300, as further described below. The network 2300 may include the Internet, the world-wide-web (WWW), a local area network (LAN), a wide area network (WAN), a metro area network (MAN), and other networks capable of enabling communication between the elements of the computing architecture 3100. In some disclosed embodiments, the computing device 3000 may be a server deployed in a cloud computing environment.

One or more user devices 3120-1 through user device 3120-*m*, where 'm' in an integer equal to or greater than 1, referred to individually as user device 3120 and collectively as user devices 3120, may be communicatively coupled with the computing device 3000 via the network 2300. A user device 3120 may be for example, a smart phone, a mobile phone, a laptop, a tablet computer, a wearable computing device, a personal computer (PC), a smart television and the like. A user device 3120 may be configured to send to and receive from the computing device 3000 data and/or metadata associated with a variety of elements associated with single data type column-oriented data structures, such as columns, rows, cells, schemas, and the like. Furthermore, external third-party application providers such as an AI agent provider 3150 may be communicatively coupled with the computing device 3000 via the network 2300.

One or more data repositories 3130-1 through data repository 3130-*n*, where 'n' in an integer equal to or greater than 1, referred to individually as data repository 3130 and collectively as data repository 3130, may be communicatively coupled with the computing device 3000 via the network 2300, or embedded within the computing device 3000. Each data repository 3130 may be communicatively connected to the network 2300 through one or more database management services (DBMS) 3135-1 through DBMS 3135-*n*. The data repository 3130 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 3000.

The embodiments disclosed herein are exemplary and any other means for performing and facilitating display navigation operations may be consistent with this disclosure.

Some disclosed embodiments involve artificial intelligence (also referred to as machine learning models or algorithms) that may be trained using training examples. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Differing embodiments of this disclosure may involve systems, methods, and/or computer readable media containing instructions. A system refers to at least two interconnected or interrelated components or parts that work together to achieve a common objective, function, or sub-function. A method refers to at least two steps, actions, or techniques to be followed to complete a task or a sub-task, to reach an objective, or to arrive at a next step. Computer-readable media containing instructions refers to any storage mechanism that contains program code instructions, for example to be executed by a computer processor. Examples of computer-readable media are further described elsewhere in this disclosure. Instructions may be written in any type of computer programming language, such as an interpretive language (e.g., scripting languages such as HTML and JavaScript), a procedural or functional language (e.g., C or Pascal that may be compiled for converting to executable code), an object-oriented programming language (e.g., Java or Python), a logical programming language (e.g., Prolog or Answer Set Programming), and/or any other programming language. Instructions executed by at least one processor may include implementing one or more program code instructions in hardware, in software (including in one or more signal processing and/or application specific integrated circuits), in firmware, or in any combination thereof, as described earlier. Causing a processor to perform operations may involve causing the processor to calculate, execute, or otherwise implement one or more arithmetic, mathematic, logic, reasoning, or inference steps.

Examples of inventive concepts are contained in the following clauses which are an integral part of this disclosure.

Clause 1. A non-transitory computer-readable medium containing instructions that, when executed by at least one processor, cause at least the at least one processor to perform operations for converting stored alphanumeric data into discrete graphical elements having a plurality of graphical characteristics that convey representations of the alphanumeric data in a non-alphanumeric manner, the operations comprising:

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in a grouped manner for visualizing progress toward the common objective;

analyzing first alphanumeric values of the at least some of the plurality of items to segment the at least some of the plurality of items in a first partitioning to thereby define first partitioning groups;

analyzing second alphanumeric values of the at least some of the plurality of items to segment the at least some of the plurality of items in a second partitioning to thereby define second partitioning groups;

based on the first partitioning, identifying a first set of visual characteristics for non-alphanumerically expressing the first alphanumeric values;

based on the second partitioning, identifying a second set of visual characteristics different from the first set of visual characteristics, for non-alphanumerically expressing the second alphanumeric values;

generating a plurality of tiles associated with the at least some of the plurality of items, each of the plurality of tiles adopting a first visual characteristic from the first set, and a second visual characteristic from the second set;

arranging the plurality of tiles in groupings based on at least one of the first set of visual characteristics or the second set of visual characteristics; and causing the groupings to be presented on a common display.

Clause 2. The non-transitory computer-readable medium of clause 1, wherein at least one of the first alphanumeric values or the second alphanumeric values are relative alphanumeric values.

Clause 3. The non-transitory computer-readable medium of any of clauses 1-2, wherein operations further comprise causing a table to be presented on the common display, wherein the table includes rows corresponding to the at least some of the plurality of items and at least two columns corresponding to the first characteristic and the second characteristic included in each of the at least some of the plurality of items.

Clause 4. The non-transitory computer-readable medium of any of clauses 1-3, wherein the table includes a third column corresponding to graphical representations of tiles associated with the at least some of the plurality of items.

Clause 5. The non-transitory computer-readable medium of any of clauses 1-4, wherein the first set of visual characteristics and the second set of visual characteristics are chosen from a group consisting of size, color, texture, transparency, shadowing, or shape.

Clause 6. The non-transitory computer-readable medium of any of clauses 1-5, wherein the first set of visual characteristics are different sizes, and the second set of visual characteristics are different colors.

Clause 7. The non-transitory computer-readable medium of any of clauses 1-6, wherein the different sizes are proportional to the first alphanumeric values or, the different sizes correspond to different ranges for the first alphanumeric values.

Clause 8. The non-transitory computer-readable medium of any of clauses 1-7, wherein each item includes a third characteristic having a third alphanumeric value and wherein the operations further comprise:

analyzing third alphanumeric values of the at least some of the plurality of items to segregate the at least some of the plurality of items in a third partitioning to thereby identify third partitioning groups;

based on the third partitioning, identifying a third set of visual characteristics, different from the first set of visual characteristics and the second set of visual characteristics, for non-alphanumerically expressing the third alphanumeric value;

applying the third set of visual characteristics to the plurality of tiles; and wherein arranging the plurality of tiles in groupings is based on at least one of the first set of visual characteristics, the second set of visual characteristics, or the third set of visual characteristics.

Clause 9. The non-transitory computer-readable medium of any of clauses 1-8, wherein the first set of visual characteristics are different sizes, the second set of visual characteristics are different colors, and the third set of visual characteristics are different transparency levels.

Clause 10. The non-transitory computer-readable medium of any of clauses 1-9, wherein visualizing progress toward the common objective includes determining an order in which the groupings are to be presented on the common display.

Clause 11. The non-transitory computer-readable medium of any of clauses 1-10, wherein the first set of visual characteristics and the second set of visual characteristics provide insights into the common objective.

Clause 12. The non-transitory computer-readable medium of any of clauses 1-11, wherein receiving a trigger includes at least one of:

receiving a scroll signal resulting from a motion of a user on the common display; or receiving a trigger via a Graphical User Interface (GUI) component present on the common display.

Clause 13. The non-transitory computer-readable medium of any of clauses 1-12, wherein the groupings are presented on the common display in a non-overlapping manner.

Clause 14. The non-transitory computer-readable medium of any of clauses 1-13, wherein arranging the plurality of tiles in groupings based on at least one of the first visual characteristic or the second visual characteristic includes:

arranging the plurality of tiles in groupings based on the first set of visual characteristics and arranging the plurality of tiles within the groupings based on the second set of visual characteristics; or arranging the plurality of tiles in groupings based on the second set of visual characteristics and arranging the plurality of tiles within the groupings based on the first set of visual characteristics.

Clause 15. The non-transitory computer-readable medium of any of clauses 1-14, wherein the operations further comprise:

receiving an alphanumeric target value associated with the common objective;

calculating from the first alphanumeric values a boundary location within the groupings corresponding to the target value;

interposing on the common display a boundary at the boundary location.

Clause 16. The non-transitory computer-readable medium of any of clauses 1-15, wherein when the alphanumeric target value is lower than a sum of the first alphanumeric values, the interposed boundary divides the plurality of tiles into two ensembles.

Clause 17. The non-transitory computer-readable medium of any of clauses 1-16, wherein each of the plurality of tiles includes at least one alphanumerical field configured to present at least one alphanumeric value of an associated item.

Clause 18. The non-transitory computer-readable medium of any of clauses 1-17, wherein the operations further comprise enabling toggling between a first grouping presentation on the common display based on the first set of visual characteristics and a second grouping presentation on the common display based on the second set of visual characteristics.

Clause 19. A method for converting stored alphanumeric data into discrete graphical elements having graphical characteristics that convey representations of the alphanumeric data in a non-alphanumeric manner, the method comprising:

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in an aggregated manner for visualizing progress toward the common objective;

analyzing first alphanumeric values of the at least some of the plurality of items to segregate the at least some of the plurality of items in a first partitioning to thereby identify first partitioning groups;

analyzing second alphanumeric values of the at least some of the plurality of items to segregate the at least some of the plurality of items in a second partitioning to thereby identify second partitioning groups;

based on the first partitioning, identifying a first set of visual characteristics for non-alphanumerically expressing the first alphanumeric values;

based on the second partitioning, identifying a second set of visual characteristics, different from the first set of visual characteristics, for non-alphanumerically expressing the second alphanumeric values;

generating a plurality of tiles associated with the at least some of the plurality of items, each of the plurality of tiles adopting a first visual characteristic from the first set, and a second visual characteristic from the second set;

arranging the plurality of tiles in groupings based on at least one of the first set of visual characteristics or the second set of visual characteristics; and causing the groupings to be presented on a common display.

Clause 20. A system for converting stored alphanumeric data into discrete graphical elements having graphical characteristics that convey representations of the alphanumeric data in a non-alphanumeric manner, the system comprising:

at least one processor configured to:

access a data structure including a plurality of items each associated with a common objective, and each including a first characteristic having a first alphanumeric value and a second characteristic having a second alphanumeric value;

receive a trigger requesting that at least some of the plurality of items from the data structure be graphically represented in an aggregated manner for visualizing progress toward the common objective;

analyze first alphanumeric values of the at least some of the plurality of items to segregate the at least some of the plurality of items in a first partitioning to thereby identify first partitioning groups;

analyze second alphanumeric values of the at least some of the plurality of items to segregate the at least some of the plurality of items in a second partitioning to thereby identify second partitioning groups;

based on the first partitioning, identify a first set of visual characteristics for non-alphanumerically expressing the first alphanumeric values;

based on the second partitioning, identify a second set of visual characteristics, different from the first set of visual characteristics, for non-alphanumerically expressing the second alphanumeric values;

generate a plurality of tiles associated with the at least some of the plurality of items, each of the plurality of tiles adopting a first visual characteristic from the first set, and a second visual characteristic from the second set;

arrange the plurality of tiles in groupings based on at least one of the first set of visual characteristics or the second set of visual characteristics; and cause the groupings to be presented on a common display.

Clause 21. A non-transitory computer-readable medium containing instructions that, when executed by at least one processor, cause the at least one processor to perform operations for causing discrete graphical elements to be organized in a segmented manner and exhibiting alphanumeric data as graphical distinctions, the operations comprising:

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in a grouped manner for visualizing progress toward the common objective;

analyzing first alphanumeric values of the at least some of the plurality of items to segment the at least some of the plurality of items in a first partitioning to thereby define first partitioning groups;

analyzing second alphanumeric values of the at least some of the plurality of items to segment the at least some of the plurality of items in a second partitioning to thereby define second partitioning groups;

generating a plurality of differently sized tiles associated with the at least some of the plurality of items, the differently sized tiles including some tiles of at least a first tile size and other tiles of at least a second tile size larger than the first tile size, and wherein the first tile size is configured to convey a first magnitude of the first alphanumeric value of the first characteristic, and the second tile size is configured to convey a second magnitude of the first alphanumeric value of the first characteristic, the second magnitude being greater than the first magnitude;

wherein the second partitioning groups are configured to cause an organizational structure dividing the plurality of tiles into distinct collections based on the second partitioning groups, and wherein within the distinct collections, the tiles of the distinct collections visually differ based on the different sizes; and causing the distinct collections to be presented on a common display.

Clause 22. The non-transitory computer-readable medium of any of clauses 1-21, wherein the distinct collections are visually organized and sorted in at least one of a columnar or a non-columnar form.

Clause 23. The non-transitory computer-readable medium of any of clauses 1-22, wherein each second partitioning group is associated with at least one of a distinct second alphanumerical value or a distinct range of second alphanumerical values.

Clause 24. The non-transitory computer-readable medium of any of clauses 1-23, wherein each of the plurality of tiles includes at least one alphanumerical field configured to present at least one alphanumeric value of an associated item.

Clause 25. The non-transitory computer-readable medium of any of clauses 1-24, wherein the at least one alphanumeric value of the associated item corresponds to the first alphanumerical value of the associated item, and wherein the operations further comprise presenting on each of the plurality of tiles the first alphanumeric value of the associated item in the at least one alphanumerical field as a function of the size of the tile.

Clause 26. The non-transitory computer-readable medium of any of clauses 1-25, wherein differences in tile size between the first tile size and the second tile size is a result of at least one of an increase in tile area or a change of tile shape.

Clause 27. The non-transitory computer-readable medium of any of clauses 1-26, wherein the different sizes of the plurality of tiles enables to convey information about the common objective.

Clause 28. The non-transitory computer-readable medium of any of clauses 1-27, wherein the operations further include arranging the plurality of tiles within the distinct collections based on the different sizes of the plurality of tiles.

Clause 29. The non-transitory computer-readable medium of any of clauses 1-28, wherein the different sizes of the plurality of tiles are proportional to the first alphanumeric values or, the different sizes correspond to different ranges for the first alphanumeric values.

Clause 30. The non-transitory computer-readable medium of any of clauses 1-29, wherein the operations further comprise:

based on the second partitioning, identifying a set of visual characteristics for non-alphanumerically expressing the second alphanumeric values;

wherein each distinct collection includes an associated label including a graphical element adopting a visual characteristic from the set of visual characteristics.

Clause 31. The non-transitory computer-readable medium of any of clauses 1-30, wherein each label includes an alphanumerical field configured to present a second alphanumerical value associated with the second partitioning group corresponding to the distinct collection.

Clause 32. The non-transitory computer-readable medium of any of clauses 1-31, wherein the operations further comprise:

for each distinct collection, calculating a sum of the first alphanumerical values of items associated with tiles included in the associated distinct collection; and wherein each label includes an additional alphanumerical field configured to present the sum of the first alphanumerical values of items associated with tiles included in the associated distinct collection.

Clause 33. The non-transitory computer-readable medium of any of clauses 1-32, wherein the operations further comprise identifying the set of different sizes is based on the first alphanumerical values and at least one of:

a display dimension;

a total number of tiles; or widths associated with columns of the columnar form.

Clause 34. The non-transitory computer-readable medium of any of clauses 1-33, wherein the operations further comprise:

determining for each column of the columnar form a width based on at least one of:

tiles included therein;

tiles included in at least one other column; or a display dimension.

Clause 35. The non-transitory computer-readable medium of any of clauses 1-34, wherein each item includes a third characteristic having a third alphanumeric value and wherein the operations further include:

analyzing third alphanumeric values of the at least some of the plurality of items to segregate the at least some of the plurality of items in a third partitioning to thereby identify third partitioning groups;

based on the third partitioning, identifying an additional set of visual characteristics to be applied to the plurality of tiles for non-alphanumerically expressing the third alphanumeric values.

Clause 36. The non-transitory computer-readable medium of any of clauses 1-35, wherein the operations further comprise arranging the plurality of tiles within the distinct collections based on the set of different sizes and the additional set of visual characteristics.

Clause 37. The non-transitory computer-readable medium of any of clauses 1-36, wherein the additional set of visual characteristics is a set of different colors.

Clause 38. The non-transitory computer-readable medium of any of clauses 1-37, wherein the operations further include:

in response to receiving a switching signal, cause the organizational structure of the plurality of tiles into the distinct collections to be switched to an alternative organizational structure;

wherein the alternative organizational structure is obtained by arranging the plurality of tiles in groupings based on at least one of the set of different sizes or the additional set of visual characteristics.

Clause 39. A method for causing discrete graphical elements to be organized in a segmented manner and exhibiting alphanumeric data as graphical distinctions, the method comprising:

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in a grouped manner for visualizing progress toward the common objective;

analyzing first alphanumeric values of the at least some of the plurality of items to segment the at least some of the plurality of items in a first partitioning to thereby define first partitioning groups;

analyzing second alphanumeric values of the at least some of the plurality of items to segment the at least some of the plurality of items in a second partitioning to thereby define second partitioning groups;

generating a plurality of differently sized tiles associated with the at least some of the plurality of items, the differently sized tiles including some tiles of at least a first tile size and other tiles of at least a second tile size larger than the first tile size, and wherein the first tile size is configured to convey a first magnitude of the first alphanumeric value of the first characteristic, and the second tile size is configured to convey a second magnitude of the first alphanumeric value of the first characteristic, the second magnitude being greater than the first magnitude;

wherein the second partitioning groups are configured to cause an organizational structure dividing the plurality of tiles into distinct collections based on the second partitioning groups, and wherein within the distinct collections, the tiles of the distinct collections visually differ based on the different sizes; and causing the distinct collections to be presented on a common display.

Clause 40. A system for causing discrete graphical elements to be organized in a segmented manner and exhibiting alphanumeric data as graphical distinctions, the system comprising:

at least one processor configured to:

access a data structure including a plurality of items each associated with a common objective, and each including a first characteristic having a first alphanumeric value and a second characteristic having a second alphanumeric value;

receive a trigger requesting that at least some of the plurality of items from the data structure be graphically represented in a grouped manner for visualizing progress toward the common objective;

analyze first alphanumeric values of the at least some of the plurality of items to segment the at least some of the plurality of items in a first partitioning to thereby define first partitioning groups;

analyze second alphanumeric values of the at least some of the plurality of items to segment the at least some of the plurality of items in a second partitioning to thereby define second partitioning groups;

generate a plurality of tiles associated with the at least some of the plurality of items, the differently sized tiles including some tiles of at least a first tile size and other tiles of at least a second tile size larger than the first tile size, and wherein the first tile size is configured to convey a first magnitude of the first alphanumeric value of the first characteristic, and the second tile size is configured to convey a second magnitude of the first alphanumeric value of the first characteristic, the second magnitude being greater than the first magnitude;

wherein the second partitioning groups are configured to cause an organizational structure dividing the plurality of tiles into distinct collections based on the second partitioning groups, and wherein within the distinct collections, the tiles of the distinct collections visually differ based on the different sizes; and cause the distinct collections to be presented on a common display.

Clause 41. A non-transitory computer-readable medium containing instructions that, when executed by at least one processor, cause at least the at least one processor to perform operations for arranging discrete graphical elements having a plurality of graphical characteristics conveying representations of alphanumeric data in a non-alphanumeric manner, the operations comprising:

causing an initial arrangement of a plurality of tiles on a display, wherein in the initial arrangement:

each of the plurality of tiles is associated with an item including a first characteristic having a first alphanumeric value and a second characteristic having a second alphanumeric value, and each item is associated with a common objective;

each tile adopts a first visual characteristic from a first set of visual characteristics, and a second visual characteristic from a second set of visual characteristics;

each tile has a unique position within the initial arrangement; and the plurality of tiles conveys a visualization of progress toward the common objective;

in response to a value change in at least one of the first alphanumeric value or the second alphanumeric value of a first item associated with a first tile of the plurality of tiles:

causing a re-sorting of the tiles to an updated arrangement differing from the initial arrangement;

causing a first visual change in at least one of the first visual characteristic or the second visual characteristic of the first tile; and causing a second visual change in at least one of the first visual characteristic or the second visual characteristic of a second tile of the plurality of tiles.

Clause 42. The non-transitory computer-readable medium of any of clauses 1-41, wherein the first set of visual characteristics is determined by analyzing the first alphanumeric values of each item associated with each of the plurality of tiles, and the second set of visual characteristics is determined by analyzing the second alphanumeric values of each item associated with each of the plurality of tiles.

Clause 43. The non-transitory computer-readable medium of any of clauses 1-42, wherein causing the first visual change includes replacing at least one of:

the first visual characteristic adopted by the first tile with a different visual characteristic from the first set of visual characteristics, or the second visual characteristic adopted by the first tile with a different visual characteristic from the second set of visual characteristics.

Clause 44. The non-transitory computer-readable medium of any of clauses 1-43, wherein causing the first visual change includes:

determining at least one of:

an updated first set of visual characteristics by analyzing the first alphanumeric values of each item associated with each of the plurality of tiles, or an updated second set of visual characteristics by analyzing the second alphanumeric values of each item associated with each of the plurality of tiles; and replacing at least one of:

the first visual characteristic adopted by the first tile with a different visual characteristic from the updated first set of visual characteristics, or the second visual characteristic adopted by the first tile with a different visual characteristic from the updated second set of visual characteristics.

Clause 45. The non-transitory computer-readable medium of any of clauses 1-44, wherein causing the second visual includes replacing at least one of:

the first visual characteristic adopted by the second tile with a different visual characteristic from the first set of visual characteristics, or the second visual characteristic adopted by the second tile with a different second visual characteristic from the second set of visual characteristics.

Clause 46. The non-transitory computer-readable medium of any of clauses 1-45, wherein causing the second visual change includes:

determining at least one of:

an updated first set of visual characteristics by analyzing the first alphanumeric values of each item associated with each of the plurality of tiles, or an updated second set of visual characteristics by analyzing the second alphanumeric values of each item associated with each of the plurality of tiles; and replacing at least one of:

the first visual characteristic adopted by the second tile with a different visual characteristic from the updated first set of visual characteristics, or the second visual characteristic adopted by the second tile with a different visual characteristic from the updated second set of visual characteristics.

Clause 47. The non-transitory computer-readable medium of any of clauses 1-46, wherein re-sorting the initial arrangement includes at least one of:

modifying spacings between tiles in the initial arrangement;

introducing at least one placeholder tile in the initial arrangement; or modifying at least one placeholder tile included in the initial arrangement.

Clause 48. The non-transitory computer-readable medium of any of clauses 1-47, wherein the first set of visual characteristics and the second set of visual characteristics are chosen from a group consisting of size, color, texture, transparency, or shape.

Clause 49. The non-transitory computer-readable medium of any of clauses 1-48, wherein the first set of visual characteristics are different sizes and the second set of visual characteristics are different colors.

Clause 50. The non-transitory computer-readable medium of any of clauses 1-49, wherein the initial arrangement corresponds to the plurality of tiles being arranged in groupings based on at least one of the first set of visual characteristics or the second set of visual characteristics.

Clause 51. The non-transitory computer-readable medium of any of clauses 1-50, wherein the first tile and the second tile are within a same grouping.

Clause 52. The non-transitory computer-readable medium of any of clauses 1-51, wherein each item associated with each of the plurality of tiles further includes a third characteristic having a third alphanumerical value, and the initial arrangement corresponds to the plurality of tiles being arranged in an organizational structure dividing the plurality of tiles into distinct collections based on partitioning groups determined by analyzing the third alphanumerical values of each item associated with each of the plurality of tiles.

Clause 53. The non-transitory computer-readable medium of any of clauses 1-52, wherein the tiles of the plurality of tiles are further arranged within the distinct collections based on the first set of visual characteristics and the second set of visual characteristics.

Clause 54. The non-transitory computer-readable medium of any of clauses 1-53, wherein the first tile and the second tile are within a same distinct collection.

Clause 55. The non-transitory computer-readable medium of any of clauses 1-54, wherein at least one of the first alphanumerical values or the second alphanumerical values of each item associated with each of the plurality of tiles are relative alphanumerical values.

Clause 56. The non-transitory computer-readable medium of any of clauses 1-55, wherein the first visual change conveys information about the value change.

Clause 57. The non-transitory computer-readable medium of any of clauses 1-56, wherein the second visual change conveys information about the value change.

Clause 58. The non-transitory computer-readable medium of any of clauses 1-57, wherein the operations further include causing a third visual change in at least one of the first visual characteristic or the second visual characteristic of a third tile of the plurality of tiles.

Clause 59. A method for arranging discrete graphical elements having a plurality of graphical characteristics that convey representations of alphanumeric data in a non-alphanumeric manner, the method comprising:

causing an initial arrangement of a plurality of tiles on a display, wherein in the initial arrangement:

each of the plurality of tiles is associated with an item including a first characteristic having a first alphanumeric value and a second characteristic having a second alphanumeric value, and each item is associated with a common objective;

each tile adopts a first visual characteristic from a first set of visual characteristics, and a second visual characteristic from a second set of visual characteristics;

each tile has a unique position within the initial arrangement; and the plurality of tiles conveys a visualization of progress toward the common objective;

in response to a value change in at least one of the first alphanumeric value or the second alphanumeric value of a first item associated with a first tile of the plurality of tiles:

causing a re-sorting of the tiles to an updated arrangement differing from the initial arrangement;

causing a first visual change in at least one of the first visual characteristic or the second visual characteristic of the first tile; and causing a second visual change in at least one of the first visual characteristic or the second visual characteristic of a second tile of the plurality of tiles.

Clause 60. A system for arranging discrete graphical elements having a plurality of graphical characteristics that convey representations of alphanumeric data in a non-alphanumeric manner, the system comprising:

at least one processor configured to:

cause an initial arrangement of a plurality of tiles on a display, wherein in the initial arrangement:

each of the plurality of tiles is associated with an item including a first characteristic having a first alphanumeric value and a second characteristic having a second alphanumeric value, and each item is associated with a common objective;

each tile adopts a first visual characteristic from a first set of visual characteristics, and a second visual characteristic from a second set of visual characteristics;

each tile has a unique position within the initial arrangement; and the plurality of tiles conveys a visualization of progress toward the common objective;

in response to a value change in at least one of the first alphanumeric value or the second alphanumeric value of a first item associated with a first tile of the plurality of tiles:

cause a re-sorting of the tiles to an updated arrangement differing from the initial arrangement;

cause a first visual change in at least one of the first visual characteristic or the second visual characteristic of the first tile; and cause a second visual change in at least one of the first visual characteristic or the second visual characteristic of a second tile of the plurality of tiles.

Clause 61. A non-transitory computer-readable medium containing instructions that, when executed by at least one processor, cause the at least one processor to perform operations for toggling between different arrangements of discrete graphical elements having a plurality of graphical characteristics conveying representations of alphanumeric data in a non-alphanumeric manner, the operations comprising:

causing an initial arrangement of a plurality of tiles on a display, wherein in the initial arrangement:

each of the plurality of tiles is associated with an item including a first characteristic having a first alphanumeric value and a second characteristic having a second alphanumeric value, and each item is associated with a common objective;

each of the plurality of tiles adopts a first visual characteristic from a first set of visual characteristics, and a second visual characteristic from a second set of visual characteristics;

the plurality of tiles is arranged in groupings based on the second set of visual characteristics; and the plurality of tiles is arranged to convey a visualization of progress toward the common objective;

in response to a trigger signal:

on a grouping-by-grouping basis, aggregating underlying associated first alphanumeric values of each item;

causing each of the groupings to merge into an associated merged tile expressing the second visual characteristic, and wherein the merged tiles have different sizes based on the aggregating of the underlying associated first alphanumeric values; and presenting on the display the merged tiles by juxtaposing the merged tiles in accordance with the second set of visual characteristics.

Clause 62. The non-transitory computer-readable medium of any of clauses 1-61, wherein the first set of visual characteristics and the second set of visual characteristics are chosen from a group consisting of size, color, texture, transparency, or shape.

Clause 63. The non-transitory computer-readable medium of any of clauses 1-62, wherein the first set of visual characteristics are different sizes and the second set of visual characteristics are different colors.

Clause 64. The non-transitory computer-readable medium of any of clauses 1-63, wherein the operations further comprise comparing the aggregated underlying associated first alphanumeric values of each grouping to determine relative merged tile sizes.

Clause 65. The non-transitory computer-readable medium of any of clauses 1-64, wherein each merged tile includes at least one alphanumerical field configured to present a sum of the first alphanumerical values of each item associated with each tile included in each associated grouping.

Clause 66. The non-transitory computer-readable medium of any of clauses 1-65, wherein the operations further comprise:

receiving an alphanumeric target value associated with the common objective;

calculating from the first alphanumeric values of each item associated with each of the plurality of tiles a boundary location within the juxtaposition of the merged tiles corresponding to the target value;

further presenting on the display a boundary at the boundary location.

Clause 67. The non-transitory computer-readable medium of any of clauses 1-66, wherein the operations further comprise:

combining at least some of the merged tiles into a combined tile based on the second alphanumerical values of each item associated with each tile included in each associated grouping of the at least some of the merged tiles.

Clause 68. The non-transitory computer-readable medium of any of clauses 1-67, wherein the combined tile includes at least one alphanumerical field configured to present a sum of the first alphanumerical values of each item associated with each tile included in each associated grouping of the at least some of the merged tiles.

Clause 69. The non-transitory computer-readable medium of any of clauses 1-68, wherein receiving the trigger signal includes receiving at least one of:

receiving a scroll signal resulting from a motion of a user on the display; or receiving a trigger via a Graphical User Interface (GUI) component present on a display.

Clause 70. The non-transitory computer-readable medium of any of clauses 1-69, wherein the operations further comprise:

in response to a reverting signal, causing each of the merged tiles to revert to the initial arrangement.

Clause 71. The non-transitory computer-readable medium of any of clauses 1-70, wherein receiving the reverting signal includes receiving at least one of:

receiving a scroll signal resulting from a motion of a user on the display; or receiving a trigger via a Graphical User Interface (GUI) component present on a display.

Clause 72. The non-transitory computer-readable medium of any of clauses 1-71, wherein operations further comprise causing a table to be presented on the display, wherein the table includes rows corresponding to the items associated with the plurality of tiles, a first column corresponding to the first characteristic, and a second column corresponding to the second characteristic.

Clause 73. The non-transitory computer-readable medium of any of clauses 1-72, wherein the operations further include in response to a selection signal, selecting at least one of the merged tiles, causing the table presented on the display to include rows corresponding to the items associated with each tile of the grouping associated with the at least one selected merged tile.

Clause 74. The non-transitory computer-readable medium of any of clauses 1-73, wherein the table includes a third column corresponding to graphical representations of tiles associated with the at least some of the plurality of items.

Clause 75. The non-transitory computer-readable medium of any of clauses 1-74, wherein the first set of visual characteristics is determined by analyzing the first alphanumeric values of each item associated with each of the plurality of tiles, and the second set of visual characteristics is determined by analyzing the second alphanumeric values of each item associated with each of the plurality of tiles.

Clause 76. The non-transitory computer-readable medium of any of clauses 1-75, wherein each item associated with each tile includes a third characteristic having a third alphanumeric value, and wherein the operations further include:

analyzing the third alphanumeric values of each item associated with each of the plurality of tiles to determine a third set of visual characteristics;

in response to a switching signal:

applying the third set of visual characteristics to the plurality of tiles;

arranging the plurality of tiles in alternative groupings based on the third set of visual characteristics;

on an alternative grouping-by-alternative grouping basis, aggregating underlying associated first alphanumeric values of each item;

causing each of the alternative groupings to merge into an associated alternative merged tile expressing the third visual characteristic, and wherein the alternative merged tiles have different sizes based on the aggregating of the underlying associated first alphanumeric values; and presenting on the display the alternative merged tiles by juxtaposing the alternative merged tiles in accordance with the third set of visual characteristics.

Clause 77. The non-transitory computer-readable medium of any of clauses 1-76, wherein the first set of visual characteristics are different sizes, the second set of visual characteristics are different colors chosen from a first color palette, and the third set of visual characteristics are different colors chosen from a second color palette different the first color palette.

Clause 78. The non-transitory computer-readable medium of any of clauses 1-76, wherein receiving the switching signal includes receiving at least one of:

receiving a scroll signal resulting from a motion of a user on the display; or receiving a trigger via a Graphical User Interface (GUI) component present on a display.

Clause 79. A method for toggling between different arrangements of discrete graphical elements having a plurality of graphical characteristics conveying representations of alphanumeric data in a non-alphanumeric manner, the method comprising:

causing an initial arrangement of a plurality of tiles on a display, wherein in the initial arrangement:

each of the plurality of tiles is associated with an item including a first characteristic having a first alphanumeric value and a second characteristic having a second alphanumeric value, and each item is associated with a common objective;

each tile of the plurality of tiles adopts a first visual characteristic from a first set of visual characteristics, and a second visual characteristic from a second set of visual characteristics;

the plurality of tiles is arranged in groupings based on the second set of visual characteristics; and the plurality of tiles is arranged to convey a visualization of progress toward the common objective;

in response to a trigger signal:

on a grouping-by-grouping basis, aggregating underlying associated first alphanumeric values of each item;

causing each of the groupings to merge into an associated merged tile expressing the second visual characteristic, and wherein the merged tiles have different sizes based on the aggregating of the underlying associated first alphanumeric values; and presenting on the display the merged tiles by juxtaposing the merged tiles in accordance with the second set of visual characteristics.

Clause 80. A system for toggling between different arrangements of discrete graphical elements having a plurality of graphical characteristics conveying representations of alphanumeric data in a non-alphanumeric manner, the system comprising:

at least one processor configured to:

cause an initial arrangement of a plurality of tiles on a display, wherein in the initial arrangement:

each of the plurality of tiles is associated with an item including a first characteristic having a first alphanumeric value and a second characteristic having a second alphanumeric value, and each item is associated with a common objective;

each tile of the plurality of tiles adopts a first visual characteristic from a first set of visual characteristics, and a second visual characteristic from a second set of visual characteristics;

the plurality of tiles is arranged in groupings based on the second set of visual characteristics; and the plurality of tiles is arranged to convey a visualization of progress toward the common objective;

in response to a trigger signal:

on a grouping-by-grouping basis, aggregate underlying associated first alphanumeric values of each item;

cause each of the groupings to merge into an associated merged tile expressing the second visual characteristic, and wherein the merged tiles have different sizes based on the aggregating of the underlying associated first alphanumeric values; and present on the display the merged tiles by juxtaposing the merged tiles in accordance with the second set of visual characteristics.

Disclosed embodiments may include any one of the following bullet-pointed features alone or in combination with one or more other bullet-pointed features, whether implemented as a system and/or method, by one or more hardware components disclosed herein, as well as by at least one processor or circuitry, and/or stored as executable instructions on non-transitory computer readable media or computer readable media.

converting stored alphanumeric data into discrete graphical elements having a plurality of graphical characteristics that convey representations of the alphanumeric data in a non-alphanumeric manner;

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in a grouped manner for visualizing progress toward the common objective;

analyzing first alphanumeric values of the at least some of the plurality of items to segment the at least some of the plurality of items in a first partitioning to thereby define first partitioning groups;

analyzing second alphanumeric values of the at least some of the plurality of items to segment the at least some of the plurality of items in a second partitioning to thereby define second partitioning groups;

based on the first partitioning, identifying a first set of visual characteristics for non-alphanumerically expressing the first alphanumeric values;

based on the second partitioning, identifying a second set of visual characteristics different from the first set of visual characteristics, for non-alphanumerically expressing the second alphanumeric values;

generating a plurality of tiles associated with the at least some of the plurality of items, each of the plurality of tiles adopting a first visual characteristic from the first set, and a second visual characteristic from the second set;

arranging the plurality of tiles in groupings based on at least one of the first set of visual characteristics or the second set of visual characteristics;

causing the groupings to be presented on a common display;

at least one of the first alphanumeric values or the second alphanumeric values are relative alphanumeric values;

causing a table to be presented on the common display, wherein the table includes rows corresponding to the at least some of the plurality of items and at least two columns corresponding to the first characteristic and the second characteristic included in each of the at least some of the plurality of items;

the table includes a third column corresponding to graphical representations of tiles associated with the at least some of the plurality of items;

the first set of visual characteristics and the second set of visual characteristics are chosen from a group consisting of size, color, texture, transparency, shadowing, or shape;

the first set of visual characteristics are different sizes, and the second set of visual characteristics are different colors;

the different sizes are proportional to the first alphanumeric values or, the different sizes correspond to different ranges for the first alphanumeric values;

each item includes a third characteristic having a third alphanumeric value;

analyzing third alphanumeric values of the at least some of the plurality of items to segregate the at least some of the plurality of items in a third partitioning to thereby identify third partitioning groups;

based on the third partitioning, identifying a third set of visual characteristics, different from the first set of visual characteristics and the second set of visual characteristics, for non-alphanumerically expressing the third alphanumeric value;

applying the third set of visual characteristics to the plurality of tiles;

wherein arranging the plurality of tiles in groupings is based on at least one of the first set of visual characteristics, the second set of visual characteristics, or the third set of visual characteristics;

the first set of visual characteristics are different sizes, the second set of visual characteristics are different colors, and the third set of visual characteristics are different transparency levels;

visualizing progress toward the common objective includes determining an order in which the groupings are to be presented on the common display;

wherein the first set of visual characteristics and the second set of visual characteristics provide insights into the common objective;

receiving a trigger includes receiving a scroll signal resulting from a motion of a user on the common display;

receiving a trigger includes receiving a trigger via a Graphical User Interface (GUI) component present on the common display;

the groupings are presented on the common display in a non-overlapping manner;

arranging the plurality of tiles in groupings based on at least one of the first visual characteristic or the second visual characteristic;

arranging the plurality of tiles in groupings based on the first set of visual characteristics and arranging the plurality of tiles within the groupings based on the second set of visual characteristics;

arranging the plurality of tiles in groupings based on the second set of visual characteristics and arranging the plurality of tiles within the groupings based on the first set of visual characteristics;

receiving an alphanumeric target value associated with the common objective;

calculating from the first alphanumeric values a boundary location within the groupings corresponding to the target value;

interposing on the common display a boundary at the boundary location;

when the alphanumeric target value is lower than a sum of the first alphanumeric values, the interposed boundary divides the plurality of tiles into two ensembles;

each of the plurality of tiles includes at least one alphanumerical field configured to present at least one alphanumeric value of an associated item;

toggling between a first grouping presentation on the common display based on the first set of visual characteristics and a second grouping presentation on the common display based on the second set of visual characteristics;

converting stored alphanumeric data into discrete graphical elements having graphical characteristics that convey representations of the alphanumeric data in a non-alphanumeric manner;

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in an aggregated manner for visualizing progress toward the common objective;

analyzing first alphanumeric values of the at least some of the plurality of items to segregate the at least some of the plurality of items in a first partitioning to thereby identify first partitioning groups;

analyzing second alphanumeric values of the at least some of the plurality of items to segregate the at least some of the plurality of items in a second partitioning to thereby identify second partitioning groups;

based on the first partitioning, identifying a first set of visual characteristics for non-alphanumerically expressing the first alphanumeric values;

based on the second partitioning, identifying a second set of visual characteristics, different from the first set of visual characteristics, for non-alphanumerically expressing the second alphanumeric values;

generating a plurality of tiles associated with the at least some of the plurality of items, each of the plurality of tiles adopting a first visual characteristic from the first set, and a second visual characteristic from the second set;

arranging the plurality of tiles in groupings based on at least one of the first set of visual characteristics or the second set of visual characteristics;

causing the groupings to be presented on a common display;

converting stored alphanumeric data into discrete graphical elements having graphical characteristics that convey representations of the alphanumeric data in a non-alphanumeric manner;

access a data structure including a plurality of items each associated with a common objective, and each including a first characteristic having a first alphanumeric value and a second characteristic having a second alphanumeric value;

receive a trigger requesting that at least some of the plurality of items from the data structure be graphically represented in an aggregated manner for visualizing progress toward the common objective;

analyze first alphanumeric values of the at least some of the plurality of items to segregate the at least some of the plurality of items in a first partitioning to thereby identify first partitioning groups;

analyze second alphanumeric values of the at least some of the plurality of items to segregate the at least some of the plurality of items in a second partitioning to thereby identify second partitioning groups;

based on the first partitioning, identify a first set of visual characteristics for non-alphanumerically expressing the first alphanumeric values;

based on the second partitioning, identify a second set of visual characteristics, different from the first set of visual characteristics, for non-alphanumerically expressing the second alphanumeric values;

generate a plurality of tiles associated with the at least some of the plurality of items, each of the plurality of tiles adopting a first visual characteristic from the first set, and a second visual characteristic from the second set;

arrange the plurality of tiles in groupings based on at least one of the first set of visual characteristics or the second set of visual characteristics;

cause the groupings to be presented on a common display;

perform operations for causing discrete graphical elements to be organized in a segmented manner and exhibiting alphanumeric data as graphical distinctions;

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in a grouped manner for visualizing progress toward the common objective;

analyzing first alphanumeric values of the at least some of the plurality of items to segment the at least some of the plurality of items in a first partitioning to thereby define first partitioning groups;

analyzing second alphanumeric values of the at least some of the plurality of items to segment the at least some of the plurality of items in a second partitioning to thereby define second partitioning groups;

generating a plurality of differently sized tiles associated with the at least some of the plurality of items;

the differently sized tiles including some tiles of at least a first tile size and other tiles of at least a second tile size larger than the first tile size;

the first tile size is configured to convey a first magnitude of the first alphanumeric value of the first characteristic;

the second tile size is configured to convey a second magnitude of the first alphanumeric value of the first characteristic, the second magnitude being greater than the first magnitude;

the second partitioning groups are configured to cause an organizational structure dividing the plurality of tiles into distinct collections based on the second partitioning groups;

within the distinct collections, the tiles of the distinct collections visually differ based on the different sizes;

causing the distinct collections to be presented on a common display;

the distinct collections are visually organized and sorted in at least one of a columnar or a non-columnar form;

each second partitioning group is associated with at least one of a distinct second alphanumerical value or a distinct range of second alphanumerical values;

each of the plurality of tiles includes at least one alphanumerical field configured to present at least one alphanumeric value of an associated item;

the at least one alphanumeric value of the associated item corresponds to the first alphanumerical value of the associated item;

presenting on each of the plurality of tiles the first alphanumeric value of the associated item in the at least one alphanumerical field as a function of the size of the tile;

differences in tile size between the first tile size and the second tile size is a result of at least one of an increase in tile area or a change of tile shape;

the different sizes of the plurality of tiles enables to convey information about the common objective;

the operations further include arranging the plurality of tiles within the distinct collections based on the different sizes of the plurality of tiles;

the different sizes of the plurality of tiles are proportional to the first alphanumeric values or, the different sizes correspond to different ranges for the first alphanumeric values;

based on the second partitioning, identifying a set of visual characteristics for non-alphanumerically expressing the second alphanumeric values;

each distinct collection includes an associated label including a graphical element adopting a visual characteristic from the set of visual characteristics;

each label includes an alphanumerical field configured to present a second alphanumerical value associated with the second partitioning group corresponding to the distinct collection for each distinct collection, calculating a sum of the first alphanumerical values of items associated with tiles included in the associated distinct collection;

each label includes an additional alphanumerical field configured to present the sum of the first alphanumerical values of items associated with tiles included in the associated distinct collection;

the operations further comprise identifying the set of different sizes is based on the first alphanumerical values and at least one of: a display dimension; a total number of tiles; or widths associated with columns of the columnar form;

determining for each column of the columnar form a width based on at least one of: tiles included therein; tiles included in at least one other column; or a display dimension;

each item includes a third characteristic having a third alphanumeric value;

analyzing third alphanumeric values of the at least some of the plurality of items to segregate the at least some of the plurality of items in a third partitioning to thereby identify third partitioning groups;

based on the third partitioning, identifying an additional set of visual characteristics to be applied to the plurality of tiles for non-alphanumerically expressing the third alphanumeric values;

arranging the plurality of tiles within the distinct collections based on the set of different sizes and the additional set of visual characteristics;

the additional set of visual characteristics is a set of different colors;

in response to receiving a switching signal, cause the organizational structure of the plurality of tiles into the distinct collections to be switched to an alternative organizational structure;

the alternative organizational structure is obtained by arranging the plurality of tiles in groupings based on at least one of the set of different sizes or the additional set of visual characteristics.

causing discrete graphical elements to be organized in a segmented manner and exhibiting alphanumeric data as graphical distinctions;

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in a grouped manner for visualizing progress toward the common objective;

analyzing first alphanumeric values of the at least some of the plurality of items to segment the at least some of the plurality of items in a first partitioning to thereby define first partitioning groups;

analyzing second alphanumeric values of the at least some of the plurality of items to segment the at least some of the plurality of items in a second partitioning to thereby define second partitioning groups;

generating a plurality of differently sized tiles associated with the at least some of the plurality of items, the differently sized tiles including some tiles of at least a first tile size and other tiles of at least a second tile size larger than the first tile size;

the first tile size is configured to convey a first magnitude of the first alphanumeric value of the first characteristic;

the second tile size is configured to convey a second magnitude of the first alphanumeric value of the first characteristic, the second magnitude being greater than the first magnitude;

the second partitioning groups are configured to cause an organizational structure dividing the plurality of tiles into distinct collections based on the second partitioning groups;

within the distinct collections, the tiles of the distinct collections visually differ based on the different sizes;

causing the distinct collections to be presented on a common display;

causing discrete graphical elements to be organized in a segmented manner and exhibiting alphanumeric data as graphical distinctions;

access a data structure including a plurality of items each associated with a common objective, and each including a first characteristic having a first alphanumeric value and a second characteristic having a second alphanumeric value;

receive a trigger requesting that at least some of the plurality of items from the data structure be graphically represented in a grouped manner for visualizing progress toward the common objective;

analyze first alphanumeric values of the at least some of the plurality of items to segment the at least some of the plurality of items in a first partitioning to thereby define first partitioning groups;

analyze second alphanumeric values of the at least some of the plurality of items to segment the at least some of the plurality of items in a second partitioning to thereby define second partitioning groups;

generate a plurality of tiles associated with the at least some of the plurality of items, the differently sized tiles including some tiles of at least a first tile size and other tiles of at least a second tile size larger than the first tile size;

the first tile size is configured to convey a first magnitude of the first alphanumeric value of the first characteristic;

the second tile size is configured to convey a second magnitude of the first alphanumeric value of the first characteristic, the second magnitude being greater than the first magnitude;

the second partitioning groups are configured to cause an organizational structure dividing the plurality of tiles into distinct collections based on the second partitioning groups;

within the distinct collections, the tiles of the distinct collections visually differ based on the different sizes;

cause the distinct collections to be presented on a common display;

arranging discrete graphical elements having a plurality of graphical characteristics conveying representations of alphanumeric data in a non-alphanumeric manner;

causing an initial arrangement of a plurality of tiles on a display, wherein in the initial arrangement;

each of the plurality of tiles is associated with an item including a first characteristic having a first alphanumeric value and a second characteristic having a second alphanumeric value;

each item is associated with a common objective;

each tile adopts a first visual characteristic from a first set of visual characteristics, and a second visual characteristic from a second set of visual characteristics;

each tile has a unique position within the initial arrangement;

the plurality of tiles conveys a visualization of progress toward the common objective;

in response to a value change in at least one of the first alphanumeric value or the second alphanumeric value of a first item associated with a first tile of the plurality of tiles: causing a re-sorting of the tiles to an updated arrangement differing from the initial arrangement; causing a first visual change in at least one of the first visual characteristic or the second visual characteristic of the first tile; and causing a second visual change in at least one of the first visual characteristic or the second visual characteristic of a second tile of the plurality of tiles;

the first set of visual characteristics is determined by analyzing the first alphanumeric values of each item associated with each of the plurality of tiles, and the second set of visual characteristics is determined by analyzing the second alphanumeric values of each item associated with each of the plurality of tiles;

causing the first visual change includes replacing at least one of: the first visual characteristic adopted by the first tile with a different visual characteristic from the first set of visual characteristics, or the second visual characteristic adopted by the first tile with a different visual characteristic from the second set of visual characteristics;

determining an updated first set of visual characteristics by analyzing the first alphanumeric values of each item associated with each of the plurality of tiles;

determining an updated second set of visual characteristics by analyzing the second alphanumeric values of each item associated with each of the plurality of tiles;

replacing the first visual characteristic adopted by the first tile with a different visual characteristic from the updated first set of visual characteristics;

replacing the second visual characteristic adopted by the first tile with a different visual characteristic from the updated second set of visual characteristics;

causing the second visual includes replacing at least one of: the first visual characteristic adopted by the second tile with a different visual characteristic from the first set of visual characteristics, or the second visual characteristic adopted by the second tile with a different second visual characteristic from the second set of visual characteristics;

causing the second visual change includes determining an updated first set of visual characteristics by analyzing the first alphanumeric values of each item associated with each of the plurality of tiles;

causing the second visual change includes determining an updated second set of visual characteristics by analyzing the second alphanumeric values of each item associated with each of the plurality of tiles;

replacing the first visual characteristic adopted by the second tile with a different visual characteristic from the updated first set of visual characteristics;

replacing the second visual characteristic adopted by the second tile with a different visual characteristic from the updated second set of visual characteristics;

re-sorting the initial arrangement includes modifying spacings between tiles in the initial arrangement;

re-sorting the initial arrangement includes introducing at least one placeholder tile in the initial arrangement;

re-sorting the initial arrangement includes modifying at least one placeholder tile included in the initial arrangement;

the first set of visual characteristics and the second set of visual characteristics are chosen from a group consisting of size, color, texture, transparency, or shape;

the first set of visual characteristics are different sizes and the second set of visual characteristics are different colors;

the initial arrangement corresponds to the plurality of tiles being arranged in groupings based on at least one of the first set of visual characteristics or the second set of visual characteristics;

the first tile and the second tile are within a same grouping;

each item associated with each of the plurality of tiles further includes a third characteristic having a third alphanumerical value;

the initial arrangement corresponds to the plurality of tiles being arranged in an organizational structure dividing the plurality of tiles into distinct collections based on partitioning groups determined by analyzing the third alphanumerical values of each item associated with each of the plurality of tiles;

the tiles of the plurality of tiles are further arranged within the distinct collections based on the first set of visual characteristics and the second set of visual characteristics;

the first tile and the second tile are within a same distinct collection;

at least one of the first alphanumerical values or the second alphanumerical values of each item associated with each of the plurality of tiles are relative alphanumerical values;

the first visual change conveys information about the value change;

the second visual change conveys information about the value change;

the operations further include causing a third visual change in at least one of the first visual characteristic or the second visual characteristic of a third tile of the plurality of tiles;

arranging discrete graphical elements having a plurality of graphical characteristics that convey representations of alphanumeric data in a non-alphanumeric manner;

causing an initial arrangement of a plurality of tiles on a display;

in the initial arrangement, each of the plurality of tiles is associated with an item including a first characteristic having a first alphanumeric value and a second characteristic having a second alphanumeric value, and each item is associated with a common objective;

in the initial arrangement, each tile adopts a first visual characteristic from a first set of visual characteristics, and a second visual characteristic from a second set of visual characteristics;

in the initial arrangement, each tile has a unique position within the initial arrangement;

in the initial arrangement, the plurality of tiles conveys a visualization of progress toward the common objective;

in response to a value change in at least one of the first alphanumeric value or the second alphanumeric value of a first item associated with a first tile of the plurality of tiles: causing a re-sorting of the tiles to an updated arrangement differing from the initial arrangement; causing a first visual change in at least one of the first visual characteristic or the second visual characteristic of the first tile; and causing a second visual change in at least one of the first visual characteristic or the second visual characteristic of a second tile of the plurality of tiles;

toggling between different arrangements of discrete graphical elements having a plurality of graphical characteristics conveying representations of alphanumeric data in a non-alphanumeric manner;

in the initial arrangement, each of the plurality of tiles adopts a first visual characteristic from a first set of visual characteristics, and a second visual characteristic from a second set of visual characteristics;

in the initial arrangement, the plurality of tiles is arranged in groupings based on the second set of visual characteristics;

in the initial arrangement, the plurality of tiles is arranged to convey a visualization of progress toward the common objective;

in response to a trigger signal: on a grouping-by-grouping basis, aggregating underlying associated first alphanumeric values of each item; causing each of the groupings to merge into an associated merged tile expressing the second visual characteristic, and wherein the merged tiles have different sizes based on the aggregating of the underlying associated first alphanumeric values; and presenting on the display the merged tiles by juxtaposing the merged tiles in accordance with the second set of visual characteristics;

the first set of visual characteristics and the second set of visual characteristics are chosen from a group consisting of size, color, texture, transparency, or shape;

the first set of visual characteristics are different sizes and the second set of visual characteristics are different colors;

comparing the aggregated underlying associated first alphanumeric values of each grouping to determine relative merged tile sizes;

each merged tile includes at least one alphanumerical field configured to present a sum of the first alphanumerical values of each item associated with each tile included in each associated grouping;

receiving an alphanumeric target value associated with the common objective;

calculating from the first alphanumeric values of each item associated with each of the plurality of tiles a boundary location within the juxtaposition of the merged tiles corresponding to the target value;

further presenting on the display a boundary at the boundary location;

combining at least some of the merged tiles into a combined tile based on the second alphanumerical values of each item associated with each tile included in each associated grouping of the at least some of the merged tiles;

the combined tile includes at least one alphanumerical field configured to present a sum of the first alphanumerical values of each item associated with each tile included in each associated grouping of the at least some of the merged tiles;

receiving the trigger signal includes receiving a scroll signal resulting from a motion of a user on the display;

receiving the trigger signal includes receiving a trigger via a Graphical User Interface (GUI) component present on a display;

in response to a reverting signal, causing each of the merged tiles to revert to the initial arrangement;

receiving the reverting signal includes receiving a scroll signal resulting from a motion of a user on the display;

receiving the reverting signal includes receiving a trigger via a Graphical User Interface (GUI) component present on a display;

causing a table to be presented on the display;

the table includes rows corresponding to the items associated with the plurality of tiles, a first column corresponding to the first characteristic, and a second column corresponding to the second characteristic;

in response to a selection signal, selecting at least one of the merged tiles, causing the table presented on the display to include rows corresponding to the items associated with each tile of the grouping associated with the at least one selected merged tile;

the table includes a third column corresponding to graphical representations of tiles associated with the at least some of the plurality of items;

the first set of visual characteristics is determined by analyzing the first alphanumeric values of each item associated with each of the plurality of tiles, and the second set of visual characteristics is determined by analyzing the second alphanumeric values of each item associated with each of the plurality of tiles;

each item associated with each tile includes a third characteristic having a third alphanumeric value;

analyzing the third alphanumeric values of each item associated with each of the plurality of tiles to determine a third set of visual characteristics;

in response to a switching signal: applying the third set of visual characteristics to the plurality of tiles; arranging the plurality of tiles in alternative groupings based on the third set of visual characteristics; on an alternative grouping-by-alternative grouping basis, aggregating underlying associated first alphanumeric values of each item; causing each of the alternative groupings to merge into an associated alternative merged tile expressing the third visual characteristic, and wherein the alternative merged tiles have different sizes based on the aggregating of the underlying associated first alphanumeric values; and presenting on the display the alternative merged tiles by juxtaposing the alternative merged tiles in accordance with the third set of visual characteristics;

the first set of visual characteristics are different sizes;

the second set of visual characteristics are different colors chosen from a first color palette;

the third set of visual characteristics are different colors chosen from a second color palette different the first color palette;

receiving the switching signal includes receiving a scroll signal resulting from a motion of a user on the display;

receiving the switching signal includes receiving a trigger via a Graphical User Interface (GUI) component present on a display;

in the initial arrangement, the plurality of tiles is arranged in groupings based on the second set of visual characteristics;

in the initial arrangement, the plurality of tiles is arranged to convey a visualization of progress toward the common objective.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It should be appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer-readable medium containing instructions that, when executed by at least one processor, cause at least the at least one processor to perform operations for converting stored alphanumeric data into discrete graphical elements having a plurality of graphical characteristics that convey representations of the alphanumeric data in a non-alphanumeric manner, the operations comprising:

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in a grouped manner for visualizing progress toward the common objective;

analyzing first alphanumeric values of the at least some of the plurality of items to segment the at least some of the plurality of items in a first partitioning to thereby define first partitioning groups;

analyzing second alphanumeric values of the at least some of the plurality of items to segment the at least some of the plurality of items in a second partitioning to thereby define second partitioning groups;

based on the first partitioning, identifying a first set of visual characteristics for non-alphanumerically expressing the first alphanumeric values;

based on the second partitioning, identifying a second set of visual characteristics different from the first set of visual characteristics, for non-alphanumerically expressing the second alphanumeric values;

generating a plurality of tiles associated with the at least some of the plurality of items, each of the plurality of tiles adopting a first visual characteristic from the first set, and a second visual characteristic from the second set;

arranging the plurality of tiles in groupings based on at least one of the first set of visual characteristics or the second set of visual characteristics; and causing the groupings to be presented on a common display.

2. The non-transitory computer-readable medium of claim 1, wherein at least one of the first alphanumeric values or the second alphanumeric values are relative alphanumeric values.

3. The non-transitory computer-readable medium of claim 1, wherein operations further comprise causing a table to be presented on the common display, wherein the table includes rows corresponding to the at least some of the plurality of items and at least two columns corresponding to the first characteristic and the second characteristic included in each of the at least some of the plurality of items.

4. The non-transitory computer-readable medium of claim 3, wherein the table includes a third column corresponding to graphical representations of tiles associated with the at least some of the plurality of items.

5. The non-transitory computer-readable medium of claim 1, wherein the first set of visual characteristics and the second set of visual characteristics are chosen from a group consisting of size, color, texture, transparency, shadowing, or shape.

6. The non-transitory computer-readable medium of claim 1, wherein the first set of visual characteristics are different sizes, and the second set of visual characteristics are different colors.

7. The non-transitory computer-readable medium of claim 6, wherein the different sizes are proportional to the first alphanumeric values or, the different sizes correspond to different ranges for the first alphanumeric values.

8. The non-transitory computer-readable medium of claim 1, wherein each item includes a third characteristic having a third alphanumeric value and wherein the operations further comprise:

analyzing third alphanumeric values of the at least some of the plurality of items to segregate the at least some of the plurality of items in a third partitioning to thereby identify third partitioning groups;

based on the third partitioning, identifying a third set of visual characteristics, different from the first set of visual characteristics and the second set of visual characteristics, for non-alphanumerically expressing the third alphanumeric value;

applying the third set of visual characteristics to the plurality of tiles; and wherein arranging the plurality of tiles in groupings is based on at least one of the first set of visual characteristics, the second set of visual characteristics, or the third set of visual characteristics.

9. The non-transitory computer-readable medium of claim 8, wherein the first set of visual characteristics are different sizes, the second set of visual characteristics are different colors, and the third set of visual characteristics are different transparency levels.

10. The non-transitory computer-readable medium of claim 1, wherein visualizing progress toward the common objective includes determining an order in which the groupings are to be presented on the common display.

11. The non-transitory computer-readable medium of claim 1, wherein the first set of visual characteristics and the second set of visual characteristics provide insights into the common objective.

12. The non-transitory computer-readable medium of claim 1, wherein receiving a trigger includes at least one of:

receiving a scroll signal resulting from a motion of a user on the common display; or receiving a trigger via a Graphical User Interface (GUI) component present on the common display.

13. The non-transitory computer-readable medium of claim 1, wherein the groupings are presented on the common display in a non-overlapping manner.

14. The non-transitory computer-readable medium of claim 1, wherein arranging the plurality of tiles in groupings based on at least one of the first visual characteristic or the second visual characteristic includes:

arranging the plurality of tiles in groupings based on the first set of visual characteristics and arranging the plurality of tiles within the groupings based on the second set of visual characteristics; or arranging the plurality of tiles in groupings based on the second set of visual characteristics and arranging the plurality of tiles within the groupings based on the first set of visual characteristics.

15. The non-transitory computer-readable medium of claim 1, wherein the operations further comprise:

receiving an alphanumeric target value associated with the common objective;

calculating from the first alphanumeric values a boundary location within the groupings corresponding to the target value;

interposing on the common display a boundary at the boundary location.

16. The non-transitory computer-readable medium of claim 15, wherein when the alphanumeric target value is lower than a sum of the first alphanumeric values, the interposed boundary divides the plurality of tiles into two ensembles.

17. The non-transitory computer-readable medium of claim 1, wherein each of the plurality of tiles includes at least one alphanumerical field configured to present at least one alphanumeric value of an associated item.

18. The non-transitory computer-readable medium of claim 1, wherein the operations further comprise enabling toggling between a first grouping presentation on the common display based on the first set of visual characteristics and a second grouping presentation on the common display based on the second set of visual characteristics.

19. A method for converting stored alphanumeric data into discrete graphical elements having graphical characteristics that convey representations of the alphanumeric data in a non-alphanumeric manner, the method comprising:

accessing a data structure including a plurality of items each associated with a common objective, and each including a first characteristic having a first alphanumeric value and a second characteristic having a second alphanumeric value;

receiving a trigger requesting that at least some of the plurality of items from the data structure be graphically represented in an aggregated manner for visualizing progress toward the common objective;

analyzing first alphanumeric values of the at least some of the plurality of items to segregate the at least some of the plurality of items in a first partitioning to thereby identify first partitioning groups;

analyzing second alphanumeric values of the at least some of the plurality of items to segregate the at least some of the plurality of items in a second partitioning to thereby identify second partitioning groups;

based on the first partitioning, identifying a first set of visual characteristics for non-alphanumerically expressing the first alphanumeric values;

based on the second partitioning, identifying a second set of visual characteristics, different from the first set of visual characteristics, for non-alphanumerically expressing the second alphanumeric values;

generating a plurality of tiles associated with the at least some of the plurality of items, each of the plurality of tiles adopting a first visual characteristic from the first set, and a second visual characteristic from the second set;

arranging the plurality of tiles in groupings based on at least one of the first set of visual characteristics or the second set of visual characteristics; and causing the groupings to be presented on a common display.

20. A system for converting stored alphanumeric data into discrete graphical elements having graphical characteristics that convey representations of the alphanumeric data in a non-alphanumeric manner, the system comprising:

at least one processor configured to:

access a data structure including a plurality of items each associated with a common objective, and each including a first characteristic having a first alphanumeric value and a second characteristic having a second alphanumeric value;

receive a trigger requesting that at least some of the plurality of items from the data structure be graphically represented in an aggregated manner for visualizing progress toward the common objective;

analyze first alphanumeric values of the at least some of the plurality of items to segregate the at least some of the plurality of items in a first partitioning to thereby identify first partitioning groups;

analyze second alphanumeric values of the at least some of the plurality of items to segregate the at least some of the plurality of items in a second partitioning to thereby identify second partitioning groups;

based on the first partitioning, identify a first set of visual characteristics for non-alphanumerically expressing the first alphanumeric values;

based on the second partitioning, identify a second set of visual characteristics, different from the first set of visual characteristics, for non-alphanumerically expressing the second alphanumeric values;

generate a plurality of tiles associated with the at least some of the plurality of items, each of the plurality of tiles adopting a first visual characteristic from the first set, and a second visual characteristic from the second set;

arrange the plurality of tiles in groupings based on at least one of the first set of visual characteristics or the second set of visual characteristics; and cause the groupings to be presented on a common display.

* * * * *